Nov. 28, 1967  G. D. HAYNIE ETAL  3,355,662
AUTOMATED TRANSMISSION MEASURING SET
Filed Oct. 30, 1963   59 Sheets-Sheet 1

INVENTORS G. D. HAYNIE
P. E. ROSENFELD
BY
Patrick J. Roche
ATTORNEY

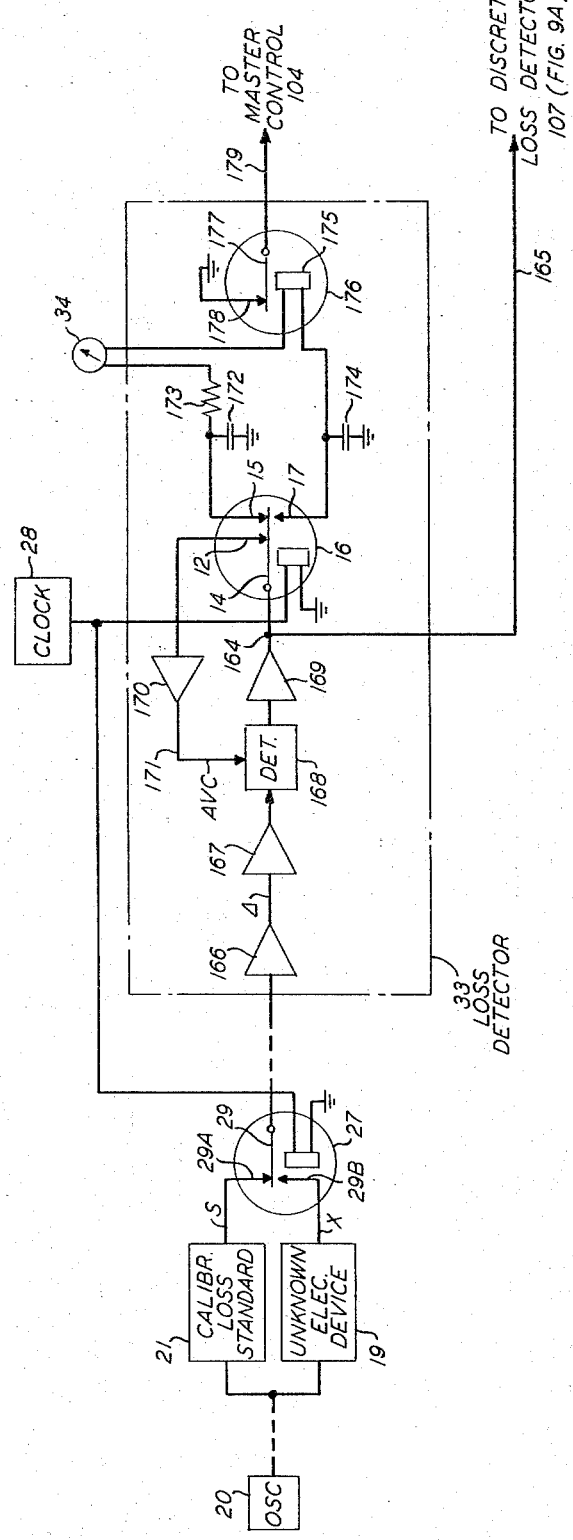

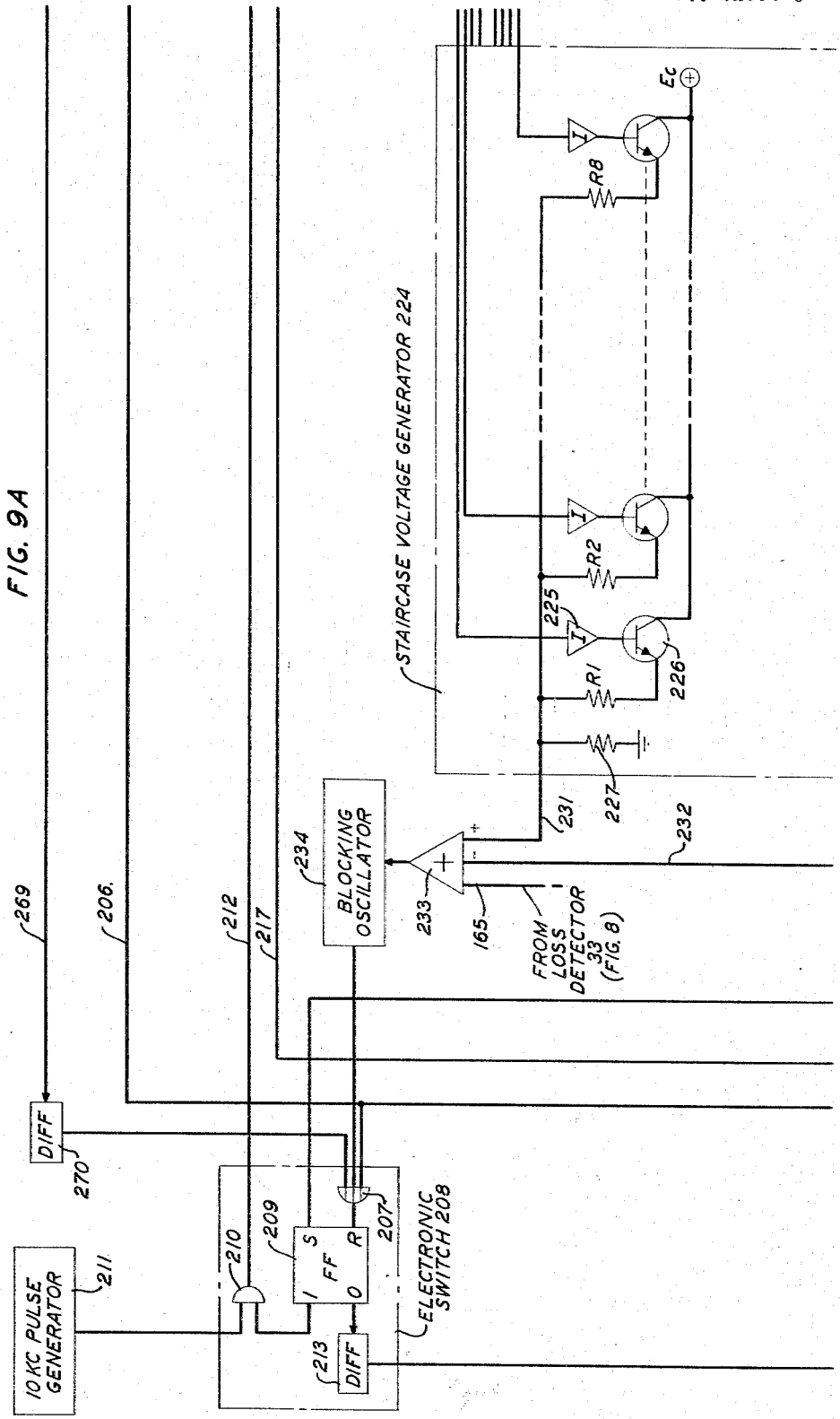

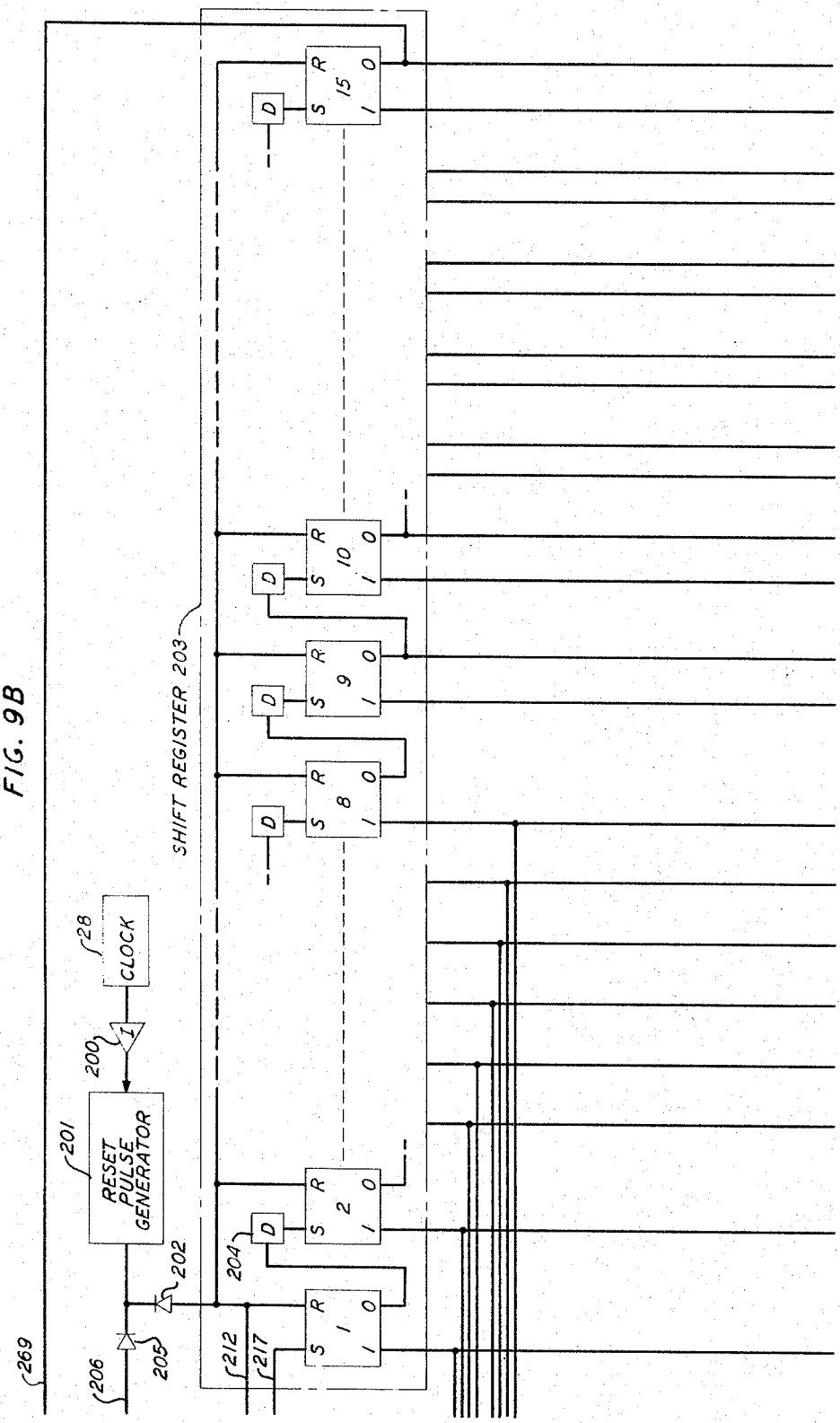

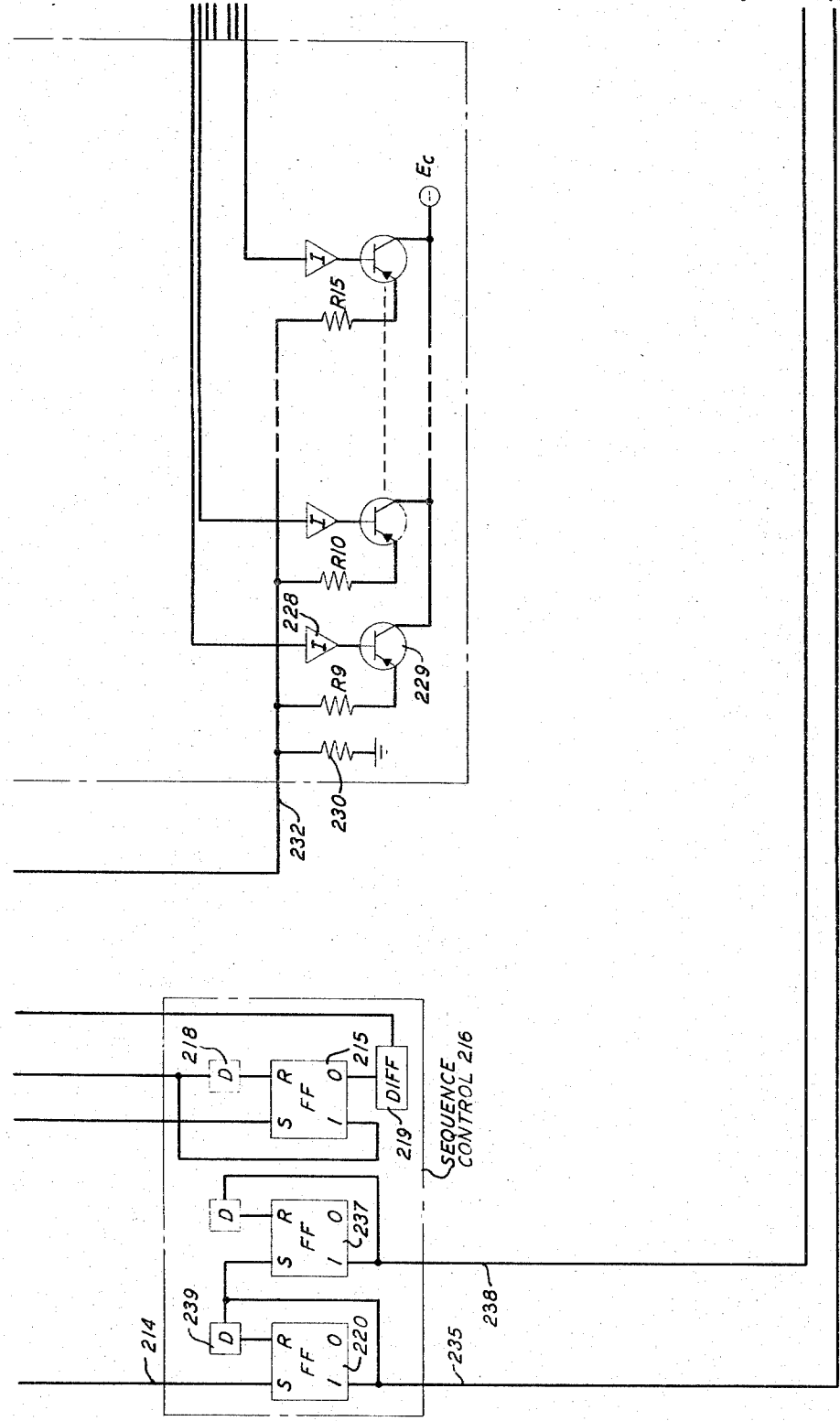

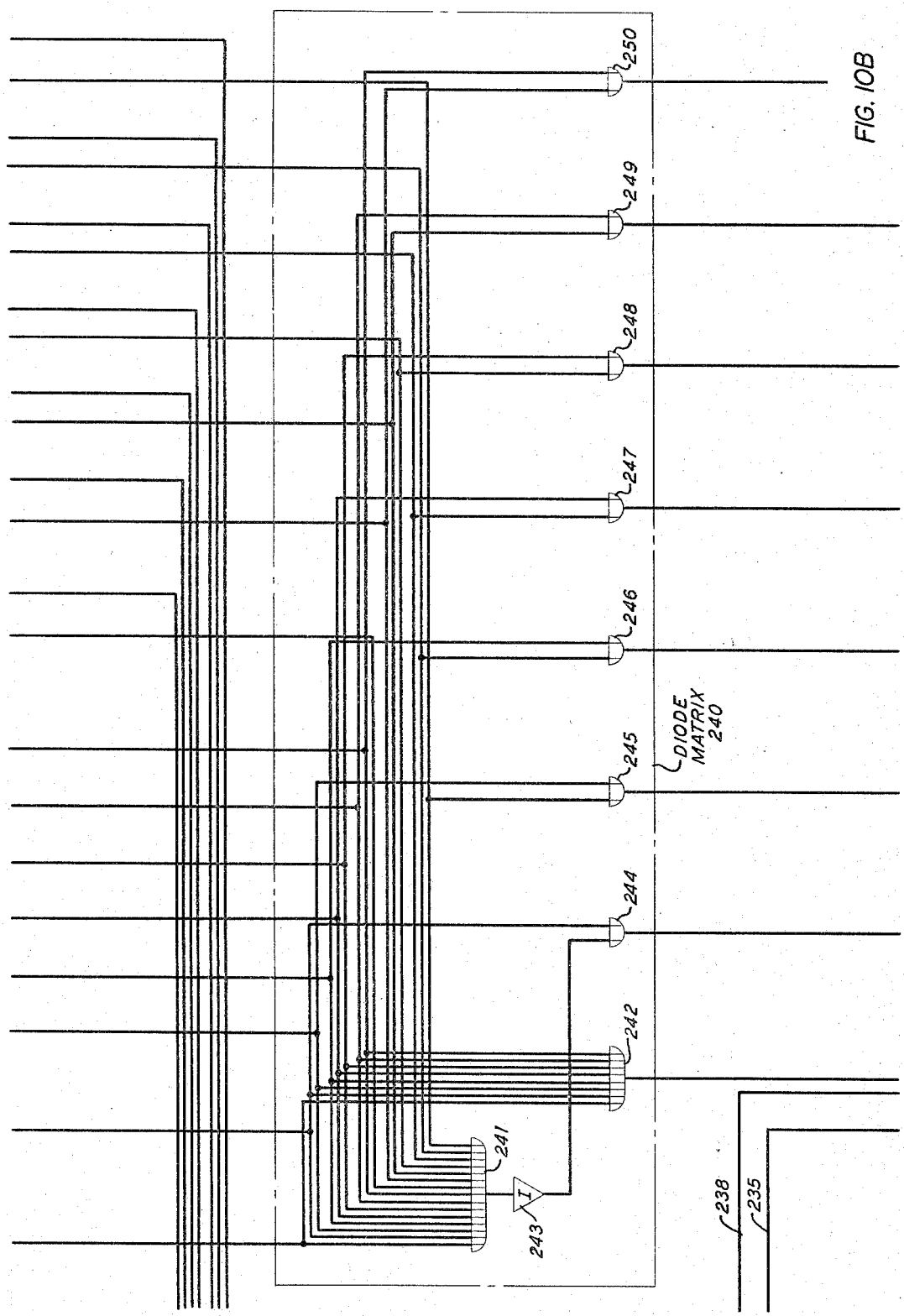

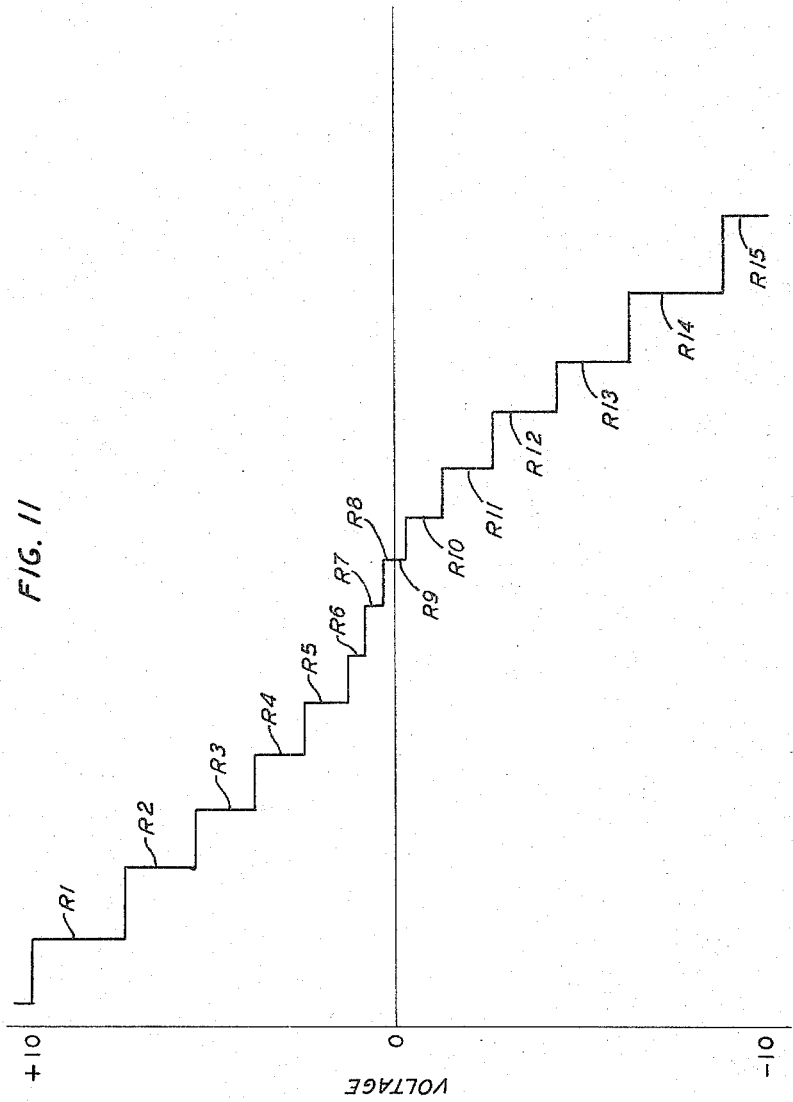

Nov. 28, 1967   G. D. HAYNIE ETAL   3,355,662
AUTOMATED TRANSMISSION MEASURING SET
Filed Oct. 30, 1963   59 Sheets-Sheet 15

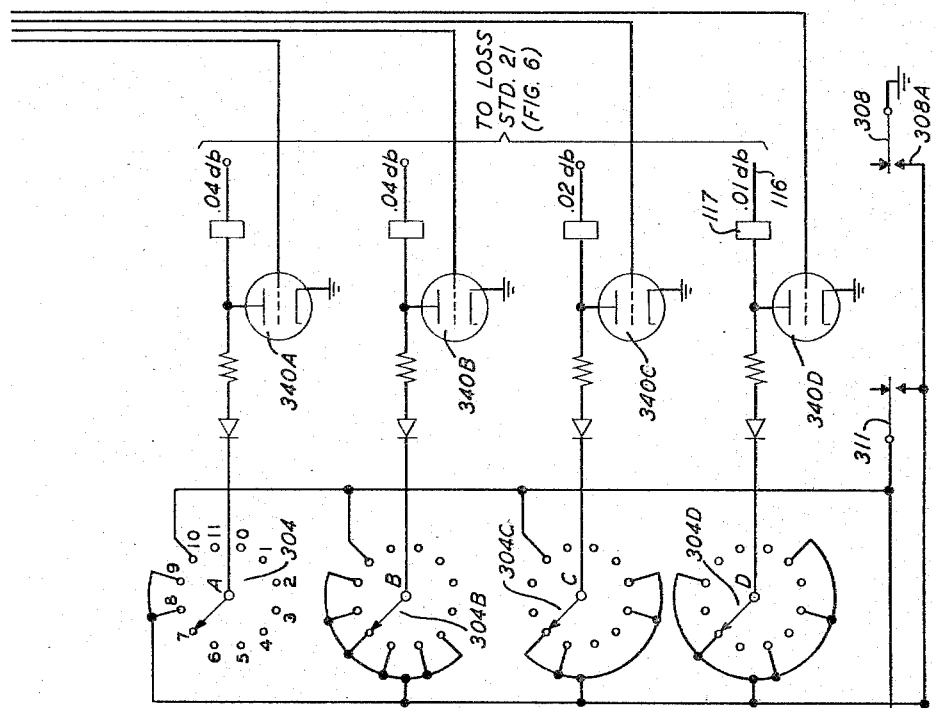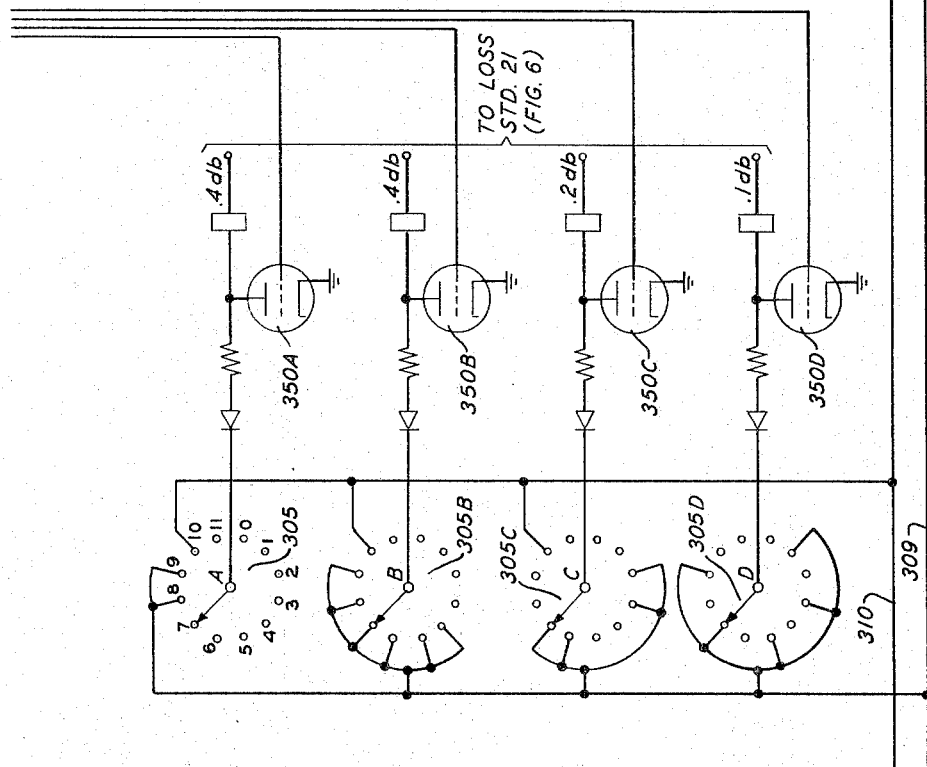
FIG. 16

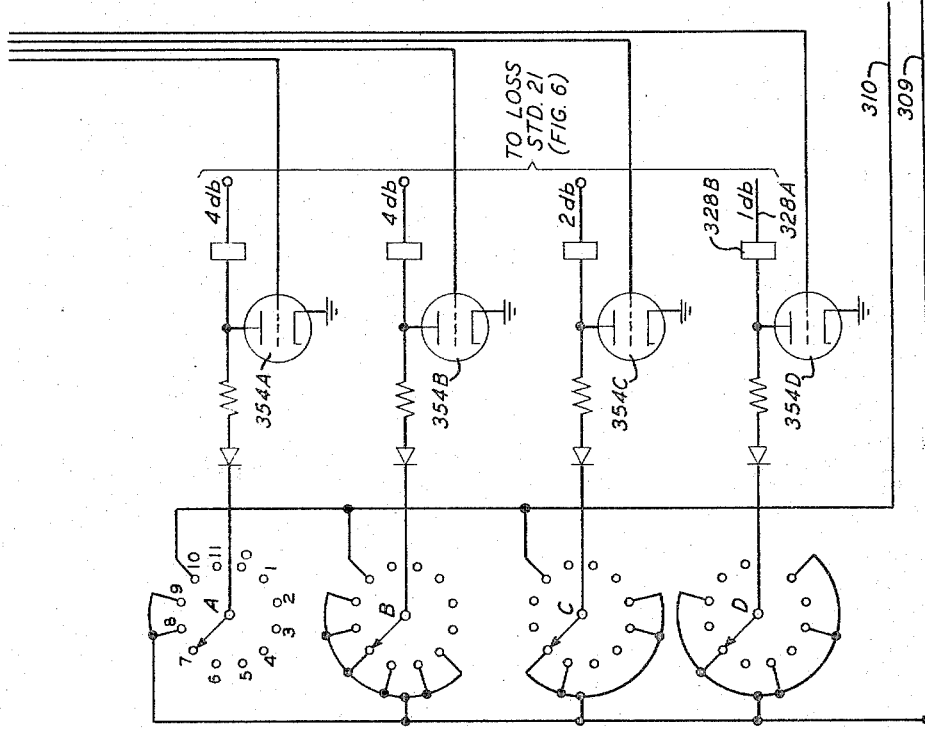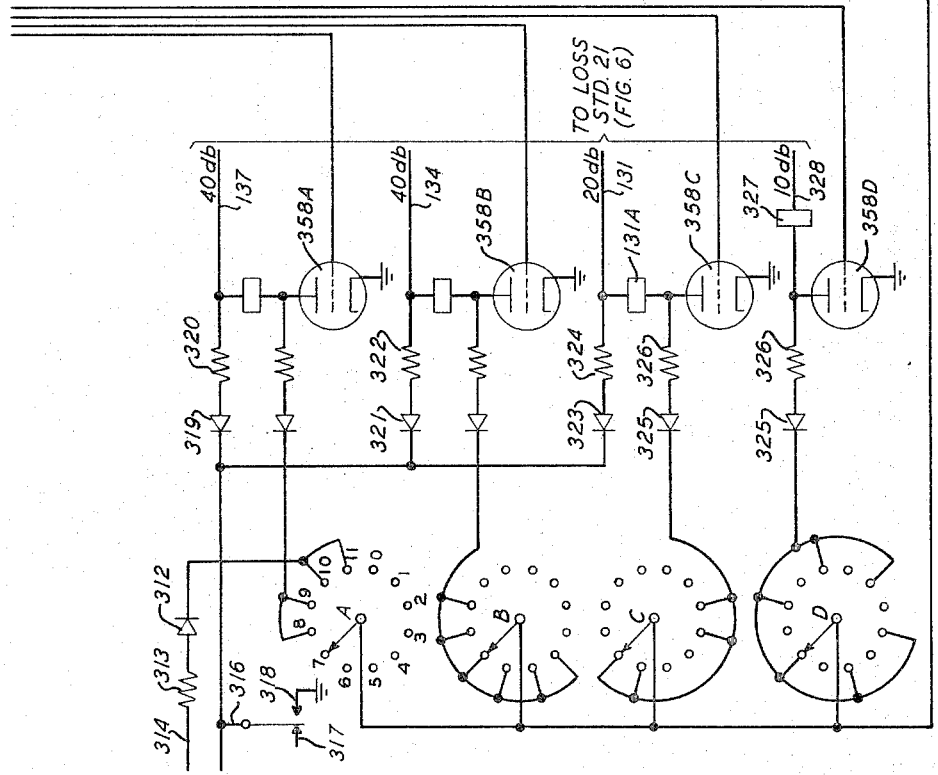
FIG. 17

Nov. 28, 1967  G. D. HAYNIE ETAL  3,355,662
AUTOMATED TRANSMISSION MEASURING SET
Filed Oct. 30, 1963  59 Sheets-Sheet 23
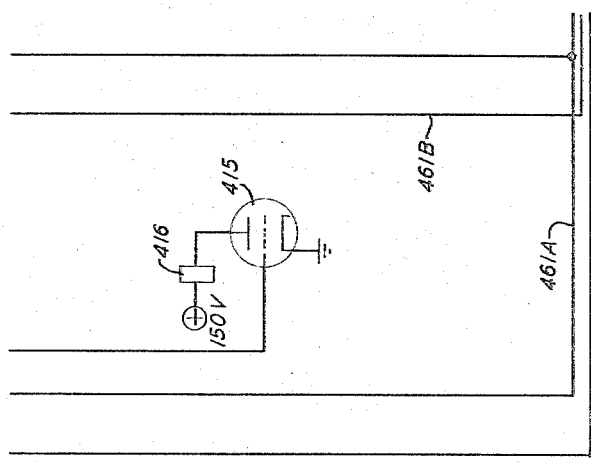
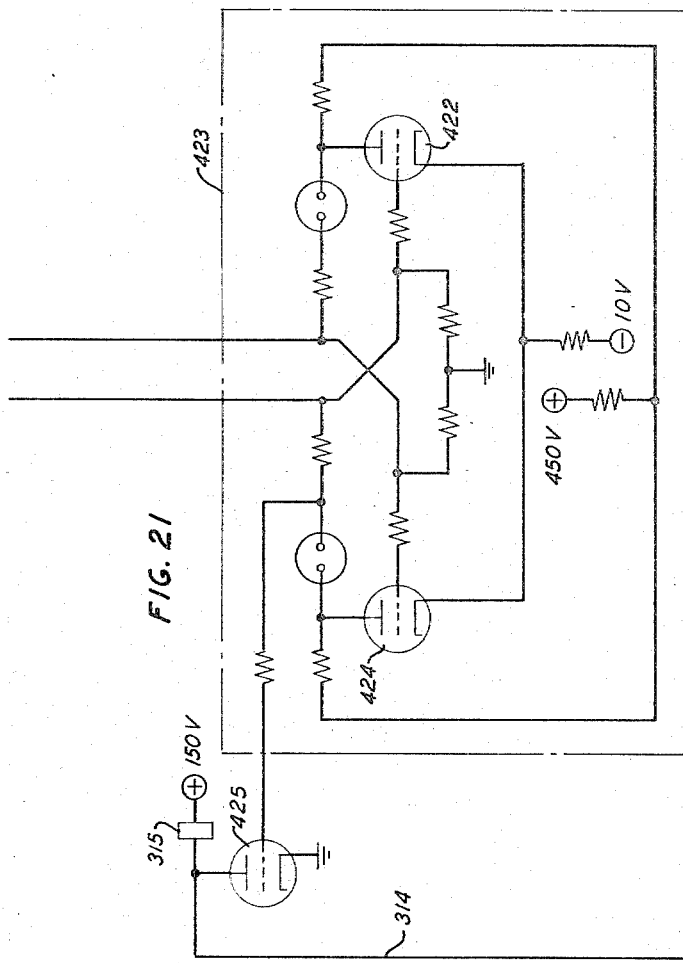
FIG. 21

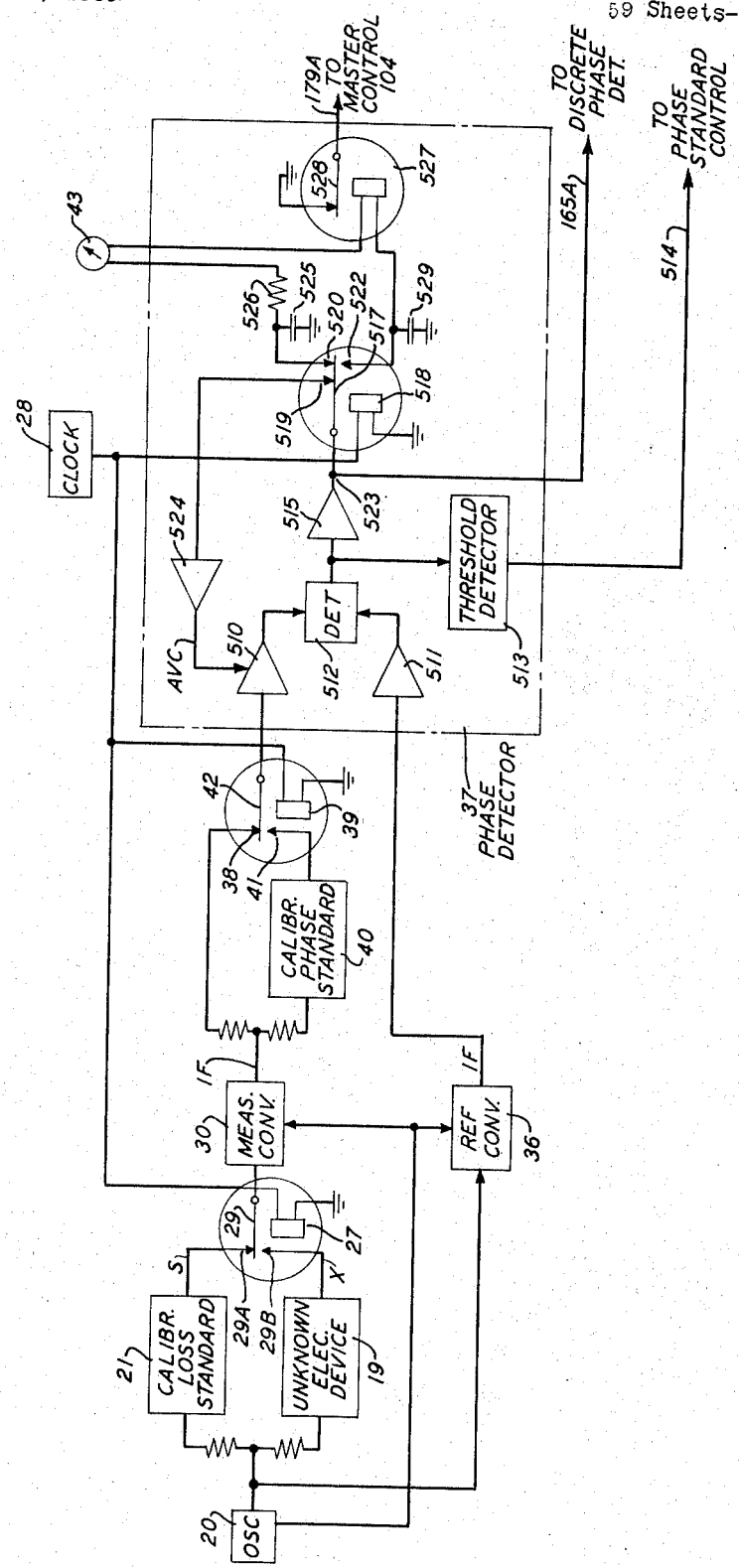

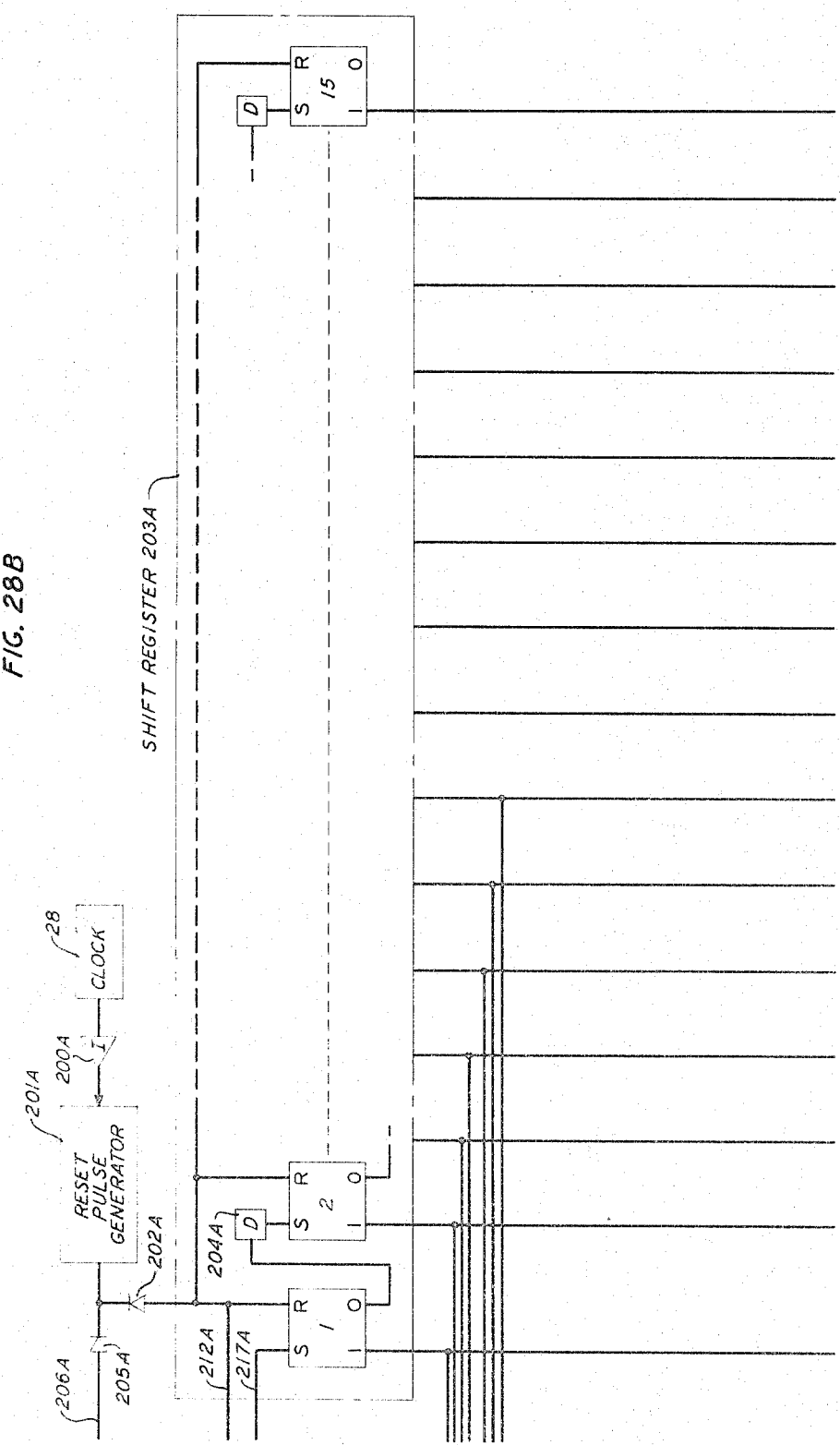

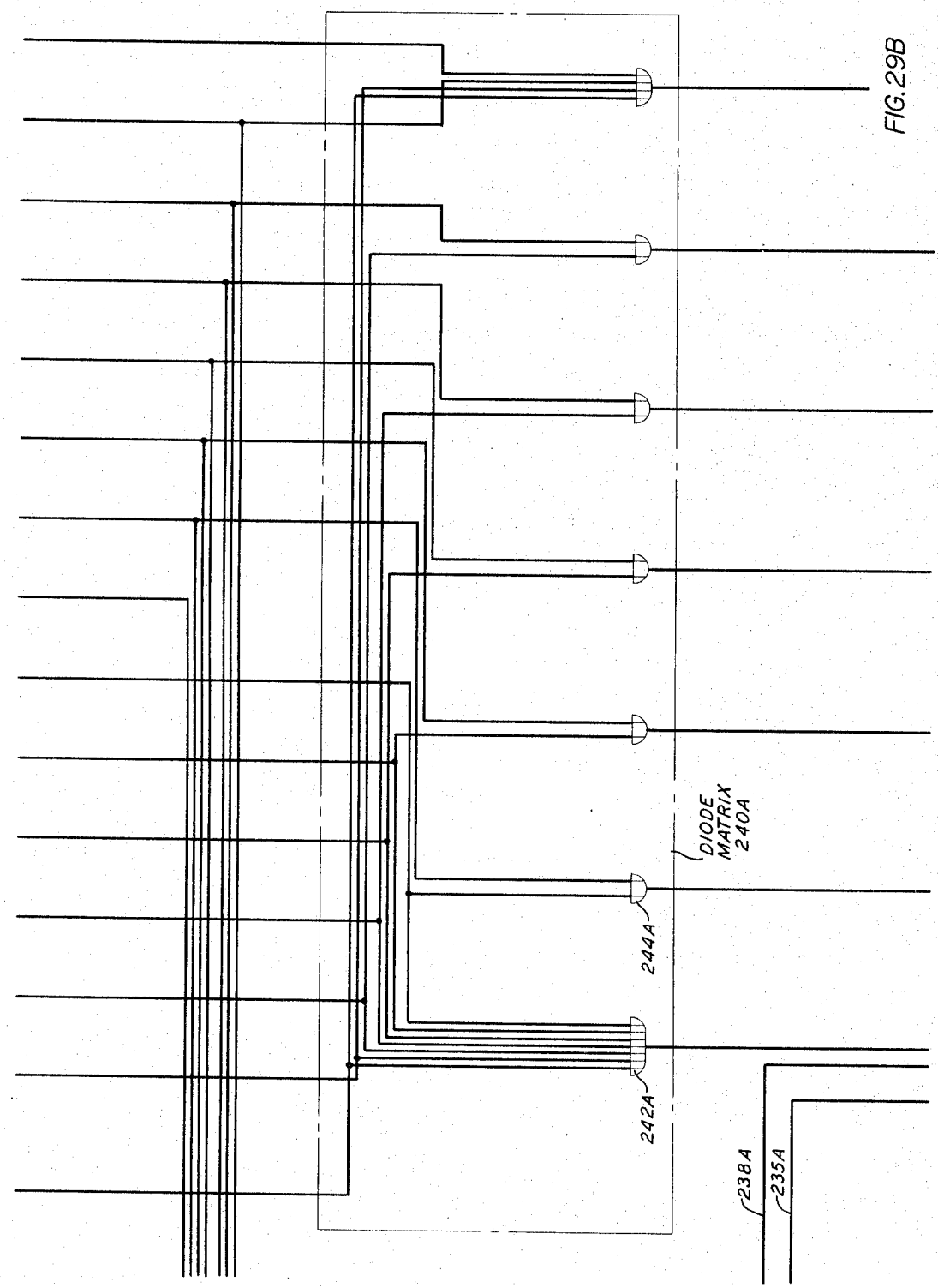

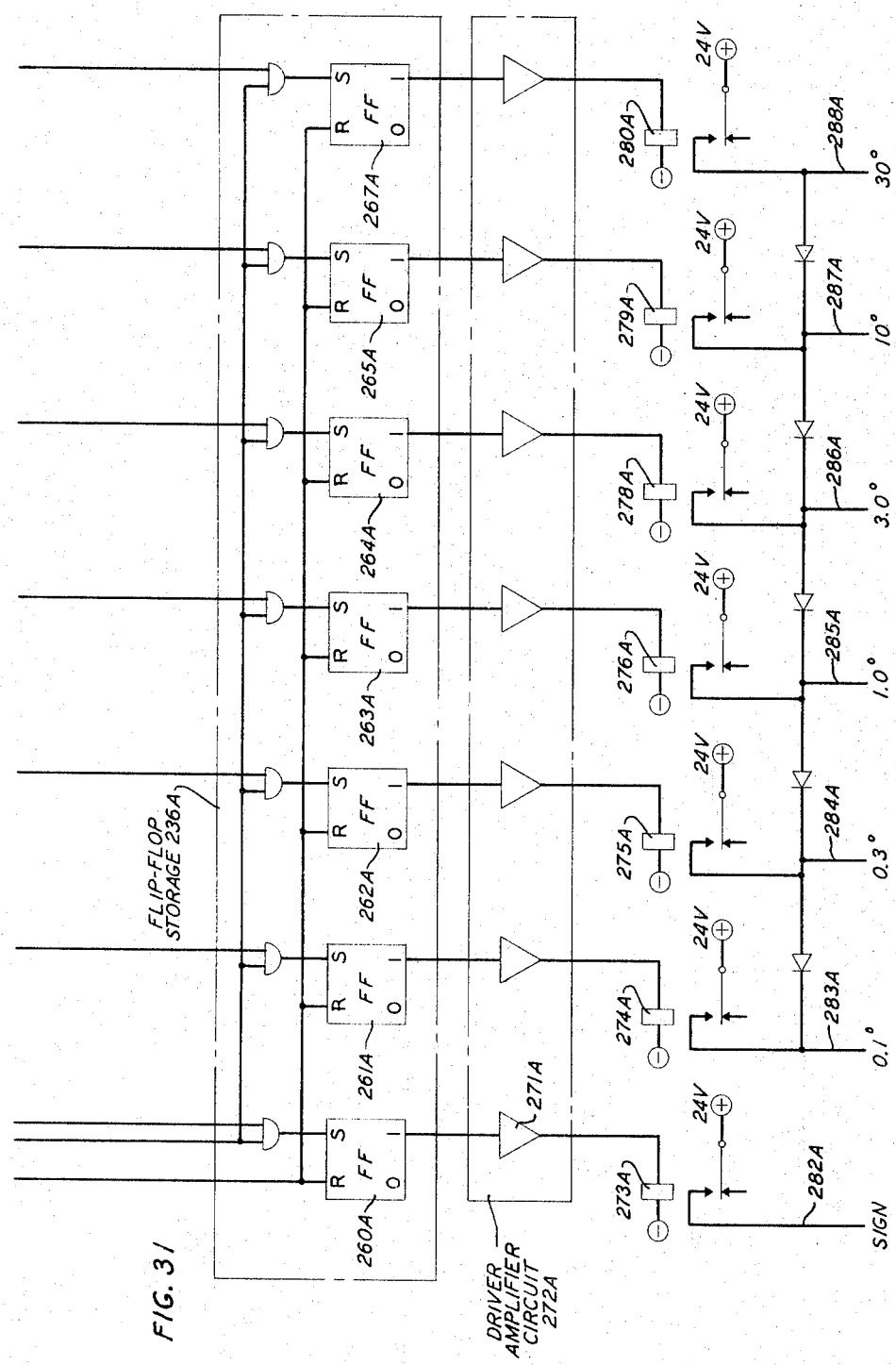

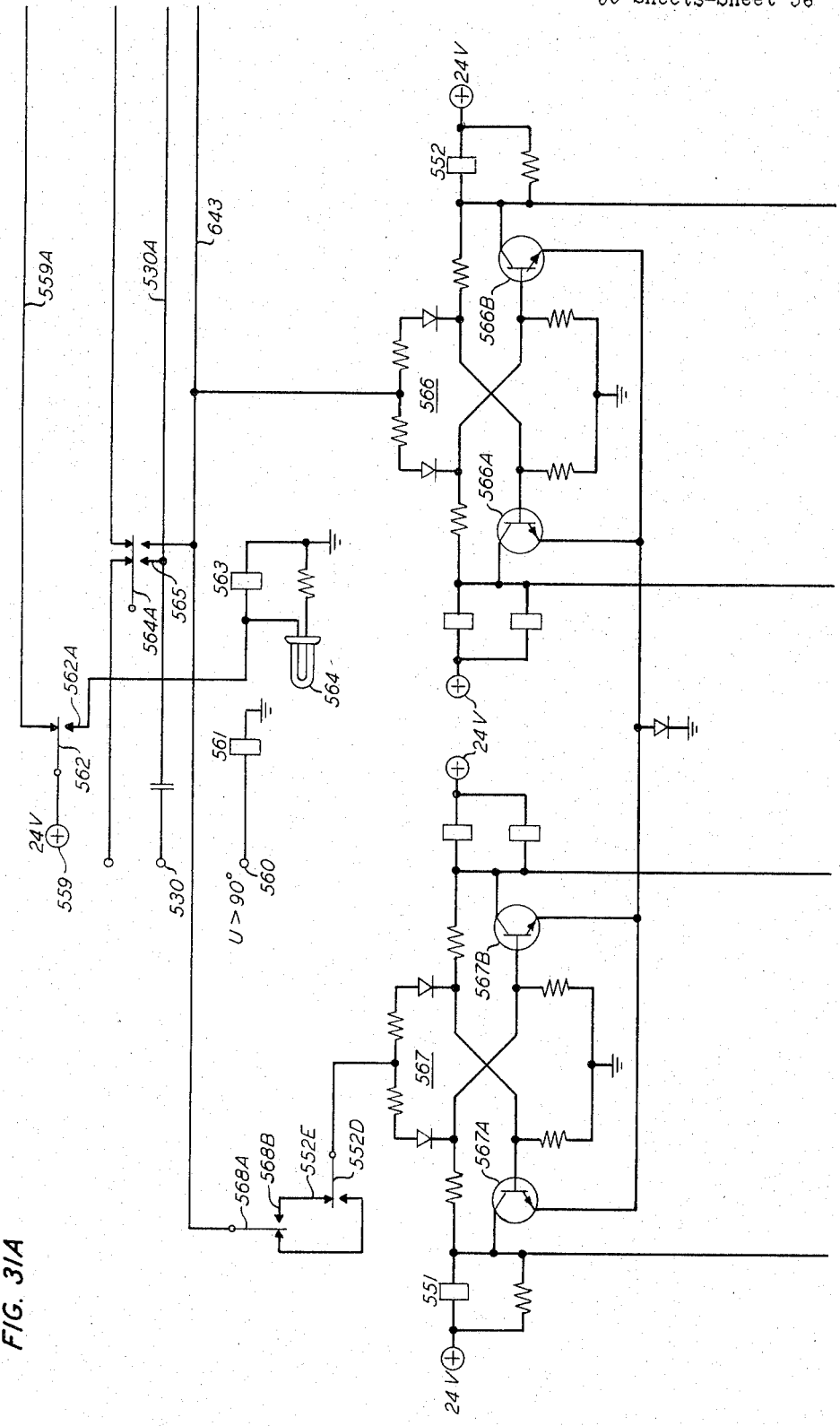

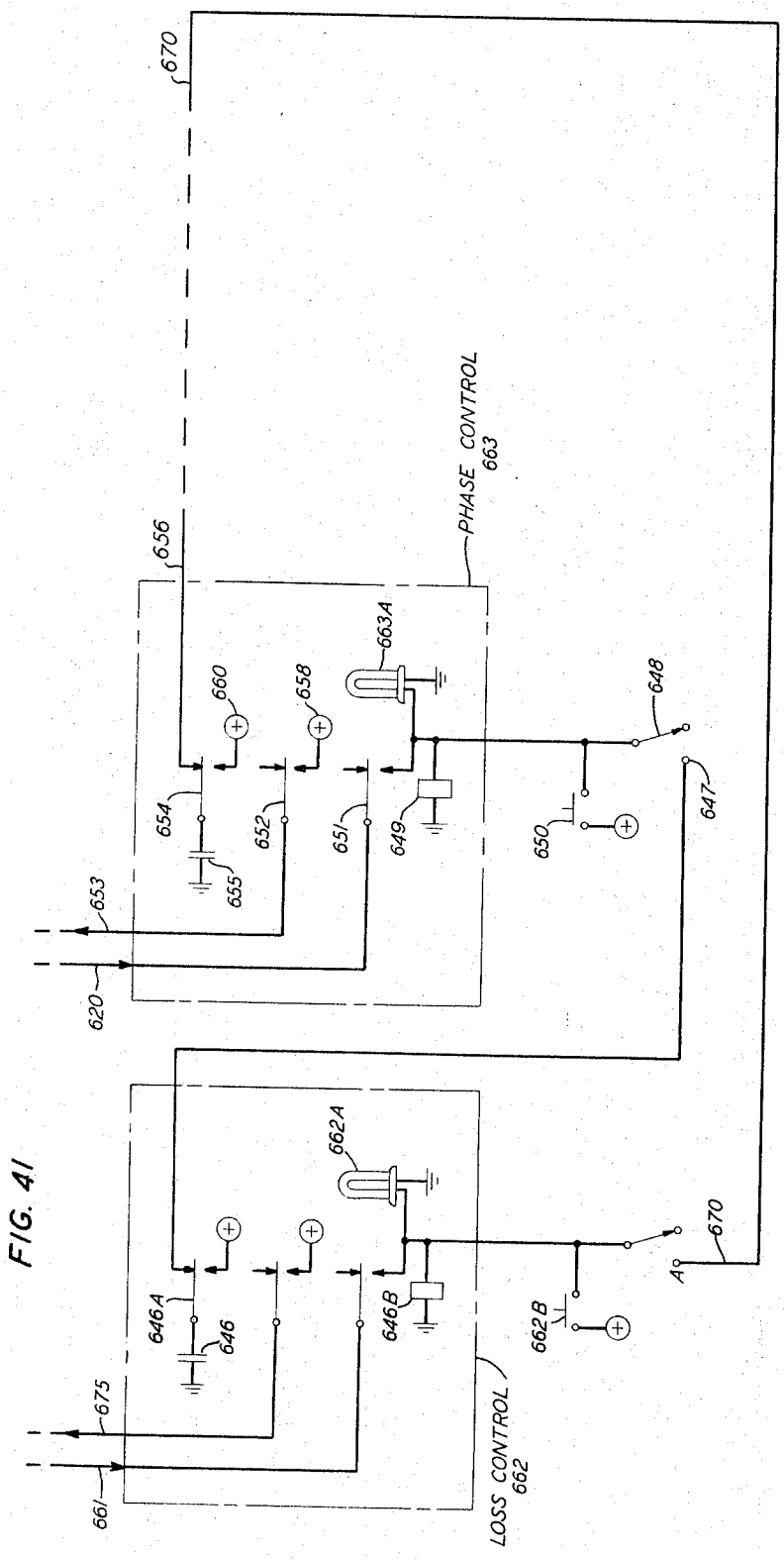

Nov. 28, 1967  G. D. HAYNIE ETAL  3,355,662
AUTOMATED TRANSMISSION MEASURING SET
Filed Oct. 30, 1963  59 Sheets-Sheet 50

FIG. 44

Nov. 28, 1967  G. D. HAYNIE ETAL  3,355,662
AUTOMATED TRANSMISSION MEASURING SET
Filed Oct. 30, 1963  59 Sheets-Sheet 59

FIG. 53

United States Patent Office 3,355,662
Patented Nov. 28, 1967

3,355,662
AUTOMATED TRANSMISSION MEASURING SET
Gerald D. Haynie and Peter E. Rosenfeld, Berkeley Heights, N.J., assignors to Bell Telephone Laboratories, Incorporated, New York, N.Y., a corporation of New York
Filed Oct. 30, 1963, Ser. No. 320,115
19 Claims. (Cl. 324—57)

ABSTRACT OF THE DISCLOSURE

This disclosure relates to an automated system for measuring insertion loss and/or phase of two terminal networks with respect to frequency for checking the accuracy of engineering designs over a 20–20,000 c.p.s. frequency range. The objective is to obtain data involving loss, phase and frequency that can be processed by a computer or recorded in tabular or graphic form. It includes a programming feature comprising: subdividing the 20,000 c.p.s. range into not more than five subdivision bands, preselecting numerical values of frequency, loss or phase increments in each band whereby loss and/or phase measurements are made therein relative to corresponding testing frequencies. The frequency, loss and phase measurements are made on a visual basis, and thereafter transferred to a perforated tape for processing by suitable apparatus. Alternative provisions for manual operation of the same are also provided.

This invention relates to an automated transmission measuring system for measuring certain quantities of an electrical device, and more specifically to a programming arrangement usable in such system for obtaining data concerning preselected amounts of changes in these quantities over a predetermined operating frequency range.

In the design of certain electrical networks such, for example, as filters, each is provided with calculated amounts of insertion loss and phase shift at successively preselected points of numerically increasing frequency over a predetermined operating frequency range. In order to check the accuracy of the design in accordance with present measuring techniques, it was heretofore necessary for a workman to submit the network to a manual measuring procedure to ascertain the actual loss and phase at preselected frequency points over the operating frequency range. This involved the following manual steps: adjusting the frequency of the testing voltage to successively different numerical values over the predetermined frequency range in which the network was to be used, adjusting a calibrated loss standard to equal the actual loss of the network at each of the frequency testing points, reading the indication of the calibrated loss standard and recording the numerical value of the indication of the calibrated loss standard. To measure the phase shift of the same network, the testing procedure for measuring loss is repeated except a calibrated phase standard replaces the calibrated loss standard.

It would appear to be patent that such testing procedure involves not only the expense of a large amount of time on the part of a workman but also tends to introduce the possibility of error due to the human factor on the part of the workman. Even with the numerous so-called assembly-line techniques available at this time, it would also appear to be uneconomical to test each production network of a large quantity. As a consequence, resort is often made to testing every third or fifth network, depending on the quantity of production networks to be tested at a given time. Here again the human factor tending toward error is also an ingredient of the assembly line testing method.

It has also been found in the performance of the manual measuring procedures that the workman may select data points involving loss, phase and frequency which may or may not be particularly significant in specific frequency subdivision bands of an over-all predetermined testing frequency range for a particular design of an electrical device. As a consequence, it may happen that the measured data does not include specific information of most pertinent interest regarding critical portions of a given loss or phase characteristic. The result is that when the measured loss, phase and frequency data are plotted in given loss and phase characteristics over the predetermined frequency range, the plotted characteristics may not reveal the optimum information regarding critical portions of the characteristics.

The present invention provides a programming arrangement usable in an automated transmission measuring system to measure data at programmed amounts of changes in the loss and phase characteristics of an electrical device or at programmed increases in the numerical values of the frequency of a testing voltage over a predetermined operating frequency range. The obtained data provides information at critical points of the loss and phase characteristics of the electrical device under test.

The main object of the invention is to provide a program for automatically measuring data concerning changes in certain quantities of an electrical device at discrete frequencies over a predetermined frequency operating range.

It is another object to measure automatically programmed changes in the loss of an electrical device at discrete frequencies over a predetermined frequency operating range.

It is a further object to measure automatically programmed changes in the phase shift of an electrical device at discrete frequencies over a predetermined frequency operating range.

It is still another object to measure automatically programmed changes in the loss and phase shift of an electrical device at discrete frequencies over a predetermined frequency operating range.

It is still a further object to program numerical increments of loss in different subdivision frequency bands constituting a predetermined frequency range for automatically measuring changes corresponding to the programmed loss increments in the unknown loss of an electrical device over the predetermined range.

It is still a further object to program numerical increments of phase shift in different subdivision frequency bands forming a predetermined frequency range for automatically measuring changes corresponding to the programmed phase shift increments in the unknown phase shift of an electrical device over the predetermined frequency range.

It is also an object to program numerical increments of frequency in different subdivision frequency bands constituting a predetermined frequency range for automatically measuring the loss and phase of an electrical device at increases of the testing frequency corresponding to the programmed frequency increments.

It is also an object to program numerical increments of frequency, loss and phase shift in different frequency subdivision ranges forming a predetermined frequency range for automatically measuring the loss and phase of an electrical device at changes corresponding to the programmed increments of loss and phase or at increases of the testing frequency corresponding to the programmed frequency increments.

In association with an automated system for measuring the insertion loss and phase shift of an electrical device at preselected frequencies over a predetermined operating frequency range, a specific embodiment of the present invention comprises a program arrangement including a first plurality of finger switches for manually subdividing the predetermined operating frequency range into a plurality of different subdivision frequency bands, a second plurality of finger switches each connected in one of the frequency bands, a third plurality of switches each connected in one of the frequency bands, and a fourth plurality of finger switches each connected in one of the frequency bands.

In the operation of the automated measuring system, the numerical value of the lower frequency of the first frequency band is preselected by manually adjusting the frequency of the testing oscillator to the desired numerical value and thereafter the first plurality of finger switches is manually adjusted to provide the numerical values of the upper frequency of the first subdivision frequency band and the lower and upper frequencies of the remaining subdivision frequency bands; the second plurality of finger switches is manually adjusted to preselect one of a plurality of different numerical frequency increments in one or more of the subdivision frequency bands; the third plurality of finger switches is manually adjusted to preselect one of a plurality of different numerical loss increments in one or more of the subdivision frequency bands; and the fourth plurality of finger switches is manually adjusted to preselect one of a plurality of different numerical phase shift increments in one or more subdivision frequency bands.

At the preselected numerical value of the lower frequency of the first subdivision frequency band, the unknown magnitudes of the loss and phase shift of the device under test are balanced in sequence against calibrated loss and phase shift standards, respectively; and the numerical values of the loss and phase measured by these standards, together with the numerical value of the corresponding lower frequency of the first subdivision band are recorded. As the numerical value of the testing frequency is automatically swept in an increasing sense from the lower frequency of the first subdivision band, the numerical change of the testing frequency, loss or phase shift, coincides a first time with one of the preselected frequency, loss or phase shift increments at which coincidence the testing frequency sweep is stopped and measurements of the numerical values of loss, phase shift and last testing frequency are made and recorded. After these recordings, the numerical sweep of the testing frequency is automatically resumed until the next succeeding recording is indicated. The testing frequency sweep is always stopped and measurements recorded in response to each occurrence of a coincidence between measured changes of testing frequency, loss or phase shift and one of the corresponding preselected frequency, loss and phase shift increments in each of the subdivision frequency bands. The magnitudes of loss and phase shift and the frequency numerical value are recorded both for visual perception and in perforated tape for future reference and processing by suitable data equipment.

A feature of the invention is that the rate of the numerical sweep of the testing frequency is slowed down as changes in the magnitude of the loss or phase shift reach a numerical increment next preceding the occurrence of coincidence of the change of loss or phase with the programmed numerical increment of the corresponding loss or phase shift in each of the subdivision frequency bands in which the loss and/or phase shift are programmed. Another feature is an automatic frequency control which operates as the sweep of the testing frequency is being terminated because of coincidence of a programmed frequency interval. When the testing frequency falls ±10 cycles per second of the nearest 100 c.p.s. point of the testing oscillator calibration, the AFC control functions to lock the numerical value of the testing frequency on such nearest calibration point. A further feature is that the system is adjustable for semi-automatic operation.

The invention will be readily understood from the following description when taken together with the accompanying drawing in which:

FIG. 8 is a schematic circuit of a loss detector usable in FIGS. 1, 2 and 5;

FIGS. 9A, 9B, 10A, 10B and 12 are box diagrams illustrating a discrete loss detector usable in FIG. 5;

FIG. 11 is a waveform of a staircase voltage obtainable in the discrete loss detector of FIGS. 9, 10 and 12;

Figure 2:
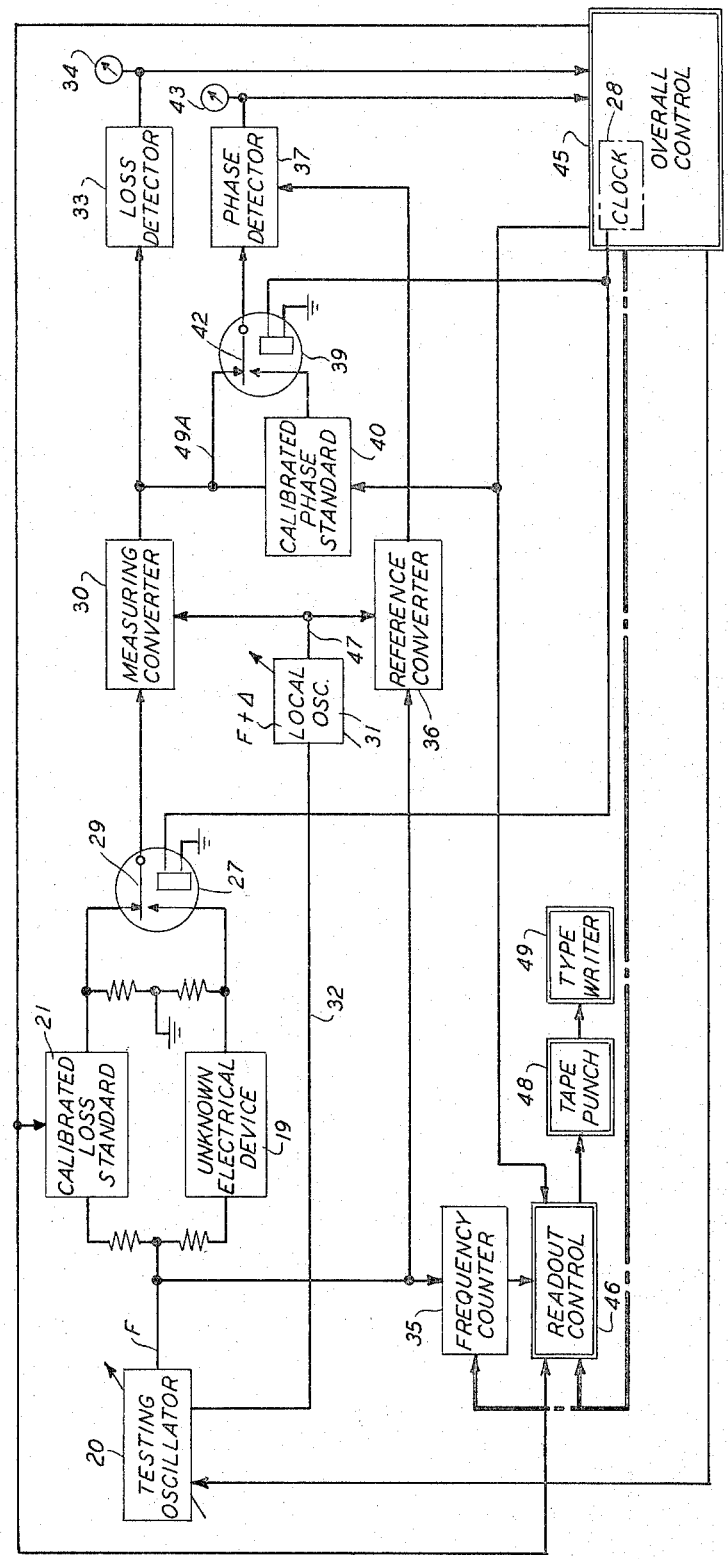
FIG. 2 is a box diagram of a simplified form of a specific embodiment of the invention.
Figure 3:
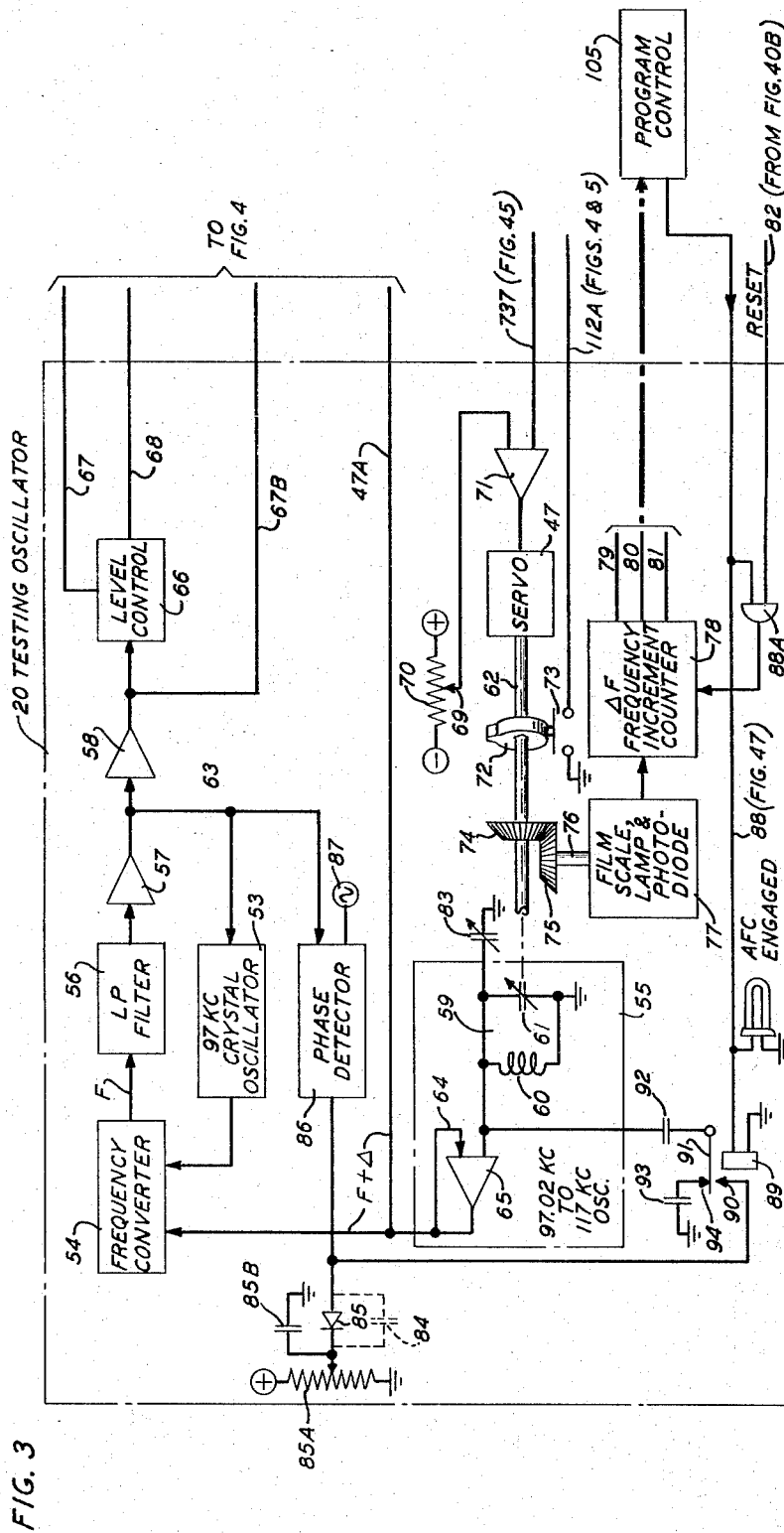
FIG. 3 is a schematic circuit-box diagram of a testing oscillator used in FIG. 2.
Figure 4:
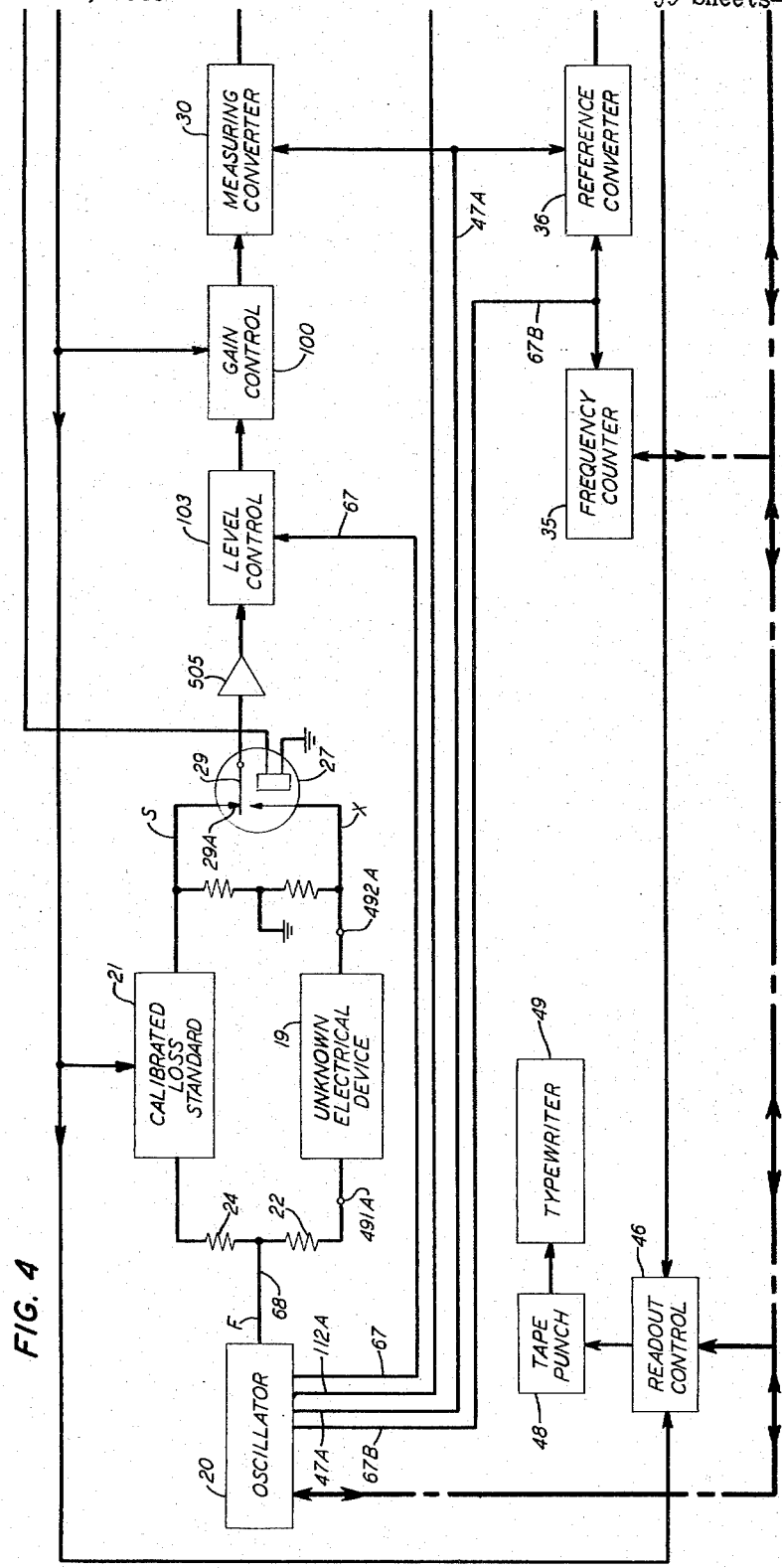
FIGS. 4 and 5 are block diagrams delineating in additional detail the specific embodiment of the invention shown in FIG. 2.
Figure 5:
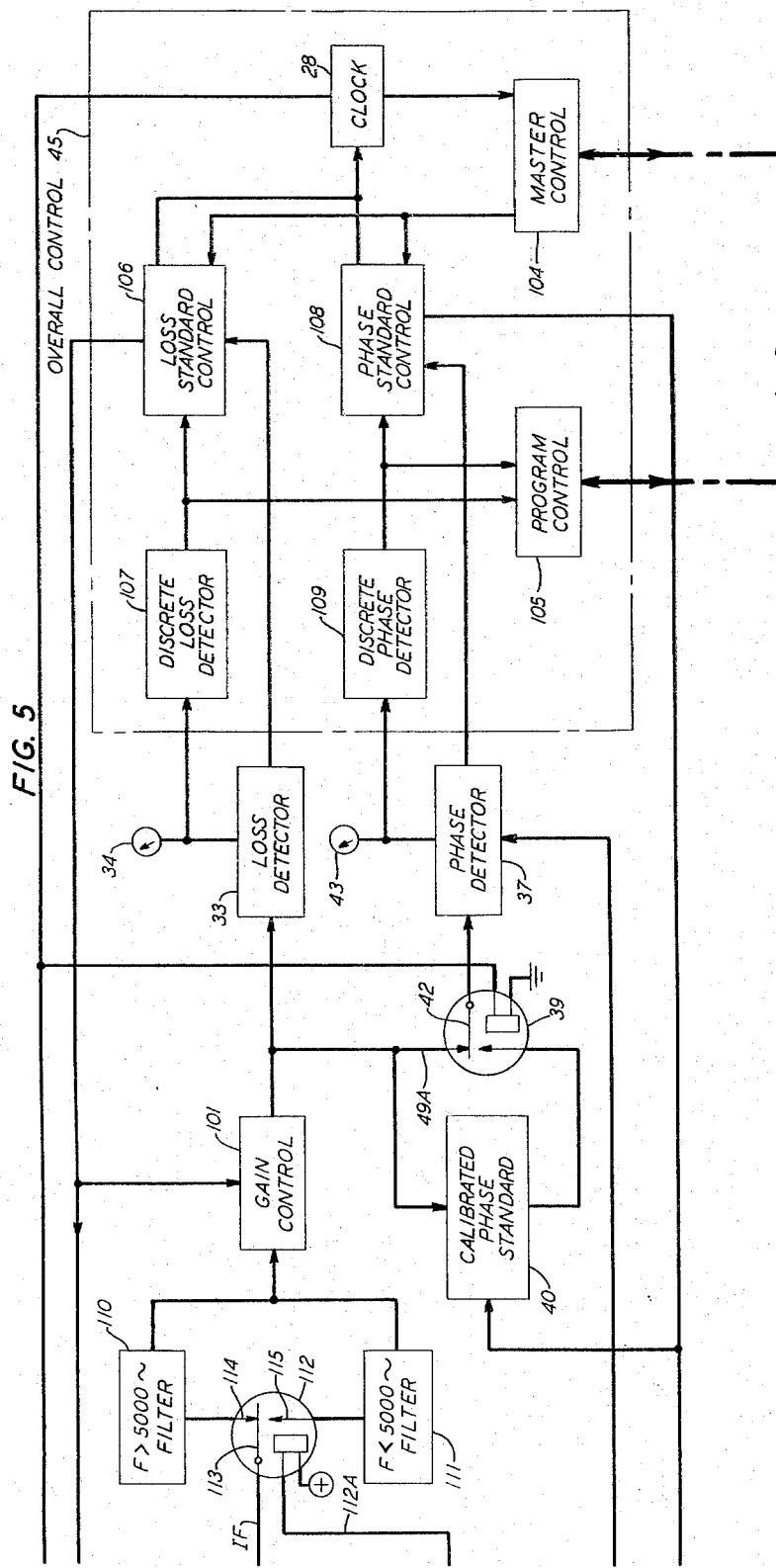
Figure 13:
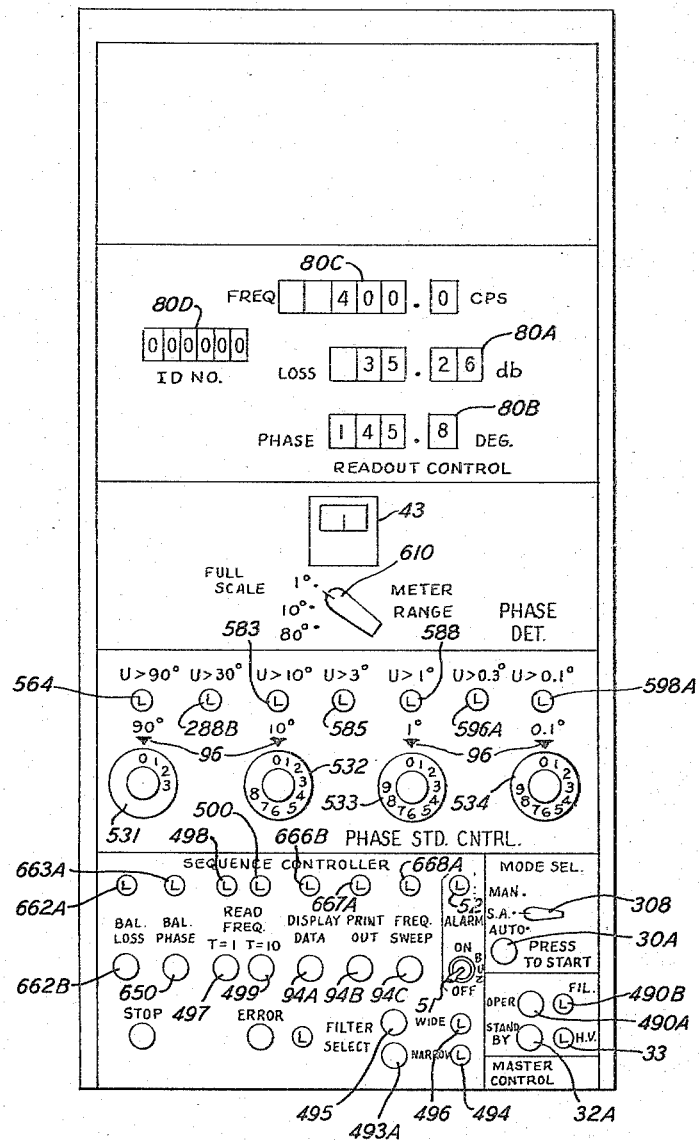
Figure 14:
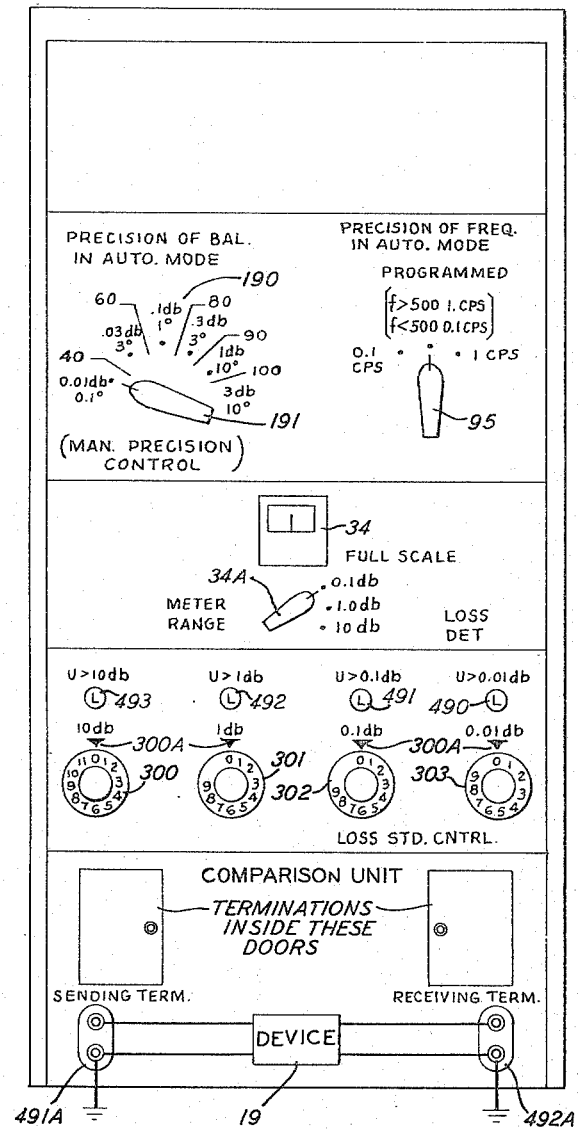
Figure 15:
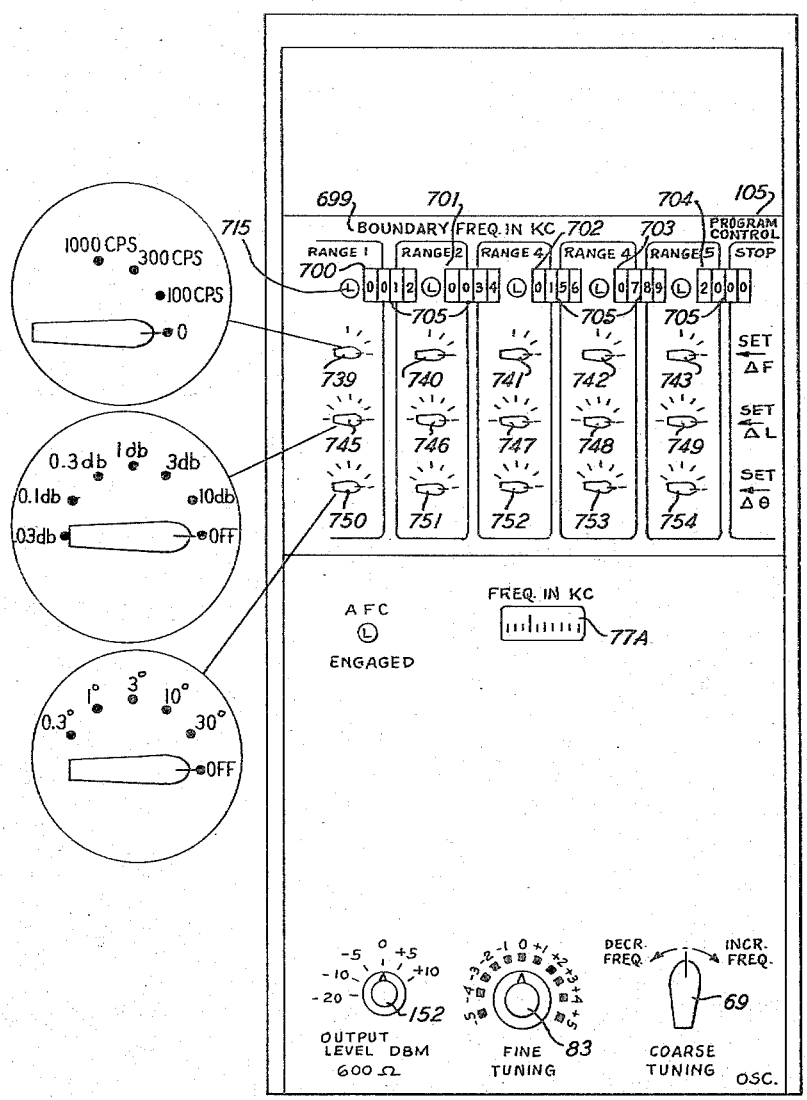
Figure 25:
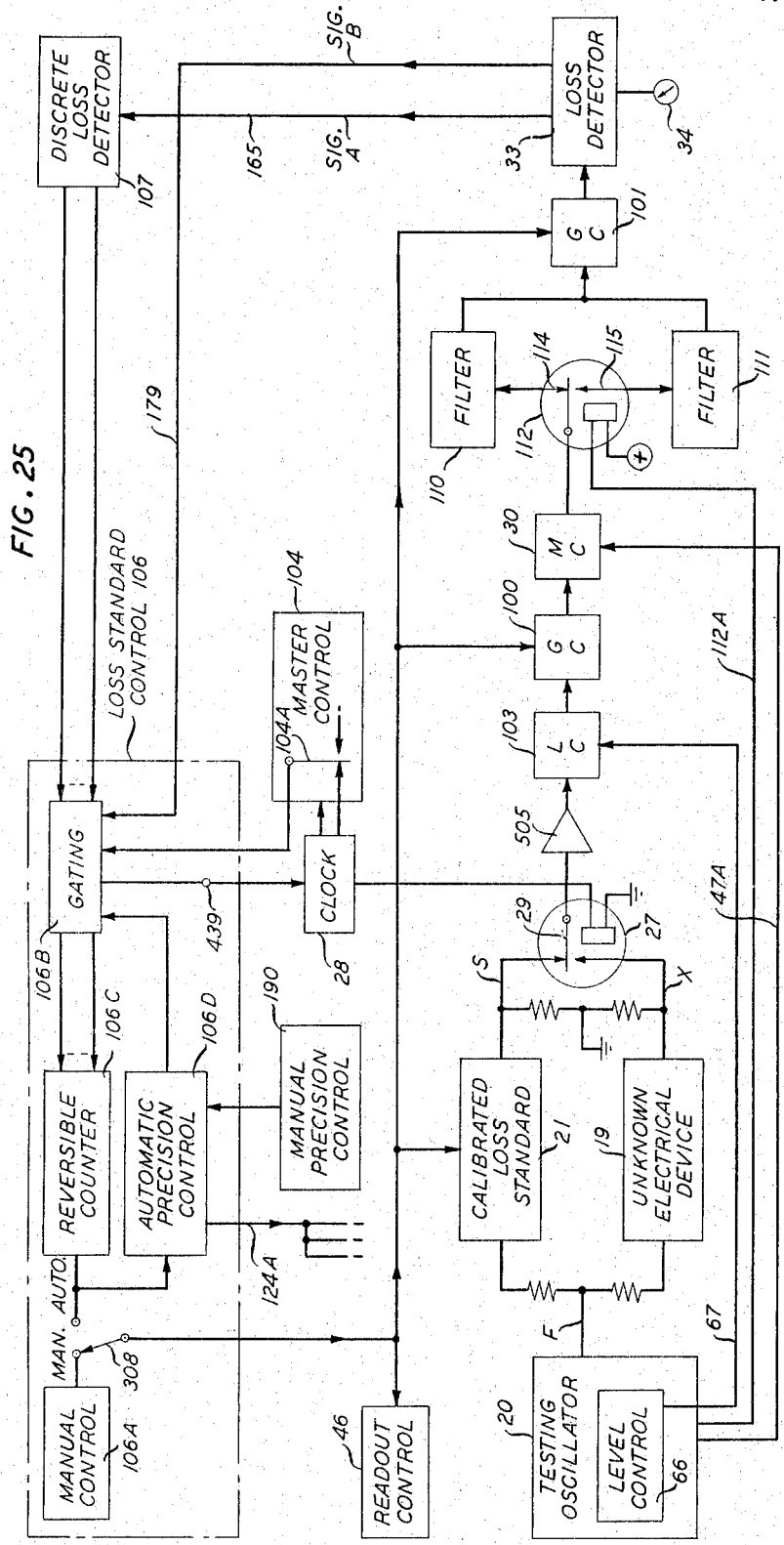
Figure 26:
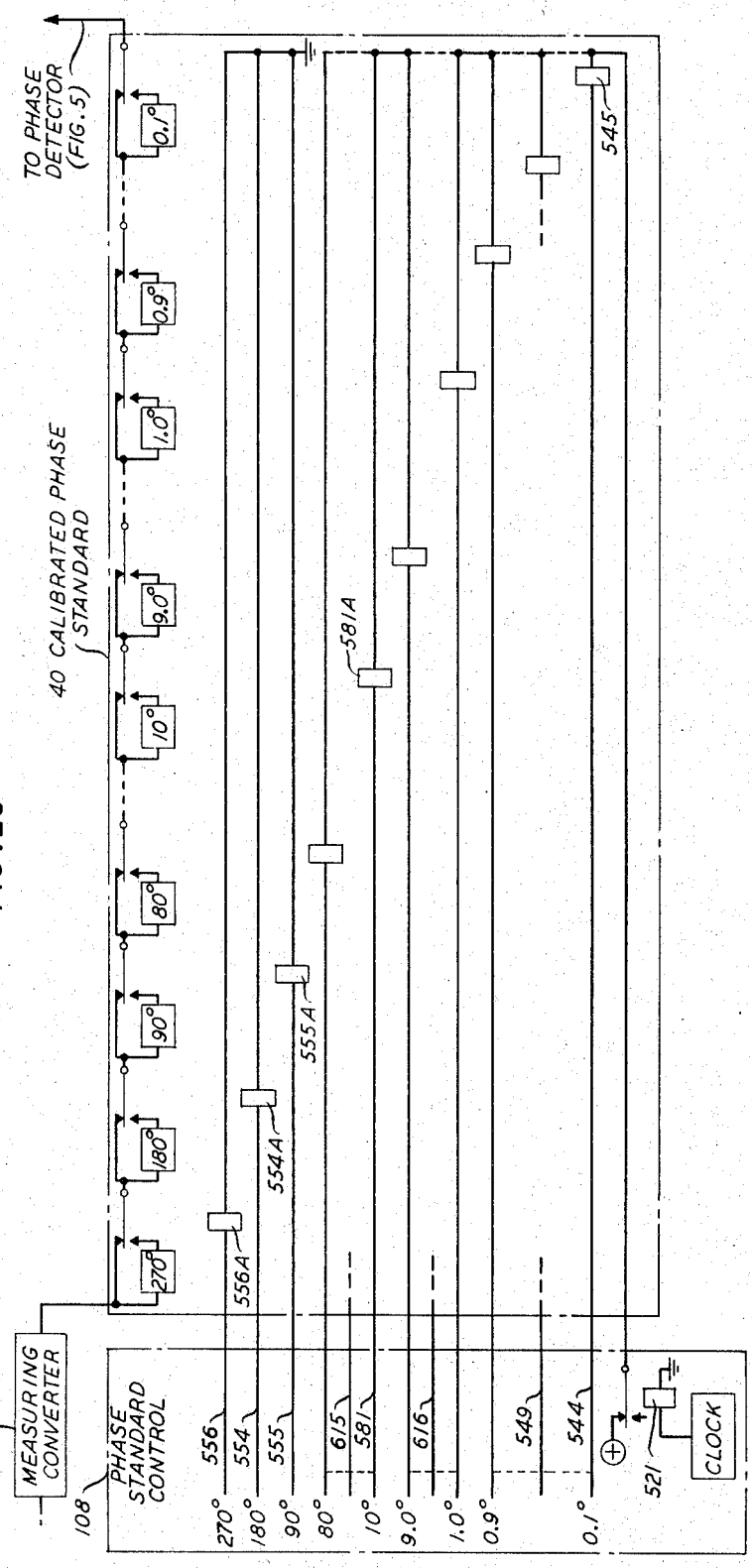
Figure 28A:
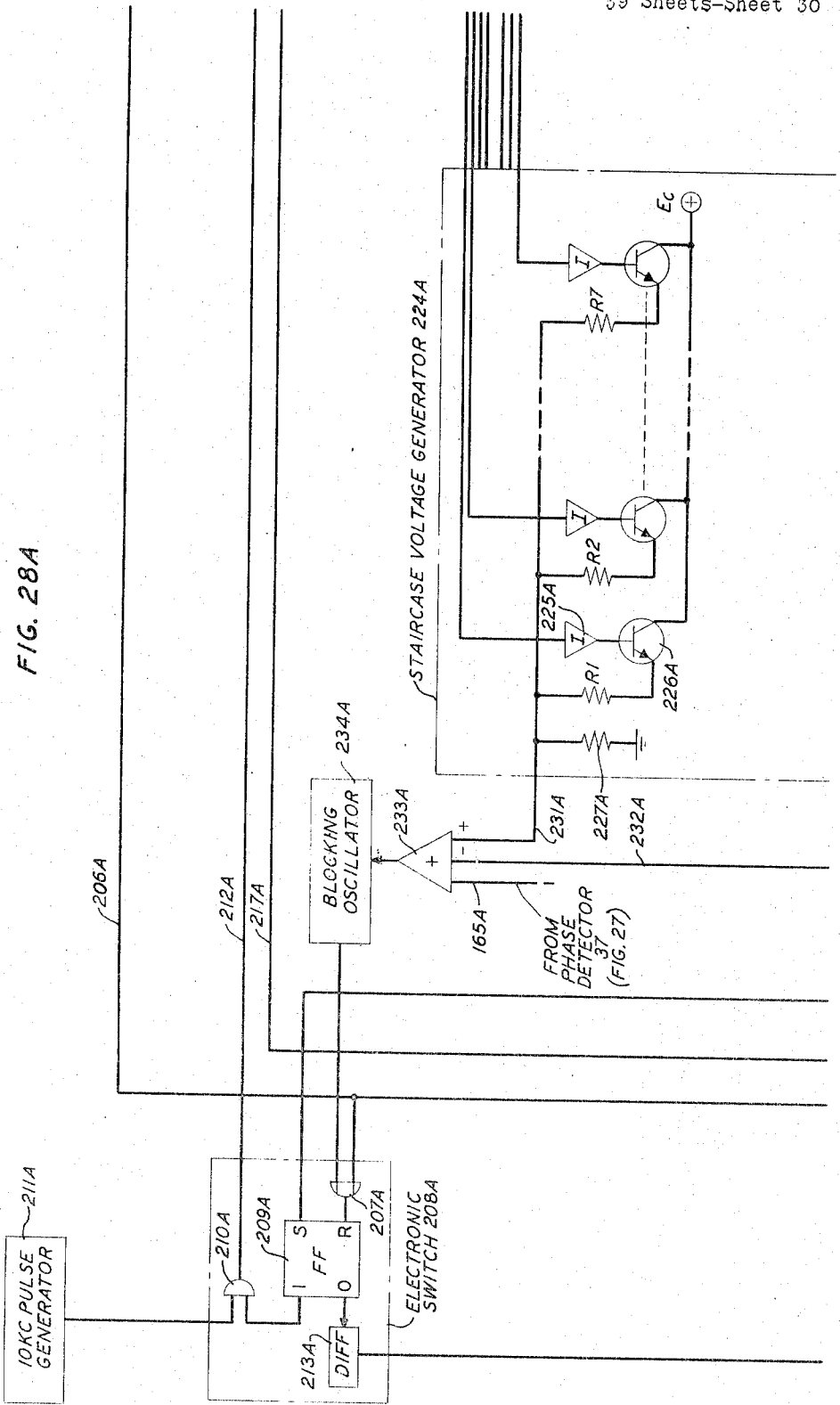
Figure 30:
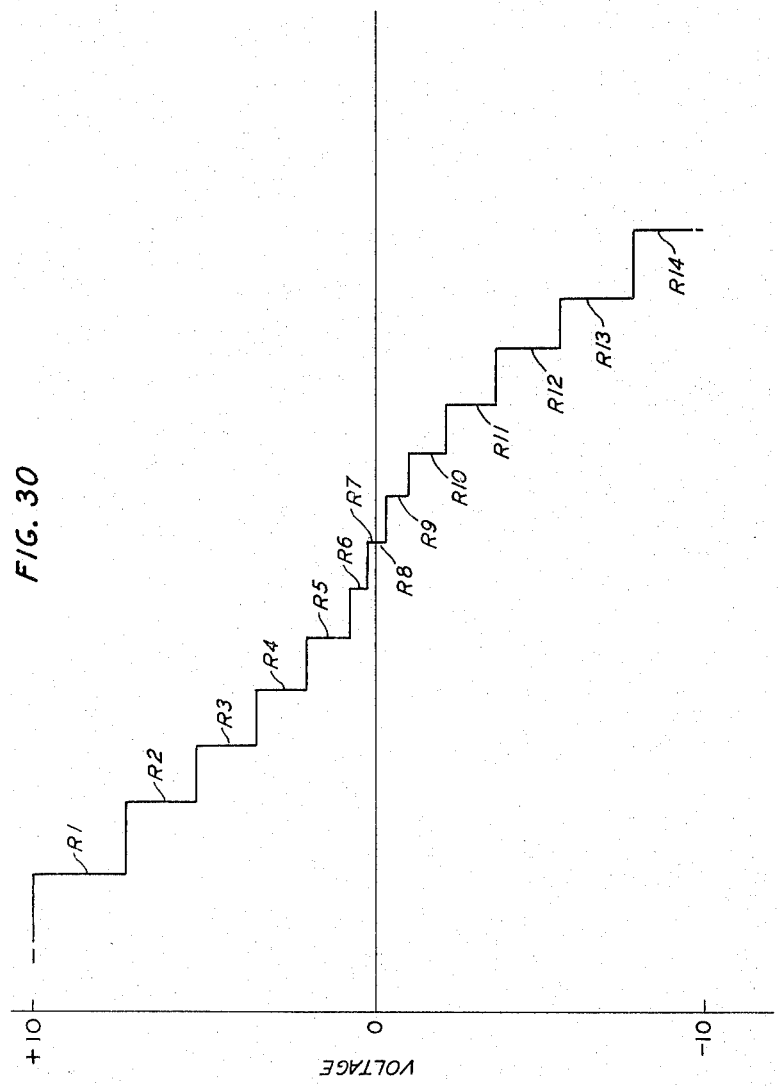
Figure 39:
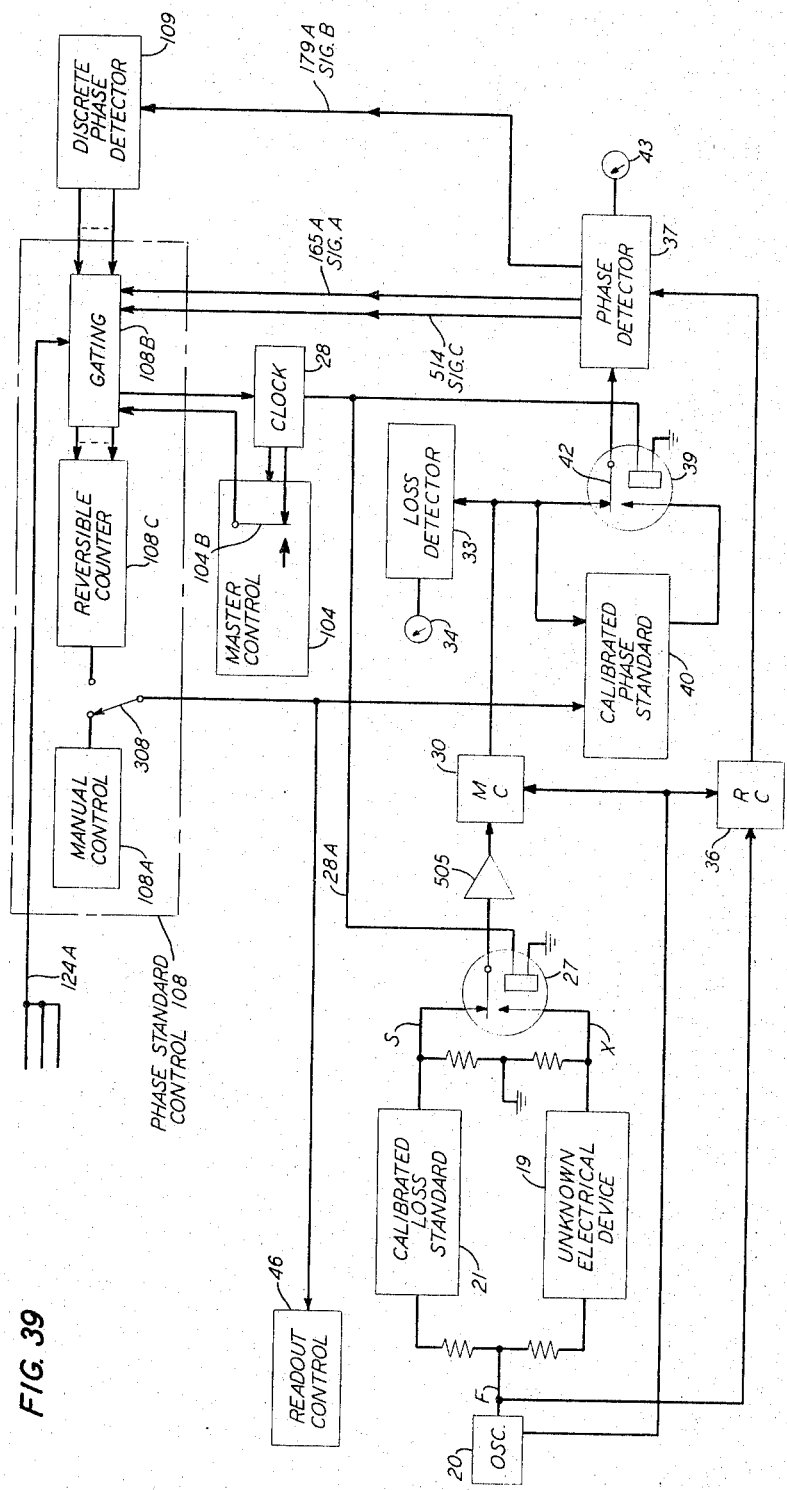
Figure 40A:
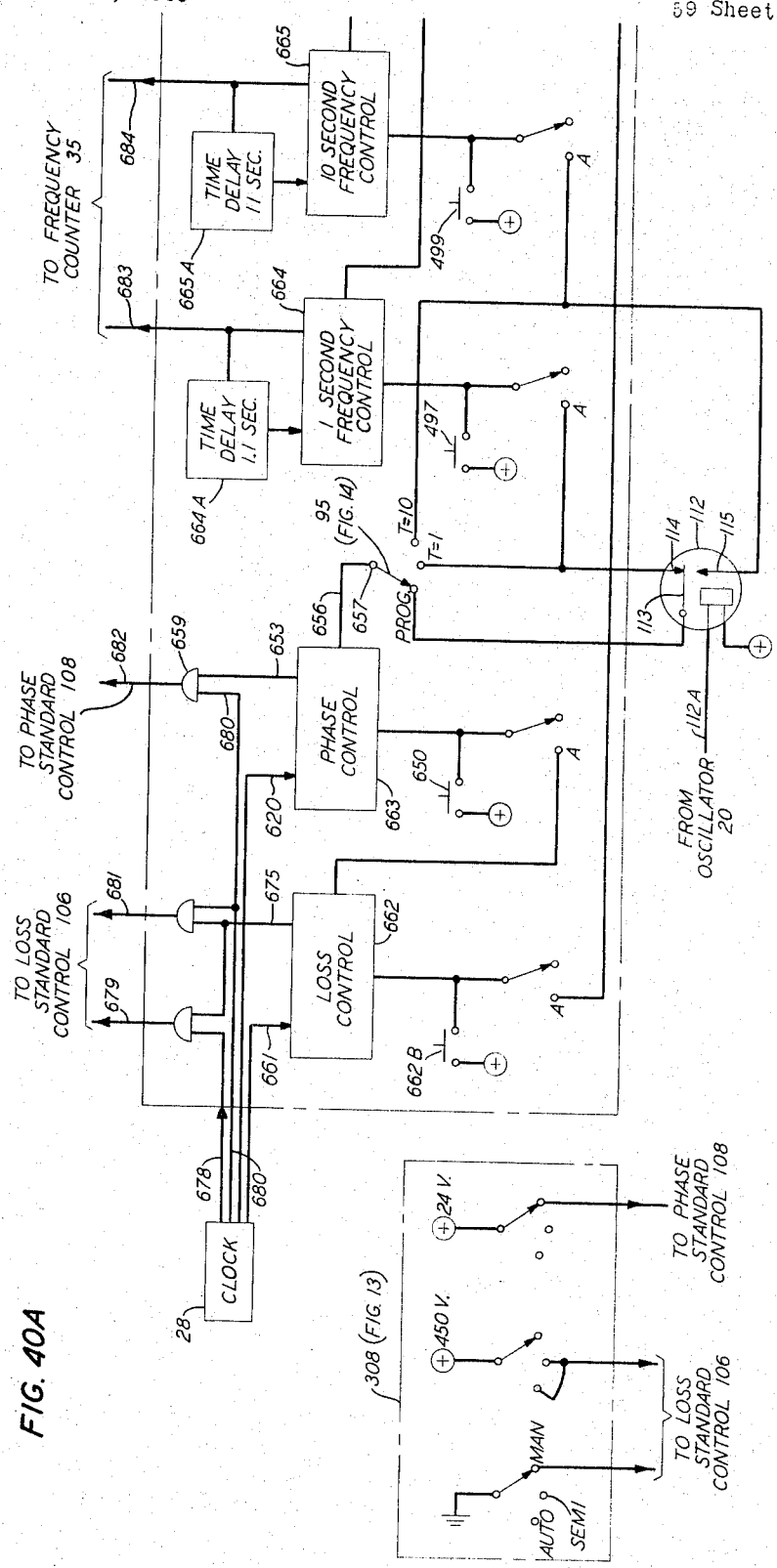
Figure 40B:
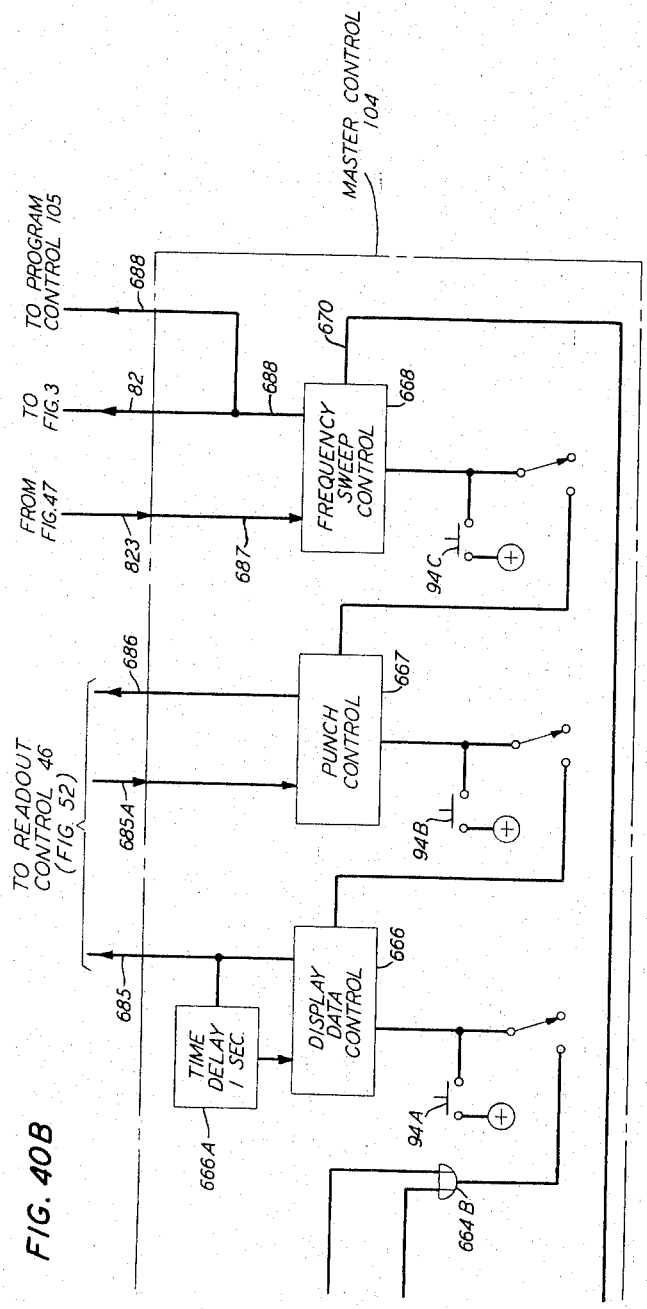
Figure 42:
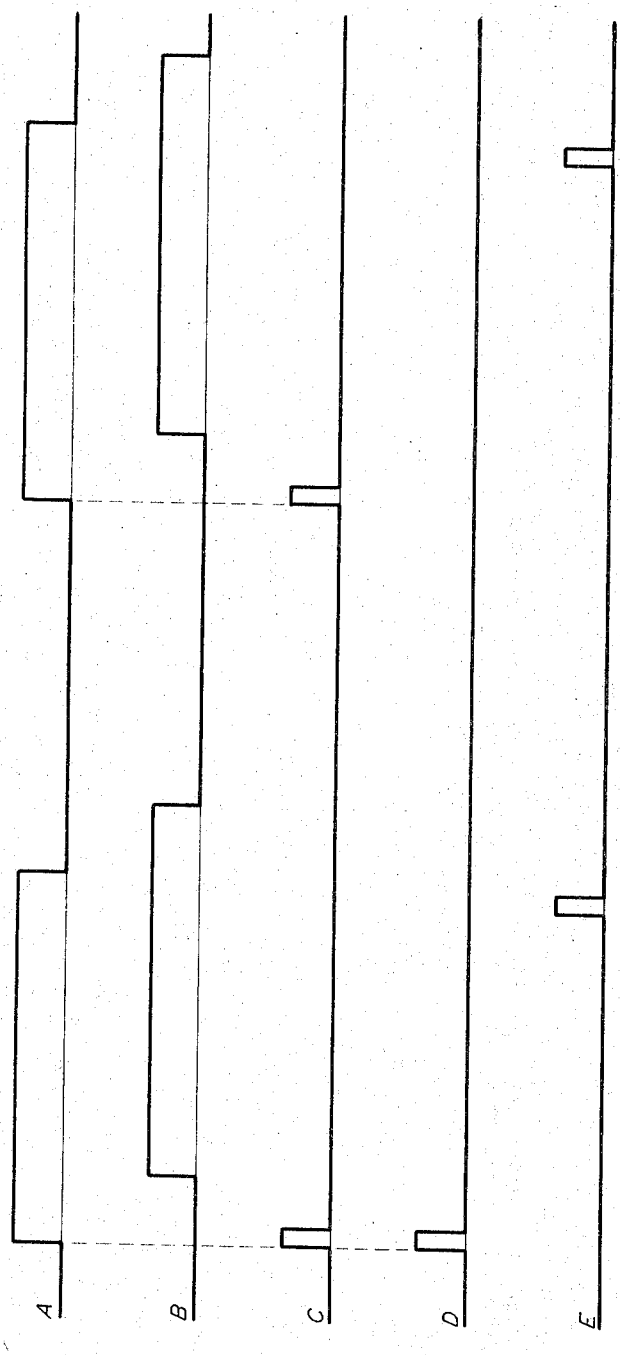
Figure 43:
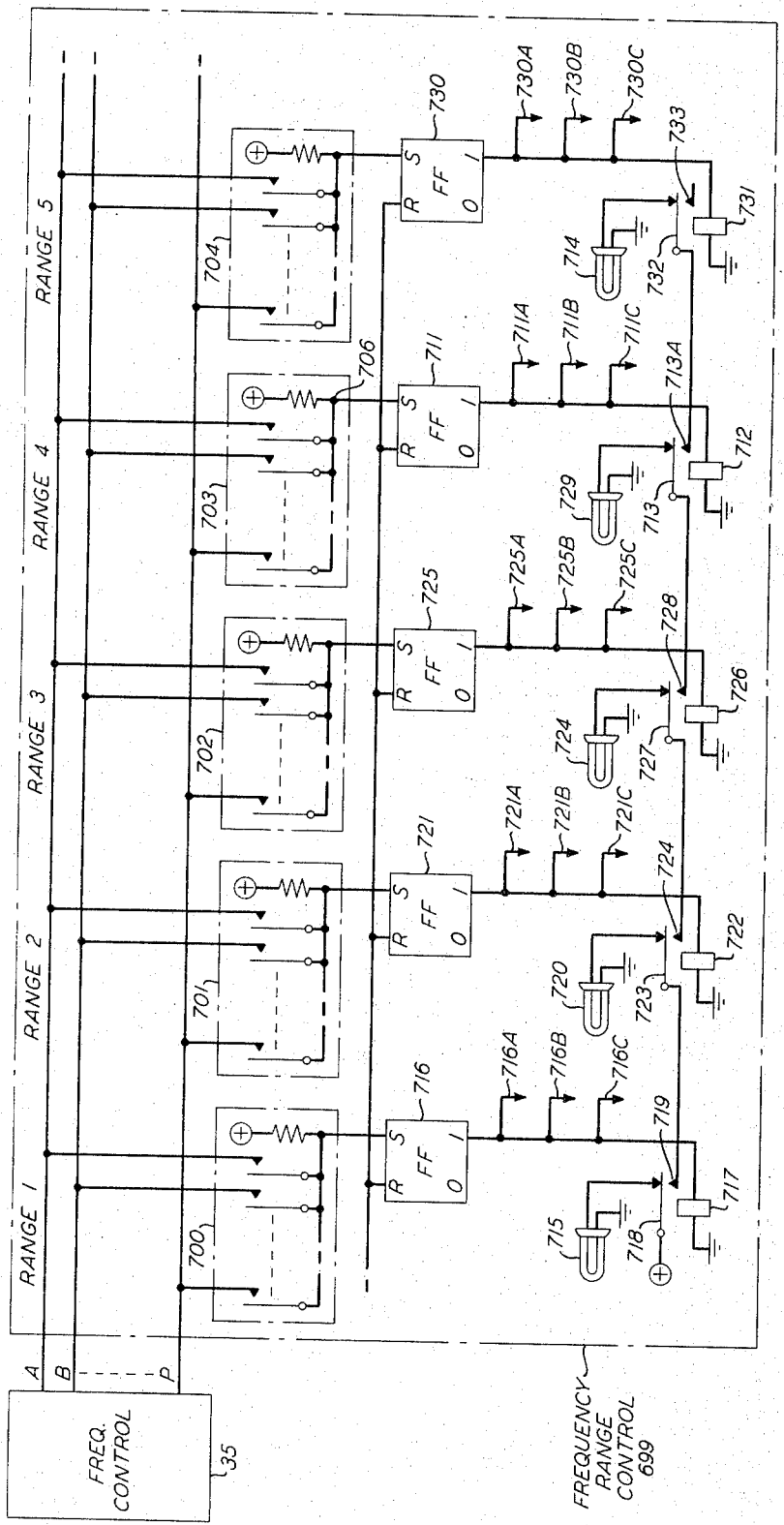
Figure 45:
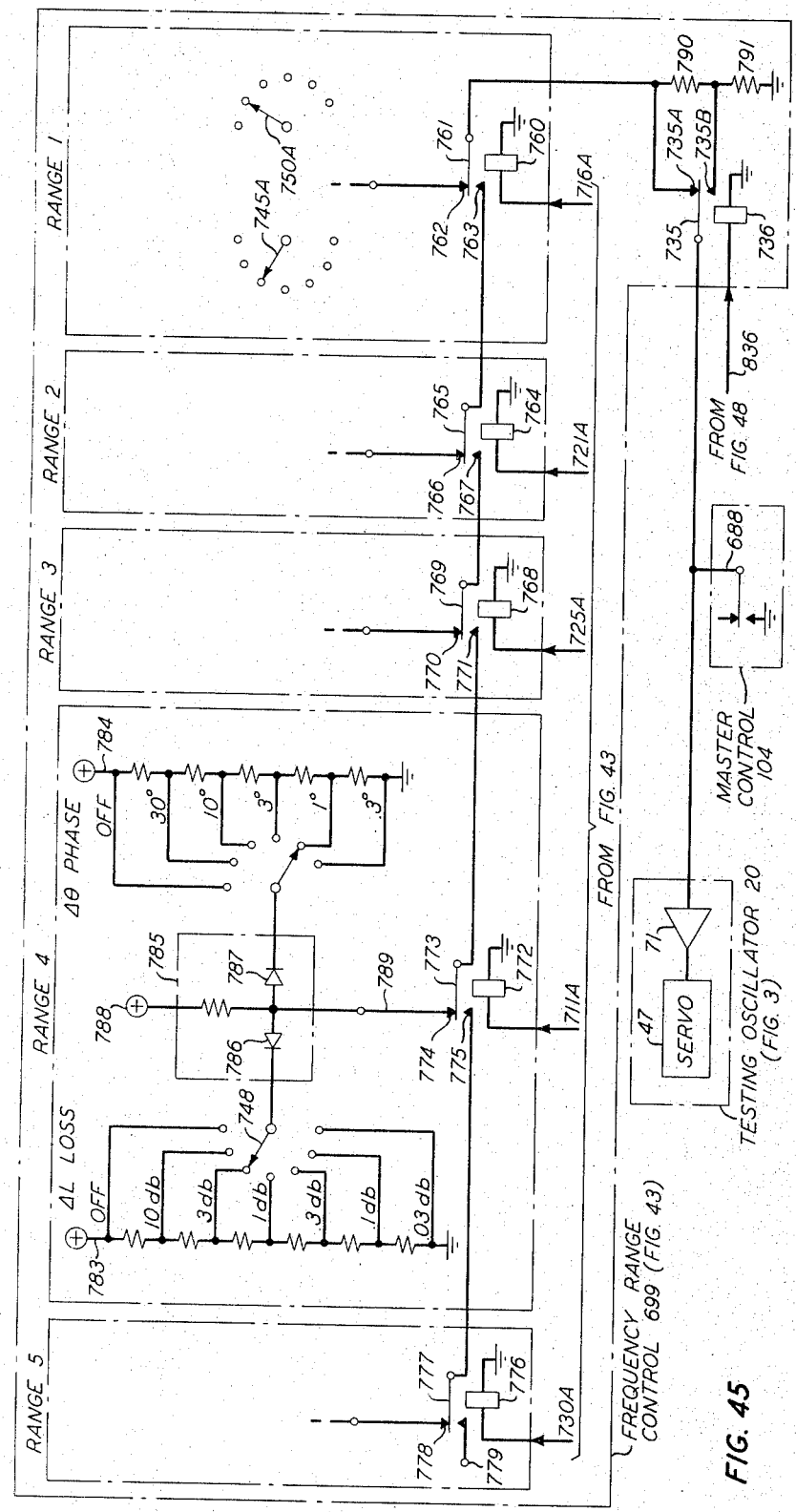
Figure 46:
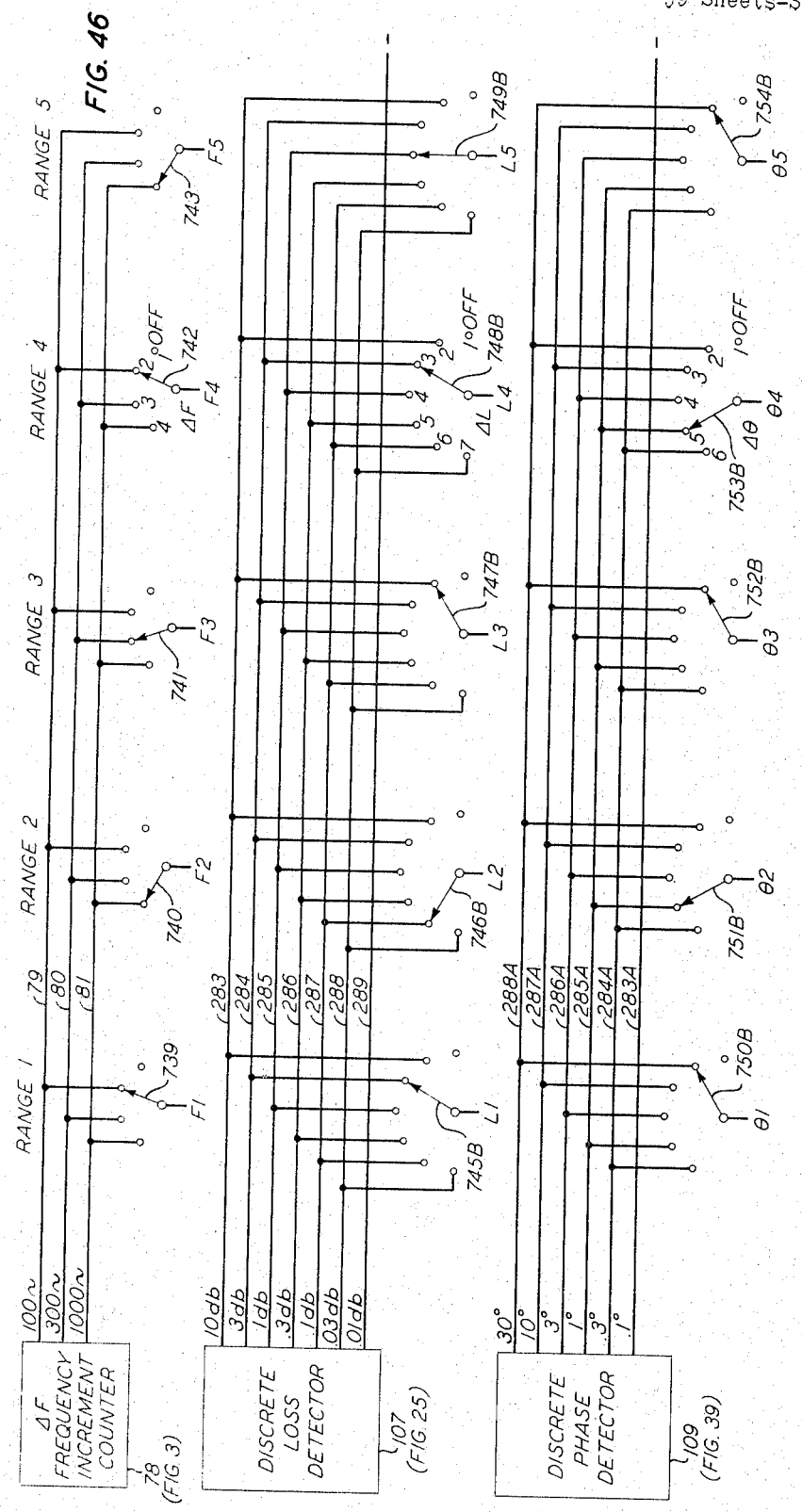
Figure 47:
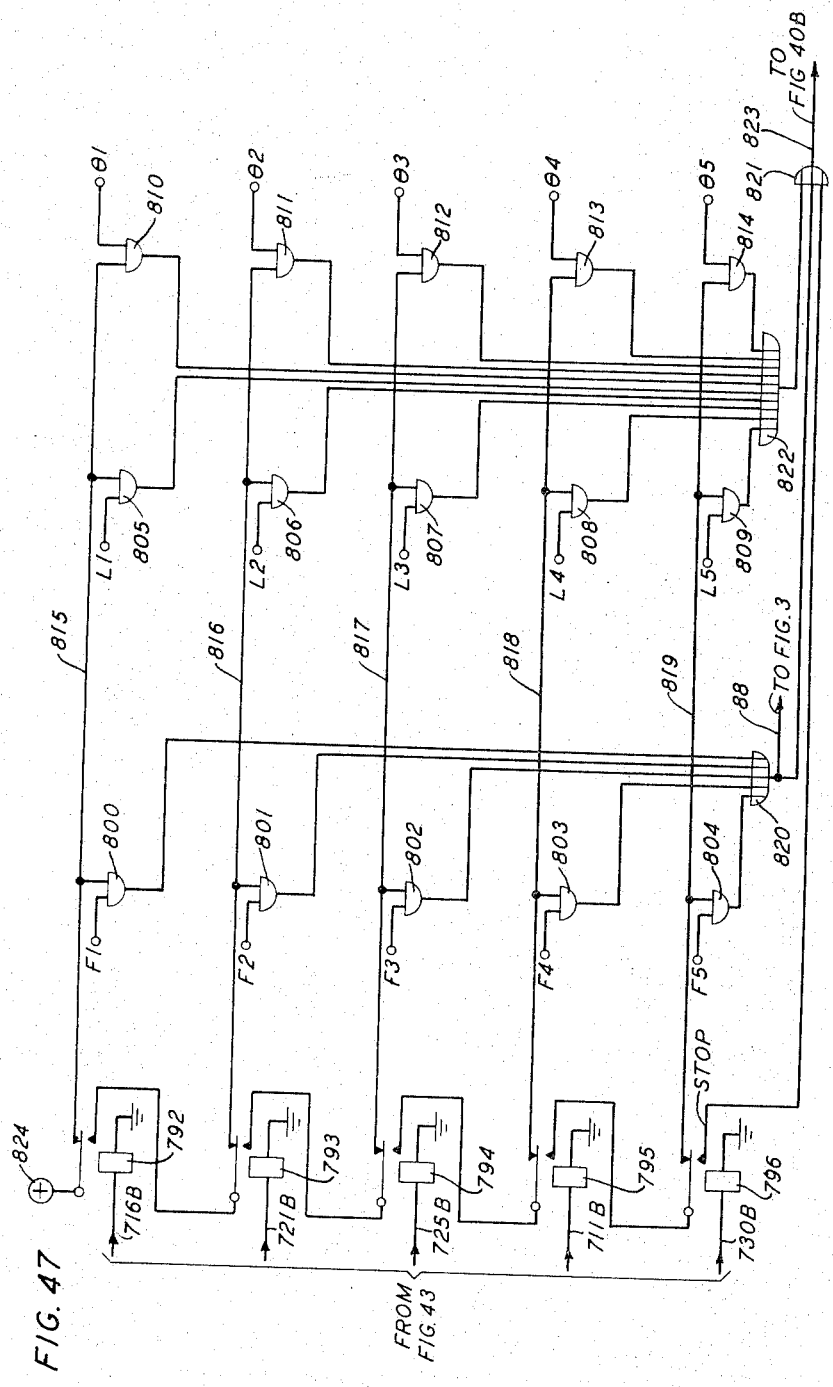
Figure 48:
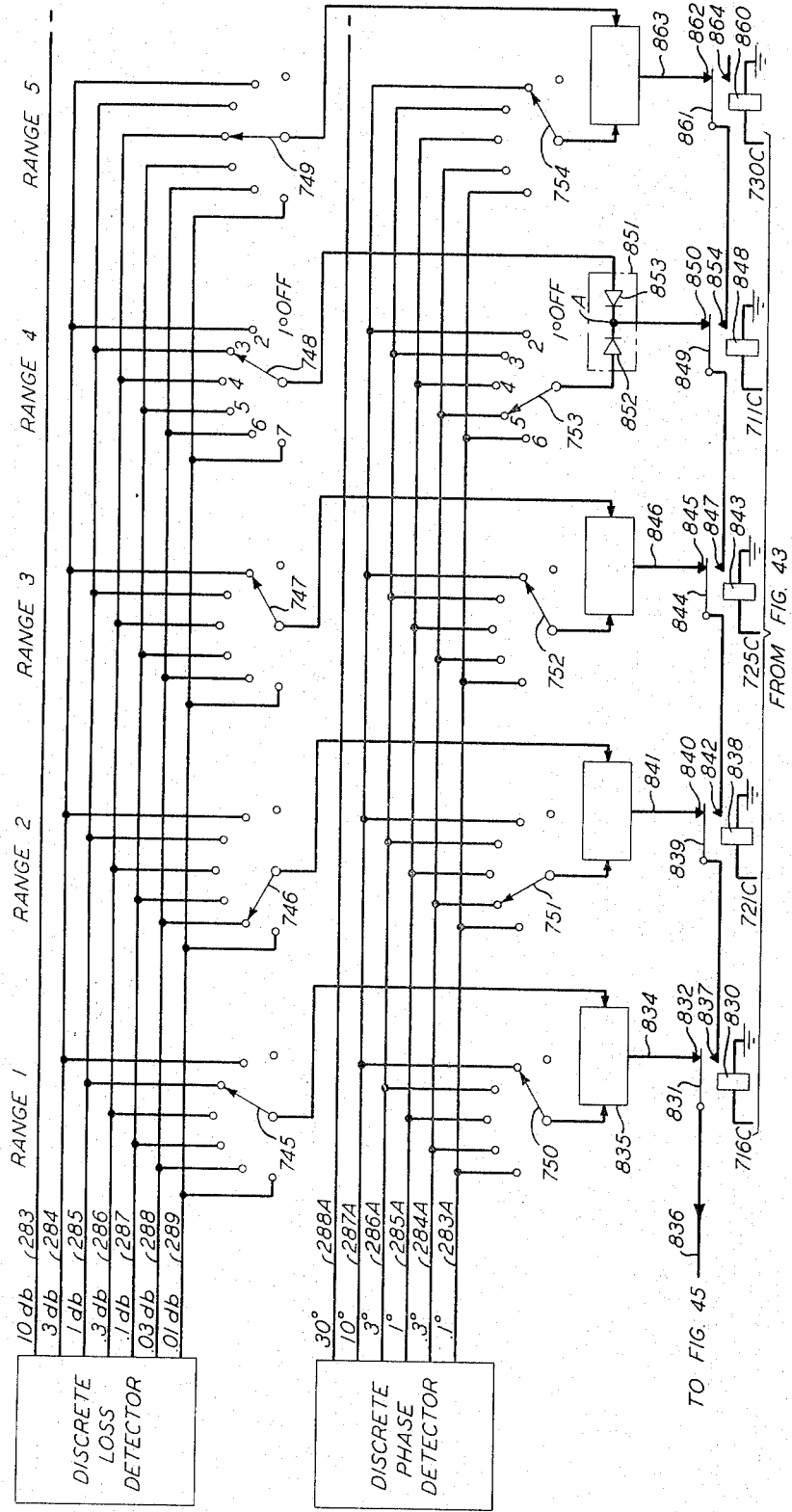
Figure 49:
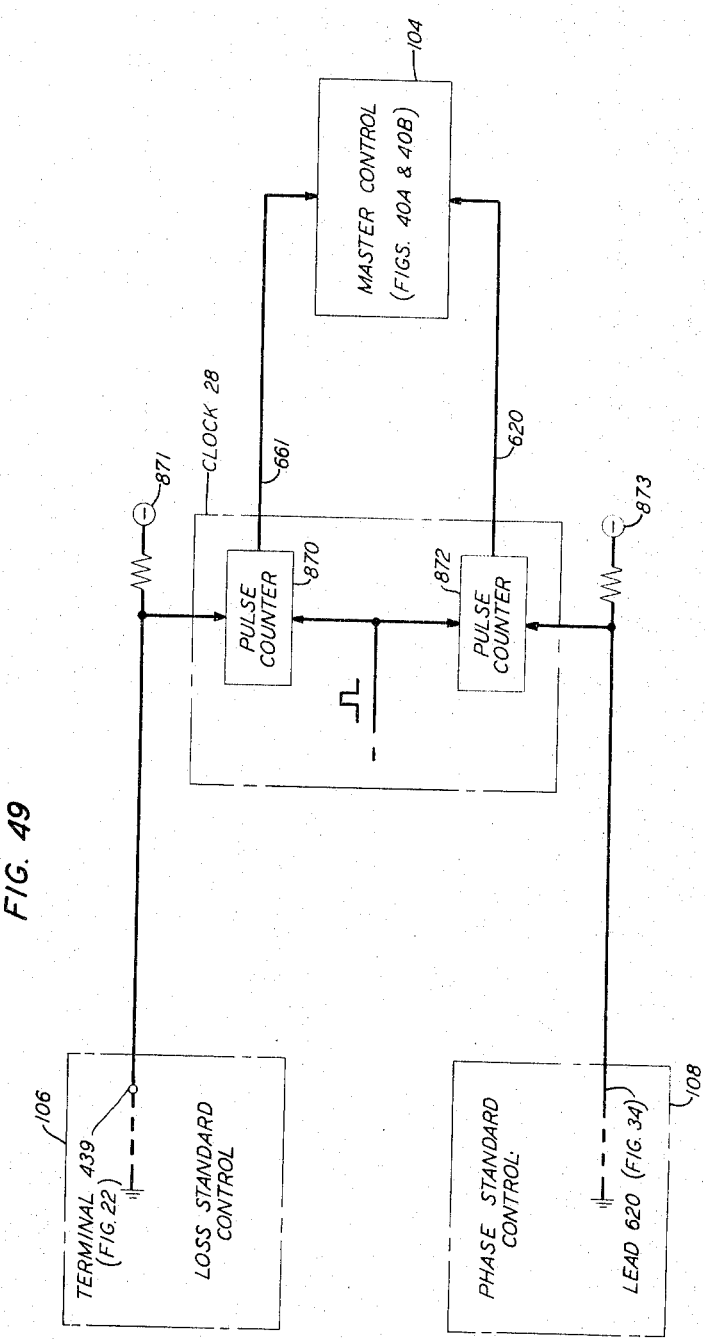
Figure 50:
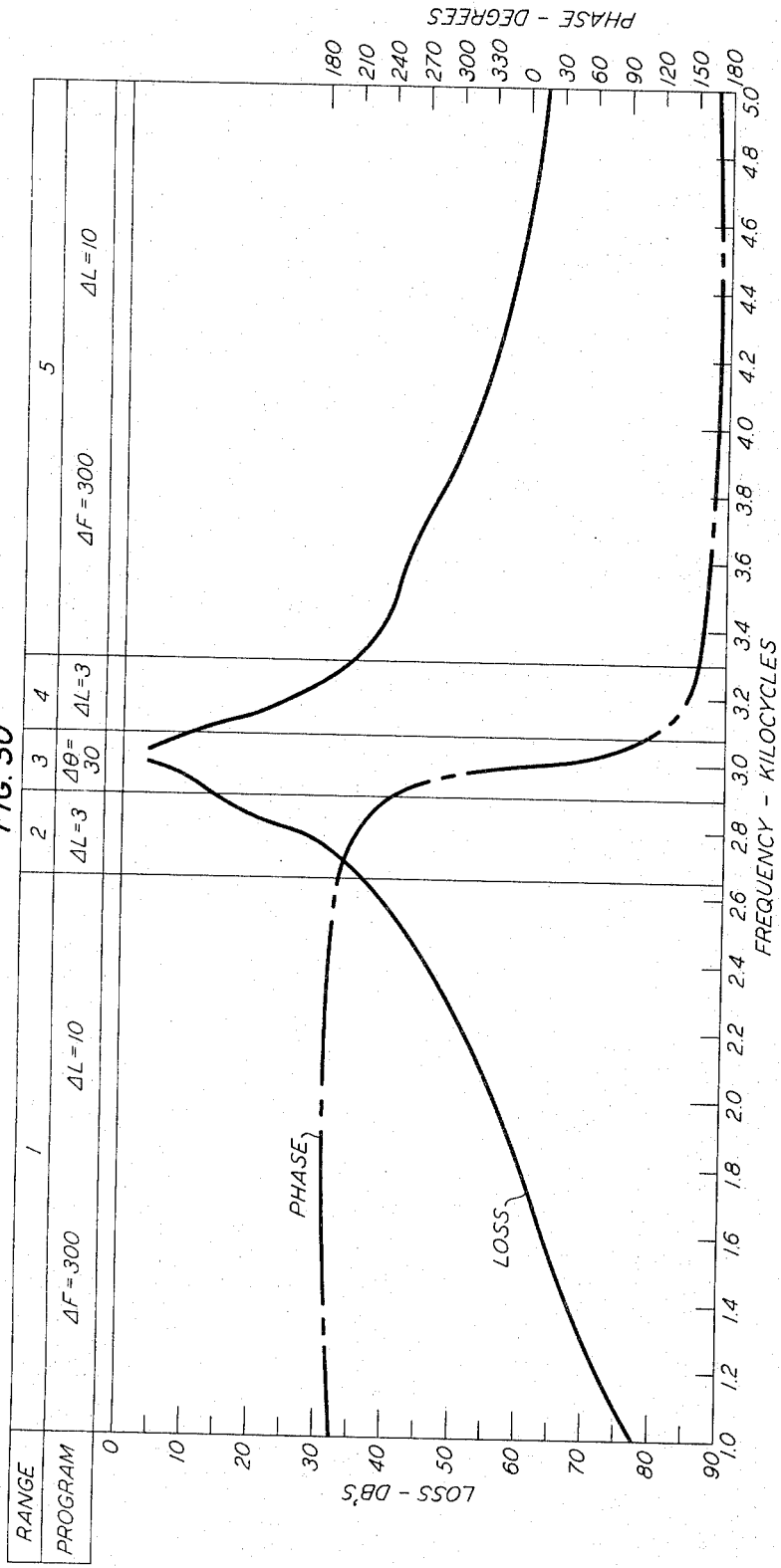
Figure 51:
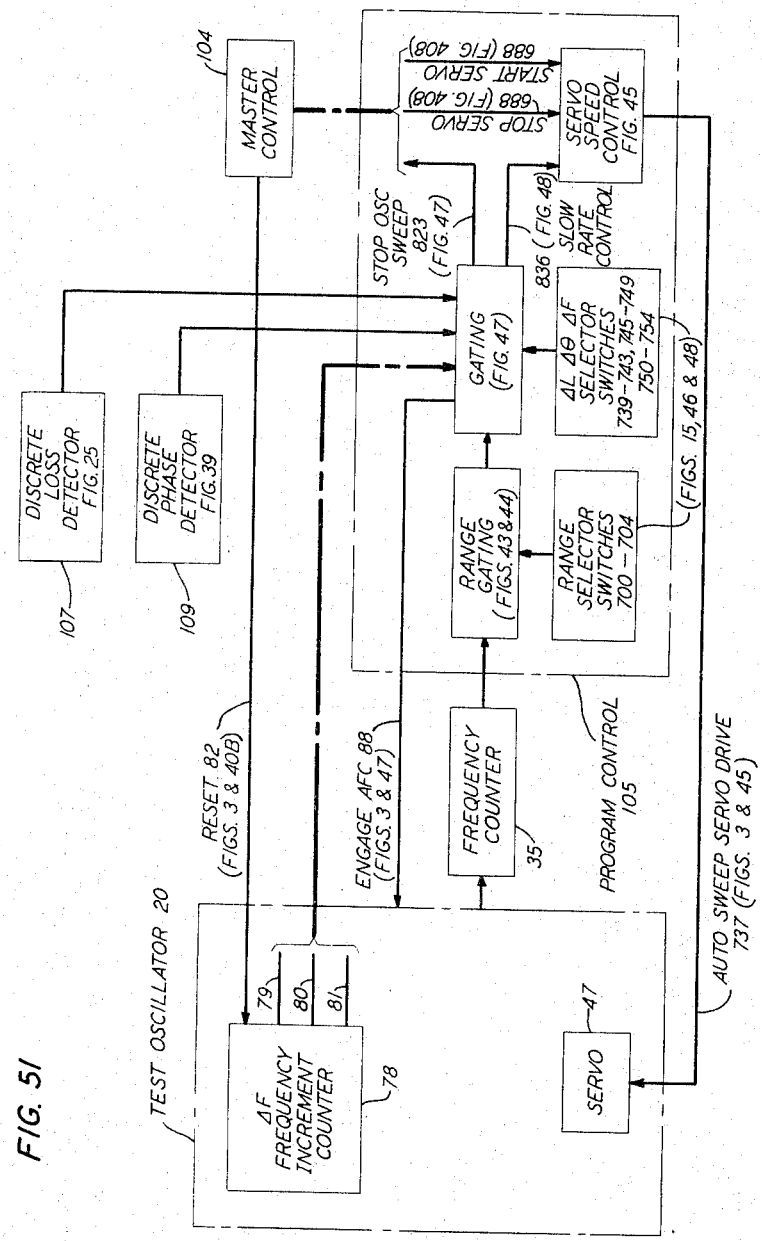
Figure 52:
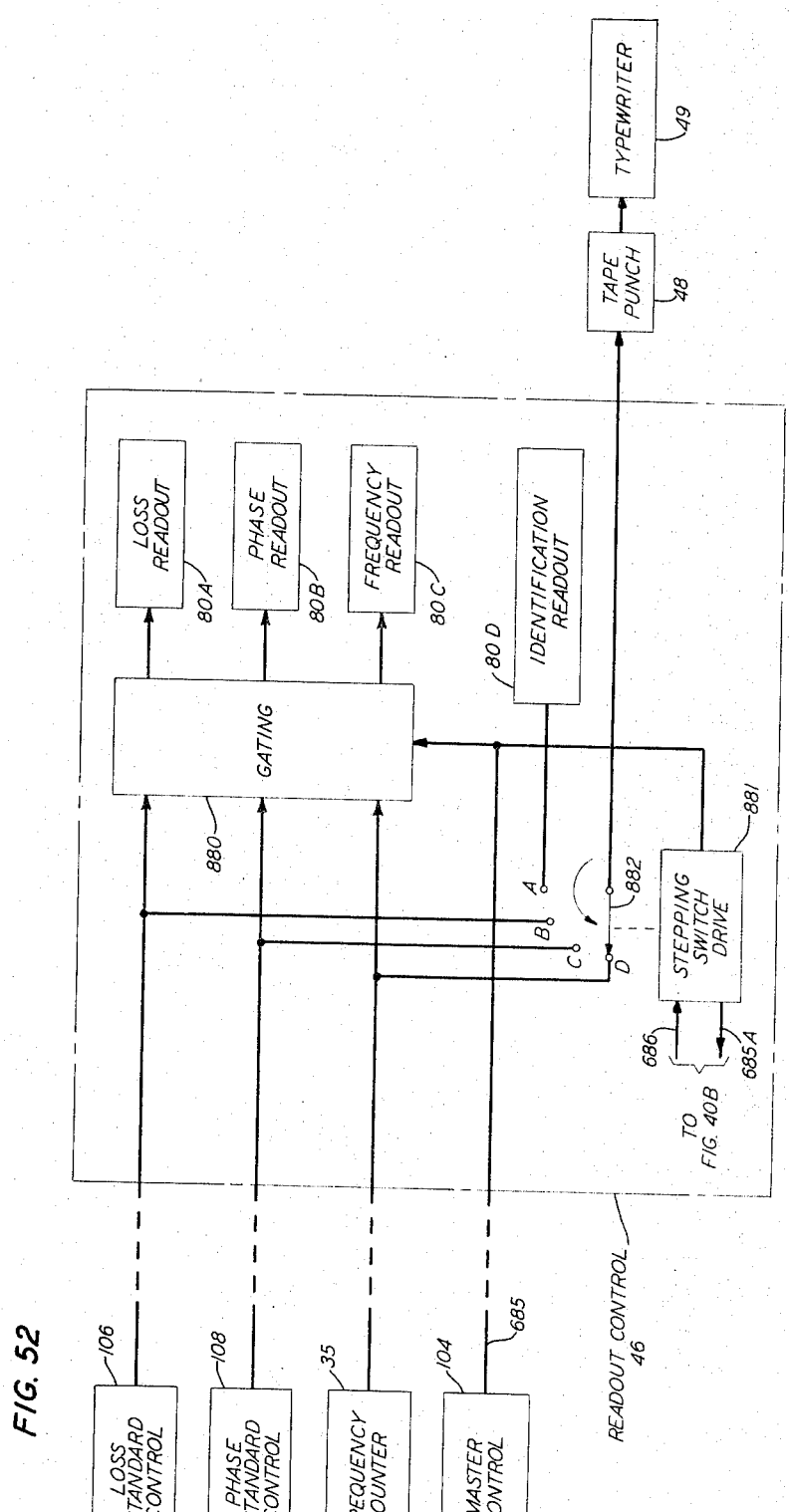

FIGS. 13, 14 and 15 taken together show the manual controls for operating the circuits of FIGS. 2, 4 and 5;

FIGS. 16 through 24 are a schematic circuit of a loss standard control usable in FIG. 5;

FIG. 25 is a box diagram of a system for achieving a loss measurement;

FIG. 26 is a box diagram of a calibrated phase standard usable in FIG. 5;

FIG. 27 is a box diagram of a phase detector usable in FIG. 5;

FIGS. 28A, 28B, 29A, 29B and 31 are box diagrams of a discrete phase detector usable in FIG. 5;

FIG. 30 is a waveform of a staircase voltage produced by the discrete phase detector of FIGS. 28A et al.;

FIGS. 31A and 32 through 38 are a schematic circuit of a phase standard control usable in FIG. 5;

FIG. 39 is a box diagram of a system for achieving phase measurement;

FIGS. 40A and 40B are box diagrams of a master control usable in FIGS. 5, 25 and 39;

FIG. 41 is a schematic circuit of a relay capacitor control usable in FIG. 40;

FIG. 42 is a timing diagram of a clock circuit usable in FIGS. 5, 8, 9, 24, 25, 27, 28 and 31;

FIG. 43 is a box-schematic diagram of a frequency range control usable in FIG. 15;

Figure 44:
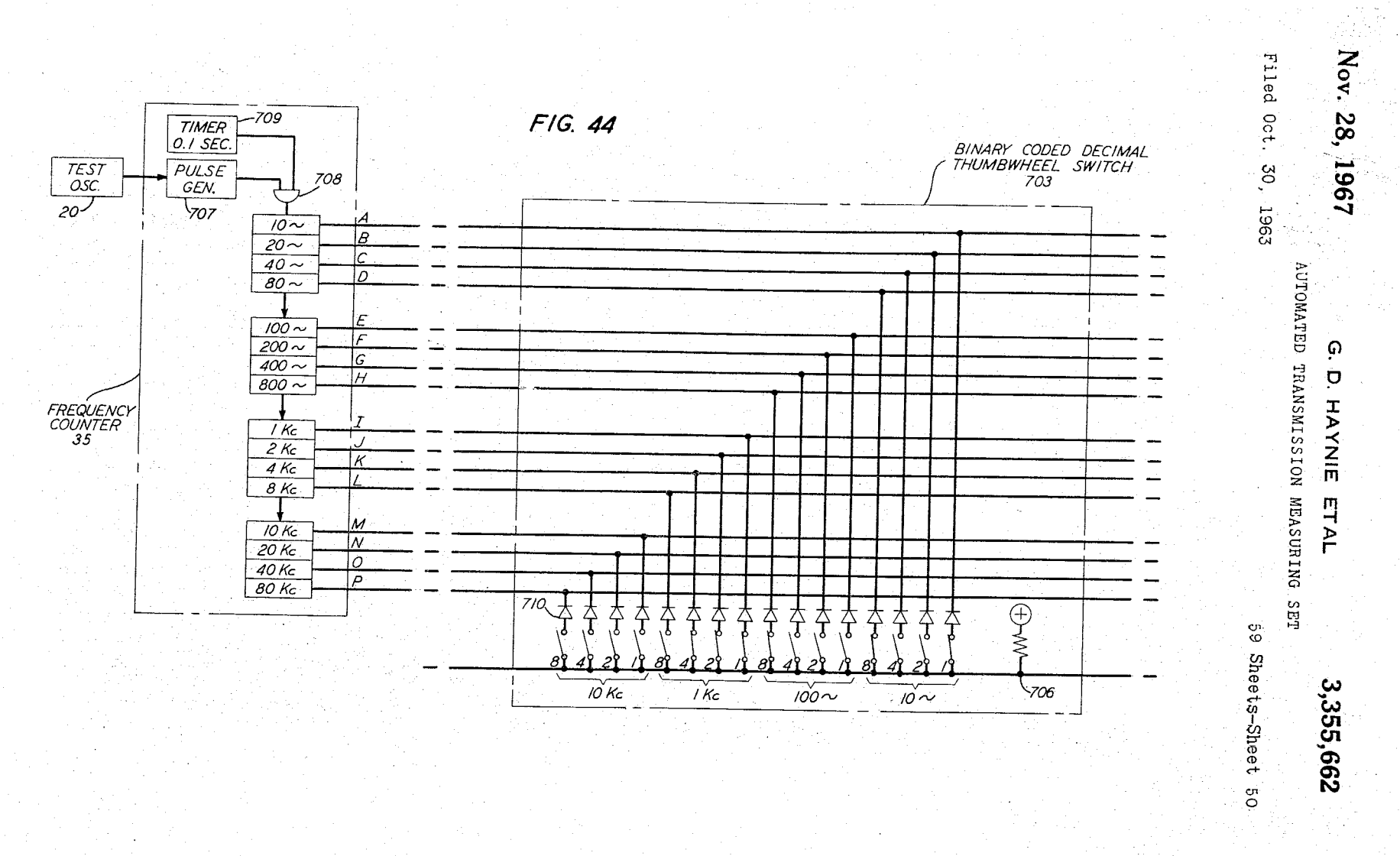

FIG. 44 is a box-schematic diagram of one binary coded decimal thumbwheel switch usable in FIGS. 15 and 43;

FIG. 45 is a schematic diagram of a servo speed control circuit usable in FIGS. 3, 4 and 5;

FIGS. 46 and 47 are circuit diagrams of a stop sweep control of the testing oscillator usable in FIGS. 3, 4 and 5;

FIG. 48 is a schematic circuit showing a fast-slow relay control usable in FIGS. 4 and 5;

FIG. 49 is a box diagram illustrating a time-out circuit usable in FIGS. 4, 5, 25, 39, 40A and 40B;

FIG. 50 illustrates a filter loss and phase characteristic programmed on an assumed basis;

FIG. 51 is a box diagram of a simplified form of the specific embodiment of the invention of FIGS. 2, 4 and 5;

FIG. 52 is a box diagram of a read out control usable in the specific form of the invention of FIGS. 2, 4 and 5;

FIG. 53 is a key sheet for showing the assembling of certain figures mentioned above.

CONTENTS

Figure 1:
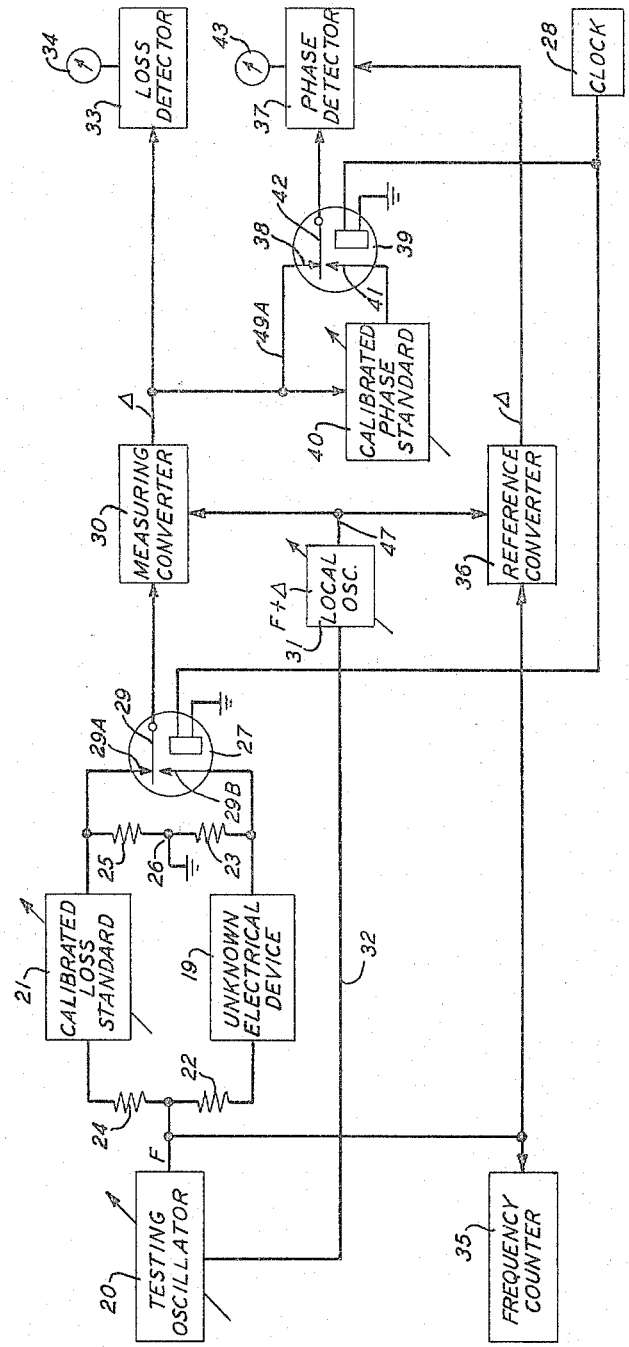
FIG. 1 is a box diagram of a prior art circuit suitable for measuring the unknown loss and phase values of an electrical device as functions of discrete frequencies of a testing voltage.

| | Col. |
|---|---|
| Prior Art Loss and Phase Measuring System—FIG. 1 | 5 |
| Broad Automated Loss and Phase Measuring System—FIG. 2 | 7 |
| Testing Oscillator—FIG. 3 | 7 |
|    100 c.p.s. Film Scale | 8 |
|    AF Frequency Increment Counter | 8 |
|    Engage AFC Control | 8 |
|    Reset for AF Counter | 8 |
| Calibrated Loss Standard—FIGS. 2, 4 and 6 | 9 |
| Testing Voltage Level Control—FIGS. 4, 5 and 7 | 10 |
| Loss Detector and Meter—FIGS. 4, 5 and 8 | 11 |
| Discrete Loss Detector—FIGS. 5, 9A, 9B, 10A, 10B, 11, 12 and 25 | 12 |
| Console of Over-all Measuring Apparatus—FIGS. 13, 14 and 15 | 16 |
| Loss Standard Control—FIGS. 5, 16–24 and 25 | 16 |
| Manual Loss Measurements—FIGS. 4, 5, 13–18 and 25 | 28 |
| Automatic Loss Measurements—FIGS. 4, 5, 13–25 | 33 |
| Calibrated Phase Standard—FIGS. 4, 5 and 26 | 41 |
| Phase Detector and Meter—FIGS. 4, 5 and 27 | 42 |
| Discrete Phase Detector—FIGS. 28A, 28B, 29A, 29B, 30 and 31 | 43 |
| Phase Standard Control—FIGS. 31A and 31–38 | 43 |
| Manual Phase Measurements—FIGS. 4, 5, 13–15 | 48 |
| Automatic Phase Measurements—FIGS. 4, 5, 13–15, 28–39 | 50 |
| Master Control—FIGS. 5, 25, 39, 40A, 40B and 41 | 57 |
| Clock Timing Pulses—FIG. 42 | 60 |
| Frequency Counter—FIGS. 4, 5 and 44 | 60 |
| Present Invention | 60 |
|    Frequency Range Control—FIGS. 15, 43 and 44 | 61 |
|    Servo Speed Control for Testing Oscillator—FIGS. 3 and 45 | 63 |
|    Fast-Slow Relay Circuit to Control Speed of Oscillator Servo in FIG. 3 FIGS. 45 and 48 | 66 |
|    Time Out Circuit—FIG. 49 | 69 |
|    Automatic Operation to Provide Data for a Given Network Under Test Including an Assumed Example | 69 |
|      Balance Loss | 71 |
|      Balance Phase | 72 |
|      Read Frequency | 74 |
|      Display Data—FIG. 52 | 74 |
|      Print Out—FIG. 52 | 75 |
|      Frequency Sweep Control | 75 |
|      Table C of Loss, Phase and Frequency Measurements | 78 |
|      Loss and Phase Characteristics Based on Measurements of Table—FIG. 50 | 78 |
|    Simplified Form of Invention as Shown in FIG. 51 | 79 |
|    Semiautomatic Operation | 79 |

The same reference numerals are utilized to identify identical elements appearing in the several figures of the drawing.

*Prior art measuring circuit—FIG. 1*

FIG. 1 is a block diagram of a transmission measuring circuit for measuring the unknown numerical values of the loss and phase of an electrical device 19 as a function of the numerical value of the frequency of a testing voltage transmitted therethrough in a manner known in the prior art. In this figure calibrated oscillator 20 is manually adjustable to supply testing voltage F at a preselected numerical value to the electrical device terminated in 600-ohm resistors 22 and 23 and at the same time to a calibrated loss standard 21 terminated in 75-ohm resistors 24 and 25. A common point 26 of resistors 23 and 25 is connected to ground. The unknown device and standard loss and the respective resistors associated therewith are connected in parallel to the oscillator. The calibrated loss standard comprises groups of individual resistors of predetermined values to provide losses in decibel amounts of .01, .02, .04, 0.1, 0.2, 0.4, 1, 2, 4, 10, 20 and 40 as mentioned below in regard to FIG. 6.

Sampling mercury relay 27 operated at a predetermined time rate via timing pulses supplied by clock 28 switches its swinger 29 alternately between its contacts 29A and 29B and thereby alternately between the outputs of the calibrated loss standard and unknown device, respectively. This supplies the individual outputs alternately to the input of measuring converter 30 at the predetermined time rate. At the same time the converter is also continuously receiving a testing voltage having a variable frequency $F+\Delta$ on lead 47 from the output of a local oscillator 31 whose output frequency is automatically controlled to be $\Delta$ cycles per second greater than the output of oscillator 20. The oscillators 20 and 31 are synchonized as indicated by line 32. Actually, local oscillator 31 and line 32 represent the testing voltage $F+\Delta$ on lead 47A in FIG. 3. The preselected numerical value of the testing voltage frequency is indicated by a frequency counter 35.

The output of converter 30 is a fixed component $\Delta$ applied to loss detector 33 whose output is supplied to null indicator 34. Differences in the magnitudes of the loss in the loss standard and unknown device produce level variations in the output of the converter at the preselected switching time rate of relay 27 under control of timing pulses supplied by clock 28. These variations are reflected as proportional deflections of null meter 10. After the calibrated loss standard is manually adjusted to provide a null reading on meter 34, the standard loss and unknown device supply equal magnitudes of the testing signal voltage to the input of the measuring converter at the preselected numerical value of the frequency of the testing voltage. The magnitudes of the loss in the standard loss and unknown device are thus equal. Now, the magnitude of the loss effective in the standard loss being equal to the magnitude of the loss present in the unknown device provides a numerical measurement of the loss present in the unknown device at the preselected numerical value of the testing voltage frequency.

For measuring the phase of the unknown device at the preselected numerical value of the testing voltage frequency, the testing voltage frequency F at the output of oscillator 20, and the local testing voltage frequency $F+\Delta$ at the output of local oscillator 31 are simultaneously supplied to the input of reference converter 36. This causes the reference converter to supply an output component $\Delta$ of fixed phase to one input of phase detector 37. At the same time, a portion of the component $\Delta$ in the output of measuring converter 30 is applied via a conductive strap 49A to a first contact 38 of mercury relay 39 and an input of calibrated phase standard 40 which has its output connected to a second contact 41 of relay 39. As shown, swingers 29 and 42 are actuated to the standard or "S" comparison positions. Relay 39 moves its swinger 42, which is connected to a second input of the phase detector, between associated contacts 38 and 41 in synchronism with swinger 29 of relay 27 under control of timing pulses supplied by clock 28. The output of phase detector 37 is applied to a null meter 43.

It is thus apparent at the moment that while the two components $\Delta$ in the outputs of the measuring and reference converters 30 and 36, respectively, have the same preselected testing voltage frequency, they may differ in phase for a reason that is presently mentioned. When the swingers 29 and 42 of relays 27 and 39, respectively, are on their associated contacts 29A and 38 as shown in FIG. 1, the magnitudes of the phase of the two components $\Delta$ in the outputs of the measuring and reference converters are simultaneously furnished to the phase detector. This constitutes a reference condition. When, however, the swingers 29 and 42 are switched to engage contacts 29B and 41, respectively, the magnitude of the phase of the testing voltages supplied to the input of the measuring converter is changed by the difference in magnitude between the phase characteristic of the loss standard and the phase characteristic of the unknown device. The effective phase change at the output of the measuring converter is represented by a negative sign on the magnitude of the last-mentioned phase difference. The reason for this negative sign is presently explained.

At the same time the phase difference between the voltages at the outputs of the measuring converter and calibrated phase standard is equal to the phase shift introduced by the latter standard. If the phase characteristic of the loss standard were negligible, the phase change at the output of the phase standard is always the difference between the phase of the unknown device and the phase standard, and this difference is reflected by a proportional indication on null meter 43. When a null is indicated by meter 43 the magnitude of phase shift introduced by the phase standard, as indicated by its calibration, is equal to magnitude of the phase of the unnknown device.

At this time, a reading of the phase standard provides a numerical measurement of the magnitude of the phase of the unknown device. Also, a reading of the frequency counter provides a numerical measurement of the preselected numerical value of the testing voltage frequency for the phase measurement. In this connection, it is recalled that the measurement of the loss of the unknown device was made as previously described at the same preselected numerical testing frequency value. These measurements of the numerical values of loss phase and frequency are then transferred to a permanent record for future use.

The frequencies of the voltages supplied by the testing and local oscillators may be adjusted in synchronism to obtain additional loss and phase measurements at desired discrete frequencies over a predetermined frequency range. It is apparent that all such measurements in FIG. 1 are made at the same numerical value of the IF frequency Δ.

*Automated measuring circuit—FIGS. 2, 4 and 5*

The manually operated circuit of FIG. 1 is automated in the manner of the box diagram shown in FIG. 2. For this purpose over-all control 45 including clock 28 of FIG. 1 is connected to calibrated loss standard 21, calibrated phase standard 40, frequency counter 35, read out control 46, loss detector 33, phase detector 37 and a servo, not shown, but included as servo 47 in testing oscillator 20 as indicated in FIG. 3. The output of the read out control is connected to the input of a tape punch 48 which may have its output fed to an electric typewriter 49, or equivalent apparatus suitable for processing the data contained in a punched tape, not shown, supplied at the output of the tape punch. It is thus evident that the several components shown in heavy lines in FIG. 2 serve to automate the manually operated circuit of FIG. 1 for measuring the numerical values of the loss and phase of the unknown device as functions corresponding to the numerical values of discrete testing frequencies in a manner that is subsequently explained in detail.

Figure 6:
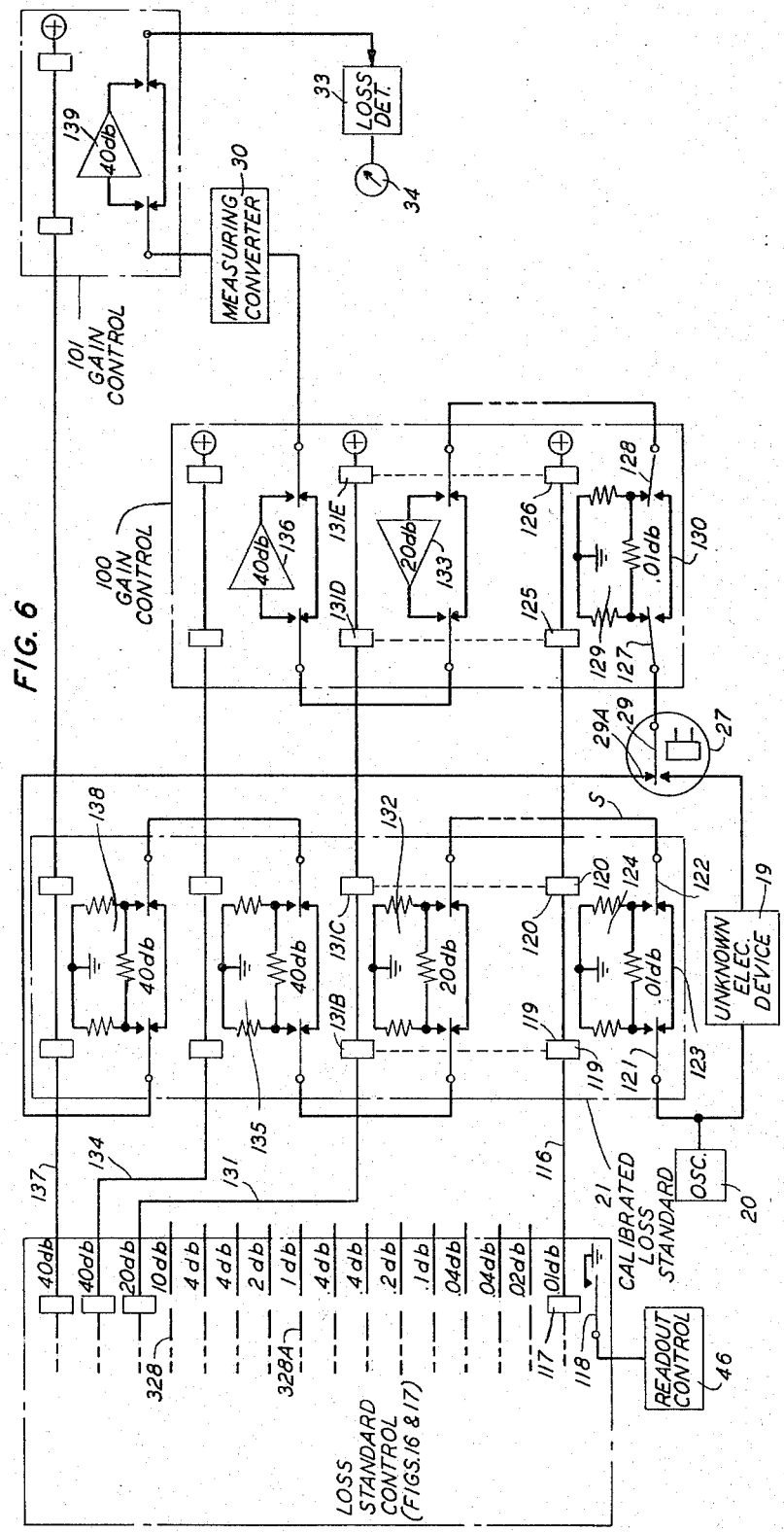
FIG. 6 is a schematic circuit illustrating the operation of a calibrated loss standard and gain control included in FIG. 6.

FIGS. 4 and 5 illustrate all of the components delineated in box form in the specific embodiment of the invention shown in FIG. 2, together with a breakdown in box form of the over-all control 45, together with a buffer amplifier 505, level control 103, and gain controls 100 and 101 in FIG. 6. The over-all control 45 comprises clock 28, master control 104, program control 105, loss standard control 106, discrete loss detector 107, phase standard control 108 and discrete phase detector 109. FIG. 5 also includes the addition of low-pass filters 110 and 111 connected in the loss measuring path via mercury relay 112 having a swinger 113 and associated contacts 114 and 115. Further details regarding the specific circuitry and functions of these components in the operation of the over-all measuring system are subsequently explained.

*Testing oscillator—FIG. 3*

FIG. 3 is a schematic circuit-box diagram of testing oscillator 20 shown in FIG. 2 and comprising a heterodyne type. This oscillator includes a crystal oscillator 53 suppling a voltage Δ of fixed 97-kc. frequency to a frequency converter 54 to which is simultaneously supplied a voltage $F+\Delta$ of a frequency varying from 97.02 kilocycles to 117 kilocycles from an LG oscillator 55. A portion of the voltage $F+\Delta$ is supplied on lead 47A to measuring and reference converters 30 and 36, respectively, in FIGS. 1 and 2 for the purposes mentioned above in connection therewith. The converter 54 translates the input frequencies into an output component F varying over a 20–20,000 cycles-per-second range. This component is transmitted through a low-pass filter 56 and a voltage amplifier 57 to a power amplifier 58. The LC oscillator is tuned via a parallel LC network 59 including an inductor 60 and air capacitor 61 whose rotor is actuated by a shaft 62 driven by servo 47 in a manner and for a purpose that are subsequently explained.

The heterodyne oscillator 20 maintains a stability of within ±0.1 cycle per second over the 20–20,000 cycles-per-second range, and a power output flat with frequency, over this range via a first AGC circuit 63 connected from the output of amplifier 57 to the 97-kc. crystal oscillator 53 and a second AGC circuit 64 connected between the output and input of voltage amplifier 65 included in the LC oscillator 55. The operation of these AGC circuits is well known in the heterodyne oscillator art. The output of power amplifier 58 is supplied to lead 67B and through level control 66 to lead 68 for a purpose that appears later. The testing voltage in the output of the level control is supplied on lead 68 to resistors 22 and 24 connected in the unknown and standard paths, respectively, in FIG. 4. The testing voltage on lead 67B is supplied to frequency counter 35 and reference converter 36 in FIG. 4. The level controls 66 and 103 shown in FIGS. 3 and 4, respectively and synchronized by signals on cable 67 provide different testing voltage levels in decibels, referenced to 1 milliwatt, comprising: 10, 5, 0, −5, −10 and −20 dbm, in a manner that is later explained in regard to FIG. 7.

Tuning of LC oscillator 55 and thereby the tuning of the over-all heterodyne testing oscillator 20 is controlled by a coarse knob 69 actuated across resistor 70 connected to direct-current source. Adjustments of this knob serve to vary the polarity and magnitude of the direct current supplied through direct-current amplifier 71 to servo 47 which actuates shaft 62 for moving the rotor of capacitor 61 for tuning the LC oscillator 55 as previously mentioned. This shaft also carries a cam 72 for controlling the closing and opening of switch 73 in such manner that a low portion of the cam opens the switch, whereas a high portion of the cam closes the switch to apply ground to lead 112A which operates mercury relay 112 in FIG. 5 for a purpose that is later mentioned. In addition, the cam carries a first bevel gear 74 meshing with a second bevel gear 75 mounted on one end of a shaft 76 which has its opposite end to control the operation of apparatus 77.

This apparatus includes a film, not shown, marked with successive black lines properly spaced in a longitudinal direction thereon for indicating the calibration of testing voltage in frequency steps of 100 cycles for a purpose that appears later, and a photosensitive diode, not shown. The output of apparatus 77 is supplied to a Δf frequency counter 78 which includes three output leads 79, 80 and 81 and an input lead 82. The operation of apparatus 77 and Δf increment counter 78 are hereinafter explained.

A vernier capacitor 83 of an air type is manually actuated to provide vernier tuning of LC oscillator 55 within a range of ±5 cycles per second. A third capacitor 84 shown in broken lines represents the capacitance of diode 85 whose capacitance is a function of the voltage applied across it. This diode is connected in an AFC loop which is presently explained. This diode is activated by the output voltage of a phase detector 86 which receives two inputs: a first one from a source 87 of alternating voltage having a precise frequency of 100 cycles per second and a second one from the output of testing voltage amplifier 57. When the testing frequency lies within ±10 cycles per second of a 100 cycle-per-second multiple, an engage AFC voltage supplied on lead 88 in a manner mentioned later is applied to the incoming end of the operating winding of electromagnetic relay 89. As the opposite end of this operating winding is grounded, relay 89 operates to close its normally open contact 90 on its armature 91.

This connects capacitor 84 representing the capacitance of diode 85 in parallel with vernier capacitor 83 whereby the over-all heterodyne oscillator is locked to the last-mentioned 100 cycles-per-second multiple frequency with no error in the frequency of the testing signal voltage F. Capacitor 92 provides direct-current blocking while capacitor 85B is a bypass capacitor. Capacitor 93 connected by armature 91 and normally closed contact 94 between ground and capacitor 83 is equal to the quiescent capacitance of diode 85 with a nominal back bias provided by potentiometer 85A so that when relay 89 is energized the frequency of the testing voltage $F+\Delta$ at the output of oscillator 55 is not materially changed. It is thus seen that the AFC circuit has a pull-in range of approximately ±10 cycles per second. Additional controls for heterodyne oscillator 20 are described hereinafter regarding the operation of the over-all system.

Calibrated loss standard and gain control—FIG. 6

The loss standard control in FIG. 6 provides circuitry for adjusting the calibrated loss standard 21 and gain control 100 and 101 of FIGS. 4 and 5 under the supervision of appropriate ground signals, for example, supplied by a loss standard control 106 in FIG. 4. The details of the operation of this control are hereinafter given. For the moment, it is understood for the purpose of this explanation that the loss standard control is capable of supplying supervising signals to adjust the calibrated loss standard and gain controls 100 and 101 for providing losses between 0.01 and 119 decibels therein. At this time it is further understood that the calibrated loss standard has zero loss while gain control 100 has maximum loss and gain control 101 has unity gain as further explained below.

Assuming an adjustment of a loss of 0.01 decibel is called for, the loss standard control applies ground to one end of lead 116 which has (+) battery at its opposite end whereby current is caused to flow on this lead. This energizes the operating winding 117 of a suitable relay, which is thereupon activated to close its associated contact 118 connected to read out control 46 for a purpose that is subsequently mentioned. At the same time the current flow on lead 116 energizes operating windings 119 and 120 of associated relays which are then operated to disengage their swingers 121 and 122, respectively, from contacts normally connected via a conductive strap 123 and to engage them with contacts associated with a resistive network 124. As this network is now connected in the measuring circuit, it introduces a 0.01 decibel loss into the calibrated loss standard and thereby into the path for the testing voltage when swinger 29 of relay 27 is engaging its contact 29A.

Also at the same time, the current flow on lead 116 energizes operating windings 125 and 126 of associated relays, which are then activated to disengage their swingers 127 and 128, respectively, from contacts normally connected to resistive network 129 and to engage them with contacts connected to a conductive strap 130. As this network is now disconnected from the measuring circuit, it removes a 0.01 decibel loss from the measuring path which now includes the 0.01 decibel loss in the calibrated loss standard as just mentioned. This precludes any reduction in the magnitude of the testing voltage applied to loss detector 33 via the path including the calibrated loss standard. In a similar manner the introduction of .02, .04 (two), .1, .2, .4 (two), 1, 2, 4 (two) and 10 decibel losses into the calibrated loss standard in response to appropriate supervisory signals received from the loss standard control is compensated for by the removal of corresponding amounts of loss from the gain control.

When, however, a current flow on lead 131 introduces a loss of 20 decibels via network 132 into the calibrated loss standard, an amplifier 133 providing a 20 db gain is connected into gain control 100 in the measuring circuit. This amplifier maintains the testing voltage at the predetermined level thereby compensating for such 20 db loss. Likewise, when a current flow on lead 134 introduces a loss of 40 decibels via resistive network 135 into the calibrated loss standard, amplifier 136 having a 40 db gain is simultaneously inserted into gain control 100 to compensate for such 40 db loss. Also, a current flow on lead 137 introduces a 40 db loss via network 138 into the calibrated loss standard and at the same time connects an amplifier 139 having a 40 db gain into gain control 101 to compensate for the corresponding amount of loss. Thus, amplifiers 133, 136 and 139 prevent any reduction in the magnitude of the testing voltage applied to the loss detector. In the calibrated loss standard and gain control in FIG. 6, it is thus seen that the contacts of the several resistive components and amplifiers are connected in series.

Figure 7:
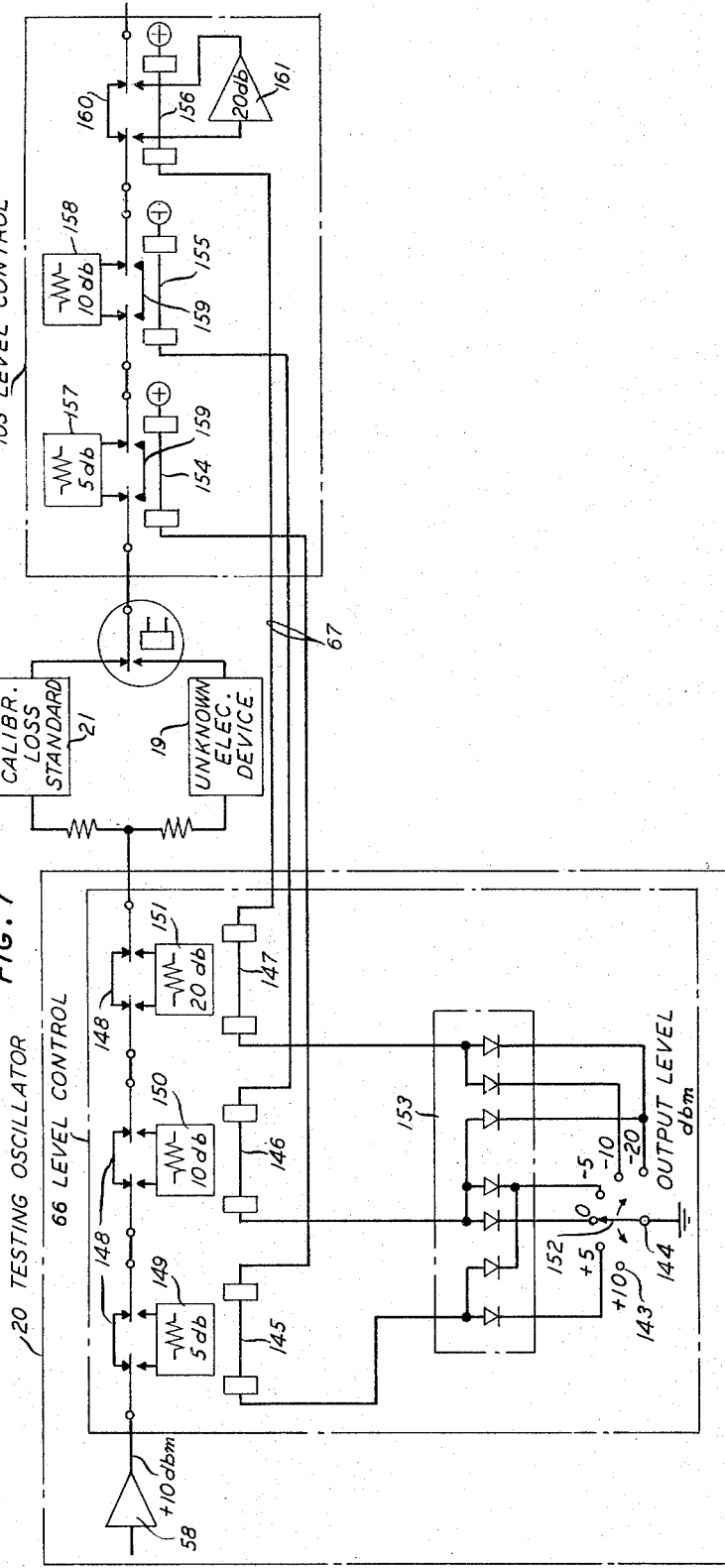
FIG. 7 is a schematic circuit illustrating the operation of the signal level controls in FIGS. 3 and 4.

Testing voltage level controls—FIG. 7

FIG. 7 illustrates the circuits used to provide the testing voltage level controls 66 and 103 shown in FIGS. 3 and 4, respectively. In level control 66, in FIG. 7, each of mercury relay pairs 145, 146 and 147 comprises two contacts normally closed on conductive straps 148, two contacts normally opened and connected to resistive networks 149, 150 and 151 providing 5, 10 and 20 db loss, respectively, and two operating windings connected in series. Also, in level control 66, a manually actuated level control switch 152 has one end grounded and the opposite end movable on a pivot 144 to a group of longitudinally spaced contacts 143, indicating values in decibel loss referenced to one milliwatt: +10, +5, 0, −5, −10 and −20 dbm. This switch is connected through the respective contacts and a diode matrix 153 to the operating windings of the mercury relays in a manner and for a purpose that are subsequently explained. It is apparent that the individual diodes are poled in the respective relay winding circuits to permit current flow from a positive terminal to ground, while at the same time precluding electrical interaction between two or more relay-winding circuits. In level control 103 in FIG. 7, each of mercury relay pairs 154 and 155 includes two contacts normally closed and connected to 5 decibel resistive and 10 decibel resistive networks 157 and 158, respectively, two contacts normally opened and connected to conductive straps 159, and two operating windings connected in series. In addition, mercury relay pair 156 comprises two contacts normally closed and connected via a conductive strap 160, two normally opened contacts connected to an amplifier 161 having a 20 db gain. It is evident that the operating windings of relay pairs 145 and 154 are serially connected as are those of relay pairs 146 and 155 and relay pairs 147 and 156.

The operation of the level controls 66 and 103 in FIG. 7 is effected in the following manner. It is assumed for the present explanation that the power of the testing signal in the output of amplifier 58 of FIGS. 3 and 7 is permanently adjusted to a +10 dbm amount, that is, 10 decibels above 1 milliwatt. Assuming further it is now desired to apply this amount of testing signal power to the calibrated loss standard 21 and unknown electrical device 19 in FIGS. 4 and 7. For this purpose switch 152 in FIG. 7 is actuated to its "+10 db" contact and from a visual inspection of the circuit shown in this figure it is apparent that this contact is so electrically isolated as to produce no action therein. As a consequence, a +10 dbm amount of testing signal power is supplied to the inputs of the calibrated loss standard and unknown electrical device. At the same time loss networks 157 and 158 and conductive strap 160 are present in the signal transmission path through level control 103. This provides 15 db of attenuation to the test signal prior to its arrival at the gain control 100 as shown in FIG. 4 and thus produces a maximum signal of −5 dbm at this point.

Let it now be assumed that it is desired to apply a 0 dbm testing signal power to the inputs of the calibrated loss standard and unknown device. For this purpose, switch 152 is moved to engage its "0 dbm" contact at which current is caused to flow in the operating windings of relays 146 and 155 whereby both latter relay pairs are operated. The operation of relay pair 146 inserts a 10 db loss network 150 in series with the output of amplifier 58 in level control 66 whereby the testing signal power is reduced thereat by such 10 db amount to a 0 dbm value. At the same time, the operation of relay pair 155 removes 10 db loss network 158 from level control 103. It is thus apparent that the insertion of the 10 db network 150 is compensated for by the removal of the corresponding 10 db network 158. This ensures that the maximum signal at the input of the gain control 100 is still −5 dbm.

In like manner a +5 dbm amount of testing signal power is supplied to the inputs of the calibrated loss standard and unknown device by moving the switch 152 to its "+5 dbm" contact at which the operating windings of relay pairs 145 and 154 are energized to operate to insert 5 db loss network 149 in the circuit in level control 66 and to remove the corresponding 5 db loss network 157 from the circuit. This provides a net loss of a 5 db amount of testing signal power relative to the initial +10 dbm amount of power whereby a +5 dbm of such power is supplied to the inputs of the calibrated standard loss and unknown device. A —5 dbm amount of power is supplied to the inputs of the calibrated loss standard and unknown device by moving the switch 152 to its "—5 dbm" contact to effect the insertion of resistance networks 149 and 150 and the removal of the corresponding 5 db and 10 db resistance networks 157 and 158 from the circuit. This provides a 15 db loss relative to the initial +10 dbm amount to provide the required —5 dbm net amount. Thus, the removal of the 15 db loss in level control 103 compensates for insertion of the 15 db loss in level control 66.

A —10 dbm amount of testing signal power is provided at the inputs of the calibrated standard loss and unknown device by moving switch 152 to its "—10 dbm" position to insert 20 db loss network 151 and 20 db gain amplifier 161 in the circuit. This 20 db loss relative to the initial +10 dbm amount provides the desired —10 dbm net amount of testing signal power. Thus, the insertion of the 20 db gain amplifier compensates for the insertion of the 20 db loss. A —20 dbm amount of testing power is established by actuating the switch 152 to its "—20 dbm" position to connect the 10 and 20 db resistance networks 150 and 151 into level control 66 and to disconnect the 10 db resistance network 158 from level control 103 and insert the 20 db gain amplifier 161 into level control 103. This 30 db loss relative to the +10 dbm power at the output of amplifier 58 provides a —20 dbm net amount of testing voltage power at the inputs of the calibrated loss standard and unknown device.

It is thus apparent from the mutual operation of the two level controls shown in FIG. 7 that while different amounts of testing signal power can be applied to the inputs of the calibrated loss standard and unknown electrical device, a certain or constant amount of such power is always applied to the input of the gain control circuits.

*Loss detector and loss meter—FIGS. 4, 5 and 8*

FIG. 8 delineates loss detector 33 and associated null meter 34, shown in FIGS. 1, 2, 4 and 5 and comprises power amplifier 166, logarithmic amplifier 167, detector 168, direct-current amplifier 169, mercury relay 16. This relay includes swinger 14 engaged on contacts 12 and 15 and disengaged from contact 17. Point 164 common to the output of amplifier 169 and swinger 14 of relay 16 is joined to a lead 165 for a purpose that is later explained. Contact 12 is connected to integrating amplifier 170 included in an AVC loop 171 terminating in detector 168. Relay contact 15 is connected to one terminal of a voltage storage capacitor 172 which has its opposite terminal at ground, and via resistor 173 to one terminal of loss meter 34. This meter has its opposite terminal joined to one end of operating winding 175 of meter relay 176. Relay contact 17 is connected to one terminal of a voltage storage capacitor 174 which has its opposite terminal at ground, and to the opposite end of relay winding 175. Relay 176 includes swinger 177 engaged with contact 178 to supply ground to lead 179 for a purpose that is subsequently mentioned.

The operation of the loss detector of FIG. 8 associated with the comparison of the magnitude of the calibrated loss standard 21 shown in FIGS. 6 and 8 with the magnitude of the loss of the unknown electrical device 19 at preselected numerical values of the testing voltage frequency is substantially the following. Assuming the loss of the calibrated loss standard is less than the loss of the unknown device, and swinger 29 of relay 27 has engaged its associated contact 29A under control of timing pulses supplied by clock 28 in FIG. 8, so that transmission is through the "S," or loss standard, path. The logarithm of the magnitude of the test signal transmitted via the calibrated loss standard, the measurement converter and the logarithmic amplifier 167 is detected in detector 168 and amplified in direct-current amplifier 169. The output of this amplifier is applied via swinger 14 and contact 15 of relay 16 to place a proportional voltage charge on capacitor 172 and via swinger 14 and contact 12 to apply the output of amplifier 169 to the input of integrating amplifier 170 in the AVC loop 171 for a purpose that is presently mentioned.

When swinger 29 of relay 27 is actuated to engage its associated contact 29B, swinger 14 of relay 16 is also moved to engage its associated contact 17 and transmission of the test signal takes place through the "X," or unknown path. The logarithm of the magnitude of the signal transmitted via the unknown device, is detected in detector 168 and amplified in direct-current amplifier 169. This amplified direct-current voltage places a proportional voltage charge on capacitor 174. The charge on capacitor 172 is applied through resistor 173 to one terminal of meter 34 whereas the charge on capacitor 174 is effective via relay operating winding 175 to the opposite terminal of meter 34. Essentially the difference between the two capacitor charges activates meter 34 to produce a proportional deflection thereon. As the loss of the calibrated loss standard was assumed to be less than the loss of the unknown device, then the deflection is in a direction to indicate such difference. In due course the swingers 29 and 14 are returned to engage their contacts 29A and 12 and 15, respectively, and thereafter to engage their contacts 29B and 17, respectively, under control of the timer pulses supplied by clock 28.

When swinger 14 engages contact 12 as previously stated, the sampled output of direct-current amplifier 169 is also applied via integrator amplifier 170 in the AVC loop which activates detector 168 in such manner as to force the output of amplifier 169 to go substantially to zero during the time when swinger 14 engages contacts 12 and 15. When swinger 14 and contact 12 are no longer engaged, the integrator amplifier holds its output value, established while swinger 14 engaged contact 12, until the next succeeding engagement of contact 12 with swinger 14. Since, as can be seen from the foregoing discussion, the voltage on capacitor 172 is essentially 0, the voltage charge on capacitor 174 represents the difference between the magnitude of the calibrated standard loss in path "S" and the loss of the unknown device in path "X," and is reflected as proportional indications on meter 34. At the same time this difference energizes the operating winding 175 of relay 176 to hold swinger 177 of relay 176 disengaged from its associated contact 178. When the magnitude of the calibrated standard loss in the "S" path is adjusted to equal the loss of the unknown device in the "X" path in a manner hereinafter described, the difference therebetween is reduced substantially to zero. This serves to de-energize operating winding 175 of relay 176 which permits thereupon its swinger 177 to engage its contact 178 thereby providing ground on lead 179 to terminal 438 in FIG. 23 for a purpose that is later explained. When the magnitude of the calibrated loss standard is greater than the loss of the unknown device at a given numerical value of the testing voltage frequency, opposite indications are established on loss meter 34 but the operation of the circuit of FIG. 8 is essentially the same as that described above.

*Discrete loss detector—FIGS. 9A, 9B, 10A, 10B, 11 and 12*

This translates the magnitudes of input analog voltages into corresponding digital quantities by comparing the analog voltage with particular steps of a staircase voltage developed within the detector, and in noting the first staircase step whose corresponding voltage exceeds the magnitude of the input analog voltage. Each comparison of the magnitude of an input voltage with a step of the staircase voltage requires an elapsed time of 100 microseconds. The detector comprises several components whose structure and cooperation are presently explained.

Clock 28 in FIG. 9B provides a negative timing pulse which is changed into a positive timing pulse by inverter 200. This positive pulse activates a reset pulse generator 201. The output of this generator produces a negative square-wave voltage which is simultaneously applied via diode 202 to the reset inputs of a 15-stage shift register 203. All stages of the shift register are simultaneously activated to their reset states whereby a −12 volt voltage is provided at their 0-side outputs and 0-volt voltages at their 1-side outputs. A delay network 204 is included between successive stages of the shift register. At the same time the square-wave voltage in the output of the reset generator is applied via diode 205 and lead 206 to one input of OR gate 207 included in an electronic switch 208 in FIGS. 9A and 9B. This gate is activated to provide a voltage which is applied to the reset input of flip-flop 209. This is transferred to its reset state whereby a 0-volt voltage is supplied from its 1-side output to AND gate 210 to block the transmission of voltage pulses from a 10-kc. pulse generator 211 therethrough to lead 212 in the output of this gate. In the reset state, flip-flop 209 also provides a −12 volt voltage via its 0-side output to the input of differentiator network 213. The output of this network provides a negative voltage pulse on lead 214 to the set input of a second stage flip-flop 220 included in sequence control 216.

The square-wave voltage on lead 206 is also applied to the set input of a first-stage flip-flop 215 included in sequence control 216. This flip-flop is set to apply a voltage from its 1-side output to lead 217 in FIGS. 9A and 9B and thereby to the set input of stage 1 of the shift register. This places a −12 volt voltage or a logic 1 in the 1-side output of this stage 1. At the same time the voltage from the 1-side output of flip-flop 215 is applied via delay network 218 to its reset input to activate itself back to its reset state. Now the 0-side output of flip-flop 215 provides a −12 volt voltage which is applied through differentiator network 219 to the set input of flip-flop 209 in the electronic switch. This flip-flop is returned to the set state to provide a −12 volt voltage at its 1-side output for enabling AND gate 210. Once again the 10-kc. pulses of pulse generator 211 are transmitted via gate 210 to its output lead 212 and thereby via this lead in FIG. 9B to advance the logic 1 stored in stage 1 of the shift register as previously mentioned. The pulses on lead 212 activate the shift register to advance the logic 1 stored in stage 1 therealong stage-by-stage.

As the logic 1 is advanced from stage 1 through stage 8 of the shift register in FIG. 9B, the −12 volt voltage in the 1-side outputs of the respective 1 through 8 stages are inverted via 8 corresponding inverter amplifiers 225 and applied as positive voltages to the bases of corresponding 8 transistors 226, included in a staircase voltage generator 224. The collectors of these are supplied with a common voltage $+E_c$ while their emitters are connected through 8 discrete voltage dividers comprising 8 resistors R1 through R8 of different magnitudes of resistance connected through a common resistor 227 to ground. Resistor R1 has the smallest resistance magnitude and resistor R8 the largest, and resistors R2 through R7 have different magnitudes varying in an ascending order from the magnitude of resistor R1 to that of resistor R8.

As the logic 1 is advanced into stage 9 and from there into stages 10 through 15, the 0 volt voltages in the 0-side outputs of the respective 9 through 15 stages are shifted via 7 corresponding inverter amplifiers 228 and applied as negative voltages to the bases of 7 corresponding transistors 229. The collectors of these transistors are supplied with a common voltage $-E_c$ while their emitters are connected through 7 discrete voltage dividers comprising 7 resistors R9 through R15 of different magnitudes of resistance connected through a common resistor 230 to ground. Resistor R9 of the R9–R15 group has the largest magnitude of resistance and resistor R15 the smallest magnitude of this group, and resistors R10 through R14 have different magnitudes varying in a descending order from the magnitude of resistor R9 to that of resistor R15. It is thus apparent that the outputs of the respective 1 through 15 stages of the staircase voltage generator provide a staircase voltage waveform substantially as illustrated in FIG. 11. From this waveform, it is seen that the voltage dividers comprising discrete resistors R1 through R8 together with common output resistor 227 provide the largest step with the voltage divider including resistors R1 and 227 and the smallest step with the voltage divider including resistors R8 and 227, the steps of decreasing magnitude with discrete voltage dividers including resistors R2 through R7 together with common resistor 227. These 8 discrete voltage dividers provide discrete voltages of corresponding magnitudes having a positive sign at common output lead 231.

Similarly, from the waveform in FIG. 11, it is seen that the voltage dividers comprising discrete resistors R9 through R15 together with common output resistor 230 provide the smallest step with the voltage divider including resistors R9 and 230 and the largest step with the voltage divider comprising resistors R15 and 230, and the steps of increasing magnitude with discrete voltage dividers comprising resistors R10 through R14 together with the common resistor 230. These 7 discrete voltage dividers provide discrete voltages of corresponding magnitude having a negative sign at common output lead 232.

The discrete positive and negative voltages at common output leads 231 and 232, respectively, in FIG. 9A are transmitted thereon to the input of summing amplifier 233 in FIG. 9A, together with the analog voltage on lead 165 from the loss detector in FIG. 8. This amplifier sums continuously the analog voltage and the descending discrete staircase voltages so that at the instant when the effective output of the amplifier passes through zero volts, a blocking oscillator 234 connected in the amplifier output is activated to transmit a negative voltage pulse to the input of OR gate 207. This gate transmits a voltage to the reset input of flip-flop 209 which is thereupon transferred to the reset state. This removes the enabling voltage from AND gate 210. This gate is blocked to terminate the transmission of the voltage pulses of generator 211 therethrough to lead 212, and thereby terminates the advance of the logic 1 through the shift register in FIG. 9B at the point at which the voltage produced by the staircase generator equals approximately or most nearly the analog voltage effective on lead 165 as supplied thereto by the loss detector in FIG. 8.

Blocking gate 210 of the electronic switch by triggering flip-flop 209 to the reset state enables the 0-side output of this flip-flop to supply a voltage via differentiator network 213 to lead 214 to transfer flip-flop 220 of the sequence control to the set state as previously mentioned. The 1-side output of flip-flop 220 in the set state supplies a −12 volt voltage on lead 235 simultaneously to the reset inputs of the 8 flip-flops included in flip-flop storage 236 in FIG. 12. Also at this time the voltage in the 1-side output of flip-flop 220 in FIG. 10A is applied to the set input of flip-flop 237 which is a component of the sequence control in FIG. 10A. The −12 volts in the 1-side output of this flip-flop transmitted on lead 238 enable simultaneously the 8 AND gates includes in the flip-flop storage in FIG. 12.

The 1-side outputs of flip-flop stages 1 through 8 and the 0-side outputs of stages 9 through 12 of the shift register are individually connected to discrete inputs of OR gate 241 included in diode matrix 240. In addition, the individual 1-side outputs of these flip-flop stages 1 through 8 are connected to corresponding discrete inputs of OR gate 242 which is also included in the diode matrix and stores the sign of the voltages produced by the staircase generator. The output voltage of gate 241 is inverted via inverter amplifier 243 and applied to one input of OR gate 244 which has also the 1-side output of stage 2 of the shift register connected thereto. The two inputs of OR gate 245 are connected to the 1-side outputs of stages 3 and 15; the two inputs of OR gate 246 are connected to the 1-side outputs of stages 4 and 14; the two inputs of OR gate 247 are connected to the 1-side outputs of stages 5 and 13; the two inputs of OR gate 248 are connected to the 1-side outputs of stages 6 and 12; the two input stages of OR gate 249 are connected to the 1-side outputs of stages 7 and 11; and the two input stages of OR gate 250 are connected to the 1-side outputs of stages 8 and 10.

Flip-flop 260 in the flip-flop storage stores the sign information regarding the discrete voltages produced at the respective steps of the staircase generator and available at the output of OR gate 242 while the individual flip-flops 261 through 268 of the flip-flop storage store the information obtained from the outputs of the respective gates 244 through 250 for indicating that the unbalance between the unknown and the loss standard exceeds 10 db, 3 db, 1 db, 0.3 db, 0.1 db, 0.03 db and 0.01 db, respectively, in a manner that is later explained. It is therefore apparent that only one of the flip-flops 261 through 268 is activated to its set state at a given time.

An inspection of the diode matrix in FIG. 10B shows that storage flip-flop 268 is activated to its set state to indicate an unbalance of 0.01 db when the logic 1 is stopped in either stage 8 or 10 of the shift register; flip-flop 267 is activated to its set state for indicating a 0.03 db loss unbalance when the logic 1 is stopped in stage 7 or 11 of the shift register; flip-flop 265 is activated to its set state for indicating a 0.1 db loss unbalance when the logic 1 is stopped in stage 6 or 12 of the shift register; flip-flop 264 is activated to its set state for indicating a 0.3 db loss unbalance when the logic 1 is stopped in stage 5 or 13; flip-flop 263 is activated to its set state for indicating a 1.0 db loss unbalance when the logic 1 is stopped in stage 4 or 14; flip-flop 262 is activated to its set state for indicating a 3.0 db loss unbalance when the logic 1 is stopped in stage 3 or 15; flip-flop 261 is activated to its set state for indicating 10 db loss unbalance when the logic 1 is stopped in stage 2 or when the logic 1 is transferred out of the 15 stages of the shift register whereby all stages show the presence of a logic 0 therein. The logic 0 in all 15 stages of the shift register activates gate 241 which produces a 0 volt output which is shifted by inverter amplifier 243 into a −12 volt signal and applied to one input of gate 244. This gate transfers the voltage to set flip-flop 261.

When the logic 1 is shifted out of the 15 stages of the shift register a −12 volt voltage is transmitted from the 0-side output of the 15th stage on lead 269 to the differentiator network 270 in FIG. 9A. This network supplies a negative pulse via gate 207 to reset flip-flop 209 whereby gate 210 is disabled for passing pulses from the 10-kc. generator 211 via lead 212 in FIG. 9A to advance the logic 1 through the 15 stages of the shift register.

Figure 12:
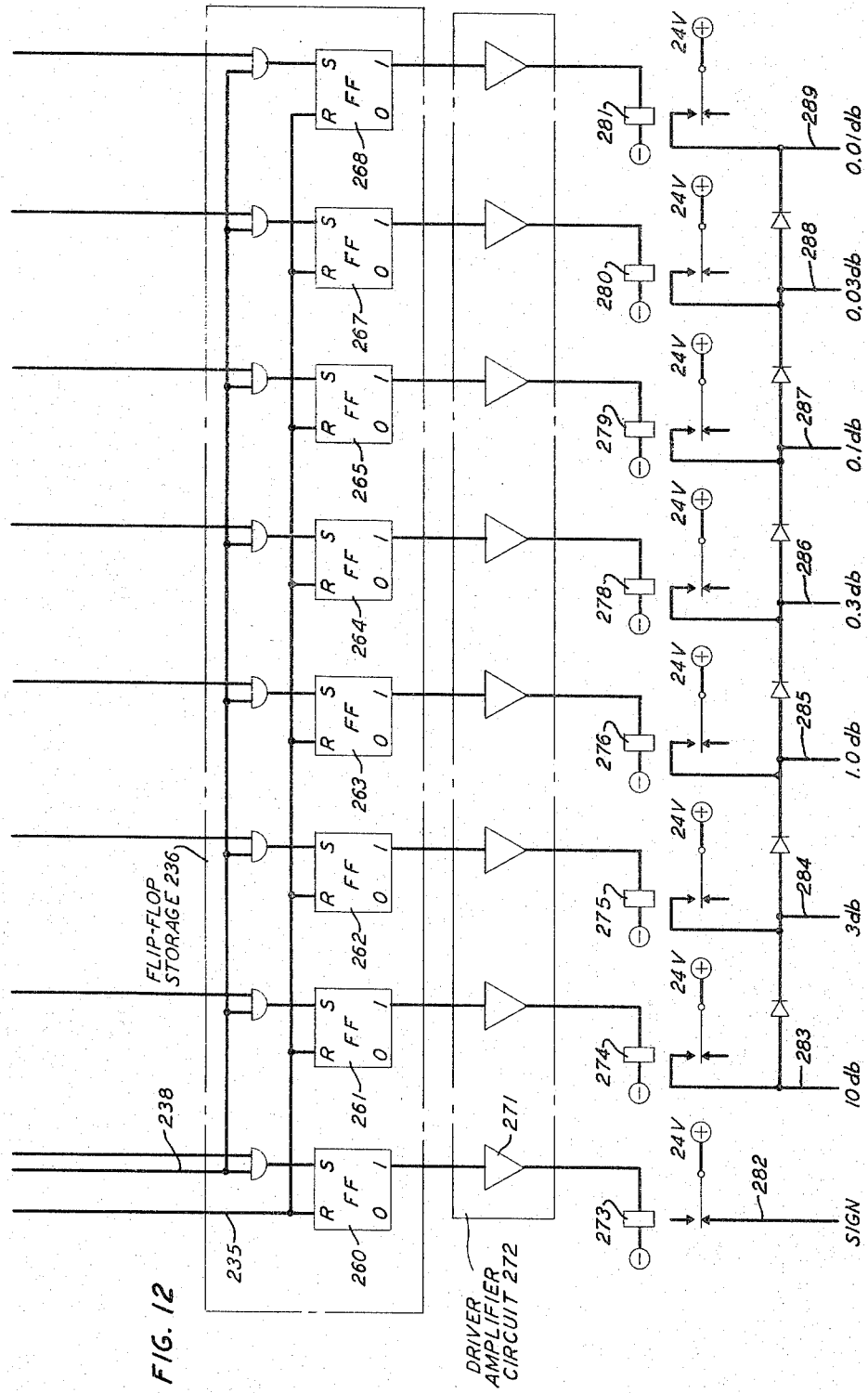

The −12 volt voltages produced in the output flip-flops 260 through 265, 267 and 268 in response to their activation to the set state are amplified in corresponding amplifiers 271 of driver amplifier 272 and thereafter utilized to energize the operating windings of corresponding mercury relays 273 through 281. As shown in FIG. 12, relay 273 is operated to remove a positive voltage from lead 282 for providing information that the respective voltages of the staircase generator of interest at the moment have a positive polarity whereas the non-operation of relay 273 applies the positive voltage to lead 282 providing the information that the respective voltages of the staircase generator of interest at the moment have a negative polarity. Relays 274 through 281 are normally released to remove voltage from their associated leads 283 through 289, respectively, and are operated one at a time to provide the digital information of 10 db, 3 db, 1 db, 0.3 db, 0.1 db, 0.03 db and 0.01 db in the form of positive voltage on the respective leads just mentioned.

In FIG. 12, it is noted that leads 283 through 289 are interconnected by discrete diodes for a purpose that is later mentioned in such manner that a +24 volt potential applied to lead 283 is also simultaneously applied to leads 284 through 289, a +24 volt potential applied to lead 284 is also simultaneously applied to leads 285 through 289, a +24 volt potential applied to lead 285 is also simultaneously applied to leads 286 through 289, a +24 volt potential applied to lead 286 is also simultaneously applied to leads 287 through 289, a +24 volt potential applied to lead 287 is also simultaneously applied to leads 288 and 289, a +24 volt potential applied to lead 288 is also simultaneously applied to lead 289, and a +24 volt potential applied to lead 289 is not applied to any other leads of the last-mentioned leads 283 through 288.

Console of over-all set—FIGS. 13, 14 and 15

This contains the manually activated controls for operating the set on either a manual or automatic basis in a manner that is subsequently explained.

Loss standard control—FIGS. 16–24

Figure 24:
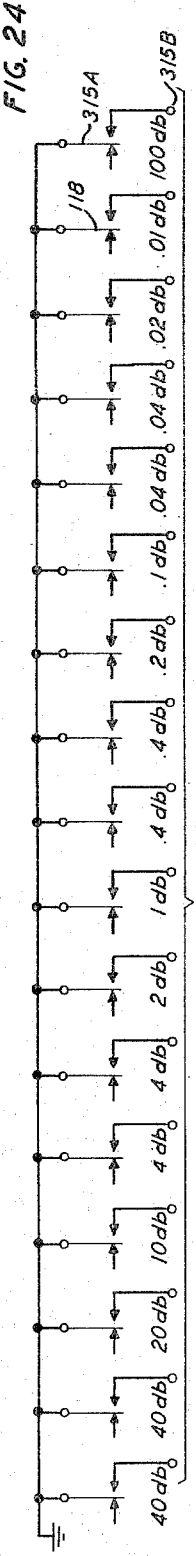

This control is activated by driving pulses originating in clock 28 and transmitted via master control 104 in FIG. 5 to either terminal 365 or 366 in FIG. 24. The pulses applied to terminal 366 are at the full time rate supplied by the clock whereas the pulses applied to terminal 365 occur at one-half the rate of the pulses supplied to terminal 366. It provides both manual and automatic mechanisms for balancing the loss standard of FIG. 6 during the routines of actual loss measurements. For manual operation, four console knobs 300, 301, 302 and 303 in FIG. 14 control four 12-position rotary switches 304, 305, 306 and 307, respectively, each including four decks as shown in FIGS. 16 and 17. These switches are activated by manually operating mode-selector knob 308 to its manual position MAN in FIGS. 13 and 16 thereby placing ground on a common lead 309 and removing the +450 volts from the circuits in FIGS. 19, 20 and 21. These switches are wired in a binary coded decimal 8421 code in correspondence with the identical code of the discrete loss networks comprising 0.01, 0.02, 0.04, 0.04, 0.1, 0.2, 0.4, 0.4, 1, 2, 4, 4, 10, 20, 40 and 40 decibels and built into the calibrated loss standard 21 in FIG. 6 as hereinbefore explained. The console knobs 303, 302 and 301 actuating rotary switches 304, 305 and 306, respectively, for controlling the 0.01, 0.1 and 1.0 db decades have a common wire connected via lead 310 to a decade step-up switch 311 in FIGS. 17 and 16. This step-up switch, when closed, connects switches 304, 305 and 306 via knob 308 to ground as shown in FIG. 16. When the step-up switch is in the open position, each of switches 304, 305 and 306 is capable of providing codes from 0 through 9; and when the step-up switch is closed, each of switches 304, 305 and 306 provides the additional 10-code therebetween via lead 310, thereby enabling the calibration of the calibrated loss standard 21 in FIG. 6 via such step-up technique. The additional 10-code of switch 306 is made effective in switch 307.

When, for example, knob 303 in FIG. 14 is in its 1-position, the lowermost deck of switch 304 in FIG. 16 is thereby placed in its 1-position to apply ground via knob 308, lead 309, diode 285, resistor 286, operating winding of relay 117 to lead 116 in FIG. 6. In the latter figure, ground on lead 116 energizes operating winding 119 and 120 of the relay associated with resistive network 124 to operate this relay for connecting the latter network into calibrated loss standard 21, and energizes operating windings 125 and 126 of the relay associated with resistive network 129 to operate this relay for removing the latter network from gain control 100. It is thus apparent that the connection of resistive network 124 into the calibrated loss standard serves to insert a 0.01 db loss into the standard path S and the removal of the resistive network 129 from the gain control serves to remove 0.01 db loss from the standard path S for maintaining the testing voltage supplied to loss detector 33 at a constant level as hereinbefore explained regarding FIG. 6.

In a similar manner, appropriate actuations of knobs 301, 302 and 303 in FIG. 14 adjust switches 306, 305 and 304, respectively, in FIGS. 16 and 17 to connect discrete 0.02, 0.04 (two), 0.1, 0.2, 0.4 (two), 1, 2, and 4 (two) db loss networks or combinations of them into the calibrated loss standard 21 and at the same time to remove resistive networks of equivalent amounts of loss from gain control 100 in FIG. 6. The knob 303 and switch 304 are operable to insert 0.01 to 0.09 db. amounts of loss in 0.01 db steps into the calibrated loss standard and to remove amounts of loss in equivalent steps from gain control 100. Switch 305 is operable to insert 0.1 through 0.9 db amounts of loss into the calibrated loss standard and to remove amounts of loss in equivalent steps from the gain control. Switch 306 is operable to insert 1 through 9 db amounts of loss into the calibrated loss standard and to remove amounts of loss in equivalent steps from the gain control.

Console knob 300 actuating switch 307 for controlling the 10 db decade operates for its positions 0–9 in a manner similar to switches 304, 305 and 306 for their 0–9 positions, and in addition operates positions 10 and 11 as follows: when switch 307 is operated to either its 10 or 11 position, its uppermost deck provides a ground path via diode 312 and resistor 313 in series in lead 314 in FIG. 17 and lead 314 in FIGS. 18 and 21 to one end of the operating winding of relay 315 which has its opposite end connected to + battery. Terminal 316 of this relay operated to its terminal 317 in FIG. 17 produces no action but operated to its terminal 318 provides ground via diode 319 and resistor 320 to lead 137, via diode 321 and resistor 322 to lead 134, and via diode 323 and resistor 324 to lead 131 in FIGS. 6 and 17.

It is thus apparent that when relay 315 closes its contact 316 on terminal 318 in response to the activation of switch 307 and knob 300 to their 10 or 11-positions in FIGS. 14 and 17, the operating windings of the relays connected to the two 40 db resistive networks 138 and 135 and the 20 db resistive network 132 in FIG. 6 are energized. These relays are thereupon operated to connect the respective networks 132, 135 and 138 into the calibrated loss standard whereby a total of 100 db attenuation is introduced into the standard path S. When knob 300 in FIG. 14 and switch 307 in FIG. 17 are in the 11-position, ground on lead 309 in FIG. 17 is effective in a circuit including the first deck of this switch, diode 325, resistor 326, and the operating winding of relay 327 to lead 328 in FIG. 6. The ground on lead 328 serves to connect a 10 db resistive network, not shown, into the calibrated loss standard to provide an additional 10 db attenuation in the standard path S. Thus, a 110 db attenuation is effectively connected into the standard path S in FIGS. 4 and 6. In FIG. 6 it is also apparent that when 40 db loss network 138 was connected into the calibrated loss standard, a 40 db amplifier 139 was also connected into gain control 101; when 40 db loss network 135 was connected into the calibrated loss standard, a 40 db amplifier 136 was connected into gain control 100; when 20 db loss network 132 was connected into the calibrated loss standard, a 20 db amplifier 133 was connected into gain control 100; when the 10 db loss network was connected into the calibrated loss standard, a 10 db loss was removed from gain control 100; and when lesser amounts of loss are connected into the calibrated loss standard, equivalent amounts of loss are removed from gain control 100.

Relay 117 and others connected to switches 304, 305 and 306 and relay 327 and others connected to switch 307, in FIGS. 16 and 17, provide contact closures for read out control 46 in the following manner. The operating winding of relay 117 in FIGS. 6 and 16 connected to the lowermost deck of switch 304 is energized via ground on lead 309 in FIG. 16 and battery on lead 116 in FIG. 6 as above-mentioned. Relay 117 is operated to close its contact 118 to provide ground thereon as shown in FIGS. 6 and 24. The ground on closed contact 118 supplies the information of a 0.01 db loss inserted into the calibrated loss standard 21 to read out control 46 for a purpose that is later explained. In a similar manner the operation of respective relays connected to switches 304, 305, 306 and 307 supplies information concerning the insertion of corresponding amounts of loss into the calibrated loss standard to the read out control. In this way, indications of discrete amounts of 0.01, 0.02, 0.04, 0.04, 0.1, 0.2, 0.4, 0.4, 1, 2, 4, 4, 10, 20, 40 and 40 db loss or combinations thereof are supplied by the loss standard control to the read out control. The contact closures for the respective relays other than relay 117 required to provide the information additional to that supplied by the latter relay to the read out control are shown in FIG. 24. It is to be noted in FIG. 17 that when the 10 db or lowermost deck of switch 307 is adjusted to its 10 or 11-position, the relays connected to leads 131, 134 and 137, respectively, associated with the 20 and the two 40 db indications, respectively, constituting a 100 db loss indication are not operated. This indication of a loss equal to or greater than 100 db is provided to the read out control by a closure of swinger 315A on its terminal 315B in FIG. 24 associated with relay 315 in FIG. 21.

Figure 19:
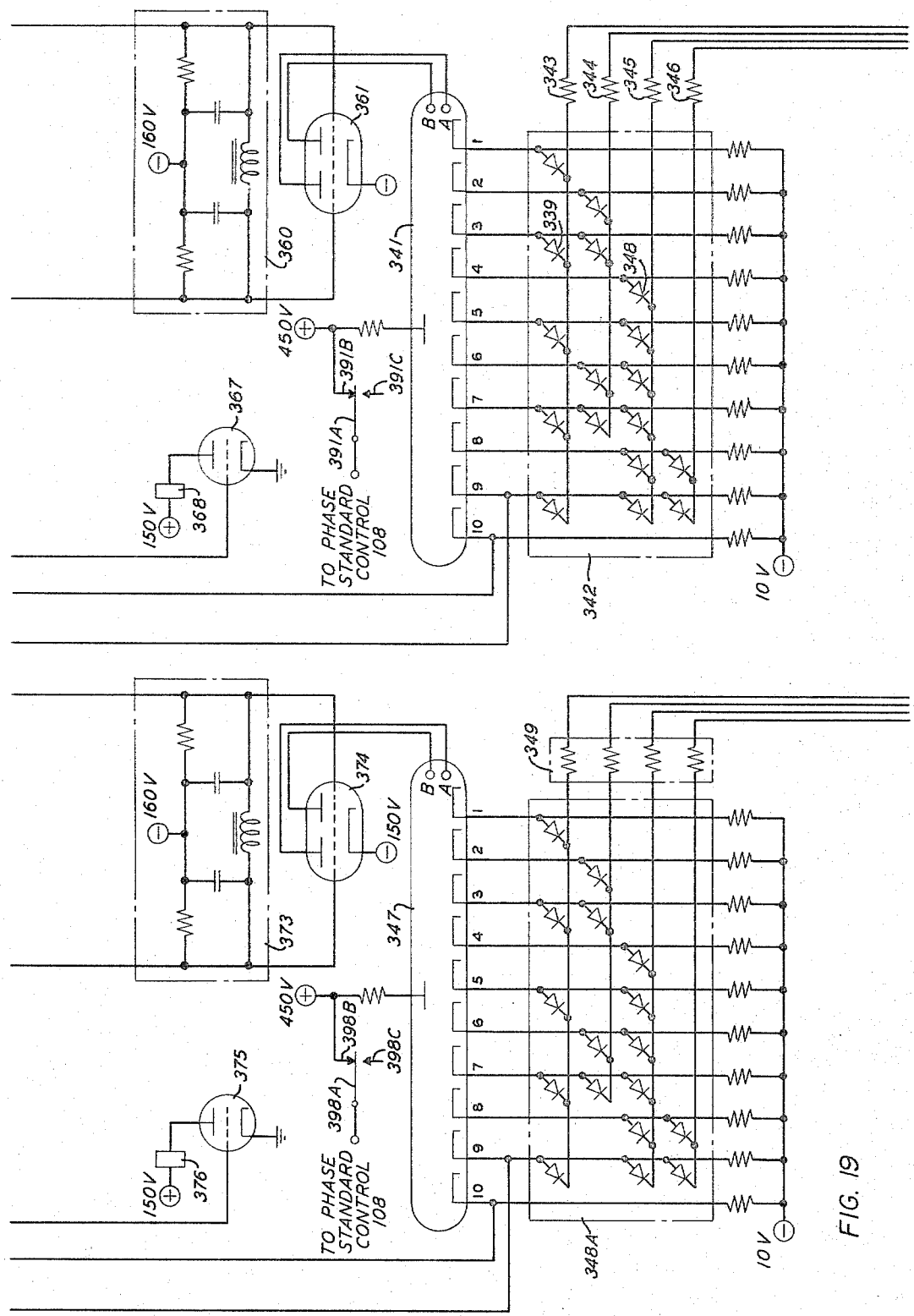

For automatic operation, mode-selector knob 308 is manually actuated to its automatic position AUTO in FIG. 13. This removes ground from lead 309 in FIG. 16 thereby deactivating knobs 300, 301, 302 and 303 in FIG. 14 and associated switches 307, 306, 305 and 304, respectively, in FIG. 16. In FIGS. 16 and 17, a triode replaces each deck of the four 4-deck switches hereinbefore discussed. It is through the conduction paths of the respective triodes that ground is selectively supplied to the battery connected to each lead for inserting the respective loss networks in the calibrated loss standard 21 and the removal of the corresponding loss networks from and/or the insertion of amplifiers into gain controls 100 and 101 in FIG. 6 in a manner that is subsequently explained. Triodes 340A–340D in FIG. 16 are controlled by cold cathode glow transfer or counting tube 341 which can be activated to pass current from its anode to one of its 10 cathodes as shown in FIG. 19. The current at each of these cathodes is transmitted through one or more diodes connected thereto of a decoding diode matrix 342 and one of four associated resistors 343, 344, 345 or 346 to the control grid of a corresponding triode. This matrix serves to convert the decimal output of counting tube 341 into the 1, 2, 4, 8 binary coded decimal system for inserting the loss networks into the calibrated loss standard 21 and removing the equivalent loss networks and/or inserting the equivalent amplifiers in gain controls 100 and 101 in FIG. 6 in a manner that is hereinafter explained.

For example, assuming counting tube 341 in FIG. 19 is activated to pass current from its anode to its 3-cathode, then current is caused to flow simultaneously through discrete circuits including diodes 339 and 348 and associated resistors 343 and 344, respectively, to the control grids of triodes 340D and 340C in FIG. 16 for instituting conduction therein. Conduction in triode 340D provides ground via its cathode and relay 117 to lead 116 to the battery on the latter lead in FIG. 6. As previously explained, this energizes relays 119 and 120 which operate to insert the 0.01 db resistive network 124 into the calibrated loss standard 21 and also energizes relays 125 and 126 which operate to remove the 0.01 db resistive network from gain control 100 in FIG. 6; and further this energizes relay 117 in FIG. 16 which operates to close its contact 118 in FIG. 24 to read out control 46. At the same time, the institution of conduction in triode 340C effects the insertion of a 0.02 db resistive network, not shown, into calibrated loss standard 21 and the removal of a 0.02 db resistive network, not shown, from gain control 100 in FIG. 6. This inserts a total of 0.03 db loss into the standard path S in FIGS. 4 and 6 as previously mentioned. In a similar manner, the decimal output of counting tube 341 in FIG. 19 is converted into a binary code decimal system via diode matrix 342 and associated resistors 345 and 346 effect the conduction of either triodes 340A or 340B in FIG. 16 or both for inserting one or both of the 0.04 db resistive networks into the calibrated loss standard and the removal of one or both of the 0.04 db resistive networks from gain control 100 in FIG. 6. The addition of one or both of the 0.04 db resistive networks inserts corresponding amounts of loss into the calibrated loss standard. Counting tube 341 is therefore controllable to cause insertion of amounts of loss in 0.01 db steps from 0 through 0.09 db into the calibrated loss standard 21 and the removal of corresponding amounts of loss in equivalent steps from gain control 100 in FIG. 6.

Figure 20:
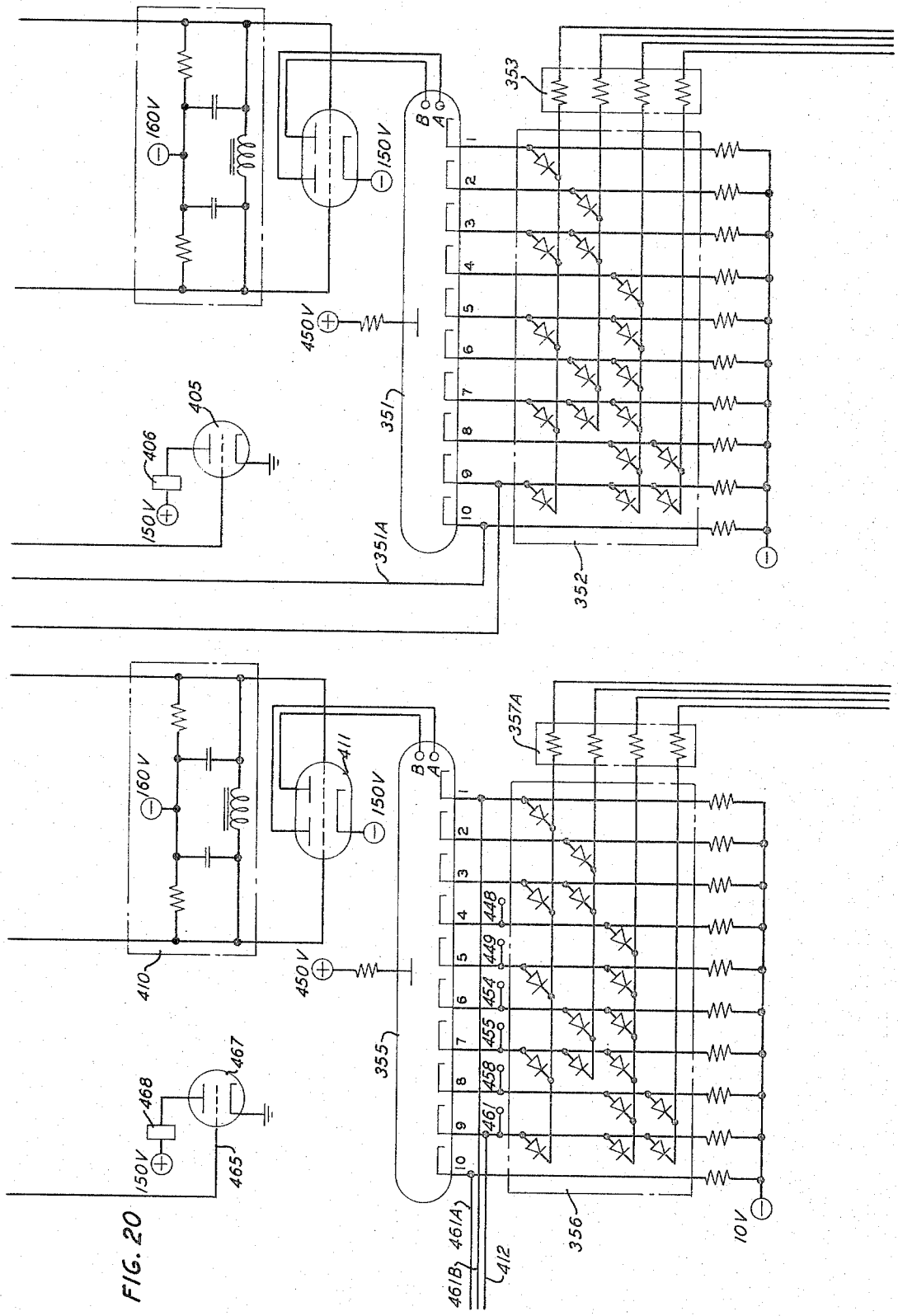

In a similar manner, cold cathode glow transfer or counting tube 347, diode matrix 348, resistors 349 in FIG. 19 and triodes 350A-350D in FIG. 16 effect the insertion of 0 through 0.9 db amounts of loss in 0.1 db steps into the calibrated loss standard 21 and the removal of corresponding amounts of loss in equivalent steps from gain control 100 in FIG. 6; cold cathode glow transfer or counting tube 351, diode matrix 352, resistors 353 in FIG. 20 and triodes 344A-354D in FIG. 17 provide the insertion of 0 through 9.0 db amounts of loss in 1 db steps into the calibrated loss standard 21 and the removal of corresponding amounts of loss in equivalent steps from gain control 100 in FIG. 6; and cold cathode glow transfer or counting tube 355, diode matrix 356, resistors 357A in FIG. 20 and triodes 358A through 358D provide the insertion 10, 20, 40 and 40 db amounts of loss into the calibrated loss standard and the removal of a 10 db loss from and the insertion of 20 db and 40 db amplifiers into gain control 100 and the insertion of a 40 db amplifier into gain control 101 in FIG. 6.

The 10th step of 0.01 db is carried over from counting tube 341 to counting tube 347 in FIG. 19, the 10th step of 0.1 db is carried over from counting tube 347 to counting tube 351 in FIG. 20 and the 10th step of 1.0 db is carried over from counting tube 351 into cold cathode glow transfer or counting tube 355 in FIG. 20 in a manner and for a purpose that are presently explained.

In order to increase or decrease the number stored in any one of the counting tubes 341, 347, 351 or 355 at a given time, voltage pulses are applied to terminals A and B of the respective tubes. The time sequence in which these pulses are so applied determines whether the count in a given tube is to be increased or decreased. That is to say, when the pulse applied to terminal A leads in time the pulse applied to terminal B in a given tube, such tube advances the count 1, 2 . . . 0; on the other hand, when the pulse applied to terminal B leads in time the pulse applied to terminal A of the given tube, such tube subtracts the count 0, 9 . . . 1, in a manner that is presently explained.

The voltage pulses applied to terminals A and B of counting tube 341 in FIG. 19, for example, are transmitted via a symmetrical network 360 having outputs connected to the control grids of twin triode 361. This twin triode has the plate of its left-hand triode connected to terminal A and the plate of its right-hand triode to terminal B of counting tube 341.

Figure 22:
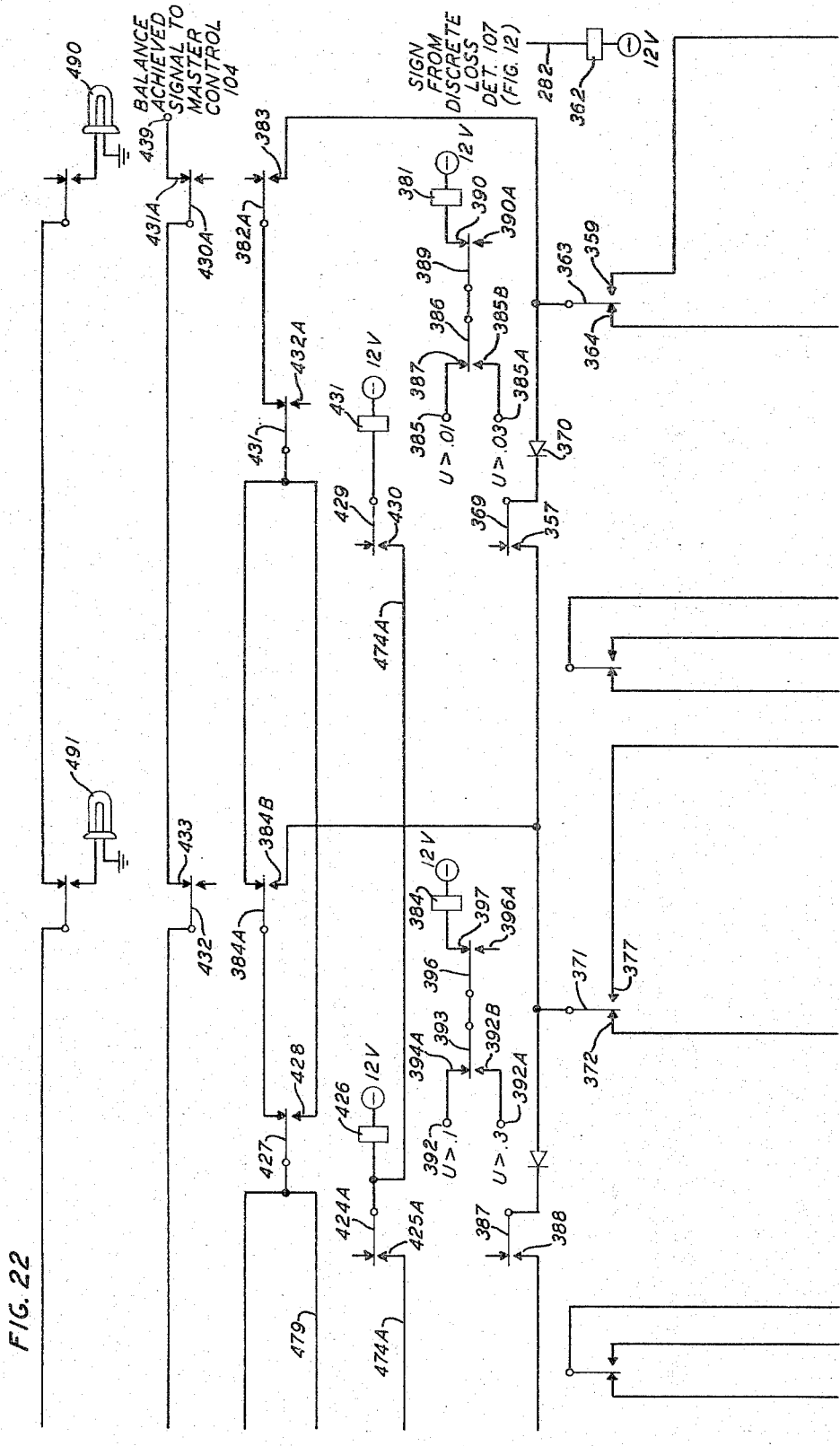
Figure 23:
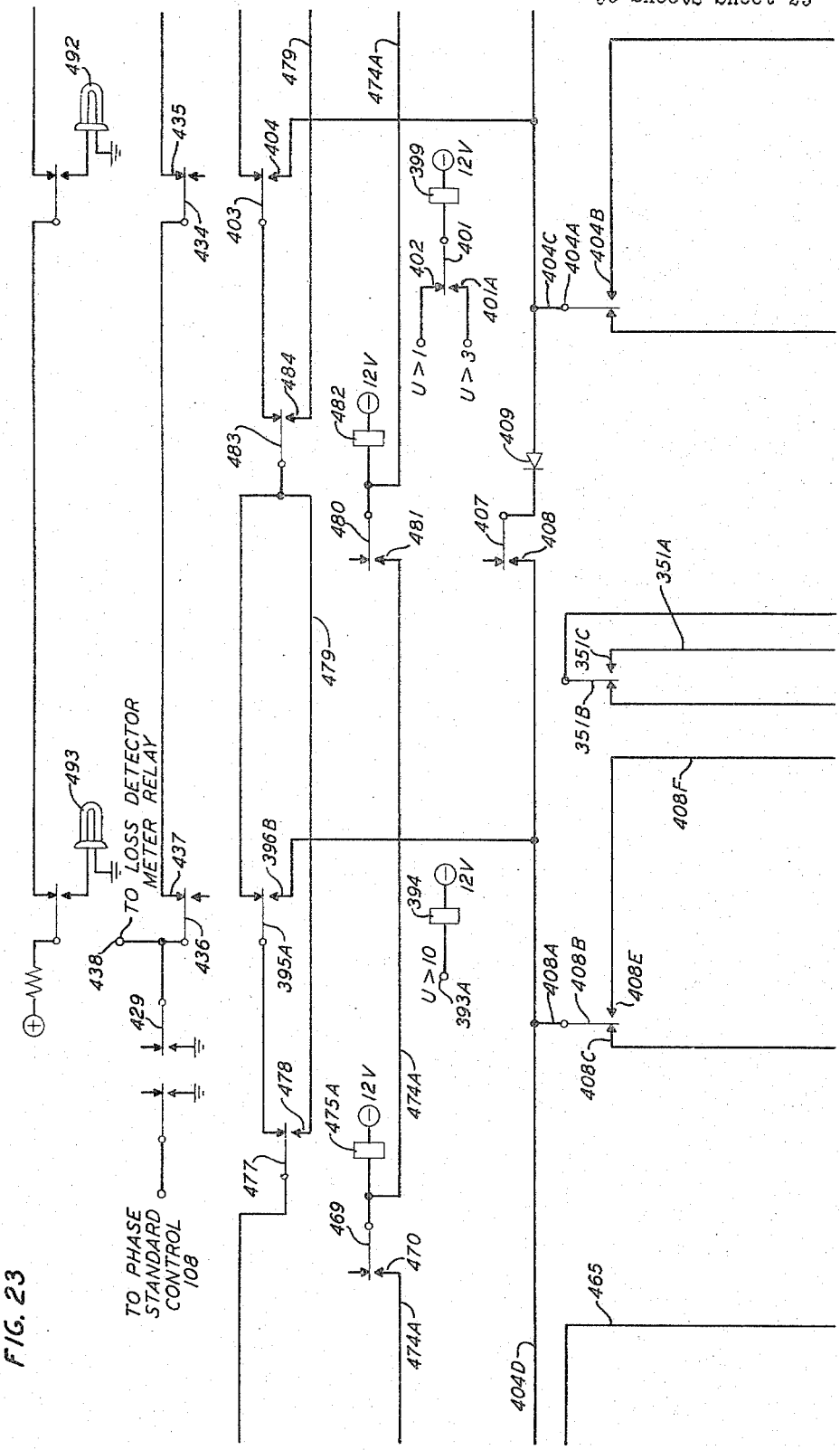

When relay 362 in FIG. 22 is operated, due to a +24 volt positive voltage on lead 282 in FIG. 12 for indicating additions to the calibrated loss standard 21 in FIG. 4, to actuate its swingers to the positions shown in FIGS. 22, 23 and 24 and relay 381 in FIG. 22 is operated to close its swinger 382A on terminal 383 in response to a positive voltage on lead 289 in FIG. 12 as previously explained, swinger 363 of relay 363 is caused to engage terminal 364 for supplying one portion of each incoming voltage pulse directly to the control grid of the left-hand triode of twin triode 361 in FIG. 19 which is normally biased to cut off. The left-hand triode is rendered conductive to apply the one pulse portion directly to terminal A of counting tube 341. At this time another portion of each incoming pulse at swinger 363 and associated terminal 364 is applied via delay network 360 to the control grid of the right-hand triode in the twin triode. This right-hand triode is rendered conductive to apply the other pulse portion to terminal B of the counting tube. It is thus seen that the delay network delays the other pulse portion at terminal B of the counting tube in time relative to the one pulse portion applied to terminal A thereof. These two portions of each incoming pulse being substantially identical in wave form but separated in time at the terminals A and B cause the numerical count in counting tube 341 to increase 1, 2 . . . 9.0 in step with the corresponding amounts of loss inserted into the calibrated loss standard 21 in FIG. 4. The voltage pulses effective at swinger 363 and terminal 364 and originating in clock 28 are applied through master control 104 in FIG. 5 to terminals 365 and 366 in FIG. 24 at such times as an automatic loss balance of the over-all measuring system in FIGS. 4 and 5 is desired. It is mentioned here, although it is also further discussed later, that when relay 362 in FIG. 22 is operated to move its swinger 363 to engage terminal 359, one portion of each incoming pulse thereat is applied directly to the righthand triode of twin triode 361 to terminal B of counting tube 341. At this time another portion of each of these incoming pulses is applied through delay network 360 and the left-hand triode of twin triode 361 to terminal A of counting tube 341. Now, the pulse portion at terminal A is delayed in time relative to the pulse portion at terminal B. These two portions of each incoming voltage pulse being substantially identical in form but separated in time at the terminals A and B cause the numerical count in counting tube 341 to decrease from 0, 9, 8 . . . 1 in step with the amounts of loss removed from the calibrated loss standard 21 in FIG. 4.

Borrow or carry pulses passed between counting tubes 341, 347, 351 and 355 in FIGS. 19 and 20 for increasing or decreasing the numerical count in the respective tubes are provided in the following way. As previously mentioned, the nonoperation of relay 362 disposes its respective swingers into the position shown in FIGS. 22, 23 and 24 for indicating that the numerical count in counting tube 341 in FIG. 19 is increasing. When counting tube 341 reaches its 9-position for an increasing numerical count therein, a voltage originating at such 9-position is applied to the control grid of triode 367 thereby driving the latter into conduction. This operates relay 368 connected in the plate circuit of conducting triode 367 to close its swinger 369 on its associated terminal 357 in FIG. 22. As a consequence, the next-succeeding voltage pulse at terminal 383 in FIG. 22 is divided at point 358 in FIG. 22 so that one portion is applied via swinger 363, contact 364 to delay network 360, twin triode 361 to terminals A and B of counting tube 341 in FIG. 19, and a second portion is applied via diode 370, swinger 369 closed on terminal 357, swinger 371 closed on terminal 372 in FIG. 22, delay network 373, twin triode 374, to terminals A and B of counting tube 347 in FIG. 19. This transfers the next-succeeding pulse simultaneously into both counting tubes 341 and 347. It is recalled from the previous description that counting tube 341 is stopped at its 9 cathode to represent a count of 0.09 db loss. Now, the one incoming voltage portion applied to terminals A and B of counting tube 341 steps the latter to its 0 terminal for representing a count of 0 loss while at the same time the second incoming voltage portion is effective at terminals A and B of counting tube 347 to activate the latter to its 1 cathode for representing a 0.1 db loss. It is thus seen that one count was effectively carried from counting tube 341 to counting tube 347.

On the other hand, a borrow pulse is taken from counting tube 347 and transferred to counting tube 341 in the following manner. For the purpose of this explanation it is recalled that relay 362 in FIG. 22 is operated to its subtract position, that is, to decrease the numerical count in both latter tubes, in response to the connection of the +24 volt battery on lead 282 in FIG. 12. As a consequence of this position of relay 362, its swinger 363 is engaged with its terminal 359, and its swinger 371 is engaged with its terminal 377. It is also recalled from the previous explanation that swinger 369 is engaged with its terminal 357 in FIG. 22, counting tube 347 in FIG. 19 is stopped on its 1 cathode to represent a count of 0.1 db loss therein, counting tube 341 is stopped on its 0 cathode for representing a count of 0 db loss therein, and relay 381 is operated to engage its swinger 382A with its terminal 383 in FIG. 22.

Now a voltage pulse applied to terminal 383 is effective at point 358 in FIG. 22 at which it is divided so that one portion is supplied to delay network 360 coupled via twin triode 361 to counting tube 341 and a second portion is supplied to delay network 373 coupled via twin triode 374 to counting tube 347 in FIG. 19. This causes one portion of the incoming pulse at each of delay networks 360 and 373 to be applied directly to terminals B of counting tubes 341 and 347, respectively, and a second portion of the incoming pulse to be delayed via the respective delay networks and then applied at terminals A of these two counting tubes. It is further recalled from the previous explanation that when the pulse portion at terminal B leads in time the pulse portion at terminal A of counting tubes 341 and 347, the count in the respective tubes is caused to decrease. As a consequence, counting tube 347 is caused to transfer the count therein in the decreasing direction from its 1 cathode to its 0 cathode for representing a count of 0 db loss therein; and counting tube 341 is caused to transfer the count therein in the reverse direction from its 0 cathode to its 9 cathode for representing a count of 0.09 db loss therein. It is thus seen that a pulse count of one was effectively borrowed from counting tube 347 and registered in counting tube 341 for representing the removal of 0.01 db loss from the calibrated loss standard 21 in FIG. 4. In a similar manner carry or borrow pulse counts are effectively transferred between counting tubes 347, 351 and 355. In this connection it is recalled from the previous explanation that tube 347 counts loss in steps of 0.1 db, tube 351 in steps of 1.0 db, and tube 355 in steps of 10 db.

As previously mentioned, driving pulses originating in clock 28 and transmitted via master control 104 in FIG. 5 are available at either terminal 365 or 366 in FIG. 24. Relay 384 in FIG. 22 is operated only when the loss unbalance at the calibrated loss standard 21 in FIG. 4 is greater than 0.1 db in a manner and for a purpose that are subsequently explained. When such unbalance is greater than 0.1 db, the full time rate pulses effective at terminal 366 are utilized and changed from a zero volt level via direct-current level translating network 385C to a −160 level. The pulses are then distributed in accordance with the following logic.

When the swingers of all relays occupy the positions shown in FIGS. 22, 23 and 24, it is evident that the incoming pulses at terminal 365 or 366 in FIG. 24 are not supplied to any of the counting tubes 341, 347, 351 and 355 in FIGS. 19 and 20. This serves to indicate that the over-all set of FIGS. 4 and 5 is properly balanced as of the loss in calibrated loss standard 21 relative to the loss in the unknown device 19 in FIG. 4. When a loss unbalance of 0.01 db or more exists in the foregoing respect, a +24 volt voltage originating on lead 289 in FIG. 12 is applied to terminal 385 in FIG. 22; when a loss unbalance of 0.03 db or more exists, a +24 volt voltage available on lead 288 in FIG. 12 is applied to terminal 385A in FIG. 22; when a loss unbalance of 0.1 db or more occurs, a +24 volt voltage effective on lead 287 in FIG. 12 is applied to terminal 392 in FIG. 22; when a loss unbalance of 0.3 db or more exists, a +24 volt voltage on lead 286 in FIG. 12 is applied to terminal 392A in FIG. 22; when a loss of 1.0 db or more occurs, a +24 volt voltage on lead 285 in FIG. 12 is applied to terminal 400 in FIG. 23; when a loss of 3.0 db or more happens, a +24 volt voltage on lead 284 in FIG. 12 is applied to terminal 400A in FIG. 23; and when a loss of 10 db or more occurs, a +24 volt voltage effective on lead 283 in FIG. 10 is applied to terminal 393A in FIG. 23.

The +24 volt voltage effective at terminal 385 in FIG. 22 resulting from a loss unbalance greater than 0.01 db is applied via swinger 386 engaging its terminal 387 in response to the release of relay 388 in FIG. 18 and further via swinger 389 engaging its terminal 390 to relay 381 in FIG. 22 in response to the release of relay 391, in FIG. 18, as later explained. This operates relay 381 which moves its swinger 387A to engage its terminal 383 thereby permitting incoming pulses to activate counting tube 341 for counting therein in the increasing direction from 1,2 . . . 9,0, each digit representing a 0.01 db loss as previously discussed.

Figure 18:
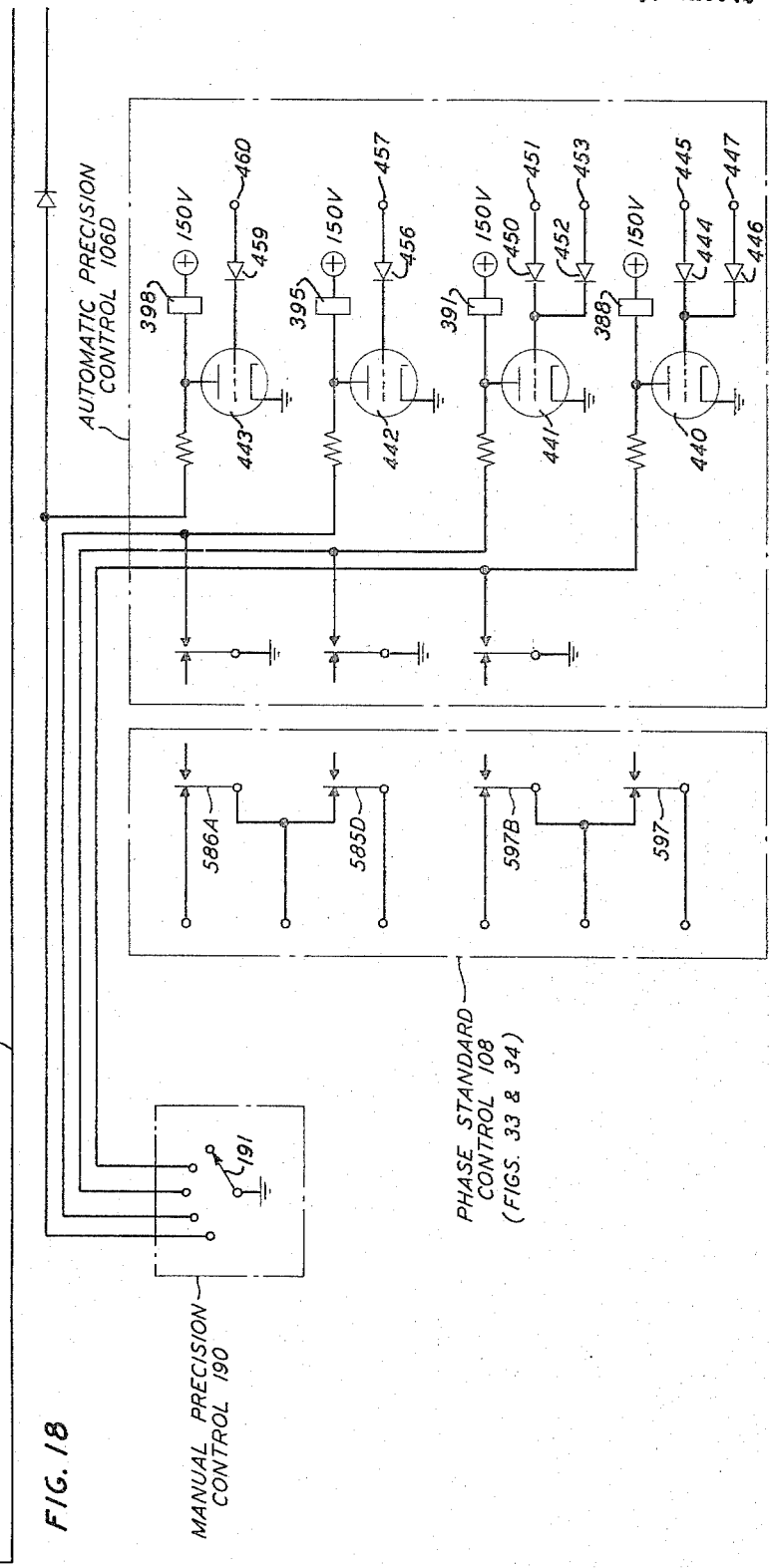

The 24 volt voltage at terminal 385A representing the 0.03 db loss unbalance in FIG. 22 is applied via swinger 386 and terminal 385B engaged therewith in response to the operation of relay 388 in FIG. 18 for a reason to be mentioned and via swinger 389 and terminal 390 to cause the operation of relay 381 in FIG. 22 for the purpose just mentioned.

The +24 volt voltage at terminal 392 in FIG. 22 representing a loss unbalance greater than 0.1 db is applied via swinger 393 engaging terminal 394A in FIG. 22 in response to the release of relay 395 in FIG. 18 and further via swinger 396 engaging its terminal 397 to relay 384 in FIG. 22 in response to the release of relay 398 in FIG. 18, as subsequently discussed. Relay 384 operated to engage its swinger 384A on associated terminal 384B is to supply the incoming full time rate pulses to counting tube 347 which is thereby stepped to count such incoming pulses therein in the increasing direction from 1, 2 . . . 9, 0, each step representing a count of 0.1 db loss unbalance as hereinbefore explained. The +24 volt voltage representing a loss unbalance greater than 0.3 db at terminal 392A in FIG. 22 is applied to relay 384 via terminal 392A and swinger 393 engaged therewith in response to the operation of relay 395 for a purpose subsequently mentioned and further via swinger 396 engaging terminal 397 in response to the release of relay 398 as mentioned later. Relay 384 is thus operated to move its swinger 384A into engagement with associated terminal 384A to supply the incoming full time rate pulses to counting tube 347 which is thereby activated to count such incoming pulses in the increasing direction from 1, 2 . . . 9, 0, each step representing a 0.1 db loss as above mentioned.

The +24 volt voltage at terminal 400 in FIG. 23 representing a loss unbalance greater than 1.0 db is applied via swinger 401 engaging terminal 402 to relay 399 in FIG. 23 in response to the release of relay 315 in FIG. 21 in a manner to be discussed later. This operates relay 399 which activates its swinger 403 in FIG. 23 to engage its associated terminal 404 whereby the incoming pulses are permitted to activate counting tube 351 in FIG. 20 to count in the increasing direction from 1, 2 ... 9, 0, each step counting 1.0 db loss in a manner identical with that hereinbefore explained regarding the stepping of counting tubes 341 and 347 in the increasing direction.

The +24 volt voltage at terminal 400A in FIG. 23 representing a loss unbalance greater than 3.0 db is applied to relay 399 via terminal 401A and swinger 401 engaged therewith in response to the operation of relay 315 in FIG. 21 as hereinafter explained. Relay 399 remains operated to apply the incoming pulses via swinger 403 and associated terminal 404 to step counting tube 351 in FIG. 20 in the manner and for the purpose just mentioned regarding the first-mentioned operation of relay 399.

The +24 volt voltage at terminal 393A in FIG. 23 for representing a loss unbalance greater than 10 db is applied to relay 394. This relay is operated to activate its swinger 395A to engage its associated terminal 396B whereby the incoming pulses are supplied directly on lead 408A, swinger 408B, terminal 408C and lead 408D, delay network 410 and twin triode 411 to terminals A and B of counting tube 355. When counting tube 355 in FIG. 20 reaches its 9-cathode position for representing a count of 90 db loss therein, this cathode transmits a voltage via lead 412 in FIGS. 20, 21 and 24, swinger 413 engaging terminal 414 and triode 415 and relay 416 in FIG. 21. Relay 416 in FIG. 21 operates to move its swinger 417 into engagement with terminal 418 in FIG. 24. Now, the incoming pulses at terminal 366 in FIG. 24 are applied through swinger 417 closed on terminal 418, direct-current translating network 419, diode 420, and swinger 421 in FIG. 24 engaging terminal 422A in FIG. 21 to the control grid of triode 422 of a conventional flip-flop 423 which also includes triode 424. Normally, triode 422 is cut off while triode 424 is turned on whereby triode 425 is non-conducting and relay 315 is unoperated. Network 419 performs the same function as network 385C in FIG. 24 as above explained. The next incoming pulse performs two functions: (1) it advances counting tube 355 to its 0-cathode position, and (2) it turns on triode 422 and in due course triode 424 is turned off to increase its plate voltage. This voltage applied to the control grid of triode 425 turns on the latter which operates relay 315 connected in its plate circuit. It is thus seen that the foregoing describes the transmission of a carry pulse from counting tube 351 into the flip-flop circuit. This operation of the flip-flop serves to insert 100 db of loss in the loss standard.

The next incoming pulse is applied via delay network 410 and twin triode 411 to terminals A and B of counting tube 355 which is thereupon advanced from its 0-position to its 1-position to register 10 db loss unbalance. This together with the 100 db loss represented by the operation of the flip-flop circuit establishes a 110 db loss measurement. The 1-position of counting tube 355 provides a voltage pulse via lead 461B in FIG. 20, lead 461B, terminal 462, swinger 463, terminal 464 and lead 465 in FIG. 24, and lead 465 to the control grid of triode 467 in FIG. 20. This triode is thereby caused to conduct for operating relay 468 which moves its swinger 469 to engage its associated terminal 470 in FIG. 23. It is now recalled from the prior explanation that the operation of relay 315 in FIG. 21 moved its swinger 471 to engage terminal 472 in FIG. 24. This supplies a +24 volt voltage at terminal 473 via a circuit including swinger 474 engaging terminal 475, lead 476, terminal 472 and engaging swinger 471, lead 474A in FIG. 24 and lead 474A, terminal 470 and engaging swinger 469 to relay 475A in FIG. 23. This relay operates to actuate its swinger 477 into engagement with terminal 478 for applying the incoming pulses at terminal 366 in FIG. 24 to lead 479. This precludes further incoming pulses from stepping counting tube 355 via swinger 395A engaging terminal 396B. As a consequence, this counting tube remains discharging at its 1 cathode.

It is also recalled from the previous explanation that when counting tube 351 discharged at its 9 cathode, relay 406 operated to close its swinger 407 on terminal 408 in FIG. 23. At the time of this operation of relay 406, its swinger 480 was also moved to engage its associated terminal 481 in FIG. 23. Now, the +24 volt voltage effective on lead 474A for operating relay 475A also operates relay 482 which moves its swinger 483 into engagement with terminal 484. This applies further incoming pulses onto lead 479 and away from swinger 403 engaging terminal 404 whereby such pulses were initially supplied to counting tube 351 in the manner hereinbefore explained. As a consequence, this counting tube remains discharging at its 9 cathode to provide thereby a count of 9 db loss insertion. At this time the maximum measurement of 119 db loss is registered in flip-flop 423 and counting tubes 355 and 351 and this amount cannot be added to due to the operation of relays 475A and 482 as previously described. It is recalled from the previous explanation that counting tubes 341 and 347 in FIG. 19 are disabled thereby precluding further additions to the 119.00 db measurement above mentioned.

In the borrow operation of tube 355, it is assumed in flip-flop 423 that the triode 422 is conducting and triode 424 is non-conducting to represent a 100 db loss unbalance as above noted, and that relay 362 in FIG. 19 is operated to step counting tubes 351 and 355 in the decreasing or subtracting direction. As a consequence, swinger 474 is disengaged from terminal 475 to remove the +24 volt battery from relays 475A and 482 in FIG. 23 both of which are then released. At the same time swinger 413 is moved to engage its associated terminal 413A, swinger 463 is actuated to engage its associated terminal 463A in FIG. 24, swinger 408B is moved to engage its associated terminal 408E and swinger 404A is actuated to engage its associated terminal 404B in FIG. 23. A first incoming pulse at terminal 366 is applied via swingers 477 and 395A engaging terminal 396B because relay 394 is operated at this time. The first incoming pulse is applied via swinger 408B engaging terminal 408E, lead 408F in FIG. 23, and lead 408F, delay network 410, and twin triode 411 to terminals A and B of counting tube 355. This first incoming pulse steps back counting tube 355 from its 1 cathode to its 0 cathode which then supplies a voltage on lead 461A in FIG. 20, terminal 413A engaged by swinger 413 in FIG. 24 to triode 415 in FIG. 21. This triode conducts to operate relay 416 which operates to engage swinger 417 with terminal 418. Now, one portion of the second incoming pulse is simultaneously applied to terminals A and B of counting tube 355 which is stepped in reverse from its 0 cathode to its 9 cathode for representing 90 db loss unbalance; and at the same time, another portion of the second incoming pulse is applied to control grid of non-conducting triode 424 of flip-flop 423 in FIG. 21 whereby the latter triode is turned on and associated triode 422 is turned off to remove the 100 db loss indication. In FIG. 21, this releases relay 416 which disengages its swinger 417 from its associated terminal 418 thereby precluding the application of further incoming pulses from activating the flip-flop in the reverse direction. Further incoming pulses activate counting in the reverse or subtracting direction to step counting tube 355 from discharge at its 9 cathode to its 0 cathode in 10 db steps.

As counting tube 355 is so stepped in the subtracting direction, it is noted that terminal 393A in FIG. 23 is receiving the +24 volt voltage only from lead 283 in the discrete loss detector in FIG. 12 whereby relay 394 in FIG. 23 is caused to remain operated, and that relays 398, 395, 391 and 388 in FIG. 18 are de-energized in that order to increase the sensitivity of the loss unbalance measurements. Further, it is noted that when relay 315 was released, its swinger 401 engaged its associated terminal 402 in FIG. 23. As counting tube 355 in FIG. 20 is discharging at its 1 cathode, the next incoming pulse steps this tube in the reverse direction to its 0 cathode while counting tube 351 remains discharged at its 9 cathode for representing a 9 db loss unbalance. If the discrete loss detector is now supplying the +24 volt voltage on leads 284–289 in FIG. 12 to terminal 400A in FIG. 23, relay 394 is released to engage its swinger 395A with its associated terminal 396B, and relay 399 is operated because relay 315 in FIG. 21 is released to permit its swinger 401 to engage its associated terminal 402 in FIG. 23. Now, the succeeding incoming pulses are applied to terminals A and B of counting tube 351 in FIG. 20 to step the latter in the reverse direction in the manner hereinbefore explained regarding the reverse stepping of counting tubes 347 and 341. A borrow operation is thus described for the operation of counting tubes 355 and 351.

In the borrow operation of counting tube 355 in FIG. 20, let it be assumed for the moment that the 1 cathode of the latter tube is conducting to represent a 10 db loss and counting tube 351 is conducting at its 0 cathode to represent 0 db loss therein, and further that relay 362 is operated to subtract in the manner previously explained. This means that swinger 408B is engaging terminal 408E and swinger 404A is engaging terminal 404B in FIG. 23, whereby the next incoming pulse is applied to terminals A and B of counting tubes 351 and 355 in FIG. 20. This incoming pulse steps both counting tubes in the subtracting direction so that counting tube 355 is stepped from its 1 cathode to its 0 cathode to represent 0 db loss and counting tube 351 is stepped from its 0 cathode to its 9 cathode to represent 9 db loss, in the manner hereinbefore explained in connection with the borrow operation of counting tubes 341 and 347. A borrow operation is thus described between counting tubes 355 and 351.

Counting tubes 341, 347, 351 and 355 are so controlled that the subtraction of the numerical count therein does not go below 000.00 db in the following manner. This means that relay 362 in FIG. 22 is operated to the subtracting position in response to the presence of voltage on lead 282 in FIG. 12 as previously explained whereby swinger 474 in FIG. 24 is now actuated to engage its associated terminal 460. As counting tube 355 in FIG. 20 is now stepped to discharge at its 0 cathode via in an incoming pulse received in a circuit including terminal 366, network 385C in FIG. 24, swinger 477, swinger 395A engaging terminal 396B, swinger 408B engaging terminal 408E, lead 408F in FIG. 23, and lead 408F, delay network 410 and triode 411 in FIG. 20. In response to its 0 cathode discharge, counting tube 355 effects the energization of relay 468 via the operating circuit previously traced whereby this relay is operated to move its swinger 469 to engage its associated terminal 470. Now, the +24 volt voltage at terminal 473 in FIG. 24 is applied in a circuit including swinger 474, terminal 460, swinger 471, as relay 315 in FIG. 21 is released and lead 474A and terminal 470 engaging swinger 469 to energize relay 475A in FIG. 23. This relay operates to move its swinger 477 to engage its associated terminal 478 to divert the next incoming pulse onto lead 479. This precludes additional incoming pulses from further stepping counting tube 355 in the subtracting direction thereby permitting it to continue its discharge at the 0 cathode for providing 0 digits in the tens position of a given loss measurement.

Similarly, counting tube 351 in FIG. 20 discharging at its 0 cathode operates its associated relay 406. This operation of relay 406 enables it to close its swinger 480 onto terminal 481 in FIG. 23 so that the +24 volt voltage on lead 474A operates relay 482 which moves its swinger 483 to engage its associated terminal 484 to divert further incoming pulses onto lead 479. This precludes additional incoming pulses from further stepping counting tube 351 in the subtracting direction thereby allowing it to continue discharging at its 0 cathode for providing a 0 digit in the units position of a given loss measurement.

Also, counting tube 347 in FIG. 19 discharging at its 0 cathode in response to an incoming pulse in an obvious circuit operates relay 376 which moves its swinger 424A to engage its associated terminal 425A. Now, the +24 volt voltage on lead 474A in FIGS. 23 and 24 operates relay 426 which actuates its swinger 427 to engage its associated terminal 428 to divert the incoming pulses onto lead 479 in FIG. 22. This precludes further incoming pulses from stepping counting tube 347 in the subtracting direction thereby enabling it to continue discharging at its 0 cathode for providing a 0 digit in the tenths position of a given loss measurement. Likewise, counting tube 341 in FIG. 19 discharging at its 0 cathode operates relay 368 which moves its swinger 429 to contact its associated terminal 430. Now, the 24 volt voltage on lead 474A in FIG. 22 operates relay 431 which actuates its swinger 432 to an associated open-circuit terminal 432A. Now, the incoming pulses on lead 479 in FIG. 22 are diverted to an open circuit to preclude additional incoming pulses from further stepping counting tube 341. This tube is thus permitted to remain discharging at its 0 cathode for providing a 0 digit in the hundredths position at a given loss measurement. It is therefore evident that further incoming pulses stimulate no additional stepping action at any of the counting tubes in the subtracting direction. This prevents the subtracting measurement from going below 000.00 db.

A sensitivity control circuit shown in FIG. 18 comprises triodes 440, 441, 442 and 443 biased normally to cut off and connected to certain cathodes of counting tube 355 in FIG. 20 in the following manner. Triode 440 has its control grid connected via diode 444 and lead 445 and via diode 446 and lead 447 to terminals 448 and 449, respectively, associated with the 4 and 5 cathodes of counting tube 355. Triode 441 has its control grid connected through diode 450 and lead 451 and through diode 452 and lead 453 to terminals 454 and 455, respectively, associated with the 6 and 7 cathodes of the counting tube 355. Triode 442 has its control grid via diode 456 and lead 457 to terminal 458 associated with the 8 cathode of the 355 counting tube. Triode 443 has its control grid connected by diode 459 and lead 460A to terminal 461 associated with the 9 cathode of counting tube 355.

It is seen in the operation of the sensitivity control circuit in FIG. 18 that in the most sensitive unbalance area a +24 volt voltage effective on lead 289 in FIG. 12 is applied to terminal 385 in FIG. 22. This voltage operates relay 381 which moves its swinger 382A to engage its associated terminal 383 thereby permitting incoming pulses to step counting tube 341 in the adding or increasing direction. This continues until counting tube 355 in FIG. 20 discharges at its 4 or 5 cathode for representing a 40 or 50 db loss at which time triode 440 in FIG. 18 is turned on to energize relay 388 connected in its anode circuit. This relay operates to move its swinger 386 to engage its associated terminal 385B in FIG. 22 thereby permitting relay 381 to operate from the +24 volt voltage supplied on lead 288 in FIG. 12 for a loss unbalance greater than 0.03 db.

When counting tube 355 in FIG. 20 discharges at its 6 or 7 cathode, triode 441 in FIG. 18 is turned on to energize relay 391, which operates to move its swinger 389 into engagement with open-circuit terminal 390A thereby interrupting the energizing circuit for relay 381 in FIG. 22. This relay releases to disengage swinger 382A from its associated terminal to preclude the application of additional incoming pulses to counting tube 341 in FIG. 19. The operation of relay 391 also actuates its swinger 391A from terminal 391B to open-circuit terminal 391C in FIG. 19 thereby removing the +450 volt supply from the anode of counting tube 341. This tube is thereupon deactivated to place effectively a 0 digit in the hundredths position of the loss measurement.

Similarly, a +24 volt voltage effective on lead 287 in FIG. 12 for representing a loss unbalance greater than 0.1 db is applied to terminal 392 in FIG. 22 for operating relay 384 which moves its swinger 384A into engagement with its associated terminal 384b. Incoming pulses are utilized to step counting tube 347 in FIG. 19. This continues until counting tube 355 in FIG. 20 discharges at its 8 cathode for supplying a voltage to activate triode 442 into conduction for energizing relay 395 in FIG. 18. This relay operates to move its swinger 393 into engagement with its associated terminal 392B in FIG. 22 which is connected to terminal 392A energized by the +24 volt voltage on lead 286 in FIG. 12 for representing loss unbalance greater than 0.3 db. This continues relay 384 in operation to supply additional incoming pulses for stepping counting tube 347 in FIG. 19.

When counting tube 355 in FIG. 20 reaches its 9 cathode, triode 443 in FIG. 18 is activated via the circuit traced above to energize relay 398 which operates to move its swinger 396 to engage its open-circuit terminal 396A thereby interrupting the operating path for relay 384 in FIG. 22. As this relay is released, its swinger 384A is disengaged from its associated terminal 384B thereby precluding the application of further counting pulses therethrough to counting tube 347 in FIG. 19. At the same time, the operation of relay 398 actuates its swinger 398A from terminal 398B to its open-circuit terminal 398C in FIG. 19 thereby removing the +450 supply from the anode of counting tube 347. This tube is thereupon deactivated to place effectively a 0 digit in the tenths position of the loss measurement.

When terminal 400 in FIG. 23 is receiving the +24 volt voltage from lead 285 in FIG. 12 for representing loss unbalance greater than 1 db to energize relay 399 which operates to move its swinger 403 into engagement with its associated terminal 404, the incoming pulses are supplied to step counting tube 351 in FIG. 20. When the discharge at the 9 cathode of counting tube 355 supplies a voltage to operate relay 416 which activates its swinger 417 into contact with its associated terminal 418. This permits the next incoming pulse to turn off triode 424 in flip-flop 423 for operating relay 315 in FIG. 21. Then, this relay moves its swinger 401 to engage terminal 400A in FIG. 23 which is energized with a +24 volt voltage from lead 284 in FIG. 12 for representing loss unbalance greater than 3 db. This continues the operation of relay 399 in FIG. 23 for stepping counting tube 351 in FIG. 20. When terminal 393A in FIG. 23 receives the +24 volt voltage from lead 283 in FIG. 12 for representing loss unbalance greater than 10 db, relay 394 in FIG. 23 is operated to move its swinger 395A to engage its associated terminal 396B to supply the incoming pulses to step counting tube 355.

It is thus seen that before relay 388 in FIG. 18 was operated and when the +24 volt voltage was effective at terminal 385 in FIG. 22, the over-all set was effecting a measurement of loss at 0.01 db precision. After relay 388 operated to pick up the +24 volt voltage at terminal 385A in FIG. 22, the over-all set was then achieving the measurement of loss at a 0.03 db precision. After relay 391 in FIG. 18 was operated to discontinue the 0.03 db precision measurement the +24 volt voltage provided terminal 392 in FIG. 22 effected loss measurements at a 0.1 db precision, and counting tube 341 was disabled. After relay 395 in FIG. 18 operated, the +24 volt voltage picked up at terminal 392A in FIG. 22 enabled the loss to be measured at 0.3 db precision. After relay 398 in FIG. 18 operated, counting tube 347 was disabled; and the +24 volt voltage picked up at terminal 400 in FIG. 23 permitted the loss measurements to proceed at a 1.0 db precision. After the operation of relay 315 in FIG. 21, the +24 volt voltage picked up at terminal 400A in FIG. 23 permitted the loss measurement to be obtained at a 3 db precision. The operation of relay 394 in FIG. 23 enabled the loss measurement to be effected at a 10 db precision.

Lamps 490, 491, 492 and 493 shown in FIGS. 14, 22 and 23 provide indications in their illuminated states as to which counting tube of the group 341, 347, 351 and 355 in FIGS. 19 and 20 is operating at a given time. In this connection, it is recalled from the previous explanation that since only one counting tube is operating at a given time, then only the lamp associated therewith is illuminated at that time via an obvious energizing circuit. For example, when counting tube 341 is operating, lamp 490 is illuminated; when counting tube 347 is operating, lamp 491 is illuminated; when counting tube 351 is operating, lamp 492 is illuminated; and when counting tube 355 is operating, lamp 493 is illuminated.

When a balance between the magnitude of the loss of the unknown device 19 under test and the known loss of the calibrated loss standard 21 in FIGS. 4 and 25 is achieved, gating relay 381 in FIG. 22 is released to allow its swinger 430A to engage its associated terminal 431A for representing balance in the 0.01 db and 0.03 db loss unbalance magnitudes; gating relay 384 in FIG. 22 is released to permit its swinger 432 to engage its associated terminal for representing balance in the 0.1 db and 0.3 db loss unbalance magnitudes; gating relay 399 in FIG. 23 is released to enable its swinger 434 to engage its associated terminal 435 for representing balance in the 1.0 db and 3.0 db loss unbalance magnitudes; and gating relay 394 in FIG. 23 is released to enable its swinger 436 to engage its associated terminal 437. At this time ground is provided at terminal 438 in FIG. 23 via lead 179 in FIG. 8 due to the loss balance indicated by meter 34 and relay 176 in FIG. 8 as above explained. This ground is applied via the engaging swingers and terminals just identified to terminal 439 for providing a balanced achieved signal to master clock 28 in FIG. 5 for a purpose that is later discussed.

When the loss is greater than 40 db, relay 388 in FIG. 18 is operated to actuate its swinger 429 to ground in FIG. 23 to nullify the effect of the ground, if any, at terminal 438, and thereby to ignore the signal from meter relay 176.

*Manual loss measurement—FIGS. 4, 5, 13, 14, 15 and 25*

This is described essentially with reference to the insertion loss unbalance measuring circuit shown in FIG. 25 which is identical with the corresponding loss measuring circuit shown in FIGS. 4 and 5, except for the additional disclosure of loss standard control 106. For this measurement, knob 308 in FIGS. 13 and 16 is manually actuated to its manual position MAN; button 490A in FIG. 13 is pressed to supply operating power to the required leads in the circuits of the several figures as indicated by the illumination of lamp 490B; electrical device 19 having an unknown magnitude of loss to be measured is connected between terminals 491A and 492A in FIGS. 4 and 14; the frequency of the testing voltage is selected at 400 cycles per second by appropriate adjustments of coarse knob 69 and vernier capacitor 83 associated with the testing oscillator in FIGS. 3 and 15; illuminated film scale 77A in FIG. 15 provides the 400 c.p.s. reading of the film scale 77 in FIG. 3 and level control switch 152 in FIG. 15 associated with level control 66 in FIG. 7 is actuated to provide the desired level of testing voltage for the testing operation at hand.

As a 400 c.p.s. testing frequency is being used, filter 111 for testing frequencies less than 500 c.p.s. is connected into the measuring circuit by actuating push button 493A in FIG. 13. This provides ground for relay 112 in FIGS. 5 and 25 which operates to move its swinger 113 into engagement with its associated contact 115 thereby connecting filter 110 into the circuit. This connection is indicated by the illumination of lamp 494 in FIG. 13. Filter 110 used for testing frequencies above 500 c.p.s. is connected in circuit by actuating push button 495 in FIG.

13. This removes ground to relay 112 in FIG. 5 which is operated to move its swinger 113 to engage its associated contact 114. This connection is indicated by the illumination of lamp 496 in FIG. 13.

A frequency counter 35 in FIG. 4 described hereinafter in connection with FIG. 44 is operated on a 1-second time base to provide an accuracy of 1 c.p.s. by actuating push button 497 whose operation is indicated by the illumination of lamp 498 in FIG. 13 or on a 10-second time base to provide an accuracy of 0.1 c.p.s. by actuating push button 499 whose operation is indicated by the illumination of lamp 500 in FIG. 13. Filter 111 has a 3 db bandwidth of 9 cycles per second, whereas filter 110 has a 3 db bandwidth of 90 cycles per second.

Swinger 29 of sampling relay 27 in FIGS. 1, 2, 4 and 25 is connected to the input of buffer amplifier 505 having a high impedance input whereby the input levels of the testing voltage F and the terminating impedances of the loss standard and unknown device paths S and X, respectively, are substantially constant. This permits the sampling rate of relay 27 to be chosen independently of the loss and phase characteristics of the unknown device under test. The output of amplifier 505 is connected to level control 103 which is electrically connected via line 67 to level control 66 included in testing oscillator 20. These level controls ensure that the magnitude of the testing voltage supplied by testing oscillator 20 to the loss detector is held substantially constant within ±0.1 db as hereinbefore explained with reference to the circuitry shown in FIG. 7. The output of level control 103 in FIG. 25 is supplied to gain control 100 which is associated with gain control 101 and the loss standard 21. These gain controls function as explained above regarding FIG. 6 to maintain the testing voltage supplied to the input of the loss detector at the previously mentioned constant magnitude as above noted.

Clock 28 in FIG. 25 is further discussed hereinafter and supplies timing pulses at a 1.6 c.p.s. or at a 10 c.p.s. rate to sampling relay 27. Since filter 111 is connected in the circuit of FIG. 25 as previously mentioned, the clock is adjusted to supply the timing pulses at the 1.6 c.p.s. rate whereby the testing voltage at the outputs of the calibrated loss standard and unknown device are alternately applied to the loss detector at that rate. When, however, filter 110 is connected in the circuit of FIG. 25, the clock supplies timing pulses at a 10 c.p.s. rate to the sampling relay whereby the testing voltage at the outputs of the calibrated loss standard and unknown device are supplied to the loss detector at that rate as subsequently explained. The difference between the amplitudes of the calibrated loss standard and unknown device is proportional to the difference in loss between the calibrated standard loss and the unknown device as determined by the loss detector. This difference is indicated by null meter 34 shown in FIGS. 14 and 25. This meter has three full scale ranges, viz.: 0.1, 1.0 and 10 db, one of which is selected by an appropriate actuation of hand knob 34A. For normal indications, this knob is positioned at the 0.1 db scale whereas scale 1.0 or 10 db is preselected when a corresponding range of loss is expected of a given unknown device under test. Loss standard control 106 is effectively disconnected from the loss measuring circuit of FIG. 25 except for manual control 106A. In FIG. 25, it is understood that manual control 106A comprises knobs 300–303 in FIG. 14 and associated 4-deck switches 307–304 for controlling the associated relay circuits in FIGS. 16 and 17 in a manner and for a purpose that are hereinafter mentioned. This manual control was connected to the measuring circuit by the actuation of knob 308 to the manual position MAN in FIGS. 13 and 25 as above mentioned. As a consequence, outputs A and B of the loss detector play no part in the instant explanation of the manual operation.

The measuring circuit of FIG. 25 is in a condition suitable for achieving a manual measurement of the magnitude of the unknown loss of device 19 at a 400 c.p.s. testing frequency in response to the previously noted adjustments of FIGS. 13, 14, 15 and 25. It is recalled that these adjustments comprise: (1) the connection of the unknown device between terminals 491A and 492A in FIGS. 4 and 14; (2) knob 308 is actuated to the manual position MAN in FIGS. 13 and 25 by applying ground to terminal 308A in FIG. 16; (3) button 490A in FIG. 13 is pressed to supply the necessary operating power to activate the measuring circuit as indicated by the illumination of its associated lamp 490B; (4) level control switch 152 in FIGS. 7 and 15 is adjusted to supply the desired level of testing voltage to the calibrated loss standard and unknown device; (5) coarse tuning knob 69 and vernier capacitor 83, respectively, in FIGS 3 and 15 are adjusted to provide the 400 c.p.s. testing frequency as shown on film scale 77A in FIG. 15; (6) button 497 in FIG. 13 is pressed to select the 1-second time base for counting the testing voltage frequency as indicated by its associated illuminated lamp 498; (7) button 493A in FIG. 13 is pressed to select low-pass band filter 111 in FIGS. 5 and 25 as indicated by its associated lamp 494 in FIG. 13; and (8) knob 34A is actuated to select the 0.1 db scale for meter 34 in FIGS. 5, 14 and 25.

The measuring circuit is now properly adjusted preparatory to an employment of the following procedure for achieving a first loss measurements of the unknown device via appropriate adjustments of loss decade switches 304, 305, 306 and 307 in FIGS. 17 and 18 via knobs 303, 302, 301 and 300, respectively, in FIG. 14. For the purpose of the present description, it is assumed that a 35.26 db magnitude of loss is to be measured in the unknown device. It is initially assumed that all four decade switches are disposed at their respective 0 readings relative to their respective indices 300A shown thereabove thereby disposing the swingers of 4 deck rotary switch 307 in FIG. 17 to their zero or open-circuit positions. Since the amount of loss is greater than 10 db, as preselected in the assumed example, lamp 493 associated with knob 300 is illuminated via a signal from the discrete loss detector on lead 283 in FIG. 12 while the corresponding lamps 490, 491 and 492 are de-energized via obvious circuits, shown in FIGS. 22 and 23. This suggests to a craftsman performing the measurement that the loss is greater than 10 db, and as a consequence, knob 300 in FIG. 14 and associated rotary switch 307 is to be actuated as a first step. This knob, connected to 4 deck switch 307 in FIGS. 14 and 17, is then actuated to its 1-position as indicated by the registration of the latter with its associated index 300A thereby supplying ground from mode selector switch 308 via lead 309 in FIGS. 16 and 17 to this position whereas the remaining positions of switch 307 are at an open circuit. This ground is applied in a series circuit including swinger 307D of deck D of switch 307 in FIG. 17, relay winding 327 connected to read out control 46 in the manner of relay winding 117 in FIGS. 4, 6 and 17 and lead 328 in FIGS. 6 and 17, windings of two relays having contacts disengaged from the terminals of a 10 db resistance network and joined by a strap not shown but in the manner of windings 119 and 120 and swingers 121 and 122 disengaged from the terminals of a 0.01 db resistance network 124 but joined by strap 123 in calibrated loss standard 21 in FIG. 6, further windings of two relays having contacts engaging terminals of a 10 db resistance network not shown but in the manner of relay windings 125 and 126 and swingers 127 and 128 connected to 0.01 db resistance network 129 in gain control 100 in FIG. 6, and finally to a + source of voltage.

Now, the two relay windings associated with the 10 db resistance network in calibrated loss standard 21 in FIG. 6 are operated to connect the latter network thereinto for introducing a 10 db loss into the standard path S in FIGS. 4 and 25. At the same time the two relay windings associated with the 10 db resistance network in gain control 100 in FIG. 6 are operated to disconnect the latter network therefrom for removing a 10 db loss from the measuring circuit of FIGS. 4 and 25 thereby compensating for the introduction of the 10 db loss in the standard path S. This maintains the testing voltage at the predetermined level as discussed hereinbefore regarding the circuit of FIG. 6. Thus, a 10 db loss is effectively connected into standard path S in FIGS. 4 and 25 as a first step of measuring the assumed value of the unknown loss of the device under test.

As lamp 493 in FIG. 14 remains illuminated, knob 300 is actuated to move swinger 307C to the 2-position of the C deck of switch 307 to which position in deck C ground is applied from mode selector switch 308 via lead 309 in FIGS. 16 and 17. This ground is applied in a series circuit including lead 309, swinger 307C of deck C of switch 307, a relay winding 131A connected to read out control 46 in the manner of winding 117 in FIG. 16, lead 131 in FIG. 17, relay windings 131B and 131C in calibrated loss standard 21 in FIG. 6, relay windings 131D and 131E in gain control 100 in FIG. 6. In due course, a 20 db resistance network 132 is connected into the calibrated loss standard and a compensating 20 db gain amplifier 133 is connected into gain control 100 for maintaining the testing voltage at the predetermined level as above indicated. As the 2-position of deck D of switch 307 is at an open circuit at this time, the 10 db resistance network is removed from the calibrated loss standard and the 10 db resistance network is reinserted into the gain control. Thus, a 20 db loss is effectively connected into standard path S in FIGS. 4 and 25 as a second step of measuring the assumed value of the unknown loss of the device under test.

As lamp 493 in FIG. 14 remains illuminated, knob 300 is actuated to move its swingers 307C and 307D to the 3 positions of switch 307 to both of which positions in decks C and D ground is applied from knob 308 and lead 309 in FIGS. 16 and 17. This ground is then applied to the two series circuits above described whereby the 20 db resistance network 132 and 20 db gain amplifier 133 remain connected in calibrated loss standard 21 and gain control 100, respectively, in FIGS. 4, 6 and 25 and the 10 db resistance network is reinserted into the calibrated loss standard and removed from the gain control in the manner just mentioned. Thus, a 30 db loss is effectively connected into standard path S as a third step of measuring the assumed value of the unknown loss of the device under test. This 30 db loss is automatically recorded in loss read out 80A in FIG. 13 in a manner explained below. It is recalled from the previous explanation that knob 300 and 4-deck switch 307 are adjustable in successive steps 4 through 11 in response to the ground from switch 308 to effect the introduction of 40 through 110 db loss into the standard path S in the manner above described regarding the operation of the circuits of FIGS. 6, 16 and 17.

At this point, it is evident from the assumed example of 35.26 db loss in the unknown device that since the loss is less than 40 db, then the amount of loss remaining to be measured is less than 10 db due to the fact that a 30 db of the assumed amount of loss is now measured. As a consequence, lamp 493 adjacent 10 db decade switch 300 is extinguished and lamp 492 adjacent to console knob 301 is illuminated. This suggests to the craftsman that the loss to be measured is less than 40 db but more than 30 db. As a fourth step, knob 301 in FIG. 14 is actuated to its 1 position thereby disposing swinger 306D to the 1 position of deck D of switch 306 in FIG. 17. This supplies ground via switch knob 308 and lead 309 in FIGS. 16 and 17 and swinger 306D of switch deck D to the 1 position thereof whereas the 1 positions of remaining decks A, B, and C of switch 306 are at an open circuit. This ground is effectively applied in a series circuit including the 1 position of deck D, operating winding of relay 328B connected to read out control 46 in the manner of winding 117 in FIGS. 4, 6 and 16, lead 328A in FIG. 17, and pairs of relay windings, not shown, in calibrated loss standard 21 and gain control 100 in FIG. 6 to the + source of voltage, in the manner of pairs of relay 119 and 120 in calibrated loss standard 21 and pairs of relay windings 125 and 136 in gain control 100 in FIG. 6. The pair of windings in the calibrated loss standard is energized to connect a 1 db resistance network into the calibrated loss standard and to remove a 1 db loss network from the gain control in the manner of the insertion of 0.01 db resistance network 124 in the calibrated loss standard and the removal of 0.01 db network 129 from gain control 100 in FIG. 6. Thus, a 1 db loss is effectively connected into the standard path S in FIGS. 4 and 25 as the fourth step of the manual measuring procedure.

As a fifth step, knob 301 in FIG. 14 and switch 306 in FIG. 17 are activated to move swingers 306C and 306D to the 2 positions of the 4-deck switch. As the 2 positions of decks A, B and D are at an open circuit, ground at swinger 306C of the 2 position of deck C serves to connect a 2 db resistance network in calibrated loss standard 21 and to remove a 2 db loss network from gain control 100 in FIG. 6 while at the same time the 1 db resistance network connected into the calibrated loss standard is removed and the 1 db resistance network removed from the gain control is reinserted. Thus, a 2 db loss is effectively connected into standard path S in FIGS. 4 and 25 as the fifth step of the manual measuring procedure.

As a sixth step, knob 301 in FIG. 14 and switch 306 in FIG. 17 are simultaneously operated to move swingers 306C and 306D to their 3 positions on decks C and D, respectively, of the switch. In this position, swinger 306C connected to ground retains the 2 db resistance network in the calibrated loss standard and the removal of the 2 db resistance loss from the gain control while at the same time swinger 306D connected to ground reconnects the 1 db resistance network into the calibrated loss standard and removes the 1 db resistance network from the gain control in FIG. 6 essentially in the manner above described for similar resistance networks. Thus, a 3 db loss is effectively connected into the standard path S in FIGS. 4 and 25 as the fifth step of the manual measuring procedure. At this time, the swingers of decks A and B are at open circuit positions.

As a seventh step, knob 301 in FIG. 14 and switch 306 in FIG. 17 are simultaneously operated to dispose their swingers 306B, C and D on 4 positions in decks B, C and D, respectively. In this position, swinger 306B connected to ground connects a 4 db resistance network into the calibrated loss standard and removes a 4 db loss from the gain control in FIG. 6 and since swingers 306C and D are at an open circuit the 1 and 2 db resistance networks are disconnected from the calibrated loss standard and reinserted into the gain control essentially in the manner above described for the connection and disconnection of similar resistance networks. In the 4 position, it is seen that the swinger of deck A is an open circuit. Thus, a 4 db loss is effectively connected into standard path S as the seventh step of the manual measuring procedure.

As an eighth step, knob 301 in FIG. 14 and switch 306 are simultaneously operated to move their swingers 306B, C and D to the 5 positions of decks B, C and D, respectively, of the switch. In this position swinger 306B connected to ground retains the 4 db resistance network connected to the calibrated loss standard and the 4 db resistance network disconnected from the gain control, swinger 306C is still on an open circuit, and swinger 306D connected to ground reconnects the 1 db network into the calibrated loss standard and removes the 1 db resistance network from the gain control. At this time, the swinger of deck A is also at an open circuit. Thus, a 5 db loss is effectively connected into standard path S as the eighth step of the manual measuring procedure.

At this time, lamp 492 associated with the 1 db console knob 301 is extinguished and lamp 491 associated with the 0.1 db decade switch is illuminated. This informs the craftsman that the assumed loss of the device under test is larger than 35 db but less than 36 db. This 5 db loss is automatically recorded so that 35.00 db loss is now recorded in read out 80A in FIG. 13 in a manner explained later. It is recalled from the previous explanation that knob 301 and switch 306 are adjustable in successive steps 6 through 11 to effect the introduction of 6 through 9 db loss into the standard path S in the manner above described regarding the operation of the circuits of FIGS. 6, 16 and 17.

As a ninth step, knob 302 in FIG. 14 and switch 305 in FIG. 16 are simultaneously operated to dispose swinger 305D of deck D of the switch to its 1 position. This provides ground at swinger 305D which effects the insertion of a 0.1 db resistance network into the calibrated loss standard and the removal of the 0.1 db loss from the gain control in FIG. 6 while the swingers of decks A, B and C of switch 305 are at an open circuit. Thus, a 0.1 db loss is effectively connected in the standard path in FIGS. 4 and 25 as the fourth step of the manual measuring procedure. As a tenth step, knob 302 and switch 305 are adjusted to move swingers 305C of decks C and D to the 2 positions. This provides ground at swinger 305C but removes ground from swinger 305D while the swingers of decks A and B are an open circuit. Ground on swinger 305C connects a 0.2 db resistance network into the calibrated loss standard and removes a 0.2 db resistance network from gain control 100 in FIG. 6 while the removal of ground from swinger 305D removes the 0.1 db resistance network from the calibrated loss standard and reinserts the 0.01 db resistance network into gain control 100 in FIG. 6. At this time lamp 491 associated with knob 302 in FIG. 14 is extinguished and lamp 490 associated with knob 303 is illuminated. This informs the craftsman that the assumed loss of the device under test is larger than 35.2 db but less than 35.3 db. This 0.2 db loss is automatically recorded in read out 80A in FIG. 13 so that this read out provides a 35.20 db loss which is indicated by the final adjustments of knobs 300, 301 and 302 in FIG. 14 and which is automatically recorded in loss read out 80A in FIG. 13 in a manner explained later.

As a tenth step, knob 303 is actuated until lamp 490 is extinguished, and from the assumed example, this occurs when knob 303 in FIG. 14 and switch 304 in FIG. 16 are operated to their 6 positions whereby ground on swingers 304B and 304C of decks B and C, respectively, and open circuits at the swingers of decks A and B of switch 304 effects the connection of 0.04 db and 0.02 db resistance networks into the calibrated loss standard and the removal of the 0.04 db and 0.02 db resistance networks from gain control 100 in FIG. 6. Thus, a 0.06 db loss is effectively connected into the standard path. This 0.06 db loss is automatically recorded in loss read out 80A in FIG. 13 so that read out provides now a 35.26 db loss reading which is equal to the loss assumed above for a 400 c.p.s. testing voltage for the purpose of this explanation, and which is also provided by the final readings of knobs 300 through 303 in FIG. 14. This adjustment of the loss of the calibrated loss standard to equal or balance that of the unknown device at a 400 c.p.s. testing frequency is further indicated by a null reading of meter 34 in FIGS. 4, 5 and 25.

*Automatic loss measurement—FIGS. 4, 5, 13–24 and 25*

For this purpose it is also assumed that the insertion loss of unknown device 19 is to be measured again at a 35.26 db level at a testing voltage frequency of 400 cycles per second. In FIG. 25, it is understood that gating 106B comprises relays 381, 384, 399, 394, 475A, 482, 426 and 431 and associated energizing circuits in FIGS. 22 and 23; reversible counter 106C comprises counting tubes 341, 347, 351 and 355 and associated diode matrices 342, 348, 352 and 356 in FIGS. 19 and 20 and triodes 340A–D, 350A–D, 354A–D and 358A–D for controlling associated relay circuits in FIGS. 16 and 17 and triodes 422, 424 and 425 in FIG. 21; and automatic precision control 106D comprises triodes 440, 441, 442 and 443 controlling relay circuits in FIG. 18. These components of gating 106 are automatically adjusted in a manner and for a purpose that are subsequently explained. For this purpose, the measuring circuit is adjusted as follows: (1) knob 308 in FIG. 13 is moved to its automatic position AUTO for removing ground from terminal 308A in FIG. 16 thereby deactivating knobs 300–303 in FIG. 14 and associated 4-deck switches 304–307 in FIGS. 16 and 17 and at the same time to connect loss standard control 106 into the circuit of FIG. 25; (2) the unknown device is connected between terminals 491A and 492A in FIGS. 4 and 14; (3) push button 490A in FIG. 13 is pressed to supply operating power to activate the measuring circuit as indicated by its associated illuminated lamp 490B; (4) level control switch 152 in FIGS. 7 and 15 is adjusted to supply the desired level of testing voltage to the calibrated loss standard 21 and unknown device 19 in FIGS. 4 and 25; (5) coarse tuning knob 69 and vernier capacitor 83, respectively, in FIGS. 3 and 15 are adjusted to provide the 400 c.p.s. testing voltage as indicated by film scale 77A in FIG. 15; (6) button 499 in FIG. 13 is pressed to select the 10-second time base for counting the testing voltage frequency as indicated by its associated illuminated lamp 500; (7) knob 50A in FIG. 14 is disposed in its programmed position for measuring the accuracy of the testing voltage frequency with a 10-second time base during the frequency read out part of each measuring cycle since the testing frequency is assumed at 400 c.p.s.; (8) knob 34A is moved to select the 0.1 db scale for meter 34 in FIGS. 5, 14 and 25; (9) a high portion of cam 72 is closing switch 73 to provide ground on lead 112A in FIG. 3 for energizing relay 112 in FIGS. 5 and 25 which operates to actuate its swinger 113 to engage its associated contact 115 for connecting filter 111 into the measuring circuit; (10) clock 28 in FIGS. 5 and 25 provides timing pulses via lead 28A at a 1.6 c.p.s. rate to relay 27 which is also operated at the 1.6 c.p.s. rate; and (11) finger knob 191 of manual precision control of balance in automatic mode 190 in FIGS. 14 and 18 is adjusted to provide 0.01 db precision.

Since the signal-to-noise ratio at the input of loss detector 33 in FIGS. 5 and 35 decreases as the measured loss increases, an automatic control described hereinafter in connection with the circuit of FIG. 18 and built into the measuring circuit is automatically rendered effective during the automatic and semiautomatic measurements to provide, for example, the precision of automatic balance verusus measured loss as indicated in Table A below:

TABLE A

| Measured loss, db: | Precision of Automatic balance, db |
|---|---|
| 0–39 | 0.01 |
| 40–59 | 0.03 |
| 60–79 | 0.10 |
| 80–89 | 0.30 |
| 90–99 | 1.00 |
| 100–119 | 3.00 |

In instances where the high precision of automatic balance shown in Table A is not required or desirable, manual precision control 190 is provided as indicated in FIGS. 14 and 18. This control includes finger knob 191 which enables a craftsman to adjust the measurements to a lower precision, for example, 1 db or 3 db whereas the measuring circuit skips automatically to each of several stages of higher order say, for example, 0.01 db, etc. as shown in Table A. In the 100–120 db range shown in Table A, the 3 db precision is effective because flip-flop 423 in FIG. 21 is operated to establish a 100 db loss.

The circuit of FIGS. 5, 8 and 25 is now adjusted for automatically balancing the loss of calibrated loss standard 21 against that of the unknown device 19 in FIGS. 4 and 25 at the 400 c.p.s. testing voltage frequency. For this purpose as above indicated, the magnitude of the balance was assumed to be 35.26 db and as a consequence, the calibrated loss standard is also assumed to be provided with 0 loss at this time. The IF component at the output of measuring converter 30 is applied via filter 111 and IF gain control 101 at the 1.6 c.p.s. sampling rate to loss detector 33. This compares the amplitudes of the IF signal for the output of the calibrated standard loss and the unknown device at the 1.6 c.p.s. sampling rate of relay 27. The difference between these two amplitudes is proportional to the loss unbalance between the calibrated loss standard and unknown device. This difference or unbalance is displayed on null meter 34.

Clock 28 is also supplying 1.6 c.p.s. timing pulses to a master control 104 in FIG. 25 which, for the purpose of the instant explanation, is shown as closed switch 104A and which is more fully described hereinafter. The clock has an input received as signal B on lead 179 from the output of loss detector 33 in FIGS. 8 and 25 via gating 106B and terminal 439. This detector also supplies signal A on lead 165 as one input to summing amplifier 233 included in discrete loss detector 107 in FIGS. 8, 9A and 25. Signal A has a sign and magnitude corresponding to the amplitude difference between the outputs of the calibrated loss standard and the unknown device. Signal B provides an open circuit indication on lead 179 so long as an unbalance exists between the loss of the calibrated loss standard and unknown device, but replaces this open circuit with a ground on lead 179 when a balance occurs between such loss, as hereinbefore explained regarding the loss detector circuit of FIG. 8. This ground on lead 179 is transmitted through the balance achieved circuit in the loss standard control to terminal 439 of FIGS. 22 and 25, and is utilized by the clock to generate a signal for the master control to indicate a balance between the loss of the calibrated loss standard and the loss of the unknown device in a manner hereinafter described in connection with the circuit of the master control and the clock.

Signal A provides, for example, on lead 165 in FIGS. 8 and 25 a positive voltage when the loss of the unknown network exceeds the loss in the loss standard and a negative voltage when the reverse holds true. These positive and negative values of signal A stimulate discrete loss detector 107 in FIG. 25 to activate loss standard control 106 in such sense that a positive signal A serves to add loss to the calibrated loss standard whereas a negative signal A serves to subtract loss from the calibrated loss standard, in a manner that is subsequently explained.

As the loss in the calibrated loss standard is 0 db and the loss of the unknown device is 35.26 db as above assumed, the outputs of the calibrated loss standard and unknown device sampled by loss detector 33 provide a positive analog signal A on lead 165 in FIG. 25. This signal is supplied to the input of summing amplifier 233 included in the discrete loss detector 107 and shown in FIG. 9A. At the same time, timing pulses supplied by clock 28 in a manner explained later reset the 15 stages of shift register 203 in FIG. 9B, and applied via diode 205 and lead 206 stop electronic switch 208 in FIG. 9A thereby blocking the transmission of pulses of 10 kc. pulse generator 211 to lead 212 and thereby from the shift register 203 in FIG. 9B.

The timing pulse on lead 206 in FIG. 9B sets flip-flop 215 in FIG. 10A which transmits a −12 volt potential from its 1-side output on lead 217 in FIG. 10A and on lead 217 in FIG. 9B to set the 1 flip-flop of the shift register thereby placing a logic 1 in the 1-side output of this stage. The −12 volt potential from the output of flip-flop 215 in the set state serves to reset itself thereby applying a −12 volt potential from its 0-side output and through differentiator 219 to set flip-flop 209 which enables AND gate 210 to pass the 10 kc. pulses from generator 211 via gate 210 to lead 212 and thereby to advance the logic 1 stage by stage through the shift register. The outputs from the 1 and 0-sides of the respective stages of the shift register produce the descending staircase voltage at the discrete voltage dividers including resistors R1–R8 and common resistor 227, as above described. This staircase voltage is applied on lead 231 as a second input to summing amplifier 233 in FIG. 9A. This amplifier sums continuously the analog input at lead 165 with the respective stages of the staircase voltage so that at the instant when the effective output of the amplifier passes through 0, blocking oscillator 234 in FIG. 9A is triggered to reset flip-flop 209 which disables AND gate 210 and thereby blocks the transmission of the 10 kc. pulses of generator 211 to shift register 203.

This stops the advance of the logic 1 through the shift register at a point at which the maximum magnitude of the staircase voltage on lead 231 most nearly equals the analog voltage on lead 231. The shift register is thus stopped at stage 2 whereat the larget voltage of the staircase voltage most nearly equals the analog voltage, that is, the loss unbalance is 35.26 db which is the difference between the assumed 35.26 db loss and 0 loss recorded in the calibrated loss standard at the moment.

The −12 volt potential from the 0-side output of reset flip-flop 209 in FIG. 9A sets flip-flop 220 which supplies a −12 volt potential from the output of its 1-side to lead 235 to reset flip-flops 260–265, 267 and 268 in flip-flop storage 236 in FIG. 12, and at the same time to set flip-flop 237 in FIG. 10A which supplies a −12 volt potential on lead 238 to enable simultaneously the 8 AND gates included in flip-flop storage 236 in FIG. 12, as hereinbefore explained regarding the operation of discrete loss detector 107 in FIGS. 9A, 9B, 10A, 10B, 11, 12 and 25. The previous explanation indicates that the placement of the logic 1 in stages 1 through 8 of the shift register served to operate relay 273 in FIG. 12, which removes a +24 volt potential on lead 282 for indicating that loss additions are to be effected in the calibrated loss standard 21 in FIGS. 6 and 25. Relay 362 in FIG. 22 is released whereby all swingers associated therewith are actuated to the positions shown in FIGS. 22, 23 and 24.

Since the assumed loss is 35.26 db, the shift register stopped at stage 2 served to operate relay 274 in FIG. 12 which provides a +24 volt voltage on lead 283 for indicating the loss balance is 10 db or more. This +24 volt voltage is applied to terminal 393A in FIG. 23 for operating relay 394 which actuates its swinger 395A into engagement with its associated terminal 396B. Timing pulses produced at a 1.6 c.p.s. full rate by master clock 28 in a manner later explained are applied to terminal 366 in FIG. 24 because relay 384 in FIG. 22 is now operated via the diodes connected to leads 283–289 in FIG. 12. These timing pulses are supplied via direct-current level translating network 385C in FIG. 24 to swinger 395A engaging terminal 396B, swinger 408B engaging terminal 408C and lead 408D in FIG. 23 and lead 408D, delay network 410 and twin triode 411 to terminals A and B of counting tube 355 in FIG. 20. The first timing pulse activates this counting tube to discharge at its 1 cathode which supplies a voltage via diode matrix 356 in FIG. 20 to the control grid of triode 358D in FIG. 17 which has its cathode at ground. This ground operates relay 327 in FIG. 17 and via lead 328 in FIG. 6 operates two relays not shown, for connecting a 10 db resistance network loss into the calibrated loss standard and operates two relays, not shown, for disconnecting a corresponding 10 db resistive network loss from gain control 100 in FIG. 6. The operation of relay 327 activates read out control 46 in FIGS. 4 and 6 to record the first 10.00 db loss in read out 80A in FIG. 13 as previously explained. Loss meter 34 in FIG. 14 continues to indicate an unbalance between the calibrated loss standard and unknown device in FIGS. 4, 5 and 25.

In a similar manner the next succeeding timing pulse provided by clock 28 in FIG. 9B serves again to place the logic 1 in stage 1 of the shift register to operate relay 273 for applying the +24 volt potential to lead 282 and to advance the logic 1 to stage 2 of the shift register which is again stopped thereat to operate relay 274 for applying the +24 volt potential to lead 283 in FIG. 12. Loss unbalance is 25.26 db representing the difference between the assumed 35.26 db loss and the measured 10 db loss. This potential at terminal 393A in FIG. 23 permits the timing pulse at terminal 366 in FIG. 24 to step counting tube 355 in FIG. 20 to discharge next at its 2 cathode. This supplies a voltage via diode matrix 356 to discharge triode 358C which operates relay 131A in FIG. 17, which operates the two relays 131B and 131C to connect a 20 db resistance network loss 132 into the calibrated loss standard and which operates the two relays 131D and 131E to connect a 20 db gain amplifier 133 into the gain control in FIG. 6. As counting tube 355 is not discharging at its 1 cathode, triode 358D is returned to cut off whereby relay 327 is released to remove the 10 db reading from the loss read out, the necessary relays are released to disconnect the 10 db resistance network loss from the calibrated loss standard, and the necessary relays are released to reinsert 10 db resistance loss network into the gain control. The operation of relay 131A activates read out control 46 in FIGS. 4 and 6 to record 20.00 db in loss read out 80A in FIG. 13.

Also, in a similar manner, succeeding timing pulses replace the logic 1 in stage 1 of the shift register to operate relay 273 in FIG. 12 for removing the +24 volt potential from lead 282 to advance the logic to stage 2 of the shift register which is stopped thereat to operate relay 274 for applying the +24 volt potential to lead 283 in FIG. 12. Loss unbalance is 15.26 db which is the difference between the 35.26 db assumed loss and the 20.00 db measured loss. This potential at terminal 393A in FIG. 23 permits the timing pulse at terminal 366 in FIG. 24 to step counting tube 355 to discharge at its 3 cathode. This supplies a voltage via diode matrix 356 to discharge triode 358D and to continue the discharge of triode 358C in FIG. 17. The continued discharge of triode 358C maintains the connection of both the 20 db resistance network 132 in the calibrated loss standard and the 20 db gain amplifier in the gain control in FIG. 6 whereas the discharge of tube 358D effects the reconnection of the 10 db resistance network loss into the calibrated loss standard and the removal of the 10 db resistance loss network from the gain control in FIG. 6. The operation of relays 327 and 131A in FIG. 17 activates read out control 46 in FIGS. 4 and 6 to record a 30.00 db in loss read out 80A in FIG. 13.

The timing pulses of clock 28 in FIG. 9B effect the placement of the logic 1 in stage 1 of the shift register to release relay 273 in FIG. 12 for removing the +24 volt potential from lead 282 and to enable the 10-kc. pulses of generator 211 in FIG. 9A to advance the logic 1 into stage 2 of the shift register. At this time, however, the loss unbalance between the calibrated loss standard 21 and the unknown device in FIGS. 4, 6 and 25 has been reduced to 5.26 db unbalance which is the difference between the assumed 35.26 db loss and the 30.00 db measured loss at the moment. Now, the logic 1 is not stopped at stage 2 of the shift register but is advanced into stage 3 thereof. Since this represents a 3.00 db loss which is nearest in magnitude to the 5.26 db unbalance, the shift register is stopped at stage 3 whereat relay 275 is operated to supply a 24 volt potential to lead 284 in FIG. 12 and via the diodes to associated leads 285–289. This potential applied via leads 284 and 285 to terminals 400 and 400A in FIG. 23 serves to operate relay 399 which actuates its swinger 403 to engage its associated terminal 404. A timing pulse at terminal 366 in FIG. 24 is applied in an obvious circuit in FIGS. 20, 23 and 24 to terminals A and B of counting tube 351 in FIG. 20 which is stepped to discharge at its 1 cathode. This supplies a voltage via diode matrix 352 to the control grid of triode 354D which discharges to supply ground to operate relay 328B and via lead 328A in FIG. 17 to FIG. 6 to operate two relays therein for connecting a 1 db resistance loss network, not shown, into the calibrated loss standard and to operate two additional relays, not shown, for removing a 1 db resistance loss network from the gain control. The operation of relay 328B activates read out control 46 in FIGS. 4 and 6 to record an additional 1 db in loss read out 80A in FIG. 6 which now reads 31.00 db.

On next succeeding timing pulses supplied by clock 28 in FIG. 9B, the logic 1 placed in stage 1 of the shift register in FIG. 9B serves to remove the +24 volt potential on lead 282 in FIG. 12 and to advance the logic 1 into stage 3. This represents a 3.00 db loss which is nearest in magnitude to the 4.26 db unbalance which is the difference between the assumed 35.26 db loss and the 31.00 db loss measured at the moment. Stopped at stage 3 of the shift register, relay 275 is operated to place a +24 volt potential on leads 284 and 285, which are connected to terminals 400 and 400A in FIG. 23. This operates relay 399 to enable the timing pulses at terminal 366 in FIG. 24 to be transmitted in an obvious circuit to step counting tube 355 in FIG. 20 to discharge to its 2 cathode. This supplies a voltage via diode matrix 352 to institute discharge in triode 354C in FIG. 17 which supplies ground for operating the associated relay to activate read out control 46 in FIGS. 4 and 6 and to operate the necessary relays to connect a 2 db resistance network loss in the calibrated loss standard and to remove a 2 db resistance loss network from the gain control in FIG. 6. The 1 db resistance network connected previously into the calibrated loss standard is now removed and the 1 db resistance network loss removed from the gain control is restored thereto because triode 354D is now cut off to release the relays connected thereto. Loss read out 80A in FIG. 13 reads 32.00 db. The loss unbalance is now 3.26 db which is the difference between the assumed 35.26 db loss and the measured 32.26 db loss.

On the next succeeding timing pulses provided by clock 28 in FIG. 9B, the +24 volt potential provided on leads 284 and 285 in FIG. 12 serves to step counting tube 351 in FIG. 20 in the manner described above to discharge at its 3 cathode. This cathode supplies a voltage via diode matrix 352 in FIG. 20 to effect a continuation of the connection of the 2 db resistance network loss in the calibrated loss standard and the removal of the 2 db resistance network loss from the gain control and in addition to effect a reconnection of the 1 db resistance network loss in the calibrated loss standard and the removal of the 1 db resistance loss network from the gain control in FIG. 6. This establishes an additional 3 db loss measurement in the calibrated loss standard. During this time read out control 46 in FIGS. 4 and 6 is activated to advance loss read out 80A in FIG. 13 to read 33.00 db loss. The loss unbalance is now: 35.26−33.00=2.26 db.

On the next succeeding timing pulses supplied by clock 28 in FIG. 9B, the +24 volt potential provided on lead 285 in FIG. 12 serves to step counting tube 351 in FIG. 20 to discharge at its 4 cathode in the manner described above. This cathode supplies a potential via diode matrix 352 to connect a 4 db resistance network loss into the calibrated loss standard and to remove a corresponding 4 db resistance network loss from the gain control in FIG. 6. At the same time, the 1 and 2 db resistance network losses connected into the calibrated loss standard are removed therefrom and the corresponding 1 and 2 db networks removed from the gain control are reinserted thereinto. This establishes an additional 4 db loss measurement in the calibrated loss standard. During this time read out control 46 in FIGS. 4 and 6 is activated to advance loss read out 80A in FIG. 13 to record 34.00 db. The loss unbalance is now: 35.26−34.00=1.26 db.

On the next succeeding timing pulses supplied by clock 28 in FIG. 9B, the +24 volt potential provided on lead 285 in FIG. 12 serves to step counting tube 351 in FIG. 20 to discharge at its 5 cathode in the manner described above. This cathode supplies a voltage via diode matrix 352 to retain the connection of the 4 db resistance network in the calibrated loss standard and the removal of the corresponding 4 db resistance network loss from the gain control in FIG. 6, and at the same time to reconnect the 1 db resistance network loss into the calibrated loss standard and to disconnect the 1 db resistance network loss from the gain control. This establishes an additional 5 db loss measurement in the calibrated loss standard. During this time read out control 46 in FIGS. 4 and 6 is activated to advance loss read out 80A in FIG. 13 to record 35.00 db. The loss unbalance is now: 35.26−35.00=0.26 db.

On the next succeeding timing pulses supplied by clock 28, the advance of the logic 1 is stopped at stage 6 register 203 in FIG. 9B to provide a +24 volt potential on lead 287 in FIG. 12. This potential applied to terminal 392 in FIG. 22 operates relay 384 which actuates its swinger 384A to engage its associated terminal 384B. The operation of this relay also maintains its swinger 384C in engagement with its terminal 366 in FIG. 24 whereby the full 1.6 c.p.s. rate timing pulses supplied by clock 28 are transmitted in an obvious circuit in FIGS. 24, 23, 22 and 19 to terminals A and B of counting tube 347 which is thereby stepped to discharge at its 1 cathode. This cathode supplies a voltage via diode matrix 348 to the control grid of triode 350 in FIG. 16 which is discharged to supply ground for operating relays corresponding to relay 117 and relays 119, 120, 125 and 126 in FIG. 6. The operation of the relay corresponding to relay 117 activates read out control 46, the operation of the two relays corresponding to relays 119 and 120 connects a 0.1 db resistance network loss into the calibrated loss standard, and the operation of the two relays corresponding to relays 125 and 126 removes a 0.1 db resistance network loss from the gain control. This establishes an additional 0.1 db loss measurement in the calibrated loss standard. During this time read out control 46 in FIGS. 4 and 6 is stimulated to advance loss read out 80A to record 35.10 db. The loss unbalance is now: 35.26−35.10=0.16 db.

On the next succeeding timing pulses provided by clock 28, the advance of the logic 1 is again stopped at stage 6 of shift register 203 in FIG. 9B to provide again the +24 volt potential on lead 287 in FIG. 12. This potential is again applied to terminal 392 in FIG. 22 which operates relay 384 for enabling the transmission of the 1.6 c.p.s. full rate timing pulses at terminal 366 in FIGS. 24, 23, 22 and 19 to terminals A and B of counting tube 347, which is thereby stepped to discharge at its 2 cathode. This cathode supplies a voltage via diode matrix 348 to the control grid of triode 350C in FIG. 16 which is discharged to supply ground for operating one relay to activate read out control 46, two relays, not shown, for connecting a 0.2 db resistance network loss into the calibrated loss standard, and to remove a corresponding 0.2 db resistance network loss from the gain control in FIG. 6. At the same time, the relay connected to the read out control is released, the two relays connecting the 0.1 db loss into the calibrated loss standard are released to remove this 0.1 db loss therefrom, and the two relays removing the 0.1 db loss from the gain control are released to reinsert this 0.1 db loss into the gain control. This establishes an additional 0.2 db loss measurement in the calibrated loss standard. During this time read out control 46 is activated to advance loss read out 80A to record 35.20 db. The loss unbalance is now: 35.26−35.20=0.06 db.

On the next succeeding timing pulses provided by clock 28, the advance of the logic 1 is stopped at stage 7 of shift register 203 in FIG. 9B because the 0.03 db loss is nearest to the remaining 0.06 db unbalance. This provides a +24 volt potential on leads 288 and 289 in FIG. 12 which is applied to terminals 385A and 385 in FIG. 22 and via associated terminal 385B and swinger 386 to operate relay 381. In stage 1 of the shift register relay 273 in FIG. 12 is operated to remove the +24 volt potential from lead 282. In the operation of relay 381, its swinger 382A engaged its terminal 383 to enable the transmission of the one-half time rate timing pulses provided by clock 28 to terminal 365 in FIG. 24, because relay 384 is now released in an obvious circuit in FIGS. 24, 23, 22 and 19 to terminals A and B of counting tube 341. This tube is stepped to discharge at its 1 cathode which applies a voltage via diode matrix 342 to the control grid of triode 340D in FIG. 16. The discharge of this tube supplies ground to operate relay 117 and to lead 116 in FIG. 16, to operate relays 119 and 120 to connect 0.01 db resistive network loss 124 into the calibrated loss standard, and to operate relays 125 and 126 to remove a corresponding 0.01 db loss from the gain control in FIG. 6. This establishes an additional 0.01 db loss measurement in the calibrated loss standard. During this time read out control 46 in FIGS. 4 and 6 is stimulated to advance loss read out 80A to record 35.21 db. The loss unbalance is now: 35.26−35.21 db=0.05 db.

On the next succeeding timing pulses provided by clock 28, the logic 1 in stage 1 of the shift register operates relay 273 to remove the +24 volt potential from lead 282 and is again stopped in stage 7 of shift register 203 in FIG. 9B to remove the +24 volt potential from lead 282 and to provide the +24 volt potential on leads 288 and 289 in FIG. 12 which is applied to terminals 385A and 385 in FIG. 22 to operate relay 381. The one-half time rate timing pulses provided by clock 28 to terminal 365 in FIG. 24 step counting tube 341 in FIG. 19 to discharge at its 2 cathode which provides a voltage via diode matrix 342 to discharge triode 340C in FIG. 16. This adds a 0.02 db resistance loss to the calibrated loss standard and removes a corresponding 0.02 db resistance loss from the gain control in FIG. 6, and removes the 0.01 db loss from the calibrated loss standard and reinserts the 0.01 db loss into the gain control in FIG. 6. This establishes an additional net 0.02 db loss measurement in the calibrated loss standard. Read out control is actuated to advance read out 80A to record 35.22 db. The loss unbalance is now: 35.26−35.22=0.04 db.

On the next timing pulses provided by clock 28, the logic 1 in stage 1 of the shift register operates relay 273 to remove the +24 volt potential from lead 282 in FIG. 12 and is again stopped in stage 7 of shift register 203 in FIG. 9B to remove the +24 volt potential from lead 282 and to provide the +24 volt potential on leads 288 and 289 in FIG. 12 which is applied to terminals 385A and 385 in FIG. 22. Now, the one-half rate timing pulses at terminal 365 in FIG. 24 step counting tube 341 in FIG. 19 to discharge at its 3 cathode which provides a voltage via diode matrix 342 to effect discharge in triodes 340C and 340D in FIG. 16. Discharge in triode 340C retains the 0.02 db loss in the calibrated loss standard and the removal of the 0.02 db loss from the gain control in FIG. 6 whereas discharge in triode 340D reconnects the 0.01 db loss into the calibrated loss standard and removes again the 0.01 db loss from the gain control. This establishes an additional net 0.03 db loss measurement in the calibrated loss standard. Read out control 46 is activated to advance read out 80A to record 35.23 db. The loss unbalance is now: 35.26−35.23=0.03 db.

On the next timing pulses provided by clock 28, the logic 1 in stage 1 of the shift register operates relay 273 to remove the +24 volt potential from lead 282 and is again stopped at stage 7 of the shift register 203 in FIG. 9B to provide the +24 volt potential on leads 288 and 289 in FIG. 12. This potential steps counting tube 341 to discharge at its 4 cathode which provides a voltage via diode matrix 342 to discharge triode 340B in FIG. 16. This adds a 0.04 db resistance loss to the calibrated loss standard and removes a corresponding 0.04 db loss from the gain control in FIG. 6. Also, at this time the 0.01 db and 0.02 db losses are removed from the calibrated loss standard and the 0.01 db and 0.02 db losses are reinserted into the gain control in FIG. 6. This establishes an additional net 0.04 db loss measurement in the calibrated loss standard. Read out control 46 is activated to advance read out 80A to record 35.24 db. The loss unbalance is now: 35.26−35.24=0.02 db.

On the next timing pulses provided by clock 28, the logic 1 in stage 1 of the shift register operates relay 273 to remove the +24 volt potential from lead 282 and is again stopped at stage 8 of shift register 203 in FIG. 9B to provide a +24 volt potential on lead 289 in FIG. 12. This voltage is effective to step counting tube 341 to discharge at its 5 cathode which provides a voltage via diode matrix 342 to retain the discharge of triode 340B and to discharge triode 340D in FIG. 16. Discharge of triode 340B retains the 0.04 db loss in the calibrated loss standard and the removal of the 0.04 db loss from the gain control in FIG. 6 whereas discharge of triode 340D reconnects the 0.01 db loss into the calibrated loss standard and removes the corresponding 0.01 db loss from the gain control 46 is acivated to advance read out 80A in FIG. measurement in the calibrated loss standard. Read out control 46 is activated to advance read out 80A in FIG. 13 to record 35.25 db. The loss unbalance is now: 35.26−35.25=0.01 db.

Finally, on the next timing pulses provided by clock 28, the logic 1 in stage 1 of the shift register 203 in FIG. 9B operates relay 273 in FIG. 12 to remove the +24 volt potential from lead 282 and is stopped at stage 8 of the shift register to provide a +24 volt potential on lead 289 in FIG. 12. This voltage is effective to step counting tube 341 to discharge at its 6 cathode which provides a voltage via diode matrix 242 to retain the discharge of triode 340B and to discharge triode 340C in FIG. 16. Discharge of triode 340B retains the 0.04 db loss in the calibrated loss standard and the removal of the 0.04 db loss from the gain control in FIG. 6 whereas the discharge of triode 340C reconnects the 0.02 db loss into the calibrated loss standard and again removes the 0.02 db loss from the gain control in FIG. 6. Also at this time triode 340D in FIG. 16 is returned to cut off thereby effecting the removal of the 0.01 db loss from the calibrated loss standard and the reinsertion of the corresponding 0.01 db loss into the gain control in FIG. 6. This establishes an additional net 0.06 db loss measurement in the calibrated loss standard. Read out control 46 is activated to advance read out 80A in FIG. 13 to record 35.26 db. The loss unbalance is now: 35.26−35.26=0. The loss of the calibrated loss standard is adjusted to balance or equal the loss of the unknown device in FIGS. 4 and 25 at 400 c.p.s. testing voltage frequency.

*Calibrated phase standard—FIGS. 4, 5 and 26*

This is a circuit arrangement shown in FIG. 26 for adding 0 to 359.9 degrees of phase in series with the unknown electrical device for measuring the phase of the latter device, and comprises the following discrete phase networks: 270 degrees, 180 degrees, 90 degrees, eight networks for measuring 10 to 80 degrees in steps of 10 degrees, nine networks for measuring 1 to 9 degrees in steps of 1 degree, and nine networks for measuring 0 to 0.9 degree in steps of 0.1 degree. Normally, all phase networks are removed from the circuit, as shown in FIG. 26, and are only connected thereinto in response to certain voltage signals received on corresponding leads connecting the calibrated phase standard to a phase standard control 108 in FIG. 5, in a manner that is subsequently explained.

*Phase detector and phase meter—FIGS. 4, 5 and 27*

FIG. 27 delineates phase detector 37 and associated null meter 43 shown in FIGS. 1, 2, 4 and 5 and comprises a voltage controlled phase shift amplifier 510 and a power amplifier 511 supplying measuring and reference voltages to the input of detector 512. This has a first portion of its output connected to an input threshold detector 513 which has its output supplied via lead 514 to phase standard control 108 in FIG. 5 for a purpose that is later mentioned, and a second portion of its output via direct-current amplifier 515 to swinger 517 of mercury relay 518. This relay is operated at the 1.6 c.p.s. sampling rate under control of clock 28 in the manner of sampling relays 27 and 39. Swinger 517 is engaging contacts 519 and 520 and is disengaged from contact 522. Terminal 523 supplies testing voltage on lead 165A for a purpose that is hereinafter mentioned.

Relay contact 519 is connected through integrating amplifier 524 included in an automatic phase control loop terminating in voltage controlled phase shift amplifier 510. Relay contact 520 is connected to one terminal of voltage storage capacitor 525 which has its opposite terminal connected to ground, and via resistor 526 to one terminal of phase null meter 43. This meter has its opposite terminal joined to one terminal of meter relay 527. When released, this relay engages its swinger 528 with ground which is applied to lead 179A for a purpose that is subsequently discussed. Relay contact 522 is connected to one terminal of voltage storage capacitor 529 and the opposite terminal of relay 527, while the opposite terminal of this capacitor is connected to ground.

The operation of phase detector 37 of FIG. 27 associated with the comparison of the magnitude of the phase of calibrated phase standard 40 with that of the unknown device in FIGS. 1, 2, 4, 5 and 27 at a preselected numerical value of testing frequency is substantially the following. In FIG. 27, relay swingers 29, 42 and 517 are shown as disposed to engage corresponding contacts 29A, 38 and 520 in the standard S position whereas for the measuring position X these swingers are disposed to engage their opposite contacts 29B, 41 and 522 in the measuring position. Assuming that calibrated loss standard 21 in FIG. 27 has negligible phase, the difference between the phase shift introduced in the measuring path S and the phase shift introduced in the reference path including contributions from the reference converter 36 and amplifier 511 is represented by a proportional voltage charge on capacitor 525. Integrating amplifier 524 in the APC path adjusts the phase of amplifier 510 to ensure that the phase of measuring path S equal the phase of the reference path just traced.

When the swingers 29, 42 and 517 in FIG. 27 are actuated to engage their opposite contacts 29B, 41 and 522, the phase of the unknown device represented by a lower sideband component in the output of the measuring converter has a negative sign. This component added to the phase of the calibrated phase standard, assumed to have a 0 degree value at the moment, is represented by a proportional voltage charge which is placed on capacitor 529. The difference between the voltage charges on capacitors 525 and 529 produces a proportional deflection on phase meter 43. If the voltage charge on capacitor 529 is different than that on capacitor 525, relay 527 is operated to actuate its swinger 528 to its open-circuit contact.

Additions of phase are now made to calibrated phase standard 40 in FIG. 26 until the difference between the voltage charges on capacitors 525 and 529 is reduced to zero at which time a null reading is produced on phase meter 43 and at the same time relay 527 is effectively released to allow its swinger 528 to engage its ground contact. This ground is applied to lead 179A for a purpose that is later given. Threshold detector 513 provides a voltage on its output lead 514 for a purpose later mentioned only when the magnitude of the unbalance between the unknown phase of the electrical device 19 under test and the phase of the calibrated phase standard is equal to or greater than 90 degrees.

*Discrete phase detector — FIGS. 28A, 28B, 29A, 29B, 30 and 31*

This translates the magnitudes of the discrete input analog voltages into corresponding digital quantities by comparing discrete analog voltages with particular steps of a staircase voltage developed within this detector; and notes the staircase voltage step whose corresponding magnitude exceeds at first the magnitude of a given input analog voltage. Each comparison of the magnitude of an input voltage with a step of the staircase voltage requires an elapsed time of the order of 100 microseconds. The detector comprises several components whose structure and cooperation are essentially the same as the corresponding components described above in the discrete loss detector in FIGS. 9A, 9B, 10A, 10B, 12 and 13, except the discrete phase detector does not include lead 269 in FIG. 9A and lead 269 and differentiator network 270 in FIG. 12, the staircase voltage in FIG. 30 is limited to fourteen steps, OR gate 241 and voltage inverter 243 in FIG. 10B are omitted in FIG. 29B, and the voltages on the output leads in FIG. 31 are in terms of specific digital magnitudes of phase. Otherwise, the operation of the discrete phase detector in FIGS. 28A, 28B, 29A, 29B, 30 and 31 is identical with that of the discrete loss detector in FIGS. 9A, 9B, 10A, 10B, 11 and 12; and in order to facilitate an expeditious comprehension of the operation of the discrete phase detector in terms of the above detailed explanation of the discrete loss detector, corresponding elements of both detectors are identified with the same reference numerals except those in the discrete phase detector which include an alphabetical suffix A. In view of the detailed description of the discrete loss detector given above, it is therefore thought to be unnecessarily repetitious to duplicate a similar explanation for the operation of the discrete phase detector.

In the discrete phase detector shown in FIGS. 28A, 28B, 29A, 29B, 30 and 31, it is noted in FIG. 31 that sign relay 273A is operated to apply a +24 volt potential to lead 282A for indicating phase increments are to be added to calibrated phase standard 40 in FIG. 26 whereas relay 273A is released to remove such potential from lead 282A for indicating phase increments are to be subtracted from the calibrated phase standard. Similarly, relays 274A, 275A, 276A, 278A, 279A and 280A are operated to indicate phase unbalances of 0.1 degree, 0.3 degree, 1 degree, 3 degrees, 10 degrees and 30 degrees to the phase standard control via the respective leads 283A, 284A, 285A, 286A, 287A and 288A.

*Phase standard control—FIGS. 31A, 32–38*

This control provides both manual and automatic mechanisms for balancing the phase of calibrated phase standard 40 in FIG. 5 against the unknown phase of electrical device 19 under test in FIG. 4.

Manual operation—for console knobs 531, 532, 533 and 534 in FIG. 13 actuate swingers 535, 536, 537 and 538, respectively, in FIGS. 35, 36, 37 and 38. These swingers are simultaneously connected to a source +24 volt potential in response to the operation of relay 539 in FIG. 35 by the actuation of mode selector knob 308 to its manual position MAN in FIGS. 13 and 35 whereby a source of +24 volt potential operates relay 539. In operating, this relay closes its swingers 539A and 539B on ground in FIG. 35, its swingers 539C, 539D and 539E on a +24 volt potential in FIGS. 36, 37 and 38, respectively.

Figure 38:
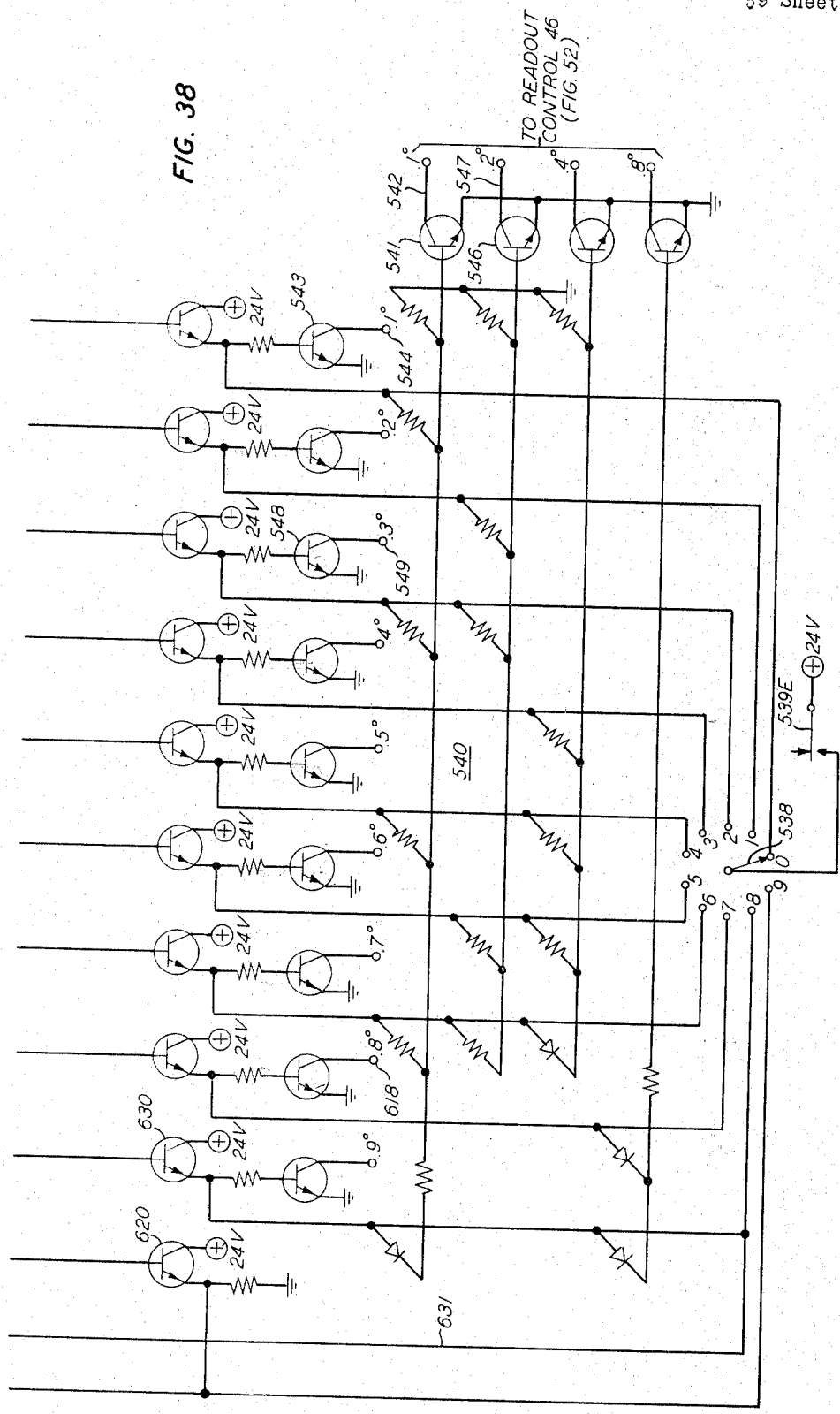

In FIGS. 13 and 38, decade knob 534 is actuable in 1 through 9 steps to move its associated swinger 538 in corresponding steps for adding 0.9 degree of phase in 0.1 degree steps to calibrated phase standard 40 in FIG. 26 via a decimal code and to the read out control via a 1, 2, 4, 8 code. For example, swinger 538 in FIG. 38 in its 0 position and knob 534 in FIG. 13 in its 0 position supply a +24 volt potential via coding resistor-diode matrix 540 to the base of transistor 541 for turning it on to apply a ground from its collector to its 0.1 degree lead 542, at the same time via matrix 540 to the base of transistor 543 for turning it on to apply a ground to lead 544. The ground on the 0.1 degree lead 542 is applied to read out control 46 in FIG. 4 which is thereby activated to record a 0.1 degree reading in phase read out 80B in FIG. 13 in a manner later explained, and the ground on lead 544 is applied in FIG. 26 to relay 545 which operates to connect the 0.1 degree phase network into the calibrated phase standard 40 in FIG. 26. Relay 545 obtains its positive supply via lead 521B from microbel switching relay 521 operating swinger 521A in FIG. 35 for alternately energizing and de-energizing the currently selected phase shift network switching relays in FIG. 26, so as to perform the function of relay 39 in FIGS. 1, 2 and 5 as previously mentioned. It can now be seen that relay 39 and shorting strap 49 in FIGS. 1, 2 and 5 are actually a simplified representation of the function which is performed by relay 521 and swinger 521A in FIG. 35, working in conjunction with relays 556A, 554A, 555A, 581A and 545 and their associated phase shift networks and strap paths in FIG. 26. Swinger 538 in FIG. 38 in its 2-position and knob 534 in FIG. 13 in its 2-position supply a +24 volt potential via matrix 540 to the bases of transistors 541 and 546, turning on both thereof for applying grounds to both 0.1 degree and 0.2 degree leads 542 and 547, respectively, and at the same time to the base of transistor 548 which is thereby turned on to apply a ground to lead 549. The grounds on the 0.1 degree and 0.2 degree leads 542 and 547 are applied to read out control 46 in FIGS. 4 and 52 which is thereby activated to record a 0.3 degree reading (0.1 degree +0.2 degree) in phase read out 80B in FIG. 13 in a manner later explained, and the voltage on lead 549 is applied in FIG. 26 to a relay not shown, which operates to connect the 0.3 degree phase network into the calibrated phase standard 40 in FIG. 26.

Figure 36:
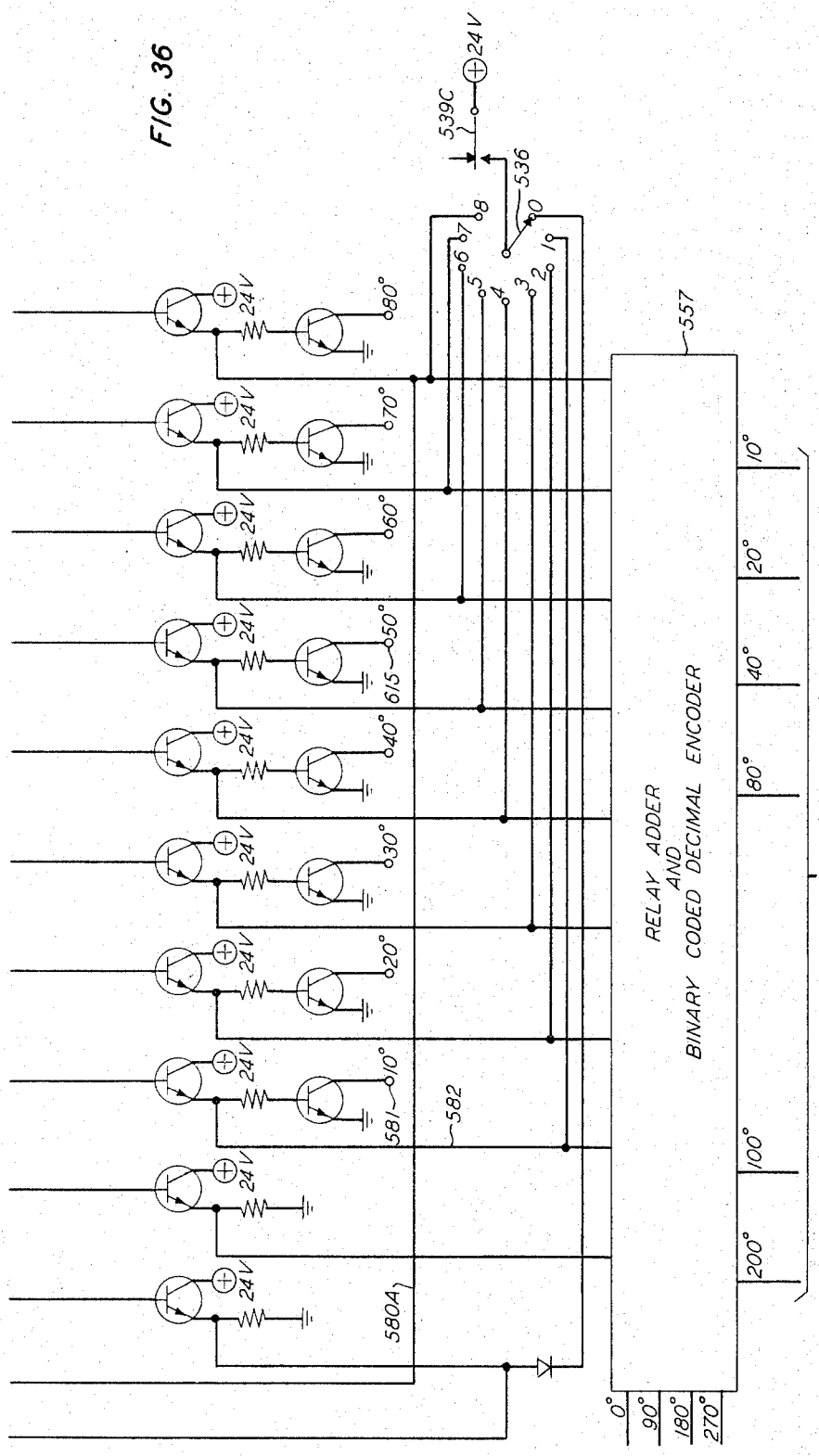
Figure 37:
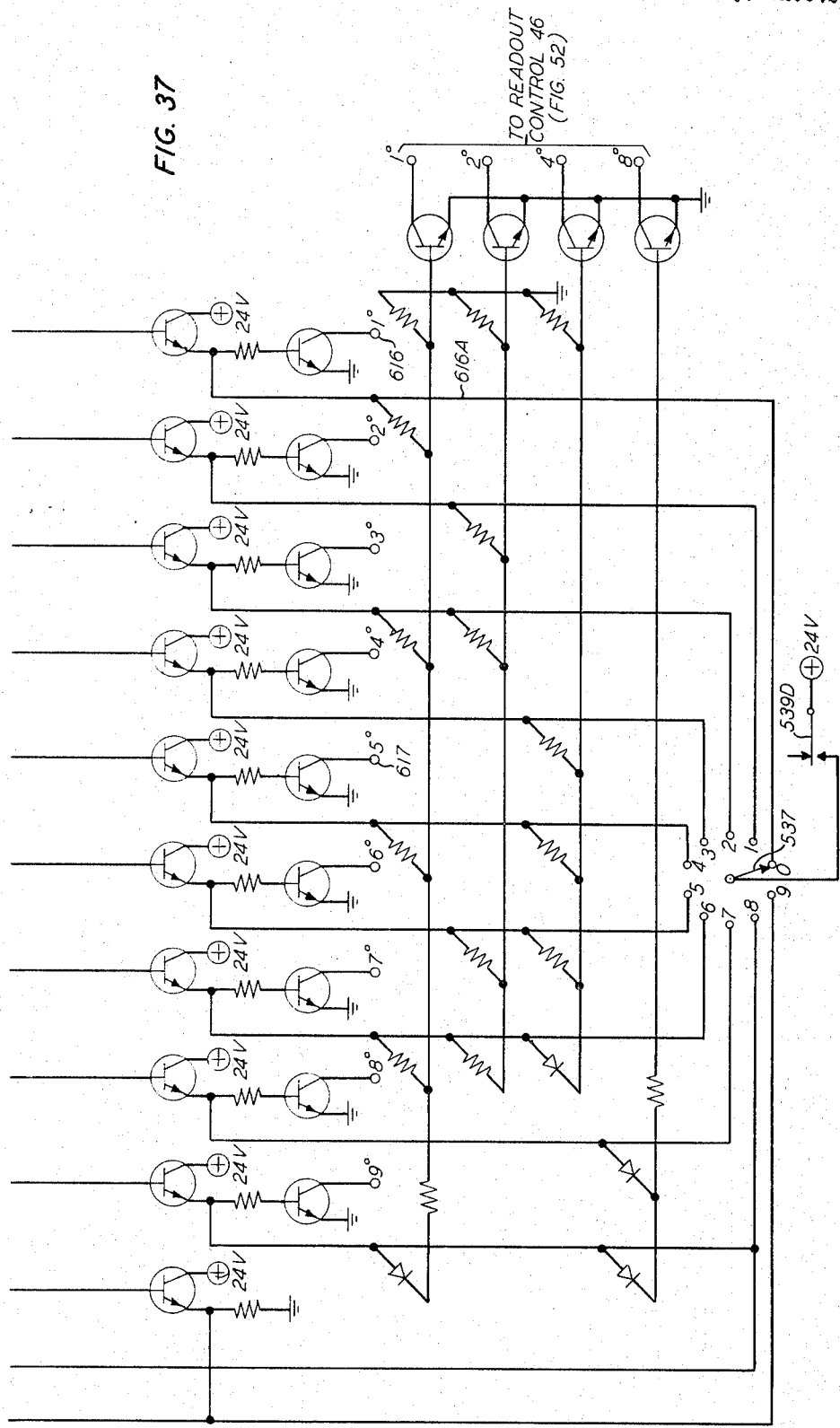

In a similar manner swinger 538 in FIG. 38 and its associated knob 534 are simultaneously movable to the remaining 2 and 4 through 9 positions to activate read out control 46 in FIG. 4 for recording discrete steps of 0.2 degree and 0.4 degree through 0.9 degree in phase read out 80B in FIG. 13; swinger 537 in FIG. 37 and its associated knob 533 in FIG. 13 are simultaneously actuable in FIGS. 37 and 13 from their 1 through 9 positions to activate read out control 46 in FIG. 4 for recording discrete 1 degree through 9 degree steps in phase read out 80B in FIG. 13, and to actuate calibrated phase standard 40 in FIG. 26 for adding discrete 1 degree through 9 degree phase shift networks thereinto; knob 532 and swinger 536 in FIGS. 13 and 36, respectively, are simultaneously actuated from their 1 through 8 positions to activate read out control 46 in FIG. 4 for recording discrete 10 degree through 80 degree steps in phase read out 80B in FIG. 13 via binary adder and binary coded decimal encoder 557 of well-known structure in FIG. 3 in a manner explained below, and via turned on transistors to actuate calibrated phase standard 40 in FIG. 26 for adding discrete 10 degree through 80 degree phase shift networks thereinto.

Figure 35:
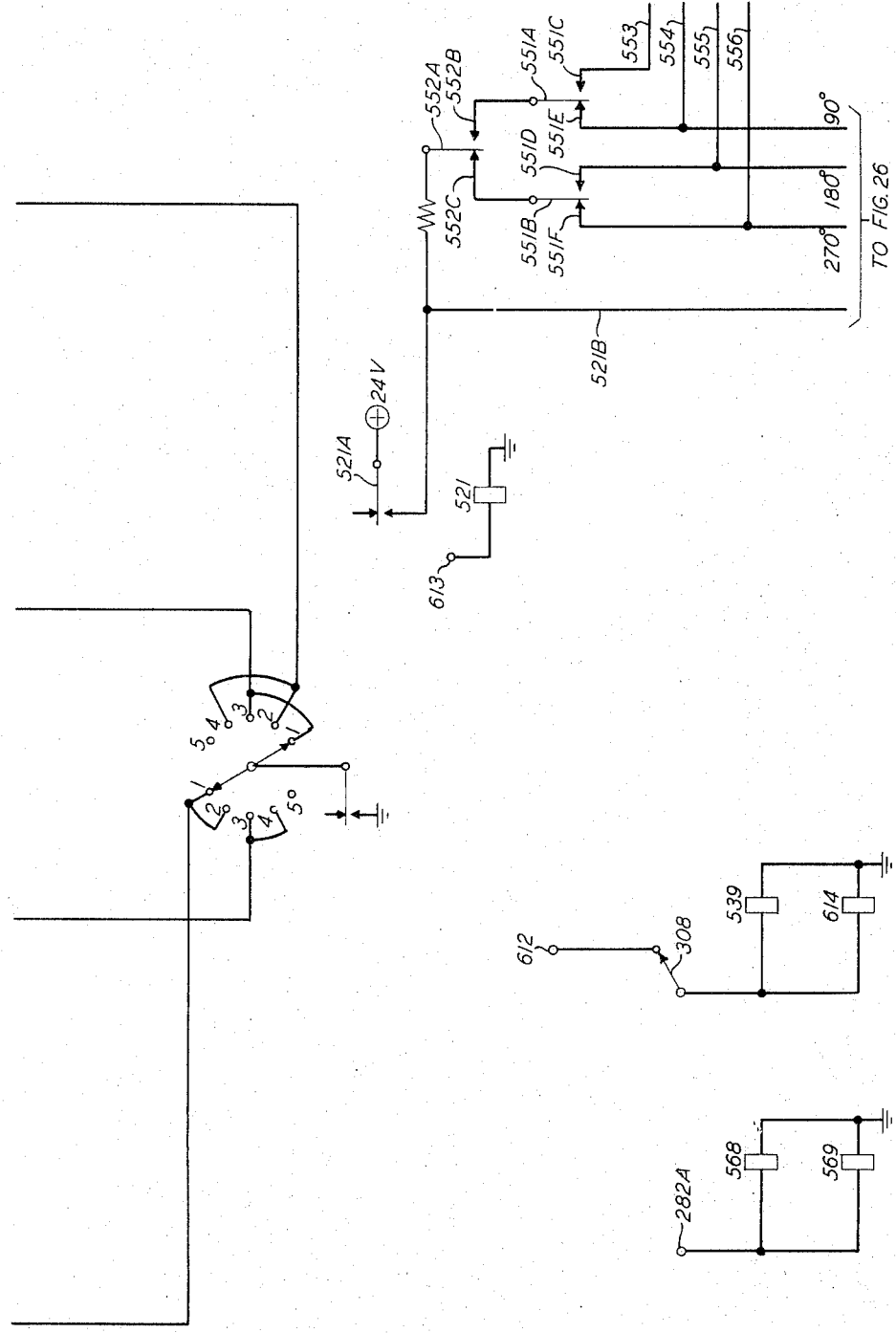

Knob 531 and swinger 550 in FIGS. 13 and 35 are simultaneously actuated from their 0 through 3 positions to control the operation of relays 551 and 552 for providing voltages on the 0 degree, 90 degree, 180 degree and 270 degree leads 553, 554, 555 and 556, respectively, in FIG. 35 in the following manner. When swinger 550 is actuated to its two 1 positions, and since relay 539 is now operated to close its swingers 539A and 539B on their associated ground terminals, relays 551 and 552 are operated to dispose their associated swingers 551A, 551B and 552A to engage their terminals 551C and 551D and 552B, respectively, for representing 0 degree phase shift in the quadrature steps as indicated by the 0 position of knob 531 in FIG. 13. When swinger 550 is actuated to its two 2 positions, relay 551 is again operated to engage its swinger 551A on open-circuit terminal 551C and its swinger 551B on its terminal 551D while relay 552 is released to allow its swinger 552A to engage its terminal 552C for representing 90 degree phase shift as indicated by the 1 position of knob 531 in FIG. 13. This applies intermittently a +24 volt potential to its 90 degree lead 555 under control of relay 521 which is intermittently operated under control of master control 104 in FIG. 5 in a manner and for a purpose both of which are later explained.

When swinger 550 is actuated to its two 3 positions and since relay 539 it still operated to engage its swingers 539A and 539B on its ground terminal, relay 551 is released to allow its swingers 551A and 551B to engage its terminals 551E and 551F and relay 552 is operated to actuate its swinger 552A to engage its terminal 552B for representing 180 degree phase shift as indicated by the 2 position of knob 531. This applies intermittently a +24 volt potential to its 180 degree lead 554 under the intermittent operation of relay 521 under control of master control 104 as just mentioned. When swinger 550 is actuated to its 3 position, relay 551 is released to allow its swinger 551B to engage its terminal 551F and relay 552 is released to allow its swinger 552A to engage its terminal 552C, while relay 539 is still operated to engage its swingers 539A and 539B on its ground terminal, for representing 270 degree phase shift as indicated by the 3 position of knob 531 in FIG. 13. This applies intermittently a +24 volt potential to its 270 degree lead 556 under the intermittent operation of relay 521 as influenced by master control 104 as above mentioned.

For adjusting the calibrated phase standard 40 in FIG. 26 to correspond with the voltages effective on leads 555, 554, and 556 at a given time, these leads are connected to corresponding leads in the calibrated phase standard to operate associated relays therein for connecting the appropriate phase shift networks thereinto. For example, a voltage on lead 556 operates relay 556A to connect the 270 degree phase shift network into this standard; and similarly voltages on leads 554 and 555 operate relays 554A and 555A, respectively, to connect the 180 degree and 90 degree phase shift networks into this standard.

For recording discrete 10 degree steps, as well as the 0 degree, 100 degree, 200 degree and 300 degree steps in phase read out 80B in FIG. 13, leads 553, 555, 554 and 556, respectively, in FIG. 35 are connected to corresponding leads associated with encoder 557 of well-known structure in FIG. 36, together with leads from the 0 through 8 positions of swinger 536. As a consequence of such inputs, encoder 557 provides in the well-known manner discrete voltages on its 10 degree, 20 degree, 40 degree, 80 degree, 100 degree and 200 degree output leads, in the well-known manner. The voltages on these output leads activate read out control 46 in FIG. 4 to record in phase read out 80B in FIG. 13 the amounts of phase shift steps represented by the corresponding phase shift networks connected into the calibrated phase standard 40 in FIG. 26.

While the foregoing operation of phase standard control 108 in FIGS. 4, 5 and 31–38 explains the manual operation of FIGS. 4 and 5 to add phase shift to calibrated phase shifter 40 in FIG. 26 and to activate read out control 46 in FIG. 4 for recording such additions in phase read out 80B in FIG. 13, it is obvious that knobs 531–534 and associated swingers 550, 536, 537 and 538 actuated in the reverse or clockwise directions effect disconnections of the discrete phase shift networks from the calibrated phase standard 40 in FIG. 26 and the corresponding subtractions of equivalent numerical amounts of such phase shift from phase read out 80B in FIG. 13.

For automatic operation, mode selector knob 308 is manually actuated to its automatic position AUTO in FIG. 13 for disconnecting a +24 volt potential from relay 539 which is thereupon released. This removes its swingers 539A and 539B from ground in FIG. 35, and its swingers 539C, 539D and 539E from the +24 volt potential in FIGS. 36, 37 and 38, respectively, thereby deactivating knobs 531–534 in FIG. 13 and associated swingers 536, 537 and 538, respectively, in FIGS. 36, 37 and 38. This renders the previously described manual control ineffective for further operating the phase standard control 108 in FIGS. 4, 5 and 31–38 to activate read out control 46 in FIG. 4 and the connection or disconnection of discrete phase shift networks into or from calibrated phase standard 40 in FIG. 26.

Assuming the phase unbalance is greater than 90 degrees, a voltage effective at terminal 560 in FIG. 31A from lead 514, in FIG. 27 operates relay 561 which actuates its swinger 562 to connect a +24 volt potential at terminal 559 to relay 563 and to lamp 564 in FIGS. 13 and 31A. This lamp is illuminated to indicate that the phase unbalance is greater than 90 degrees. Relay 563 actuates its swinger 564A to terminal pair 565 for applying timing pulses applied to terminal 530 and originating in clock 28 in FIG. 5 to flip-flop 566 and flip-flop 567 for adding or subtracting 90 degree, 180 degree and 270 degree amounts of phase shift depending on the operation of relays 568, 569 and 552 as later explained.

Figure 32:
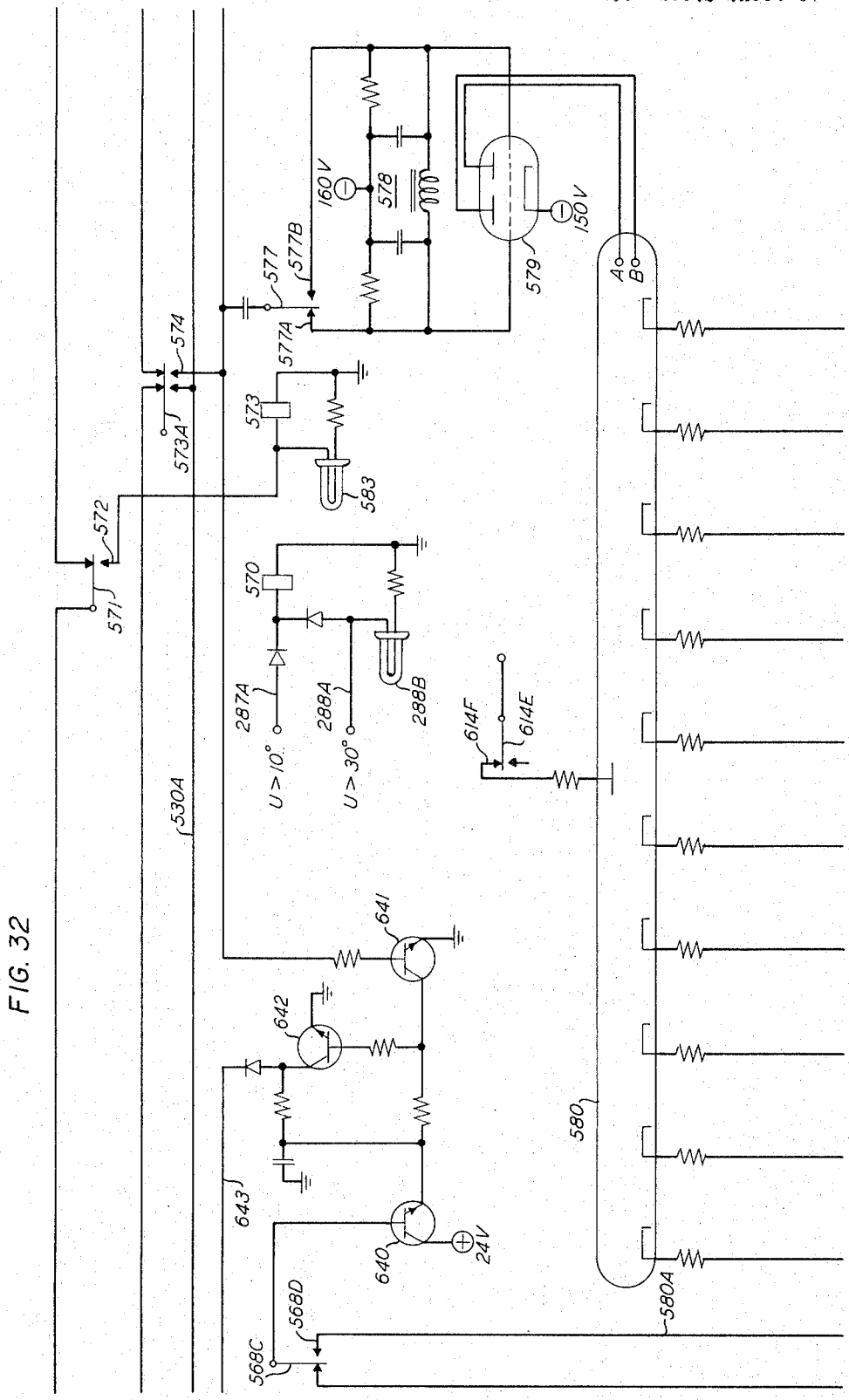

Assuming the phase unbalance is greater than 30 degrees but less than 90 degrees, the voltage on lead 288A in FIG. 31 applied to the same lead in FIG. 32 operates relay 570 and illuminates lamp 288B in FIGS. 13 and 32 for indicating that the phase shift is greater than 30 degrees. In operating, relay 570 actuates its swinger 571 to engage terminal 572 whereby the +24 volt potential at terminal 559 in FIG. 31A applied on leads 559A in FIGS. 31A and 32 operates relay 573. This relay operates to activate its swinger 573A to engage terminal pair 574 to apply the timing pulses at terminal 530 via leads 530A in FIG. 31A and 32, swinger 577, delay network 578 and twin triode 579 to terminals A and B of counting tube 580. Depending on the position of swinger 577 on its associated terminal 577A or 577B, the timing pulses reverse or advance the discharge between the 1 through 10 cathodes to subtract or add 10 degrees in the manner hereinbefore described with reference to the explanation of the operation of loss counting tubes 341, 347, 351 and 355 in FIGS. 19 and 20. For example, when counting tube 580 discharges at its 1 cathode, in the adding or subtracting direction, it provides a voltage on lead 581 to operate relay 581A for adding a ten degree phase shift network to the calibrated phase standard 40 in FIG. 26, and a voltage on lead 582 to encoder 548 to activate read out control 46 in FIG. 4 for adding 10 degrees to the reading of phase read out 80B in FIG. 13.

Similarly, as counting tube 580 is stimulated to reverse the discharge from the 10 cathode to its 1 cathode or to advance the discharge from its 1 cathode to its 10 cathode, corresponding leads in FIG. 36 connected to the respective cathodes in FIG. 32 are provided with voltages which serve to add phase shift networks to the calibrated loss standard 40 in FIG. 26 and to activate read out control 46 in FIGS. 4 and 26 for effecting additions to the phase read out 80B in FIG. 13. For reasons hereinafter stated, a discharge at cathodes 9 or 10 of counting tube 580 represents the zero state and therefore does not cause the insertion of any phase shifting networks in the calibrated phase standard or any addition to the phase read out.

Assuming the phase unbalance is more than 10 degrees but less than 30 degrees, the +24 volt potential on lead 287A in FIG. 31 applied to the same lead 287A in FIG. 32 operates relay 570 which actuates its swinger 571 to engage its associated terminal 572. Now, the +24 volt potential effective at terminal 559 in FIG. 31A applied via leads 559A in FIGS. 31A and 32 operates relay 573 and illuminates lamp 583 in FIGS. 13 and 32 for indicating that the phase unbalance is greater than 10 degrees. Operated relay 573 applies the timing pulses at terminal 530 in FIG. 31A via leads 530A in FIGS. 31A and 32, swinger 573A engaging terminals 574 and the circuit previously traced to terminals A and B of counting tube 580. This tube is activated to step the discharge among its respective cathodes in FIG. 32 to provide potentials on corresponding leads in FIG. 36. The voltages on these leads serve to add phase shift networks to calibrated phase standard 40 in FIG. 26, and to activate read out control 46 in FIGS. 4 and 26 for effecting corresponding additions to phase read out 80B in FIG. 13.

Figure 33:
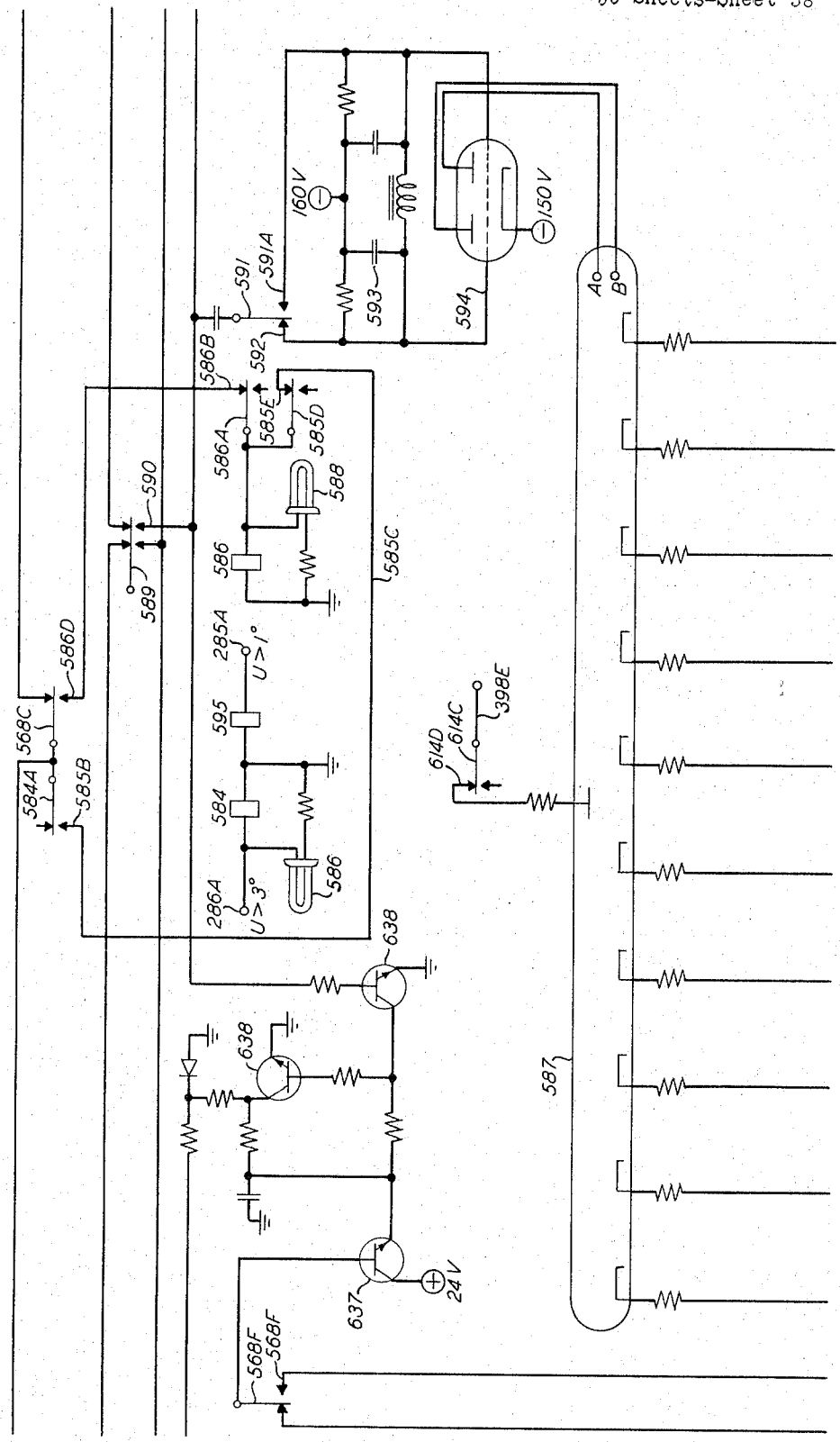

Assuming phase unbalance is greater than 3 degrees, the +24 volt potential on lead 286A in FIG. 31 is applied to the same lead 286A in FIG. 33, operates relay 584 and illuminates lamp 585 in FIGS. 13 and 33 for indicating that the phase unbalance is greater than 3 degrees. Operated relay 584 actuates its swinger 584A to engage its associated terminal 585B to apply the +24 volt potential at terminal 559 in FIG. 31A in a circuit including leads 559A in FIGS. 31A, 32 and 33, swinger 584A engaging contact 585B in FIG. 33 and lead 585C to swinger 585D engaging terminal 585E. As relay 398 in FIG. 18 was operated in response to a loss unbalance greater than 90 db as hereinbefore explained, then swinger 585D is disengaged from its terminal 585E and relay 586 in FIG. 33 is not operated. This limits the phase measurement to a sensitivity of 10 degrees. Since relay 398 in FIG. 18 is operated, its swinger 398A is disengaged from its terminal 398B in FIG. 19 to disconnect operating voltage from counting tube 347 in FIG. 19 and its associated lead 398E in FIGS. 19 and 33 whereby operating power is also disconnected from counting tube 587 in FIG. 33.

On the other hand, if relay 398 were released to engage its swinger 585D with its terminal 585E in FIGS. 18 and 33 and relay 395 were operated to disengage its swinger 586A from its terminal 586B in FIGS. 18 and 33 for indicating a loss measurement equal to or greater than 80 db, but less than 90 db, then relay 586 is operated and lamp 588 is lit for indicating the phase unbalance is greater than 1 degree. Operated relay 586 actuates its swinger 589 to engage terminal pair 590 whereby the timing pulses at terminal 530 in FIG. 31A supplied on leads 530A in FIGS. 31A, 32 and 33 are applied via swinger 589 engaging terminals 590, swinger 591 engaging terminal 592, delay network 593 and twin triode 594 to terminals of counting tube 587. As relay 398 is released in FIG. 18, power is restored to lead 398E in FIG. 19 and thereby to the same lead 398E in FIG. 33 whereby counting tube 587 is activated. This tube is stepped to discharge among its respective cathodes to provide potentials on corresponding leads in FIG. 37. The voltages on these leads serve to add phase shift networks to calibrated phase standard 40 in FIGS. 4 and 26, and to activate read out control 46 for effecting corresponding additions to phase read out 80B in FIG. 13.

When a voltage is effective on leads 285A in FIGS. 31 and 33 indicating a phase unbalance greater than 1 degree and relays 395 and 398 in FIG. 18 are released, then relay 595 in FIG. 33 is operated to close its swinger 586A on terminal 586B to permit the +24 volt potential at terminal 559 and on leads 559A in FIGS. 31A, 32 and 33 to operate relay 586 in an obvious circuit and to illuminate lamp 588 in FIGS. 13 and 33 to indicate the 1 degree phase unbalance. This operation of relay 586 steps counting tube 587 in the manner and for the purpose explained above.

Figure 34:
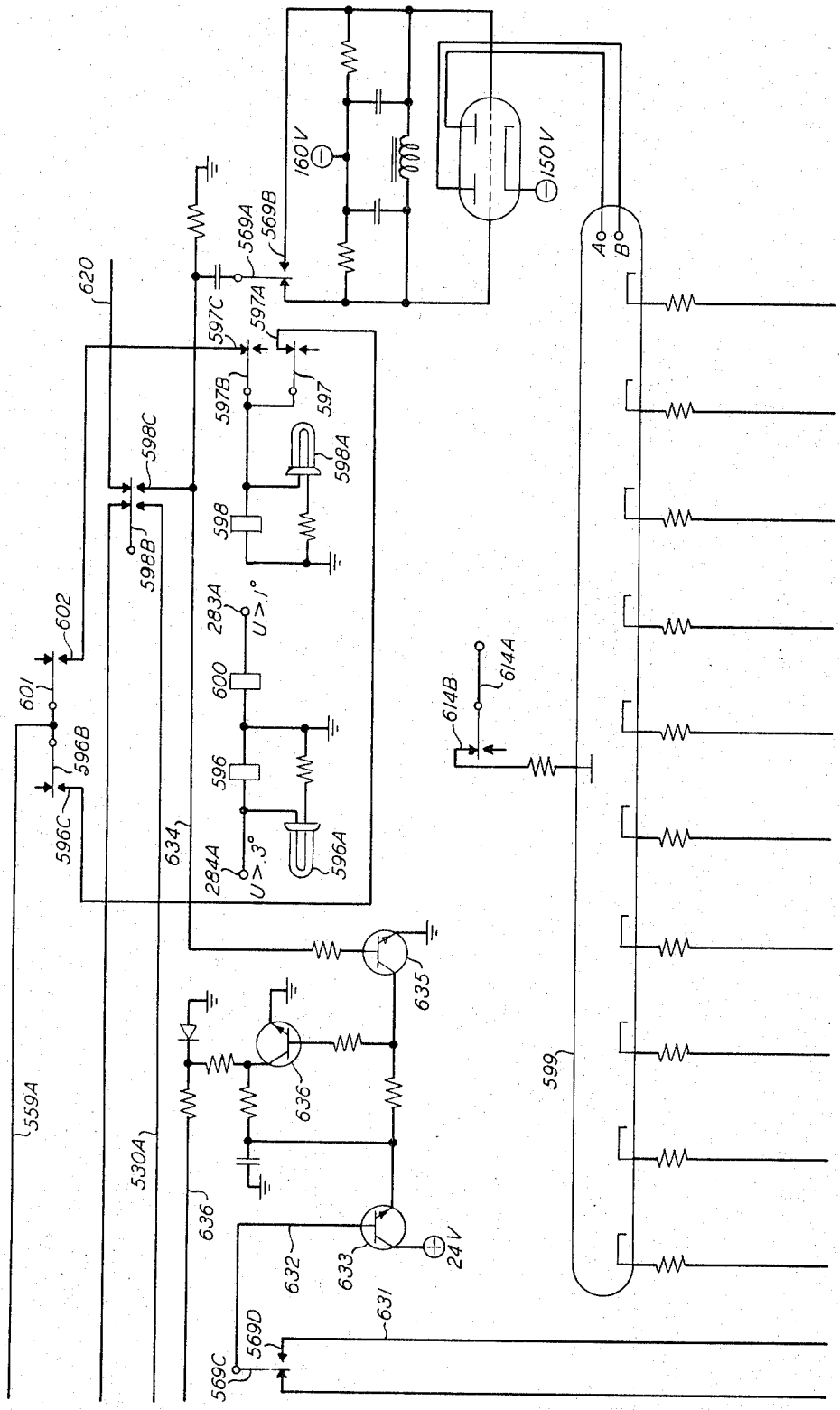

When the phase unbalance is greater than 0.3 degree, the +24 volt potential on leads 284A in FIGS. 31 and 34 operates relay 596 in FIG. 34 and illuminates lamp 596A for indicating the latter unbalance in FIGS. 13 and 34. The operation of relay 596 closes its swinger 596B on terminal 596C for transmitting the +24 volt potential at terminal 559 and on leads 559A in FIGS. 31A, 32, 33 and 34 to swinger 597 disengaged from terminal 597A in FIGS. 18 and 34. This is so because its associated relay 391 in FIG. 18 is operated due to the fact that the loss standard at the moment is set equal to or greater than 60 db as above explained. The phase unbalance is therefore being measured at the sensitivity of 1 degree phase shift as above noted. When the loss being measured is less than 60 db but greater than 40 db, relay 391 is released to engage its swinger 597 on its terminal 597A and relay 388 operated in FIG. 18 to disengage its swinger 597B from its terminal 597C for enabling the +24 volt potential on lead 559A in FIG. 34 to operate relay 598 and to illuminate lamp 598A in FIGS. 13 and 34. This indicates that the phase unbalance is equal to or greater than 0.1 degree.

In operating, relay 598 closes its swinger 598B on its terminal pair 598C to permit the timing pulses at terminal 530 and on leads 530A in FIGS. 31A, 32, 33 and 34 to step counting tube 599 in the manner mentioned above for similar counting tubes 580 and 587 in FIGS. 32 and 33. The stepping of counting tube 599 serves to add phase shift networks to the calibrated phase standard 40 in FIG. 26 and at the same time to activate read out control 46 in FIGS. 4 and 26 to add to the reading of phase read out 80B in FIG. 13 in the manner previously explained.

When a +24 volt potential is effective on lead 283A in FIGS. 31 and 34, relay 600 is operated to close its swinger 601 on terminal 602. If relay 388 in FIG. 18 is released at this time to close its swinger 597B on its terminal 597C, the +24 volt potential at terminal 559 and effective on leads 559A in FIGS. 31A–34 operates relay 598 again to step counting tube 599 for measuring phase shift unbalance at a 0.1 degree sensitivity in the manner and for the purpose above explained.

*Manual phase measurement—FIGS. 4, 5, 13, 14, 15 and 39*

This is described essentially with reference to the insertion phase measuring system shown in FIG. 39, which is identical with the corresponding phase measuring circuit shown in FIGS. 4 and 5 except for the addition of phase standard control 108. For this measurement, knob 308 in FIG. 13 is manually actuated to its manual position MAN; button 490 A in FIG. 13 is actuated to supply operating power to the required leads included in the circuits of the several figures, as indicated by the illumination of lamp 490B in FIG. 13; unknown electrical device 19 having an unknown magnitude of phase to be measured is connected between terminals 491A and 491B in FIGS. 4 and 14; the frequency of the testing voltage is selected at 400 cycles per second by appropriate adjustments of coarse knob 69 and vernier capacitor 83 associated with the testing oscillator in FIGS. 3 and 15; illuminated film scale portion 77A in FIG. 15 provides the 400-c.p.s. reading on film scale 77A in FIG. 13; and level control switch 152 in FIG. 15 associated with level control 66 in FIG. 7 is actuated to provide the desired level of the testing operation at hand.

In view of the use of the 400-c.p.s. testing frequency, filter 111 is connected into the measuring circuit of FIG. 5 by pushing button 493A in FIG. 13. This provides ground for relay 112 in FIG. 5 which operates to move its swinger 113 into engagement with associated contact 115 thereby connecting filter 111 into the measuring circuit of FIG. 5. This connection is indicated by the illumination of lamp 496 in FIG. 13. The frequency counter 35 in FIG. 4 is operated on a 1-second time base to provide an accuracy of 1 c.p.s. by actuating push button 497 whose operation is indicated by the illumination of lamp 498 in FIG. 13.

It is understood that the measuring circuit of FIG. 39 also includes level controls 66 and 103, and gain controls 100 and 101 of FIG. 25 which are omitted in FIG. 39 for the purpose of simplifying the present explanation. It is therefore apparent that so much of the circuitry of FIG. 25 as is necessary for the operation of the circuit of FIG. 39 is included in the latter and referred thereto for this description. Clock 28 in FIG. 37 provides timing pulses via lead 28A at the 1.6 c.p.s. rate.

In addition to the adjustments of the phase measuring circuit of FIGS. 4, 5 and 39 as above mentioned, knob 610 in FIG. 13 is actuated to select the one degree scale in FIG. 13 and master control 104 in FIG. 5 is operated to provide a +24 volt potential at terminal 612 for operating relays 539 and 614 in FIG. 35 in a manner and for a purpose that are subsequently explained. The operation of relay 614 actuates its swinger 614A to engage its associated open-circuit terminal 614B for removing operating power from counting tube 599 in FIG. 38; it actuates its swinger 614C to engage its open-circuit terminal 614D for removing operating power from counting tube 587 in FIG. 37; and its activates swinger 614E to engage its open-circuit terminal 614F for removing operating power from counting tube 580 in FIG. 36. The operation of relay 539 in FIG. 35 closes its swingers 539A and 539B to ground, and its swingers 539C, 539D and 539E in FIGS. 36, 37, and 38, respectively, to a +24 volt potential. At this time knobs 531, 532, 533, and 534 in FIG. 13 and associated swingers 550, 536, 537, and 538 in FIGS. 35, 36, 37, and 38, respectively, are actuated to their 0 positions as indicated by their registrations with their associated indices 96 in FIG. 13. Since knob 531 is on its 0 position in FIG. 13, then its associated swinger 550 is on its 0 contacts whereby associated relays 551 and 552 in FIG. 31A are operated to provide a voltage on terminal 551C for indicating 0 degree phase shift as above explained.

Assuming, for example, device 19 in FIGS. 4 and 39 has an unknown magnitude of phase shift equal to 145.8 degrees for the purpose of this explanation, this unknown magnitude is measured on a manual basis in the following manner. Since lamp 564 associated with knob 531 is now illuminated in FIG. 13, the craftsman recognizes at once that the unknown phase shift is equal to or greater than 90 degrees as evidenced by the assumed example. Initially, knob 531 is actuated to its 1 position thereby moving its associated swinger 550 in FIG. 35 to its two 2 positions for energizing relay 551 and de-energizing relay 552 in FIG. 31A. This provides a voltage on lead 555 in FIG. 35 in the manner above explained; this voltage on the same lead 555 in FIG. 26 energizes relay 555A to connect the 90 degree phase shift network into the calibrated phase standard 40. At the same time, the voltage on lead 555 is also applied to encoder 557 in FIG. 36 which is thereby activated to provide voltages on its 10 degree and 80 degree output leads. The voltages on these two leads stimulate read out control 46 in FIG. 4 to record 90 degrees in phase read out 80B in FIG. 13, in a manner that is later explained.

Lamp 564 is turned off and lamp 288B in FIG. 13 is turned on to indicate to the craftsman that the unknown magnitude of phase shift is greater than 90 degrees but less than 180 degrees. Next decade knob 532 is actuated to its 1 position for moving its associated swinger 536 to its 1 position in FIG. 36 thereby providing a +24 volt potential on 10 degree lead 581. This voltage on the same lead 581 in FIG. 26 operates relay 581A to connect the 10 degree phase shift network into the calibrated phase standard 40; and at the same time it is applied to encoder 557 in FIG. 36 for activating read out control 46 which records an additional 10 degrees in phase read out 80B in FIG. 13 or a total of 100 degrees therein. Knob 532 in FIG. 13 and its associated swinger 536 in FIG. 36 are rotated from their 1 positions until its associated lamp 583 is turned off and lamp 588 associated with knob 533 is illuminated. This occurs when knob 532 and swinger 536 reach their 5 positions to provide a voltage on lead 615 in FIGS. 36 and 26 whereby a 50 degree phase shift network is connected into the calibrated phase standard in addition to the 90 degrees network and read out control 46 is activated to record an additional 50 degrees in phase read out 80B in FIG. 13 or a total of 140 degrees therein. At this time, the craftsman recognizes that the unknown magnitude of phase shift in device 19 is greater than 140 degrees but less than 150 degrees.

Knob 533 in FIG. 13 is now rotated to its 1 position and thereby its associated swinger 537 in FIG. 37 to its 1 position for providing a voltage on 1 degree lead 616 in FIGS. 37 and 26 whereby the 1 degree phase shift network is connected into the calibrated phase standard 40 in FIG. 26 and read out control 46 in FIG. 4 is activated to record an additional 1 degree in phase read out 80B in FIG. 13 or a total of 141 degrees therein. Knob 533 in FIG. 13 and its associated swing 537 in FIG. 37 are rotated from their 1 positions until its associated lamp 588 is turned off and lamp 598A is illuminated. This happens when knob 533 and associated swinger 537 attain their 5 positions to provide a voltage on 5 degree lead 617 in FIG. 37 whereby a 5 degree phase shift network is connected into the calibrated phase standard 40 in FIG. 26 and read out control 46 in FIG. 4 is activated to add an additional 5 degrees in phase read out 80B in FIG. 13 or a total of 145 degrees therein. At this time, the craftsman is aware that the unknown magnitude of phase shift in device 19 is greater than 145 degrees but less than 146 degrees.

Knob 534 in FIG. 13 and swinger 538 in FIG. 38 are simultaneously rotated to their 1 positions for providing a voltage on lead 544 in FIGS. 38 and 26 whereby the 0.1 degree phase shift network is connected into the calibrated phase standard 40 in FIG. 26 and read out control 46 in FIG. 4 is activated to record an additional 0.1 degree in phase read out 80B in FIG. 13 or a total of 145.1 degrees. Knob 534 and swinger 538 are again rotated from their 1 positions until their associated lamp 598A is turned off. This occurs when knob 534 and associated swinger 538 reach their 8 positions to provide a voltage on 0.8 degree lead 618 in FIG. 38 whereby a 0.8 degree phase shift network is connected into the calibrated phase standard 40 and read out control 46 is activated to add an additional 8 degrees in phase read out 80B in FIG. 13 or a total of 145.8 degrees therein. At this time, the craftsman recognizes that the measurement of the unknown magnitude of phase shift in device 19 is completed and totals 145.8 degrees which is equal to the amount of the assumed example.

*Automatic phase measurement—FIGS. 4, 5, 13, 14, 15 and 28–39*

For this purpose it is assumed again that the insertion phase shift is to be measured at 145.8 degrees for a 400-c.p.s. testing voltage adjusted to the level selected for the above-described manual phase shift measurement. Knob 308 in FIG. 13 is moved to its automatic position AUTO whereby power is removed from terminal 612 to de-energize relays 539 and 614 in FIG. 35. Release of relay 539 disengages swingers 539A and 539B from their associated ground in FIG. 35 thereby disabling swinger 550 with regard to controlling the operation and release of relays 551 and 552 for providing voltage on leads 553, 554, 555 and 556 in the manner previously explained. Release of relay 614 permits its swingers 614A, 614C and 614E to engage their associated terminals 614B, 614D and 614F, respectively, in FIGS. 32, 33 and 34 for applying power to the anodes of counting tubes 580, 587 and 599 which are thereby reactivated.

Unknown electrical device 19 remains connected between terminals 491A and 491B in FIGS. 4, 14 and 39. Button 490A in FIG. 13 is pressed to supply operating power to activate the measuring circuit of FIGS. 4, 5 and 39 as indicated by its associated lamp 490 B. Level control switch in FIGS. 7 and 25 is adjusted to supply the desired level of 400-c.p.s. testing voltage to the unknown device 19 in FIG. 14, coarse tuning knob 69 and vernier capacitor 83 in FIG. 6 are adjusted to provide the 400- c.p.s. testing voltage as indicated by film scale portion 77A in FIG. 16. Knob 50A in FIG. 14 is disposed in its programmed position for measuring the accuracy of the testing voltage with a 10-second time base during the frequency read out of each portion of measuring cycle. Knob 610 is actuated to select the 1 degree scale for phase null meter 43 in FIG. 13.

A high portion of cam 72 closes switch 73 to provide ground on lead 112A in FIG. 3 for energizng relay 112 which operates to engage its associated contact 115 for connecting filter 111 into the measuring circuit in FIG. 5. Clock 28 provides timing pulses at a 1.6 c.p.s. rate via lead 28A to relays 27, 39 and 518 in FIGS. 4, 5, 27 and 39. Finger knob 191 of manual precision control of balance in automatic mode 190 is adjusted to provide a 0.1 degree balance in FIGS. 14 and 18.

As the signal-to-noise ratio at the input of phase detector 37 in FIGS. 27 and 39 decreases as the measured loss increases, the automatic control shown in FIG. 18 and hereinbefore described is automatically rendered effective during the automatic operation. This is indicated in Table B below:

TABLE B

| Measured loss, db: | Precision of Automatic balance, degrees |
|---|---|
| 0–39 | 0.1 |
| 40–59 | 0.3 |
| 60–79 | 1.0 |
| 80–89 | 3.0 |
| 90–119 | 10.0 |

Where a high precision of automatic balance of phase shift is not required, finger knob 191 of the precision control 190 in FIGS. 14 and 18 is adjustable to provide a lower precision as hereinbefore mentioned.

The circuit of FIGS. 4, 5, 27 and 39 is now adjusted for automatically balancing the phase shift of calibrated phase standard 40 against that of unknown device 19 at the 400-c.p.s. testing voltage; and for this purpose phase standard control and the calibrated phase standard are assumed to be initially set to zero degrees phase shift. For this explanation, the unknown magnitude of the phase shift of device 19 at 400 cycles per second is assumed to be 145.8 degrees.

Clock 28 is supplying 1.6 c.p.s. timing pulses to master control 104 in FIG. 39 which, for the purpose of this explanation, is a closed switch 104B and which is later described. This switch applies the timing pulses to gating 108B included in phase standard control 108. Phase detector 37 in FIGS. 27 and 39 supplies a signal A on lead 165A as one input to summing amplifier 233A in FIG. 28A included in discrete phase detector 109 in FIG. 39. Signal A has a sign and amplitude corresponding to the phase difference between unknown device 19 and calibrated phase standard 40 in FIG. 27 as above mentioned. Signal B on lead 179A provides an open circuit condition indication so long as an unbalance exists between the phase unknown device 19 and calibrated phase standard 40, and replaces this open circuit with a ground on lead 179A when a phase balance occurs between unknown device 19 and calibrated phase standard 40, as hereinbefore explained. Phase detector 37 provides a signal C on lead 514 which is effectively 0 volts if the input of threshold detector 513 indicates that the phase unbalance is below 90 degrees and provides a voltage on lead 514 from the output of threshold detector 513 when the phase unbalance is equal to or greater than 90 degrees. The ground on lead 179A which is transmitted through the phase standard control via relay swingers 564A in FIG. 31A, 573A in FIG. 32, 589 in FIG. 33 and 598B in FIG. 34 when their corresponding coils are de-energized is utilized by the master control to indicate a balance between the phase of unknown device 19 and calibrated phase standard 40 in a manner hereinafter described regarding the operation of master control 104 in FIGS. 5 and 39. The positive and negative signs of signal A on lead 165A stimulate the calibrated phase standard in such sense that a positive sign serves to add discrete phase shift networks to the calibrated phase standard whereas a negative sign serves to disconnect discrete phase shift networks therefrom, in a manner that is subsequently explained.

Since the phase shift in the calibrated phase standard is 0 degree at the moment and the phase shift of the unknown device is 145.8 degrees as assumed, the outputs of the reference and unknown pats reprsented by the respective charges on capacitors 525 and 529 provide a positive analog voltage on lead 165A as signal A in FIGS. 27 and 39. This signal is supplied as one input to summing amplifier 233A in FIG. 28A included in discrete phase detector 109 in FIG. 39. At the same time timing pulses supplied by clock 28 in a manner explained later via diode 202A reset the 15 stages of shift register 203A in FIG. 28B, and applied via diode 205A and lead 206A stop electronic switch 208A in FIG. 28A thereby blocking the transmission of pulses of 10-kc. pulse generator 211A to lead 212A and thereby from the shift register.

The timing pulse on lead 206A in FIG. 28B sets flip-flop 215A which transmits a −12 volt potential from its 1-side output on lead 217A in FIGS. 28A and 28B to set the 1 flip-flop in the shift register thereby placing a logic 1 in the 1-side output of stage 1. The −12 volt potential from the 1-side output of flip-flop 215A in the set state resets itself via delay network 218A thereby applying a −12 volt potential from its 0-side output and via differentiator network 219A to set flip-flop 209A. In the set state this flip-flop supplies from its 1-side output a −12 volt potential to enable AND gate 210A which transmits the 10 kc. from generator 211A via enabled AND gate 210A to lead 212A in FIG. 28A for advancing the logic 1 stage-by-stage in the shift register 203A in FIG. 28B. The outputs from the 1-side and 0-side outputs of the respective stages of the shift register produce the descending staircase voltage in FIG. 30 at the discrete voltage dividers comprising resistors R1–R7 and common resistor 227A in FIG. 28A as previously explained. This positive staircase voltage is applied on lead 231A as a second input to summing amplifier 233A. This amplifier sums continuously the analog voltage on lead 165A and the respective steps of the staircase voltage so that at the instant when the effective output of the summing amplifier passes through zero, blocking oscillator 234A in FIG. 28A is triggered to reset flip-flop 209A which disables AND gate 210A, thereby blocking the transmission of 10-kc. pulses of generator 211A to shift register 203A in FIGS. 28A and 28B.

This stops the advance of the logic 1 through the shift register at a point at which the magnitude of the staircase voltage of FIG. 30 on lead 231A in FIG. 28A most nearly equals the analog voltage on lead 165A. The shift register is thus stopped at stage 2 whereat the staircase voltage most nearly equals the analog voltage, that is, the phase unbalance is 145.8 degrees which is the difference between the assumed 145.8 degrees phase shift and 0 phase shift recorded in the calibrated phase standard 40 in FIGS. 27 and 39.

Figure 29A:
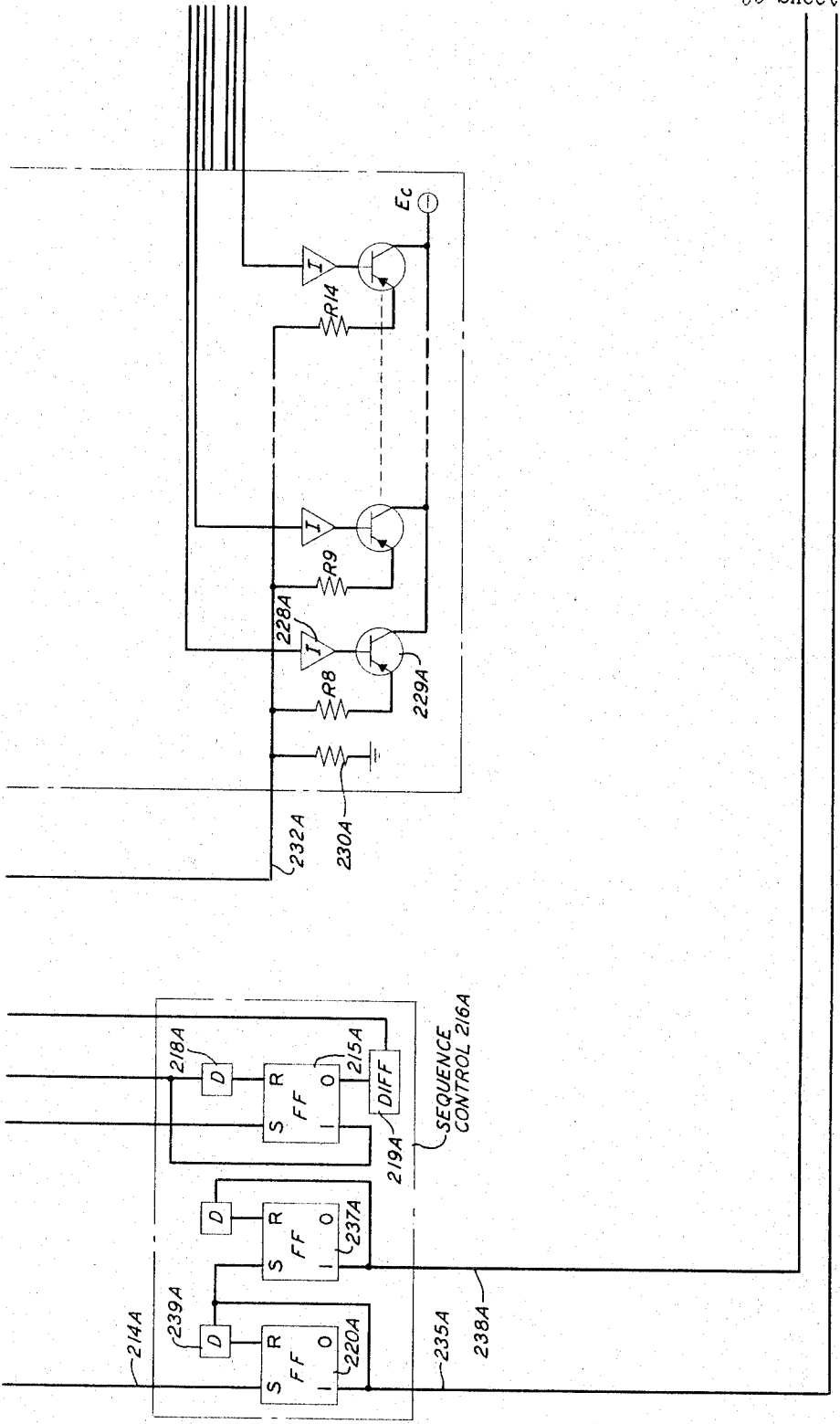

The −12 volt potential from the 0-side output of flip-flop 209A in the reset state in FIG. 28A applied via differentiator network 213A sets flip-flop 220A which supplies a −12 volt potential from its 1-side output to lead 235A in FIGS. 29B and 28A for resetting flip-flops 260A, 261A, 262A, 263A, 264A, 265A and 267A in flip-flop storage 236A in FIG. 31; and at the same time it sets flip-flop 237A in FIG. 29A which supplies a −12 volt potential on lead 238A in FIG. 29A to enable simultaneously the 7 AND gates included in flip-flop storage 236A, as hereinbefore explained regarding the operation of discrete phase detector 109 in FIGS. 5 and 39 and discrete loss detector 107 in FIGS. 5 and 25. The previous explanation indicates that the placement of the logic 1 in stages 1 through 7 of the shift register 203A in FIG. 28B served to operate relay 273A which applies a +24 volt potential on lead 282A for indicating phase shift additions are to be made to calibrated phase standard 40 in FIGS. 5, 26 and 39.

As relays 568 and 569 in FIG. 35 are released, all swingers connected to these relays in FIGS. 31A–34 indicate therein phase shift subtractions are to be made to the calibrated phase standard. The voltage on lead 282A in FIGS. 31 and 35 operates relays 568 and 569 which actuate their swingers to positions opposite to those shown in FIGS. 31A and 34 for the phase shift addition just mentioned.

Since the assumed phase shift is 145.8 degrees, the shift register stopped at stage 2 operates relay 280A in FIG. 31 to provide a +24 volt potential on its associated lead 288A for indicating a phase unbalance of 30 degrees or more. Since the assumed phase shift is 145.8 degrees, a voltage provided by the phase detector on lead 514 in FIG. 27 is applied to terminal 560 in FIG. 31A and relay 561 connected thereto. This relay operates to move its swinger 562 to engage terminal 562A so that the +24 volt potential available at terminal 559 is applied to lamp 564 and relay 563. This lamp is illuminated in FIGS. 13 and 31A to indicate to a craftsman that the unknown phase shift of device 19 is equal to or greater than 90 degrees. Relay 563 is operated to move its swinger 564A to engage its terminal 565.

Swinger 568A in FIG. 31A of operated relay 568 in FIG. 35 is closed on its terminal 568B; and since relay 552 is released, swinger 552D connected thereto engages its associated terminal 552E. Now, the timing pulse supplied by clock 28 in FIG. 5 and available at terminal 530 is applied via the circuit just traced to the bases of transistors 567A and 567B forming the transistor flip-flop 567. As transistors 567A and 566A are conducting and transistors 567B and 566B are cut off, the incoming pulse just mentioned institutes conduction in transistor 566B to release relay 552 and terminates conduction in transistor 566A. The continued operation of relay 551 and release of relay 552 due to the cut off of transistor 566A in flip-flop 566 provides a voltage on lead 555 in FIG. 35, as previously explained. This voltage operates relay 555A to connect the 90 degree phase shift network into calibrated phase standard 40 in FIG. 26 and to stimulate read out controls 46 in FIGS. 4, 5 26 and 39 to record 90.0 degrees in phase read out 80B in FIG. 13 as above mentioned. This completes the first balancing step in the phase measurement cycle.

In a similar manner, the next succeeding timing pulse provided by clock 28 in FIG. 28B places again the logic 1 in stage 1 of shift register 203A to operate relay 273A for applying the +24 volt potential on lead 282A to operate relays 568 and 569 in FIG. 35 and to advance the logic 1 to stage 2 of the shift register which is stopped thereat to operate relay 280A for applying a +24 volt potential to lead 288A in FIG. 31. At this point the phase unbalance is: 145.8—90=55.8 degrees. This potential on lead 288A in FIGS. 31 and 32 illuminates lamp 288B in FIGS. 13 and 32 and operates relay 570 in FIG. 32. The illumination of this lamp informs the craftsman that the phase unbalance is less than 90 degrees but more than 10 degrees. In operating, this relay moves its swinger 571 to engage its terminal 572 whereby the +24 volt potential at terminal 559 in FIG. 31A is applied on leads 559A in FIGS. 31A and 32 to relay 573. This relay operates to apply the timing pulse to terminals A and B of counting tube 580 which is stepped to transfer discharge from its 0 cathode to its 1 cathode for providing a voltage on leads 581 and 582 in FIG. 36. The voltage on lead 581 in FIGS. 26 and 36 operates relay 581A in FIG. 26 to connect a 10 degree phase shift network into the calibrated phase standard and at the same time the voltage on lead 582 stimulates read out control 46 in FIGS. 4, 26 and 39 to add 10 degrees to the reading of phase read out 80B in FIG. 13 to a total of 100 degrees. The remaining phase unbalance is 145.8—100=45.8 degrees.

In a similar manner, the next two timing pulses at clock 28 in FIG. 28B serves to apply discrete +24 volt potentials to lead 282A and discrete +24 volt potentials to lead 288A and thereby step counting tube 580 to discharge at its 2 and 3 cathodes in turn for adding a 20 degree and 30 degree phase shift network in turn to the calibrated phase standard in FIG. 26 while at the same time activating the read out control 46 in FIGS. 4, 26 and 39 to increase the reading of read out 80B in FIG. 13 in two successive 10 degree steps until a reading of 120.0 degrees is recorded therein. At this time lamp 288B in FIGS. 13 and 32 is illuminated to inform the craftsman that the phase unbalance is greater than 30 degrees. The remaining phase unbalance is: 145.8—120.0=25.8 degrees.

The next two timing pulses supplied by clock 28 in FIG. 28B serve to provide the discrete +24 volt potentials on lead 282A and 287A in FIG. 31. The potential on lead 287A in FIGS. 31 and 32 energizes relay 570 which operates to illuminate lamp 583 in FIGS. 13 and 32 and to step counting tube 580 to discharge at its 4 and 5 cathodes in turn for adding 40 degree and 50 degree phase shift networks in turn to the calibrated phase standard 40 in FIG. 26 and to stimulate read out control 46 in FIGS. 4, 26 and 39 to increase the reading of read out 80B in FIG. 13 by two steps of 10 degrees each to a total reading of 140.0 degrees. At this time lamp 583 indicates to a craftsman that the phase unbalance is less than 10 degrees. The remaining phase unbalance is: 145.8—140.0=5.8 degrees.

The next timing pulse supplied by clock 28 in FIG. 28B serves to provide discrete +24 volt potentials on leads 282A and 286A in FIG. 31. The potential on lead 286A in FIGS. 31 and 33 illuminates lamp 585 in FIGS. 13 and 33 for indicating the loss is greater than 3 degrees and at the same time operates relay 584 in FIG. 33. Since device 19 under test in FIG. 39 has a measured 35.26 db loss, relays 395 and 398 in FIG. 18 are released as above explained. The operation of relay 584 in FIG. 33 moves its swinger 584A to engage its terminal 585B so that the +24 volt potential at terminal 559 and on leads 559A in FIGS. 31A, 32 and 33 is applied on lead 585C, swinger 585D closed on terminal 585E to illuminate lamp 588 in FIGS. 13 and 33 and to operate relay 586. The operation of relay 586 applies the timing pulse at terminal 530 and on leads 530A in FIGS. 31A, 32 and 33 to step counting tube 587 in FIG. 33 to discharge at its 1 cathode to provide voltage on its leads 616 and 616A in FIG. 37. The voltage on lead 616 operates the corresponding relay in FIG. 26 to add a 1 degree phase shift network to the calibrated standard; and the voltage on lead 616A stimulates read out control 46 in FIGS. 4, 26 and 39 to add one step of 1 degree to the reading of read out 80B in FIG. 13 to achieve a total reading of 141.0 degrees. The remaining phase shift is: 145.8—141.0=4.8 degrees.

In a similar manner, the next two timing pulses supplied by clock 28 in FIG. 28B serve to provide two discrete +24 volt potentials on leads 282A and 286A in FIGS. 31 and 33 to step counting tube 587 from its 1 cathode to its 2 and 3 cathodes in turn for adding 2 degree and 3 degree phase shift networks in turn to the calibrated phase standard 40 in FIG. 26 and for stimulating read out control 46 to add two steps of 1 each to the reading of read out 80B in FIG. 13 to a total reading of 143.0 degrees. The remaining phase shift unbalance is 145.8—143.0=2.8 degrees.

The next two timing pulses originating in clock 28 in FIG. 28B provide discrete +24 volt potentials on leads 282A and 285A in FIGS. 31 and 33. The potential on lead 285A operates relay 595 in FIG. 33 which moves its swinger 586A to engage its terminal 586B. Since the measured loss was 35.26 db, relays 395 and 398 in FIG.

18 are released. This enables the +24 volt potential at terminal 559 and on leads 559A in FIGS 31A–33 to illuminate lamp 588 in FIGS. 13 and 33 and to operate relay 586 to step counting tube 587 from its 3 cathode to its 4 and 5 cathodes in turn for adding 4 degree and 5 degree phase shift network to the calibrated phase standard 40 in FIG. 26 and for stimulating read out control 46 to add two steps of 1.0 degree each to the reading of read out 80B in FIG. 13 to a total reading of 145.0 degrees. The remaining phase shift unbalance is: 145.8−145.0=0.8 degree.

The next timing pulse supplied by clock 28 in FIG. 28B provides discrete +24 volt potentials on lead 282A and 284A in FIGS. 31 and 34. The potential on lead 284A in FIG. 34 operates relay 596 in FIG. 34 and illuminates lamp 596A in FIGS. 13 and 34 for indicating to a craftsman that the phase shift unbalance is greater than 0.3 degree but less than 1 degree. Since relays 388 and 391 in FIG. 18 are released in the light of the measured 35.26 db loss, the +24 volt potential at terminal 559 and on leads 559A in FIGS. 31A–34 is applied via the circuit previously identified to operate relay 598 and to illuminate lamp 598A in FIGS. 13 and 34. The timing pulses at terminal 530 and on leads 530A in FIGS. 31A–34 step the discharge in counting tube 599 from the zero to the five cathode in succession to add 0.1 degree through 0.5 degree phase shift networks in turn to the calibrated phase standard 40 in FIG. 26 and for stimulating read out control 46 in FIGS. 26 and 39 to add 5 steps of 0.1 each to the reading of read out 80B in FIG. 13 to total 145.5 degrees. The remaining phase shift unbalance is: 145.8−145.5=0.3 degree.

The next timing pulse originating in clock 28 in FIG. 28B provides discrete +24 volt potentials on leads 282A and 283A in FIG. 31. The potential on lead 283A in FIGS. 31 and 34 operates relay 600 in FIG. 34 thereby supplying the +24 volt potential at terminal 559 and on leads 559A in FIGS. 31A–34 via a previously traced circuit to operate relay 598 and illuminate lamp 598A in FIGS. 13 and 34 for indicating to a craftsman that phase shift unbalance greater than 0.1 degree is being measured. The timing pulses at terminal 530 and on leads 530A in FIGS. 31A–34 step counting tube 599 from its 5 through 8 cathodes in succession to add 0.6 degree through 0.8 degree phase shift networks to calibrated phase standard 40 in FIG. 26 and to activate read out control 46 in FIGS. 26 and 39 to add 3 steps of 0.1 each to the reading of read out 80B in FIG. 13 to total 145.8 degrees. This is equal to the assumed value of the phase shift of device 19 in FIG. 39 as above indicated.

Borrow-carry operation of flip-flops 566 and 567 and counting tubes 580, 587 and 599 in FIGS. 31A–34 is effected in the following manner. It is recalled here from the foregoing description that relays 568 and 569 in FIG. 35 are in the released state to dispose their associated swingers to the positions shown in FIGS. 31A–34 for the subtracting condition and further that these relays are operated to dispose their associated swingers to opposite positions for the adding condition. When relays 568 and 569 are operated to move swinger 569A to engage its terminal 569B and swinger 569C to engage its swinger 569D and 0.1 degree counting tube 599 is stepped to discharge at its 9 cathode in FIG. 34, then a voltage at the emitter output of transistor 630 in FIG. 38 is applied via lead 631 in FIGS. 38 and 34, terminal 569D engaged by swinger 569C, lead 632 to the base of transistor 633 which is thereby rendered conductive. The next timing pulse available at terminal 598C engaged by swinger 598B in FIG. 34 is applied on lead 634 to the base of transistor 635 which is turned on to pass the pulse through transistor 636 in FIGS. 34 and 33 to swinger 591 engaging terminal 591A in FIG. 33 to step 1.0 degree counting tube 587 from discharge at its 0 cathode to discharge at its 1 cathode. This carry pulse is thus registered in the 1.0 degree counting tube 587 and counting tube 599 in FIG. 34 is stepped to discharge at its 0 cathode. The total indication of 1.0 degree of counting tubes 587 and 599 is recorded in phase read out 80B in FIG. 13 as above explained.

In a similar manner, when 1 degree counting tube 587 is discharging at its 9 cathode and swinger 568E is engaging terminal 568F in FIG. 33, transistor 637 is rendered conductive so that the next incoming timing pulse renders transistor 638 conductive. This transistor passes the incoming pulse via transistor 639 to step counting tube 580 in FIG. 32 to discharge at its 1 cathode for registering a count of 10 degrees in phase read out 80B in FIG. 13 while counting tube 587 is stepped to discharge at its 0 cathode.

Also, in a similar maner when 10 degree counting tube 580 in FIG. 32 is discharging at its 8 cathode for registering a count of 80 degrees, a voltage is transmitted via lead 580A in FIGS. 36 and 32, swinger 568C engaging terminal 568D renders transistor 640 conductive. Now, the next incoming timing pulse applied to tube 580 renders transistor 641 conductive to apply a voltage pulse through transistor 642 and lead 643 in FIG. 32, and lead 643 to flip-flops 566 and under certain conditions 567 in FIG. 31A. In connection with flip-flop 567, it is recalled that swinger 568A is engaging terminal 568B because relay 568 in FIG. 35 is operated and swinger 552D is disengaged from terminal 552E because relay 552 is now operated. The next incoming timing pulse renders transistor 566B conductive to release relay 552 which actuates its swinger 552A to engage its terminal 552C for providing a voltage on lead 555 in FIG. 35 to register 90 degrees in phase read out 80B in FIG. 13, in the manner above explained.

The next incoming timing pulse on lead 643 renders transistor 566A of flip-flop 566 in FIG. 31A conductive to operate relay 552 in FIG. 31A while relay 551 is released to provide a voltage on lead 554 in FIG. 35 for recording 180 degrees in phase read out 80B in FIG. 13 as previously mentioned. Similarly, another timing pulse incoming on lead 643 activates flip-flops 566 and 567 in FIG. 31A so as to release both relays 551 and 552 in FIG. 31A to provide a voltage on lead 556 in FIG. 35 for recording 270 degrees in phase read out 80B in FIG. 13, as hereinbefore described.

In the borrow operation, it is now assumed that relays 568 and 569 in FIG. 35 are de-energized to dispose their associated swingers in the positions shown in FIGS. 32, 33 and 34. When counting tube 587, for example, in FIG. 33 is discharging at its 1 cathode and counting tube 599 is discharging at its 0 cathode, the next timing pulse incoming via swinger 598B engaging terminals 598C in FIG. 34 is simultaneously applied to terminals A and B of both counting tubes 599 and 587 to step counting tube 587 to discharge at its 0 cathode and to step counting tube 599 to discharge at its 9 cathode. This is accomplished by transistor 633 having been turned on by the voltage at the 0 cathode of counting tube 599 so that the incoming pulse is applied by transistors 635 and 636 to terminals A and B of counting tube 587. Succeeding incoming timing pulses step counting tube 599 in the reverse direction from its 9 cathode to its 0 cathode to subtract 0.1 degree at each step.

It is now assumed that counting tube 580 in FIG. 32 is discharging at its 1 cathode and counting tube 587 in FIG. 33 is discharging at its 0 cathode to turn on transistor 637. An incoming timing pulse available via swinger 589 engaging terminal 590 in FIG. 33 is applied to terminals A and B of counting tube 587 to step its discharge from the 0 cathode to its 9 cathode. At the same time, the same timing pulse is also applied via conducting transistors 638 and 639 to step the discharge in counting tube 580 from its 1 cathode to its 0 cathode. Succeeding timing pulses step counting tube 587 in the reverse direction from discharge at its 9 cathode to its 0 cathode.

In a similar manner a borrow operation between flip-flops 566 and 567 in FIG. 31A and counting tube 580 in FIG. 32 is effected in the following manner. For this purpose, it is assumed that transistor 567A of flip-flop 567 is turned on to operate relay 551 which actuates its swinger 551B to engage terminal 551D and transistor 566A of flip-flop 566 is turned off to release relay 552 which enables its swinger 552A to engage its terminal 552C. This provides a voltage on lead 555 in FIG. 35 as above noted. At this time counting tube 580 is discharging at its 9 cathode (which is connected to its 0 cathode to provide effectively two 0 cathodes) so that the voltage at this 9 cathode turns on transistor 640. Now, a timing pulse available at swinger 573A and terminal 574 in FIG. 32 is applied to the A and B terminals of counting tube 580 to step the discharge from its 9 cathode to its 8 cathode. At the same time, the same timing pulse is applied via transistors 641 and 642 to flip-flop 566 to turn on transistor 566A thereby operating relay 552. The operation of this relay removes the voltage on lead 555 which causes the 90 degree phase shifting network in FIG. 26 to be removed from the circuit. Succeeding timing pulses applied to terminals A and B of counting tube 580 step it from discharge at its 8 cathode to its 0 cathode. In a similar manner, timing pulses applied simultaneously to both flip-flops 566 and 567 control the conduction and nonconduction states of transistors 566A and 567A as to remove the discrete voltage from the 180 degree and 270 degree leads 554 and 556, respectively, in FIG. 35 in the performance of the borrow operation. In the carry and borrow operations, it is apparent that the read out control 46 is activated to add or remove proper amounts from the readings of read out 80B in FIG. 13.

*Master control—FIGS. 5, 25, 39, 40A, 40B and 41*

Master control 104 controls the automatic balancing and readout sequence when the measuring circuit in FIGS. 4, 5, 25 and 39 is operating in the semiautomatic or fully automatic mode. This sequence, as shown in FIG. 13 comprises: automatic balancing of loss; automatic balancing of phase; read frequency on a 1-second or 10-second time base; display of loss, phase and frequency data on corresponding read outs 80A, 80B and 80C, respectively, in FIG. 13; print out via tape punch 48 in FIG. 4; and automatic sweep of frequency by oscillator 20 in FIGS. 3, 4, 8, 25, 27 and 39 to find the next succeeding data point at which a measurement of the foregoing sequence is to be made. In addition, the master control enables the read frequency and print out operations while the measuring circuit is operating in the manual mode as above described.

In FIGS. 40A and 40B, each of boxes indicating loss control, phase control, 1-second frequency control, 10-second frequency control, display data control, punch control, and frequency sweep control includes essentially relay capacitor circuit of FIG. 41. In this figure, capacitor 646 included in a next-preceding box say, for example, loss control 662 in FIG. 40A, is connected via swinger 646A included in relay 646B to a terminal 647 engaged with swinger 648 of the mode selector switch at the moment. This swinger is connected to the operating winding of relay 649 included in another box say, for example, phase control 663 in FIG. 40A. Also in FIG. 41, swinger 648 is connected to one terminal of a push button switch 650 which has its opposite terminal connected to a positive voltage supply for a purpose explained later. A first swinger 651 of relay 649 is connected to an incoming lead 620 which, for the purpose of the assumed illustration, provides a balance achieved signal from standard phase control on the same lead in FIG. 34. A second swinger 652 is connected to an outgoing lead 653 which, for this illustration, is connected to AND gate 659 in FIG. 40A and connectable to a source of voltage at terminal 658 for a purpose that is later explained. A third swinger 654 included in relay 649 in FIG. 41 is connected to capacitor 655 and lead 656 which, for this illustration, is connected to swinger 657, as well as to a source of voltage at terminal 660 for a purpose mentioned later.

In the operation of the circuit of FIG. 41, it is assumed that capacitor 646 is charged to its maximum voltage magnitude and relay 646B is just released, and further that swinger 648 is engaging terminal 647 for the automatic operation of the measuring circuit. The voltage charge on capacitor 646 operates relay 649 which moves its swinger 651 to a holding circuit including lead 620 which supplies current to relay coil 649 until a phase balance achieved signal is received from phase standard control 108 in FIGS. 34 and 39 as above mentioned. Swinger 652, closed on terminal 658 to a positive source of voltage, transmits the latter voltage on lead 653 to AND gate 659 in FIG. 40A for a purpose that is subsequently specified. At the same time, swinger 654 in FIG. 41, closed on terminal 660 to a positive source of voltage, enables capacitor 655 to charge to the magnitude of this source. At this time, lamp 663A in FIG. 13 is illuminated to indicate that the automatic balance of phase is in progress. When the phase balance achieved signal on lead 620 in FIG. 41 causes the current supply to be terminated, relay 649 is released to permit the voltage charge on capacitor 655 to be applied via swinger 654 and lead 656 for operating the circuit of 1-second frequency control 664 or 10-second frequency control 665 in FIG. 40A in a similar manner. Lead 670 in FIG. 41 transmits the voltage charge on the capacitor, not shown, but included in sweep frequency control 668 in FIG. 40B as later mentioned. In the semiautomatic operation of the measuring circuit of FIGS. 4 and 5, a push button 650 in FIGS. 13 and 41 is pressed to operate relay 649 for the purpose just described.

Referring to master control 104 in FIGS. 40A and 40B knob 308 in FIGS. 13 and 40A is actuable to a manual control position MAN to supply ground for activating 4-deck switches 304, 305, 306 and 307 of loss standard control 106 in FIGS. 5, 16, 17 and 25, as previously explained, and to supply a +24 volt potential to operate relays 539 and 614 in phase standard control 108 in FIGS. 5, 35 and 39 as above mentioned. Knob 308 in the semiautomatic and automatic positions SA and A, respectively, in FIG. 40A supplies no voltage to terminal 612 in FIG. 35 to release relays 539 and 614 to control the voltage supply to the anodes of counting tubes 580, 587 and 599 as previously pointed out. It is now assumed that knob 308 in FIGS. 13 and 40A is actuated to its automatic position A to dispose its associated swingers to close on terminals A.

In the automatic operation of the measuring circuit of FIGS. 4, 5, 25 and 39, a signal received on lead 661 from the time out control is applied to loss control 662 in FIG. 40A. At this time, relay 646B of loss control 662 in FIGS. 40A and 41 is operated due to the voltage charge on the capacitor, not shown, but included in frequency sweep control 668 in FIG. 40B and supplied on lead 670 in accordance with the explanation given above for the circuit of FIG. 41. An output voltage on lead 675 is simultaneously applied to AND gates 676 and 677. Gate 676 is receiving ½ time rate pulses on lead 678 from clock 28 in FIG. 42, this gate provides an output voltage on lead 679 to terminal 365 in FIGS. 24 and 25 for activating loss standard control 106 in FIG. 25 as previously discussed. Gate 677 is receiving full time rate pulses on lead 680, this gate provides an output voltage on lead 681 to terminal 366 in FIGS. 24 and 25 for activating loss standard control 106 in FIG. 25 as above explained. During this time, lamp 662A in FIG. 13 is illuminated to indicate that the automatic balance of loss is in progress.

Once the loss time out counter voltage signal is removed from lead 661, the voltage charge on the capacitor, not shown, but included in loss control 662 in FIG. 40A as stated above regarding phase control 663 of FIG. 41, operates the relay included in phase control 663 in FIG. 40A. If a balanced achieved voltage signal were effective on lead 620 as above mentioned regarding FIG. 41, then relay 649 included in phase control 663 shown in FIG. 41 is operated to transmit a voltage on lead 653. Gate 659 is also receiving timing pulses on lead 680 from clock 28 in FIG. 42, this gate transmits full time rate timing pulses on lead 682 to terminal 530 of FIGS. 31A, and 39 for the purpose previously specified. During this time lamp 663A in FIG. 13 is illuminated to indicate the automatic balance of phase as stated above.

When the phase time out counter signal is removed from lead 620 in FIG. 40A, the voltage charge on capacitor 655 of phase control 663 in FIGS. 40A and 41 operates the relay, not shown, but included in either the 1-second frequency control 664 or the 10-second frequency control 665 as above described regarding the phase control circuit in FIG. 41. It is understood that either the 1-second or 10-second frequency control, but not both, is operative at this time. As a consequence, a voltage output effective at the swingers of the respective relays is applied to either lead 683 or 684 and thereby to frequency counter 35 in FIG. 4 for a purpose that is later mentioned. A 1.1 second time delay network 664A holds the relay included in the 1-second frequency control in the operated condition for 1.1 second time and thereafter releases this relay to apply the voltage charge on the associated capacitor to OR gate 664B in FIG. 40B. An 11-second time delay network 665A holds the relay included in the 10-second frequency control in the operated condition for 11 seconds and thereafter releases this relay to apply the voltage on the associated capacitor to OR gate 664B. During the operation of 1-second frequency control 664 in FIG. 41 lamp 498 in FIG. 13 is illuminated, and during the operation of 10-second frequency control 665 in FIG. 41 lamp 500 in FIG. 13 is illuminated.

The voltage from the output of gate 664B operates the relay, not shown, but included in display data control 666 as above explained. A swinger associated with this relay supplies a voltage on output lead 685 for displaying the loss, phase and frequency data at the respective read outs, 80A, 80B and 80C, respectively, in FIG. 13, in a manner that is subsequently explained. A 1-second time delay network 666A holds the relay operated for 1-second time interval. During this time lamp 666B is illuminated in FIG. 13 to indicate that data is being transferred into the read out devices. After the 1-second time interval, this relay releases to supply the voltage charge on the associated capacitor to the relay included in punch control 667. A voltage incoming on lead 685A for a reason later explained holds the relay in the punch control operated to transmit a voltage on lead 686 to tape punch 48 in FIG. 4 for a purpose subsequently mentioned. During this operation, lamp 667A in FIG. 13 is illuminated to indicate that the data is being punched out on paper tape.

After the voltage is removed from lead 685A, the relay in the punch control is released to permit the charge on the associated capacitor, not shown, to operate the relay, not shown, included in frequency sweep 668 for the reason explained above regarding the circuit of FIG. 41. This relay is held operated by a voltage effective on lead 687 until the program control commands the sweep to stop in a manner subsequently explained. At this time a voltage available on a swinger of the operated relay is supplied on lead 688 to program control 105 for a reason later discussed. After the voltage is removed from lead 687, the relay in the frequency sweep control is released to enable the voltage charge on the associated capacitor, not shown, to be applied on lead 670 to operate the relay in loss control 662 to institute the commencement of another sequence or work cycle. During this time, lamp 668A is illuminated to indicate that an automatic operation of frequency sweep is in progress. It is thus seen that only one of the several controls in FIGS. 40A and 40B is activated at a given instant.

For the semiautomatic operation of the circuit of FIGS. 40A, 40B and 41, a push button switch identical with switch 650 and connected to each of the remaining controls serves to cause the operation of each thereof on a casual selection basis for enabling the semiautomatic operation of the measuring circuit in FIGS. 4 and 5 in a manner discussed hereinafter. For the semiautomatic operation, the sequence controller in FIGS. 13 and 40A and 40B includes push button switches 662B, 650, 497, 499, 94A, 94B and 94C.

Clock—FIG. 42

This supplies the necessary signals to synchronize the operation of the circuits included in FIGS. 4, 5, 8, 9B, 24, 27, 28A, 31A and 40A and 40B as indicated in the timing chart of FIG. 42. The timing signals are utilized: (1) to synchronize the standard and unknown positions of relays 27 and 39 connected to the loss and phase standards in FIGS. 4 and 5; (2) to synchronize the operation of relays 16 and 518 in the loss and phase detectors in FIGS. 8 and 27, respectively; (3) to trigger the operation of discrete loss detector 107 in FIGS. 5, 9 and 25 and discrete phase detector 109 in FIGS. 5, 28B and 39; (4) to supply pulses for the operation of loss standard control 106 in FIGS. 5, 24 and 25 and of phase standard control 108 in FIGS. 5, 31A and 39; and (5) to provide the time out after the completion of an automatic loss or phase balance in a manner described hereinafter.

In FIG. 42 the timing pulses on line A operate relay 27 in FIGS. 4 and 27 at either an 8 or a 1.6 cycle per second rate depending on whether filter 110 or 111 in FIG. 5 is connected in the measuring circuit of FIGS. 4 and 5. The timing pulses on line B are delayed in time to operate relay 39 in FIGS. 5 and 27 and relay 527 in FIG. 27. This delay is equal to the physical delay occasioned by filter 110 or 111 when connected in the measuring circuit of FIG. 5. The timing pulses on line C are at a full rate of 1.6 or 8 cycles per second for use in FIGS. 8, 24, 25, 27, 31A and 39 when the testing signal in the measuring circuit of FIGS. 4 and 5 is being applied to unknown device 19. The timing pulses on line D are at ½ the time rate of the signals on line G or at a 0.8 or 4 c.p.s. rate for use in FIGS. 24, 25, 40A and 40B. The timing pulses on line E are used to trigger the discrete loss and phase detectors 107 and 109, respectively, in FIGS. 9B, 25, 28B and 39.

Frequency counter—FIGS. 4 and 44

This involves a commercial structure and includes three operating modes as follows: (1) one continuously recycling counting mode operating on a 0.1 second time base for providing coarse frequency information during the frequency sweep of the testing oscillator in FIG. 3 during the automatic and semiautomatic modes; and (2) two non-recycling counting modes for providing frequency read outs with an accuracy of 1 cycle per second or 0.1 cycle per second which are utilized by read out control 46 in FIG. 4 for setting frequency read out 80C in FIG. 13 and tape punch 48 in FIG. 4. The frequency counter utilizes a high precision 100-c.p.s. wave at its input to provide the required 0.1, 1 and 10 second time bases. This wave is divided to provide 10 c.p.s., 1 c.p.s. and 0.1 c.p.s. timing pulses. If the frequency counter counted the cycles of the input signal from the testing oscillator in FIG. 3 for a period of exactly 0.1 second, the numerical value counted would be equal to the input testing frequency in 10's of cycles per second to an accuracy of ±10 cycles as indicated in FIG. 44. The counter also includes a modification for effecting a nonrecycling measurement with a 1 second time base and thereby a ±1 cycle per second accuracy; and a further modification for achieving a nonrecycling measurement with a 10 second time base and thereby an accuracy of 0.1 cycle per second.

In accordance with the present invention for measuring the data points to establish electrical characteristics of unknown electrical device 19 in FIG. 4 in terms of insertion loss and/or phase shift in different preselected subdivision bands constituting an over-all operating frequency range, it is essential to collect data covering predetermined numerical limits of changes in frequency, loss and phase shift in each of one or more preselected subdivision bands of the over-all operating frequency range.

*Frequency range control—FIGS. 15, 43 and 44*

The five frequency bands are preselected for the present explanation by a frequency range control 699 in terms of kilocycles in FIG. 15. This control comprises five sets of binary coded decimal thumbwheel switches 700, 701, 702, 703, and 704 in FIG. 43, each comprising four discrete switches with a common output terminal 706 as indicated in thumbwheel switch 703 in FIG. 44. It is obvious in the subsequent explanation that the subdivision frequency bands may comprise one, two, three, four or five in number, depending upon a particular characteristic of interest at the moment. In utilizing the thumbwheels, the first step fixes the lowermost numerical frequency value in he over-all range of interest by manually preselecting such value by appropriate adjustments of tuning knobs 69 and 83 in FIG. 15 for coarse and fine tuning of the testing oscillator in FIG. 3 as explained hereinbefore. As the subdivision bands are preselected in kilocycles, it is noted that a decimal point 705 in FIG. 15 is disposed between the second and third switches of each of the thumbwheel switch sets.

In FIG. 44, oscillator 20 supplying a testing voltage over a 20 kc. frequency range in FIGS. 3 and 4 is connected to the input of a pulse generator 707 included in frequency counter 35 and having an output connected to one input of a gate 708 which has a second input obtained from a 0.1 second timer 709. This gate has its output applied to the 10 cycles-per-second stage of a well-known binary coded decimal counter for providing an output on lead A and triggering the 20 cycles-per-second stage for providing an output on lead B. The output of the 20 cycles-per-second stage also triggers the 40 cycles-per-second stage for providing an output on lead C and triggering the 80 cycles-per-second stage for providing an output on lead D and triggering the 100 cycles-per-second stage. In a similar manner, the remaining stages of frequency counter are activated.

From the previous discussion of binary coded decimal equipments, it is recalled that a frequency count of 10 cycles per second provides a ground on lead A, a frequency count of 20 cycles per second provides a ground on lead B, a frequency count of 30 cycles per second provides a ground on leads A and B, a count of 40 cycles per second provides ground on lead C, a count of 50 cycles per second provides a ground on leads A and C, a count of 60 cycles per second provides grounds on leads B and C, a count of 70 cycles per second provides grounds on leads A, B, and C, a count of 80 cycles per second provides a voltage on lead D, and a count of 90 cycles per second provides grounds on leads A and D. In a similar manner, grounds are provided on leads E, F, G, and H to indicate a frequency count of 100 through 900 cycles per second in 100 cycles-per-second steps; grounds are provided on leads I, J, K, and L to indicate a frequency count of 1 kilocycle through 9 kilocycles in 1 kilocycle steps; and grounds are provided on leads M, N, O, and P to indicate a frequency count of 10 kilocycles through 90 kilocycles in 10 kilocycle steps. The respective stages of the frequency counter comprise essentially a flip-flop to provide ground output signals in the set state and —12 volt signals in the reset state in the well-known manner. For the 0.1 second time interval, frequency counter 35 provides a frequency count within a ±10 cycles-per-second accuracy.

The respective voltages on leads A through P of the frequency counter 35 in FIG. 44 are supplied to each of thumbwheel switches 700–704 of frequency range control 699 in FIG. 15 as indicated in FIGS. 43 and 44. It is understood that each of the thumbwheel switches of FIG. 43 includes the connections shown in FIG. 44. As all thumbwheel switches are alike and since the following description is directed only to thumbwheel switch 703 in FIGS. 15 and 44, it is understood that such description applies in an identical manner to the remaining thumbwheel switches 700, 701, 702, and 704 in FIGS. 15 and 44. In these figures, thumbwheel switch 703 comprises four discrete switches identifiable as 10 kilocycles, 1 kilocycle, 100 cycles per second and 10 cycles per second. It is thus seen that leads A, B, C, and D connect the 10, 20, 40, and 80 counter stages to terminals 1, 2, 4, and 8 of the 10 cycles-per-second thumbwheel switch, that is, to the 10, 20, 40, and 80 terminals, respectively; leads E, F, G, and H connect the 100, 200, 400, and 800 cycles-per-second counter stages to terminals 1, 2, 4, and 8, respectively, of the 100 cycles-per-second thumbwheel switch, that is, to the 100, 200, 400, and 800 terminals; leads I, J, K, and L connect the 1, 2, 4, and 8 kilocycle counter stages to terminals 1, 2, 4, and 8, respectively, of the 1 kilocycle thumbwheel switch, that is, to the 1, 2, 4, and 8 kilocycle terminals; and leads M, N, O, and P connect the 1, 2, 4, and 8 counter stages to terminals 1, 2, 4, and 8, respectively, of the 10 kilocycle thumbwheel switch, that is, 10, 20, 40, and 80 kilocycle terminals. A diode 710 is interposed in each lead connecting one counter stage to its corresponding terminal of a particular thumbwheel switch.

In the operation of the circuitry shown in FIG. 44, it is assumed that the 4 discrete thumbwheel switches constituting each of thumbwheel switches 700–704 and included in frequency range control 699 in FIG. 15 are set to preselect the following five frequency ranges: (1) initially the numerical value of the lowermost frequency of range 1 is arbitrarily set at 0.1 kilocycle or 100 cycles per second by tuning the oscillator frequency in FIG. 3 to that frequency as above explained and thumbwheel switch 700 is set at 00.12 kilocycle or 120 cycles per second thereby fixing the numerical value of the uppermost frequency of range 1 and the numerical value of the lowermost frequency of range 2; (2) thumbwheel switch 701 is set to 00.34 kilocycle or 340 cycles per second thereby fixing the numerical value of the uppermost frequency of range 2 and the numerical value of the lowermost frequency of range 3; (3) thumbwheel switch 702 is set to 1.86 kilocycles or 1,860 cycles per second thereby fixing the numerical value of the uppermost frequency of range 3 and the numerical value of the lowermost frequency of range 4; (4) thumbwheel switch 703 is set to 7.89 kilocycles or 7,890 cycles per second thereby fixing the numerical value of the uppermost frequency of range 4 and the numerical value of the lowermost frequency of range 5; and (5) thumbwheel switch 704 is set at 20.00 kilocycles or 20,000 cycles per second thereby fixing the numerical value of the uppermost frequency of range 5.

It is thus seen that the 5 ranges comprise: 100–120 cycles per second in range 1, 120–340 cycles per second in range 2, 340–1,860 cycles per second in range 3, 1,860–7,890 cycles per second in range 4, and 7,890–20,000 cycles per second in range 5. Upon reaching the uppermost numerical value of range 5, the measuring apparatus halts automatically.

The operation of thumbwheel switch 703 in range 4, for example, is effected in the following manner. As the uppermost frequency of this range is 7,890 cycles per second as above mentioned, it is recalled that when the frequency counter in FIG. 44 has counted the numerical value of the frequency of testing oscillator 20 in FIG. 3 to that numerical value, discrete voltages are thereby provided on leads A, D, H, I, J, and K and thereby on the corresponding 1 and 8 terminals of the 10 cycles-per-second switch, on the 8 terminal of the 100 cycles-per-second switch, and on 1, 2, and 4 terminals of the 1 kilocycle switch. Obviously, no voltages are provided on leads M, N, O, and P and as a consequence no voltages are supplied to any terminals of the 10 kilocycle switch.

The simultaneous grounds on leads A, D, H, I, J, and K provide an output signal on terminal 706 via an obvious circuit in FIGS. 43 and 44. In FIG. 43, the voltage at terminal 706 sets flip-flop 711 which supplies a voltage to operate relay 712. In operating, this relay closes its swinger 713 on terminal 713A to complete a circuit which illuminates lamp 714 in FIGS. 15 and 43 to indicate that the testing frequency is in range 5 at the moment.

In FIGS. 15, 43, and 44, it is seen therein that when the measuring circuit of FIGS. 4, 5, and 15 is initially activated at the lowermost frequency of range 1, lamp 715 is illuminated to indicate that the frequency range control is operating in range 1; and further that when thumbwheel switch 700 is activated to set flip-flop 716, relay 717 is operated to move its swinger 718 to engage terminal 719 for de-energizing lamp 715 and illuminating lamp 720 to indicate that the frequency range control is operating in range 2. In like manner, when thumbwheel switch 701 is activated to set flip-flop 721, relay 722 is operated to move its swinger 723 to engage terminal 724A for illuminating lamp 724 to indicate that the frequency range control is operating in range 3; when thumbwheel switch 702 is activated to set flip-flop 725, relay 726 is operated to move its swinger 727 to engage terminal 728A for illuminating lamp 729 to indicate that the frequency range control is operating in range 4; when thumbwheel switch 703 is activated to set flip-flop 711, relay 712 is operated to move its swinger 713 to engage terminal 713A for illuminating lamp 714 to indicate that the frequency range control is operating in range 4; and when thumbwheel switch 704 is actuated to set flip-flop 730, relay 731 is operated to move its swinger 732 to engage its terminal 733 for de-energizing lamp 714 to indicate that the sequence is terminated, and the measuring apparatus has halted.

In FIG. 15, a program control 105 for measuring the numerical values of the insertion loss and phase shift of device 19 in FIGS. 4 and 5 at particular numerical values of the testing frequency comprises: (1) $\Delta f$ finger knobs 739, 740, 741, 742 and 743, each positioned in one of ranges 1, 2, 3, 4 and 5 for preselecting one numerical value of change of the testing frequency of oscillator 20 in FIGS. 3 and 4 from a group including 10, 300 and 1,000 cycles per second and comprising 3 decks as later pointed out; (2) $\Delta L$ finger knobs 745, 746, 747, 748 and 749, each positioned in one of ranges 1, 2, 3, 4 and 5 for preselecting one numerical value of change of the insertion loss from a group consisting of 0.03, 0.1, 0.3, 1, 3 and 10 decibels and comprising 3 decks as below mentioned; and $\Delta \theta$ finger knobs 750, 751, 752, 753 and 754, each positioned in one of ranges 1, 2, 3, 4 and 5 for preselecting one numerical value of change of the insertion phase shift from a group comprising 0.3, 0.1, 3.0, 10.0 and 30 degrees and comprising 3 decks as subsequently identified. This program control is subsequently described in further detail.

*Servo speed control for testing oscillator in FIG. 20–FIG. 45*

This provides two voltages of different magnitudes, one at a time, to activate servo 47 in FIGS. 3 and 45 via swinger 735 of a fast-slow speed relay 736 and lead 737 for controlling the rate of change of the frequency of testing oscillator 20 in FIGS. 3 and 4, depending upon the numerical limit of change preselected for measuring insertion loss and/or phase shift at the moment, as further explained hereinafter. This control determines the rate of change of the frequency of the testing oscillator in relation to the smaller of the preselected numerical limits of change selected for the loss or phase shift measurement.

In FIG. 45, there are shown the program controls in detail for loss and phase shift increments $\Delta L$ and $\Delta \theta$, respectively, as connected in range 4, for example, of program control in FIG. 15. In this connection, it is understood that the program control switches used to select the loss and phase shift $\Delta L$ and $\Delta \theta$ increments, respectively, in FIG. 4 are similarly connected in ranges 1, 2, 3 and 5. When the program control in FIGS. 15 and 43 is operating in range 1, relay 760 is released to enable swinger 761 to engage terminal 762; when thumbwheel switch 700 is activated to set flip-flop 716 to provide a voltage on lead 716A, this voltage operates relay 760 which moves its swinger 761 to engage its terminal 763. As relay 764 is released, the swinger 765 engages its terminal 766; when thumbwheel switch 701 is activated to set flip-flop 721 to provide a voltage on lead 721A, this voltage operates relay 764 which moves its swinger 765 to engage its terminal 767. As relay 768 is released, its swinger 769 is engaged with its terminal 770; when thumbwheel switch 702 is activated to set flip-flop 725 to provide a voltage on lead 725A, this voltage operates relay 768 which moves to swinger 769 to engage terminal 771. As relay 772 is released, its swinger 773 engages its terminal; and when thumbwheel switch 703 is activated to set flip-flop 711 to provide a voltage on lead 711A, this voltage operates relay 772 which moves its swinger to engage terminal 775. As relay 776 is released, its swinger 777 engages its terminal 778; and when thumbwheel switch 704 is activated to set flip-flop 730 to provide a voltage on lead 730A, this voltage operates relay 776 to move its swinger 777 to engage open circuit terminal 779 at the end of the sequence.

It is assumed in FIG. 45 at this time for the purpose of this description that loss knob 748A in range 4 is adjusted to its 3 db terminal on a voltage divider 783 including a plurality of discrete resistors connected in series between a source of positive potential and ground whereby the full magnitude of the source potential is applied to the OFF terminal and decreasing amounts of potential are provided at the 10, 3, 1, 0.3, 0.1 and 0.3 db terminals. Also, at this time phase shift knob 753A in range 4 is adjusted to the 1 degree terminal on a voltage divider 784 including a plurality of discrete resistors connected in series between a source of positive potential and ground whereby the full magnitude of the source potential is provided at the OFF terminal and decreasing amounts of potential are provided at the 30, 10, 3, 1 and 0.3 degree terminals.

It is thus apparent in FIG. 45 that the smaller magnitude of potential is provided at the 1 degree terminal of $\Delta \theta$ phase shift voltage divider 784 and the larger magnitude of potential is provided at the 3 db terminal of $\Delta L$ loss voltage divider 784. The voltages at the 1 degree and 3 db terminals are applied to a potential selector 785 which comprises diodes 786 and 787 having their cathodes connected to a source 788 of potential and their anodes to the 1 degree and 3 db terminals, respectively. Current flows in a circuit including source 788, diode 787, finger knob switch 753A to ground. The voltage effective at the 1 degree terminal back-biases diode 786. The voltage effective at the 1 degree terminal causes current flow in a circuit including source 788, terminal 774, swinger 773, as relay 772 is de-energized, terminal 771 and swinger 769, terminal 767 and swinger 765, terminal 763 and swinger 761 to voltage dividers 790 and 791 to ground. When swinger 735 of relay 736 engages its terminal 735A as shown in FIG. 45, the full magnitude of the voltage effective at the 1 degree terminal of phase voltage divider 784 is applied via amplifier 71 to the servo 47 for sweeping the frequency of testing oscillator 20 at one speed; and when swinger 735 engages its terminal 735B, a smaller magnitude of voltage is applied via amplifier 71 to servo 47 for sweeping the frequency of the testing oscillator at a lower speed. It is thus seen that the smaller adjustment of loss $\Delta L$ or phase $\Delta \theta$ determines the frequency-sweep speed of oscillator servo 47. In a similar manner, the oscillator servo is controlled for stages 1, 2, 3 and 5 of the frequency range control. The operation of relay 736 is further discussed below. When the frequency sweep has progressed to the point where one of the programmed increments has been exceeded, master control 104 in FIG. 5 provides a ground which directs the voltage from amplifier 71 and servo 47 in a manner that is later explained.

The circuit of FIG. 46 illustrates the connections of the frequency ΔF, loss ΔL and phase Δθ knob switches 739–743, 745–749 and 750–754, respectively, in FIG. 15 to the ΔF increment counter 78 included in the testing oscillator 20 in FIG. 3, the discrete loss detector 107 and the discrete phase detector 109 in FIGS. 25 and 39. In FIG. 46, the ΔF increment counter 78 in FIG. 3 includes output lead 79 for a 100 c.p.s. interval, output lead 80 for a 300 c.p.s. interval, and output lead 81 for a 1000 c.p.s. interval. As explained herein, film portion 77A in FIG. 15 included in film scale apparatus 77 in FIG. 3 is provided with a black line at each 100 c.p.s. point of the oscillator calibration. As each 100 c.p.s. line is sensed by the lamp and photo diode also included in equipment 77, a voltage is supplied to a corresponding lead. For a count of one 100 c.p.s. line, counter 78 provides a voltage on lead 79; for a count of three 100 c.p.s. lines, counter 78 places a voltage on lead 80; and for a count of ten 1000 c.p.s. lines, counter 78 puts a voltage on lead 81.

In FIGS. 43 and 47, lead 716B is connected to relay 792; lead 721B is connected to relay 793; lead 725B is connected to relay 794; lead 711B is connected to relay 795; and lead 730B is connected to relay 796. Also, leads F1–F5 in FIG. 46 are connected to the one inputs of AND gates 800–804 in FIG. 47, respectively; leads L1–L5 in FIG. 46 are connected to one inputs of AND gates 805–809 in FIG. 47, respectively; and leads θ1–θ5 in FIG. 46 are connected to one inputs of AND gates 810–814 in FIG. 47. Second inputs for AND gates 800, 805 and 810 are obtained from lead 815; second inputs for AND gates 801, 806 and 811 are taken from lead 816; second inputs for AND gates 802, 807 and 812 are obtained from lead 817; second inputs for AND gates 803, 808 and 813 are taken from lead 818; and second inputs for AND gates 804, 809 and 814 are obtained from 819. The outputs of AND gates 800–804 are applied to the inputs of OR gate 820 which has one output lead 88 connected to engage the AFC circuit of testing oscillator 20 in FIG. 3. A second output of OR gate 820 is applied to one input of OR gate 821. The outputs of AND gates 805–809 and 810–814 provide the inputs for OR gate 822 which supplies its output as a second input to OR gate 821. A third input for this OR gate is obtained from STOP terminal of relay 796. The output voltage of OR gate 821 is transmitted on stop oscillator sweep lead 823 to master control 104 in FIG. 5.

When, for example, the testing voltage of oscillator 20 in FIGS. 3 and 4 is operating in range 1 of frequency range control 699 in FIG. 15, relay 792 in FIG. 47 is released to supply the + potential of source 824 to one inputs of gates 800, 805 and 810; and if any one of these gates is receiving a second input via one of leads F1, L1 or L2, then the particular gate transmits a voltage to the corresponding input of gate 820 or 822. As a consequence, either of these gates is caused to provide an output voltage to stimulate gate 821 to supply an output voltage on lead 823 to master control 104 in FIG. 5. When a voltage on lead 716B in FIGS. 43 and 47 operates relay 792, the voltage of source 824 is applied via lead 816 to one inputs of gates 801, 806 and 811, one of which may be supplied with a second input via the F2, L2 or θ2 lead, for providing the voltage on lead 823. When a voltage on lead 721B in FIGS. 43 and 47 operates relay 793, the voltage of source 824 is applied via lead 817 to one inputs of gates 802, 807 and 812, one of which may also be supplied with a second input via the F3, L3 or θ3 lead, for providing the voltage on lead 823. When a voltage on lead 725B operates relay 794, the voltage of source 824 is applied via lead 818 to one inputs of gates 803, 808 and 813, one of which may also receive a second input via the F4, L4 or θ4 lead, for providing the voltage on lead 823. When the voltage on lead 711B operates relay 795, the voltage of source 824 is supplied on lead 819 to one inputs of gates 804, 809 and 814, one of which may also receive a second input from the F5, L5 or θ5 lead, for providing the voltage on lead 823. In each of the foregoing instances, it is evident that each output of gate 820 provides an output on lead 88. The voltage on lead 88 provides an engage signal to the AFC control described hereinbefore regarding the operation of testing oscillator 20 in FIG. 3. The function of the voltage on lead 823 is subsequently mentioned.

*Fast-Slow Control Circuit of Relay 736 in FIG. 45–FIG. 48*

This circuit controls the operation of relay 736 in FIG. 45 to provide a large or a small magnitude of voltage on lead 737 to control the speed of servo 47 in FIG. 3 for adjusting the numerical value of the testing frequency provided by oscillator 20 in FIGS. 3 and 4 at a high rate of speed for the larger magnitude of voltage on lead 737 and at a slow rate of speed for the smaller magnitude of voltage thereon.

In FIG. 48, it is noted in range 1 in FIG. 15 therein that when relay 830 is released before a voltage is provided on lead 716C in FIG. 43 in the manner explained above, its swinger 831 engages terminal 832 which is connected via lead 834 to OR gate 835. This gate is connected to the outputs of ΔL loss and Δθ phase knob switches 745 and 750, respectively, in FIG. 15. A voltage provided on lead 834 is applied via terminal 832, swinger 831 and lead 836 to relay 736 in a manner and for a purpose that are presently mentioned concerning the operation of range 4 in FIG. 48. When relay 830 in FIG. 48 is operated in response to the voltage on lead 716C, its swinger 831 engages its terminal 837 and when relay 838 is released before a voltage is provided on lead 721C in the operation of range 2 in FIGS. 15 and 43, swinger 839 engages its terminal 840 which is connected via lead 841 to ΔL loss and Δθ phase knob switches 746C and 751C, respectively, in FIGS. 15 and 48. A voltage provided on lead 841 is applied via terminal 840, swinger 839, terminal 837, swinger 831 to lead 836 in the manner and for the purpose presently mentioned regarding the operation of range 4 in FIG. 48.

When relay 838 in FIG. 48 is operated in response to the voltage on lead 721C, its swinger 839 engages terminal 842 and when relay 843 is released before a voltage is provided on lead 725C in the operation of range 3 in FIGS. 15 and 43, swinger 844 engages terminal 845 which is connected via lead 846 to ΔL loss and Δθ phase switches 747C and 752C, respectively, in FIGS. 15 and 48. A voltage provided on lead 846 is applied via terminal 845, swinger 844, terminal 842, swinger 839, terminal 837 and swinger 831 to lead 836 in the manner and for the purpose presently explained concerning the operation of range 4 in FIG. 48. When relay 848 in FIG. 48 is operated in response to the voltage on lead 711C, its swinger 849 is engaged with its terminal 854 and when relay 860 is released before a voltage is provided on lead 730C in the operation of range 5 in FIGS. 15 and 43, swinger 861 engages terminal 862 which is connected via lead 863 to ΔL loss and Δθ phase switches 749C and 754C, respectively, in FIGS. 15 and 48. A voltage provided on lead 863 is applied via terminal 862, swinger 861, terminal 854, swinger 849, terminal 847, swinger 844, terminal 842, swinger 839, terminal 837 and swinger 831 to lead 836 in the manner and for the purpose presently mentioned regarding the operation of range 4 in FIG. 48. Finally, when relay 860 is operated in response to the voltage on lead 730C in FIG. 43, its swinger 861 is actuated to open-circuit terminal 864.

When relay 843 in FIG. 48 is operated in response to the voltage on lead 725C, its swinger 844 engages terminal 847 and when relay 848 is released before a voltage is provided on lead 711C in the operation of range 4 in FIGS. 15 and 43, swinger 849 engages terminal 850 which is connected to a common point A of OR gate 851. This gate comprises a pair of diodes 852 and 853 having their anodes connected to common point A, and the cathode of diode 853 connected to ΔL loss knob switch 748C in FIGS. 15 and 48 and the cathode of diode 852 is connected to Δθ knob switch 753C in FIGS. 15 and 48. It is noted that ΔL knob switch 748C in range 4 in FIGS. 15 and 48 is a third deck of a three deck switch whose other decks are shown in FIGS. 45 and 46; ΔL switch 748B in FIG. 46 has its 7 terminal connected to 0.3 db lead 288, its 6 terminal to 0.1 db lead 287, its 5 terminal to 0.3 db lead 286, its 4 terminal to 1 db lead 285, its 3 terminal to 3 db lead 284, its 2 terminal to 10 db lead 283 in FIGS. 12 and 46 and its 1 terminal to the OFF position. It is further noted that the 0.1 db lead 289 in FIGS. 10 and 46 is not connected to knob switch 748B, or any of knob switches 745B, 746B, 747B or 749B in FIGS. 15 and 46. It is also noted that the third deck ΔL switch 748C in range 4 in FIGS. 15 and 48 has its 7 terminal connected to 0.1 db lead 289, its 6 terminal to 0.3 db lead 288, its 5 terminal to 0.1 db lead 287, its 4 terminal to lead 286, its 3 terminal to lead 285 in FIGS. 12 and 48; its 2 terminal to lead 284, and its 1 terminal is in the OFF position. It is also seen in FIG. 48 that 10 db lead 283 is not connected to switch 748C, or any of knob switches 745C, 746C, 747C and 749C. It is also noted in FIGS. 46 and 48 that when the first deck or switch 748B in FIG. 46 is on its 7 terminal which is connected to the 0.03 db lead 288 in FIG. 46, the third deck knob switch 748C in FIG. 48 is also on its 7 terminal which is connected to the 0.01 db lead 289. It is thus seen that the second deck switch 748B in FIG. 46 is always connected to the ΔL loss increment in advance of the ΔL loss increment to which the third deck switch 748C in FIG. 48 is connected.

It is further noted that Δθ knob switch 753C in range 4 in FIGS. 15 and 48 is a third deck of a three deck switch whose other decks are shown in FIGS. 45 and 46, Δθ switch 753B in FIG. 46 has its 6 terminal connected to 0.3 degree lead 284A, its 5 terminal to 1 degree lead 285A, its 4 terminal to 3 degree lead 286A, its 7 terminal to 10 degree lead 287A, its 2 terminal to 30 degree lead 288A, and its 1 terminal to the OFF terminal. It is seen that the 0.1 degree terminal connected to lead 283 in FIGS. 12 and 46 is not connected to knob switch 753B, or any of switches 750B, 751B, 752B or 754B. It is also seen that second deck switch 753C in range 4 in FIGS. 15 and 48 has its 6 terminal connected to 0.1 degree lead 283A, its 5 terminal to 0.3 degree lead 284A, its 4 terminal to 1.0 degree lead 285A, its 3 terminal to 3.0 degree lead 286A, its 2 terminal to 10 degree lead 287A, and its 1 terminal to the OFF position. It is further seen in FIG. 48 that 30 degree lead 288A in FIG. 31 is not connected to switch 753C, or any of knob switches 750C, 751C, 752C, or 754C in FIG. 48. It is seen in FIGS. 46 and 48 that when the second deck of Δθ switch 753B in FIG. 46 is on its 6 terminal which is connected to 0.3 degree lead 284A, the third deck switch 753C in FIG. 48 is connected to 0.1 degree lead 283 in FIG. 48. It is thus seen that the second deck switch 753B in FIG. 46 is always connected to the Δθ phase increment in advance of the Δθ phase increment to which the third deck switch 753C in FIG. 48 is connected.

As previously mentioned, the fast-slow sweep control signal provided on lead 836 in FIGS. 48 and 45 on the basis of the first occurrence of the Δθ phase increment, or ΔL loss increment serves to slow down the frequency sweep of testing oscillator 20 in FIGS. 3 and 4 in anticipation of stopping such sweep in the following manner. In FIG. 46, it is noted that when ΔL loss second deck switch 748B is set at terminal 3 for a programmed ΔL loss increment of 3 decibels, third deck ΔL loss switch 748C in FIG. 48 is also set at terminal 3 for a ΔL loss increment of 1 decibel; and when Δθ second deck switch 753B in FIG. 46 is set at terminal 6 for a programmed Δθ phase increment of 0.3 degree, third deck Δθ phase switch 753C in FIG. 48 is set at terminal 6 for a Δθ phase increment of 0.1 degree. It is now assumed that the frequency sweep of the testing oscillator is advancing at maximum speed.

Assuming, for example, that the programmed ΔL loss increment of 3 decibels is going to occur before the occurrence of the programmed Δθ phase increment of 0.3 degree, then as the ΔL loss increments increase in magnitude from 0.01 db increment toward the 3 db increment, a voltage is provided on lead 285 and thereby a terminal 3 of third deck ΔL loss switch 748C in FIG. 48 at a time which is one ΔL loss increment ahead of the occurrence of the voltage on lead 284 and at terminal 3 of the second deck switch 748B in FIG. 46 for the ΔL programmed increment of 3 db loss. The voltage at terminal 3 of ΔL third deck loss switch 748C in FIG. 48 is applied via gate 851 and the circuit previously traced to lead 836 in FIGS. 48 and 45 to operate relay 736 in FIG. 45. In operating, this relay actuates its swinger 735 to engage terminal 735B whereby only a portion of the voltage across voltage divider 790, 791 is applied on lead 737 to amplifier 71 and servo 47 included in testing oscillator 20 in FIG. 3. This slows down the frequency sweep of the testing oscillator before the voltage at terminal 3 of ΔL second deck loss switch 748B in FIG. 46 stops the frequency sweep of the testing oscillator by providing voltage on lead 823 in FIG. 47, thereby minimizing the overshoot of the testing frequency provided by oscillator 20 in FIGS. 3 and 4. In similar manner, the settings of the ΔL second deck and third deck switches 748B and 748C in FIGS. 46 and 48, respectively, are so correlated that the voltage provided at any terminal setting of the ΔL third deck switch 748C in FIG. 48 serves to operate relay 736 in FIG. 45 to slow down the frequency sweep of the testing oscillator 20 in FIGS. 3 and 4 at one ΔL loss increment in advance of the voltage provided at the corresponding terminal setting of ΔL second deck switch 748B in FIG. 46. The latter voltage on lead 823 in FIG. 47 stops the frequency sweep of the testing oscillator 20 in FIG. 3. Slowing down the frequency sweep in advance of the stoppage thereof minimizes frequency overshoot by the testing oscillator. An identical operation takes place for the ΔL loss programming effected by appropriate settings of ΔL loss switches 745B, 745C, 746B, 746C, 747B, 747C, 749B and 749C in FIGS. 46 and 48, respectively.

Assuming now, for example, that the programmed Δθ phase increment of 0.3 degree switch 753B in FIG. 46 is going to occur before the occurrence of the programmed ΔL loss increment of 3 decibels of terminal 3 of switch 748B in FIG. 46, then as the Δθ phase measurements increase in magnitude from 0.1 degree toward 0.3 degree, a voltage is provided on lead 283A and thereby at terminal 6 of switch 753C in FIG. 48 at a time which is one Δθ phase increment ahead of the occurrence of the voltage on lead 284A and thereby at terminal 6 of switch 753B in FIG. 46 for the Δθ programmed increment of 0.3 degree. The voltage at terminal 6 of Δθ third stage switch 753C in FIG. 48 is applied via gate 851 and the circuit previously traced to lead 835 in FIGS. 48 and 45 to operate relay 736 in FIG. 45. In operating, this relay actuates its swinger to engage terminal 735B whereby only a portion of the voltage across voltage divider 790, 791 is applied on lead 737 to amplifier 71 and servo 47 included in testing oscillator 20 in FIG. 3. This slows down the frequency sweep of the testing oscillator before the voltage at terminal 6 of Δθ second deck phase switch 753B in FIG. 46 stops the frequency sweep of the testing oscillator by providing voltage on lead 823 in FIG. 47, thereby minimizing the overshoot of the testing frequency supplied by oscillator 20 in FIGS. 3 and 4. In a similar manner, the settings of the Δθ second deck and third deck switches 753B and 753C in FIGS. 46 and 48, respectively, are so correlated that the voltage provided on any terminal setting of the Δθ third deck switch 753C in FIG. 48 serves to operate relay 736 in FIG. 45 to slow down the frequency sweep of the testing oscillator 20 in FIGS. 3 and 4 at one Δθ phase increment in advance of the voltage provided at the corresponding terminal setting of Δθ second deck switch 753B in FIG. 46. The latter voltage on lead 823 in FIG. 47 stops the frequency sweep of the testing oscillator 20 in FIG. 3. Slowing down the frequency sweep in advance of the stoppage thereof minimizes frequency overshoot by the testing oscillator. An identical operation takes place for the Δθ phase programming effected by appropriate settings of Δθ phase switches 750B, 750C, 751B, 751C, 752B, 752C, 754B and 754C in FIGS. 46 and 48, respectively.

*Time out circuit—FIG. 49*

This functions when a balanced achieved signal in the form of ground is secured from either loss standard control 106 at terminal 439 in FIG. 22 or from the phase standard control 108 at lead 620 in FIG. 34. These ground signals are provided at the respective terminals and leads in the manner hereinbefore explained. In FIG. 49, pulse counter 870 comprises 3 stages for counting timing pulses supplied thereto at either a 1.6 or 8 cycle per second rate by clock 28 as explained herein. Normally, this counter is biased to its reset or zero state by a negative voltage 871 so that when the loss balance achieved signal is applied to pulse counter 870, the negative biasing voltage is connected to ground whereby its biasing effectiveness is obviated. This renders the pulse counter operative so that after a count of 4 consecutive pulses supplied by the clock, pulse counter 870 transmits a voltage on lead 661 to master control 104 in FIG. 40A for stopping the loss balance as previously explained. Now the phase balance step is begun.

Pulse counter 872 is normally biased to its reset or zero state by a negative voltage source 873. When the phase balance achieved signal is applied to pulse counter 872, the negative biasing voltage is connected to ground whereby its biasing effectiveness is obviated. This renders pulse counter 872 operative so that after a count of 4 consecutive pulses supplied by the clock, pulse counter 872 transmits a voltage on lead 620 to master control 104 in FIG. 40A for terminating the phase balance as above mentioned. Next, the read frequency step is started as previously discussed regarding the master control in FIGS. 40A and 40B.

*Automatic operation to provide data for a given network under test*

For the purpose of facilitating an understanding of the present invention, data points of interest regarding the loss and phase characteristics over a preselected frequency range are so programmed that they are obtainable on either an automatic or semiautomatic basis. To do this, numerical values are preassigned to the ΔF frequency increment, ΔL loss increment and Δθ increment in one or more of the 1–5 ranges of frequency range control 699 in FIG. 15 for an assumed loss and phase characteristic of a given electrical device to be tested. The over-all testing frequency range is assumed to extend from 20 cycles per second through 20,000 cycles per second.

A program is set up to test a telegraph tone channel filter, for example, constituting unknown network 19 in FIGS. 4 and 14 and provided with a suitable identification number via adjustment of the thumbwheels in identification read out 80D in FIG. 13 as later explained for the purpose of the present explanation, with the following requirements: a center frequency of 2,975 cycles per second, together with Loss relative to center
frequency, db:            Frequency, c.p.s.
>3.0 ............................. 2975±42.5
>7.5 ............................. 2890
>16.0 ............................ 2975±170
>40.0 ............................ below 2400
>40.0 ............................ above 3700

Assuming an operating frequency band of from 1 kilocycle to 5 kilocycles, loss and phase are of interest, a program is set up as indicated in the table below:

TABLE B

| Range | Lower freq., kc. | Upper freq., kc. | ΔF, c.p.s. | ΔL, db | Δ, degrees |
|---|---|---|---|---|---|
| 1 | 1.00 | 2.65 | 300 | 10 | Off |
| 2 | 2.65 | 2.89 | Off | 3 | Off |
| 3 | 2.89 | 3.06 | Off | Off | 30 |
| 4 | 3.06 | 3.30 | Off | 3 | Off |
| 5 | 3.30 | 5.00 | 300 | 10 | Off |

In order to set up the program of Table B in FIG. 15, tuning knobs 69 and 83 are initially adjusted to set the frequency of testing oscillator 20 in FIGS. 3 and 4 at 1 kilocycle as indicated by film portion 77A for fixing the lower frequency of range 1. Thumbwheel switch 700 is set to read 2.65 thereby fixing the upper frequency of range 1 and the lower frequency of range 2. Thumbwheel switch 701 is set to read 2.89 for fixing the upper frequency of range 2 and the lower frequency of range 3. Thumbwheel switch 702 is set to read 306 for fixing the upper frequency of range 3 and the lower frequency of range 4. Thumbwheel switch 703 is set to read 3.30 for fixing the upper frequency of range 4 and the lower frequency of range 5. Thumbwheel switch 704 is set to fix the upper frequency of range 5.

In FIG. 15, in regard to ΔF frequency increments, knob switch 739 in range 1 is set at 300 c.p.s., knob switches 740, 741 and 742 in ranges 2, 3 and 4 are set at OFF, and knob switch 743 is set at 300 c.p.s.; in regard to ΔL loss increments—knob switch 745 in range 1 is set at 10 db, knob switch 746 in range 2 is set at 3 db, knob switch 747 in range 3 is set at OFF, knob switch 748 in range 4 is set at 3 db, and knob switch 749 in range 5 is set at 10 db; and in regard to Δθ phase increments—knob switches 750 and 751 in ranges 1 and 2 are set at OFF, knob switch 752 in range 3 is set at 30 degrees, and switches 753 and 754 in ranges 4 and 5 are set at OFF.

Power for operating an alarm circuit included in the measuring equipment of FIGS. 4 and 5, but not described herein, is made available by operating toggle switch 51 in FIG. 13 to its ON position as indicated by the illumination of its associated lamp 52. Mode selector switch 308 in FIG. 13 is moved to its automatic position AUTO. In this connection, it is understood that all circuit adjustments involved in this mode are made in the several figures as hereinbefore explained. As the testing frequency starts at 1 kilocycle and is therefore greater than 500 cycles per second, switch 73 in the testing oscillator of FIG. 3 is opened whereby filter 110 is connected into the measuring circuit of FIG. 5. At this time, finger switch 95 in FIG. 14 is adjusted to its middle position in FIG. 14 whereby the frequency counter 35 in FIG. 44 counts the testing frequency on a 1.0 second time base to an accuracy of ±1 cycle per second. Also, as previously mentioned, the frequency counter is operable on a 10-second time base for counting the testing frequency to an accuracy of ±0.1 cycle per second. Level control switch 152 in FIGS. 7 and 15 is actuated to such position as to supply the desired power level of testing signal to the inputs of the unknown device 19 under test and calibrated loss standard 21 in FIG. 4, as above explained.

Read out 80D in FIG. 13 comprises 6 finger wheels, each wheel including in sequence 0 through 9 digits disposed on the periphery thereof. These wheels are independently adjustable to provide the desired identification number which is read out with the data associated with the particular unknown device under test at a given time. It is also recalled from the previous explanation that when the numerical value of the frequencies provided by testing oscillator 20 in FIGS. 3 and 4 is below 500 cycles per second, clock 28 in the measuring circuit of FIGS. 4 and 5 provides automatically timing pulses at the 1.6 c.p.s. rate, filter 111 is connected in the circuit in FIG. 5 and frequency counter 35 in FIGS. 35 and 44 is counting the numerical value of the testing frequencies on a 10-second time base; and that when the numerical value of frequencies of the testing oscillator is above 500 cycles per second, the clock provides automatically timing pulses at the 8-c.p.s. rate, filter 110 is connected in the circuit of FIG. 5, and the frequency counter is counting the numerical value of the testing frequencies supplied by testing oscillator 20 in FIGS. 3 and 44 on a 1-second time base, for the purposes hereinbefore explained. Knob 34A in FIG. 14 is adjusted to its position to provide maximum accuracy of the indications established on its associated loss meter 34, and knob 610 in FIG. 13 is adjusted to provide maximum accuracy of the indications established on its associated phase null meter 43.

*Balance loss*

Operation of the measuring circuit of FIGS. 4 and 5 is initiated either by manually actuating press-to-start button 875 or balance loss button 662B in FIGS. 13 and 40A. As these buttons are electrically connected together, the actuation of either one suffices to start the measurements at the lower frequency of 1 kilocycle in range 1. Pressing balance loss button 662B in FIGS. 40A and 41 provides a voltage to operate relay 646B in FIGS. 40A and 41. When this relay operates it closes its swinger 646C on terminal 646D whereby a voltage on lead 661 from the output of the time out circuit in FIG. 49 holds relay 646B in FIG. 41 operated. In this connection, it is recalled from the previous explanation that until the time out circuit in FIG. 49 counts 4 consecutive timing pulses, the output of this circuit is the voltage which holds relay 646B in FIGS. 40A and 41 operated. Also, in response to the operation of this relay, its swinger 646E is closed on terminal 646F whereby a positive voltage is applied on lead 675 to enable gate 676 supplied with 4-c.p.s. clock pulses on lead 678 and gate 677 supplied with 8-c.p.s. clock pulses on lead 680. Assume calibrated loss standard 21 in FIGS. 4 and 6 is initially adjusted to 0 db loss. The 1 kc. testing voltage is alternately applied via the calibrated loss standard and unknown device in FIGS. 4, 5 and 25 to loss detector 33 which provides a voltage on lead 165 and a current in relay winding 175 of relay 176 which is operated to actuate its swinger 177 to disengage its associated contact 178 for removing ground from the swinger. The voltage on lead 165 applied to summing amplifier 233 in FIG. 9A and the voltage on lead 231 obtained from staircase voltage generator 224 in FIG. 9A provide an "add" voltage to lead 282 and successively discrete voltages to leads 284–289 in FIG. 12. These voltages activate loss standard control 106 in FIGS. 16–25 to provide discrete ground signals for connecting corresponding discrete loss networks and/or amplifiers in the calibrated loss standard 21 and gain control 100 in FIG. 6. In this connection, it is recalled from the previous description that the loss networks and amplifiers are introduced in a decreasing order of magnitude into the calibrated loss standard and gain control until the magnitude of the loss in the calibrated loss standard is equal to or balances substantially the unknown magnitude of the loss of the device under test in the circuit of FIGS. 4 and 5 at the 1 kc. frequency constituting the lower frequency of range 1 in FIG. 15.

Depending on whether relay 384 in FIG. 22 is de-energized or energized, 4-c.p.s. or 8-c.p.s. pulses are supplied via lead 679 or 681 in FIG. 40A and swinger 384C in FIG. 24 as corresponding timing pulses to loss standard control 106 in FIGS. 5, 24 and 25. One or the other of these timing pulses step flip-flop 423 and counting tubes 355, 351, 347 and 341 in FIGS. 21, 20 and 19 to provide the ground signals for connecting the discrete loss networks and/or amplifiers in the calibrated loss standard and gain control in FIG. 6. One of lamps 493, 492, 491 and 490 in FIGS. 14, 23 and 22 is illuminated to indicate when the loss unbalance between the calibrated loss standard and unknown device in FIGS. 4 and 6 is greater than 10, 1, 0.1 or 0.01 decibel.

Upon the occurrence of substantial balance or equality between the loss in the calibrated loss standard and the unknown device as indicated by a null reading on loss detector 33 in FIGS. 4, 5 and 6, that is, at an adjustment of such balance to a magnitude less than 0.01 decibel, the voltages on lead 165 at the input of summing amplifier in FIG. 9A is substantially zero. As a consequence, the discrete loss detector in FIGS. 12 and 25 provides no further discrete voltages on the output leads therof. Also, at this time, the current flow in the operating winding 175 of relay 176 in FIG. 8 is reduced substantially to zero whereupon this relay is released to permit its swinger 177 to engage contact 178 which is grounded. This ground is applied via balance-achieved terminals 438 and 439 and the connecting circuit therebetween in FIGS. 23 and 22 of loss standard control 106 in FIG. 49 to connect biasing source 871 thereto for nullifying the biasing effect of this source.

As a consequence, pulse counter 870 of the time out circuit in FIG. 49 is enabled to count 4 consecutive timing pulses provided by clock 28, of which the time out circuit is a part. After this 4 pulse count, the pulse counter 870 changes its previous output from a specific positive voltage to no voltage or ground for terminating the loss unbalance step. The no voltage is effective on lead 661 in FIGS. 40A and 41 to permit the release of relay 646B which supplies thereupon the voltage charge on capacitor 646 to operate relay 649 in FIGS. 40A and 41 thereby constituting the step of balancing the phase shift of the calibrated phase standard against the phase shift of the unknown device in FIGS. 4 and 5. At this time, the measured insertion loss of unknown device 19 in FIG. 4 at a testing frequency of 1 kilocycle is stored in flip-flop 423 and at the respective discharging cathodes of counting tubes 341, 347, 351 and 355 in FIGS. 19, 20 and 21 of the loss standard control 106 in FIG. 5, and is available at the closed swingers of relay 315 connected to the flip-flop and the additional relays connected to the respective cathodes of the counting tubes just mentioned. Depending on whether the flip-flop is activated and on the particular cathodes of the respective counting tubes discharging at the moment, ground is made available at the corresponding leads shown in FIG. 24 for a purpose that is later mentioned. It is noted that these leads are identified with different values of loss for measuring it to the maximum amount of 119.00 db in the manner above discussed, and are connected to read out control 46 in FIG. 52 as shown in FIG. 24.

*Balance phase*

Assume that the calibrated phase standard in FIGS. 4, 5 and 26 is initially adjusted to 0 phase shift. The testing signal is still applied alternatively via the path including the calibrated loss standard, converter, and strap, and the path including the unknown network, converter and phase standard, to the phase detector in FIGS. 4, 5 and 27 for providing voltages on leads 165A, 179A and 514 in the manner above described. For the present, current flow in the winding of relay 527 disengages its swinger 528 from ground. The voltage on lead 165A is applied to one input of summing amplifier 223A in FIG. 28A, together with the voltage on lead 231A derived from staircase voltage generator 224A in FIG. 28B, to provide an "add" voltage on lead 282A and successively discrete voltages on leads 283A–288A in FIG. 31. These voltages, together with the voltage on lead 514 in FIG. 27, activate phase standard control 108 in FIGS. 5, 31A and 32–38 to provide discrete voltages for connecting the discrete phase shifting networks into the calibrated phase standard in FIG. 26. In this connection, it is recalled from the previous description that the discrete phase shifting networks are connected in a decreasing order of magnitude into the calibrated phase standard until the magnitude of the phase shift introduced into the calibrated phase standard is equal to or balances substantially the unknown phase shift of the device under test in the measuring circuit of FIGS. 4 and 5 at the 1 kc. frequency constituting the lower frequency of range 1 in FIG. 15.

During the phase balancing operation, relay 649 in FIGS. 40A and 41 is maintained in its operated state by a voltage on lead 620 from the output of the time out circuit 4 pulse counter 872 in FIG. 49. As previously pointed out, the output of the time out circuit is a positive voltage until 4 consecutive timing pulses are counted. Until this time, swinger 652 in FIG. 41 is actuated to engage terminal 658 having the source of positive voltage connected thereto, and swinger 654 is moved to engage terminal 660 for increasing the magnitude of the voltage charge thereon to the magnitude of the latter voltage source. The positive source of voltage at terminal 658 is applied via its associated swinger 652 and lead 653 to AND gate 659 in FIGS. 40A and 41. This gate is enabled to transmit 8-c.p.s. timing pulses originating on lead 680 connected to clock 28 in FIGS. 4 and 5. These timing pulses applied to terminal 530 in FIG. 31A included in phase standard control 108 in FIGS. 4, 5, 26 and 39 activate flip-flops 566 and 567 and step counting tubes 580, 587 and 599 in FIGS. 31A, 32, 33 and 34 of the phase standard control 108 in FIG. 39 to provide the voltages for connecting the discrete phase shift networks into the calibrated phase standard in FIG. 26. One of lamps 564, 288B, 483, 585, 588, 596A or 598A in FIGS. 13, 31A and 32–34 is now illuminated to indicate when the phase unbalance between the calibrated phase standard and unknown device in FIGS. 4 and 5 is greater than 90, 30, 10, 3, 1, 0.3 or 0.1 degrees.

Upon the occurrence of substantial balance or equality between the phase in the calibrated phase standard and the unknown device as indicated by a null reading on meter 43 connected to phase detector 37 in the measuring circuit of FIGS. 4 and 5, that is, at an adjustment of such balance to the magnitude less than 0.1 degree, the voltages on leads 165A and 231A in FIG. 28A are rendered substantially zero. As a consequence, the discrete phase detector in FIGS. 31 and 39 provides no further discrete voltages on the output leads thereof. Also, at this time the current in the operating winding of relay 527 included in the phase detector in FIG. 27 is reduced substantially to zero whereupon this relay is released to permit its swinger 528 to engage the associated ground terminal. This ground is applied via balance-achieved terminal 530 and associated terminal and lead 620 and interconnecting circuit therebetween in FIGS. 31A, 32–34 and 49 of the phase standard control to connect biasing source 873 thereto for nullifying the biasing effect thereof.

As a consequence, pulse counter 872 of the time out circuit in FIG. 49 is enabled to count 4 consecutive 8-c.p.s. timing pulses provided by clock 28 via lead 680 in FIG. 40A. After this 4 pulse count, the pulse counter 872 changes its previous output from a specific positive voltage to no voltage or ground for terminating the phase unbalance step. At this time, the measured insertion phase shift of the unknown device at the 1 kc. testing frequency is stored in the activated flip-flops and at the discharging cathodes of the respective counting tubes included in FIGS. 31A and 32–34 of the phase standard control 108 in FIGS. 4, 5 and 39. This measured amount is made available at the corresponding leads identified with specific amounts of phase shift and connected to read out control 46 in FIG. 52 as indicated in FIGS. 36, 37 and 38, for a purpose that is presently mentioned. The no voltage is effective on lead 620 in FIGS. 34, 40A, 41 and 49 to enable the release of relay 649 in FIGS. 40A and 41 which supplies voltage via its capacitor 655 to operate the corresponding relay in the 1-second or 10-second frequency control 664 or 665 for instituting the read-frequency step indicated by illuminated lamp 498 or 500 in FIG. 13.

The activation of either the 1-second or 10-second frequency control 664 or 665 provides a voltage on the corresponding lead 683 or 684, both of which are connected to frequency counter 35 in FIGS. 4, 5 and 44. The voltage on one or the other of these leads activates the frequency counter for a purpose that is presently explained. It will be recalled from the previous explanation that the 1 kc. frequency constituting the lower frequency of range 1 in FIG. 15 is now stored in the frequency counter. In due course, the charge on the capacitor included in the 1-second or 10-second control applied via gate 664B in FIGS. 40A, 40B and 41 stimulates display data control 666 in FIG. 40B to provide a voltage on lead 685 in FIG. 40B.

*Display data*

It is assumed that the device under test is assigned an identification number by appropriate adjustments of finger wheels in identification number read out 80D in FIG. 13.

Read out control 46 in FIGS. 4, 5, and 52 is activated by a positive voltage applied via lead 685 by master control 104 in FIGS. 5 and 40A and 40B to gating 880 in FIG. 52. It is now recalled that the measured amount of loss is stored at the closed swingers of the loss standard control in FIG. 24; the measured amount of phase shift is stored at the appropriate leads identified to read out control 46 in FIG. 52 as indicated in FIGS. 36, 37 and 38; and that a digital indication of the testing frequency is stored in frequency counter 35 in FIG. 44. Due to the voltage supplied on lead 685 in FIGS. 40B and 52, the numerical amounts are simultaneously read out of the respective loss and phase standard controls and frequency counter just mentioned and into loss read out 80A, phase read out 80B and frequency read out 80C in FIGS. 13 and 52.

As one example, the amount of loss stored in the loss standard control is assumed to be the 35.26 db hereinbefore mentioned, and it is read out from the 3 and 5 cathodes of counting tubes 355 and 351, respectively, in FIG. 20 and the 2 and 6 cathodes of counting tubes 347 and 341, respectively, in FIG. 16. For this read out, it is obvious from the preceding explanation that flip-flop 423 in FIG. 21 is not involved. As one example, the amount of phase shift stored in the phase standard control is assumed to amount to 145.8 degrees as hereinbefore mentioned, and this amount is read out from the output of encoder 557 in FIG. 36 from the 5 cathode of counting tube 587 in FIG. 37 and from the 8 cathode of counting tube 599 in FIG. 38. For this amount, it is obvious from the preceding explanation that flip-flop 567 in FIG. 31A is involved but its associated flip-flop 566 is not involved, and the 5 cathode of counting tube 580 in FIG. 32 is also involved. As one example, the numerical value of the testing frequency stored in the frequency counter is assumed to be 400 cycles per second from lead G in FIG. 44 hereinbefore mentioned. This amount is read out from the frequency counter at the 1-second or 10-second time rate shown in master control 104 in FIGS. 5 and 40B and is recorded in read out 80C in FIG. 13. The amount of read out could also involve the 1 kc. lower band of range 1 as above mentioned. If so, the voltage derived from lead I in FIG. 44 is applied to gating 880 in FIG. 52.

It is understood from the previous description of the disposition of finger switch 95 in the programmed position in FIG. 14 that the tenths display in the visual display is available for testing frequencies below 500 cycles per second but is always zero for testing frequencies above 500 cycles per second. In reading out loss and phase, it is further recalled from the preceding explanation that the precision of balance in the automatic mode 190 in FIGS. 14 and 18 plays a part in the respect that the loss read out may or may not include tenths and hundredths digits and the phase read out may or may not include units and tenths digits depending on precision of balance. For example, if the measured loss were 77.36 db as stored in loss standard control 106 in FIGS. 5 and 16–24, such loss is read out into loss read out 80A in FIG. 13 as 77.30 db because the precision of automatic loss balance is automatically adjusted to 0.1 db as indicated in precision of automatic mode balance 190 in FIGS. 14 and 18 wherein the measured loss lies between 60 and 80 db. At the same time, a measure phase shift 195.6 degrees, for example, is read out as 195.0 degrees because the measured loss lies between 60 and 80 degrees as above noted.

*Print out*

Upon the completion of step of display data, the voltage originating on the capacitor in display data control 666 operates the relay in punch control 667 in FIG. 40B in the manner described above regarding the circuit of FIG. 41 to place a voltage on lead 686 to activate stepping switch drive 881. This actuates its swinger 882 in a counter clockwise direction from its A through D terminals to transfer the following data in sequence to tape punch 48 from the corresponding read outs in FIG. 13: the numerical identification number in read out 80D, the numerical amount in loss in read out 80A, the numerical amount of phase shift in read out 80B, and the numerical amount of the testing voltage frequency in read out 80C. The punched tape in tape punch 48 containing the pertinent data is available to be processed by typewriter 49 or equivalent data processing equipment.

*Frequency sweep control*

As the cycle of operation of the automatic mode is now recorded in the punched tape, the measuring circuit of FIGS. 4 and 5 is ready to perform its final operational step of frequency sweep FREQ SWEEP shown in FIG. 13. This step serves to sweep the frequency to its next numerical value for obtaining data on the loss and phase measurements. Upon the completion of the print out step and at the beginning of the sweep, a voltage originating in punch control 667 of the master control in FIG. 40B operates the relay in frequency sweep control 668 in FIG. 40B in the manner explained above regarding the master control circuit of FIG. 41. The operation of this relay removes ground from lead 688 in FIGS. 40B and 45 thereby enabling the transmittal of voltage on lead 737 in FIG. 45 to amplifier 71 and servo 47 in FIG. 3 for starting the frequency sweep or the testing oscillator. At this time, a voltage placed on lead 82 in FIGS. 3 and 40B, when a voltage is also present on the AFC engaged lead 88, is applied via AND gate 88A to reset ΔF frequency increment counter 78 in FIG. 3 to a zero count. It is noted that when the AFC is engaged, a lamp so identified is illuminated in FIGS. 3 and 15.

The voltage on reset lead 82 in FIG. 3 is transmitted through AND gate 88A only when the last data point indicated was taken because the programmed ΔF frequency increment in range 1–5 in FIGS. 15 and 46 coincided with the actual numerical value of the increase in the testing frequency thereby causing the AFC circuit to be engaged. As previously pointed out, photo diode 77 in FIG. 3 senses each 100 c.p.s. marker line provided on the testing oscillator calibrated film scale of film scale and photodiode 77 in FIG. 3 and in response thereto transmits one voltage pulse to the input of ΔF counter 78 for providing discrete voltages on leads 79, 80 or 81, but voltages on these leads are not involved at this time for measuring the loss and phase of the unknown device in FIG. 4 for the assumed one kilocycle testing frequency constituting the lower frequency of range 1 in the above Table B. It is thus seen that the loss, phase and one kilocycle testing frequency at the lower edge of range 1 have been measured and printed out as indicated hereinafter in Table C.

Further in range 1, measurements of the numerical value of the testing frequency, loss and phase are to be made at the programmed ΔF increments of 300 c.p.s., ΔL increments of 10 db and no Δθ increments as shown in above Table B. The next measurements are made at the above-noted programmed increment of ΔF or ΔL depending on which increment is equaled first as the sweep progresses. Lamp 715 in FIGS. 15 and 43 is illuminated to indicate that the measuring circuit is operating in range 1. It is now assumed that ground is removed from lead 688 in FIGS. 40B and 45 to place a voltage on lead 737 from the maximum output of voltage dividers 790 and 791 in FIG. 45 for activating servo 47 in FIG. 3 to start to increase the numerical value of the testing frequency provided by the testing oscillator above one kilocycle at which the measurements were just made. At this time in FIGS. 15 and 46, ΔF knob switch 739 is disposed at its 300 c.p.s. terminal, ΔL knob switch 745, or ΔL knob switch 745A in FIG. 45, is disposed at its 10 db terminal, and Δθ knob switch 750, or 750A in FIG. 45, is disposed at its OFF terminal.

It is also assumed that the numerical value of the testing frequency is increasing above the one kilocycle testing frequency range 1 as just mentioned to establish coincidence with the ΔF frequency interval of 300 c.p.s. or the ΔL loss interval of 10 db programmed in range 1. Assume that the loss unbalance has remained less than 10 db as the oscillator is swept up to 1300 c.p.s. Relay 792 in FIG. 47 is as yet unenergized because flip-flop 716 has not been activated to the set state, so there is no voltage on lead 716B in FIGS. 43 and 47. Due to the 300 c.p.s. increase in the numerical value of the testing frequency provided by oscillator 29 in FIG. 3, ΔF counter 78 in FIGS. 3 and 46 counts three successive 100 c.p.s. black lines to provide a voltage on lead F1 connected to ΔF switch 739 in FIGS. 15 and 46. This voltage is applied via lead F1 in FIG. 47 together with a voltage from source 824 to enable gate 800, which is transmitted by gate 820 to supply an engaged AFC voltage on lead 88 in FIGS. 3 and 47 and a voltage via gate 821 to lead 823. The latter voltage is applied via lead 687 to activate frequency sweep control 668 in FIG. 40B to apply a ground to leads 82 and 688. The ground on lead 688 grounds the output of the voltage dividers 790 and 791 in FIG. 45 thereby removing activating voltage from lead 737, amplifier 71 and servo 47 in FIGS. 3 and 45. This voltage removal from lead 737 stops the numerical frequency sweep of the testing oscillator 29 in FIGS. 3, 4 and 5.

In FIGS. 40A, 40B and 41, it is noted that the voltage due to the charge on a capacitor included in frequency sweep control 668 and corresponding to capacitor 655 in FIG. 41 is applied on lead 670 to operate relay 646B in FIGS. 40A and 41, and that a voltage is also effective on lead 661 at this time from the output of 4 pulse counter 870 in FIG. 41 to hold relay 646B in the operated condition. This provides a voltage on lead 675 to enable gates 676 and 677 in FIG. 40A to transmit 4 c.p.s. and 8 c.p.s. timing pulses via leads 679 and 681 to terminals 365 and 366 in FIG. 24 of loss standard control 106 in FIGS. 4, 5 and 25 to change the loss in the calibrated loss standard 40 in FIGS. 5 and 6 at the 1300 c.p.s. value of the testing frequency. The new value of the loss of the device under test at the 1300 c.p.s. testing frequency is reflected in the change of the loss count in loss standard control 106 in FIGS. 5 and 16–24.

Assuming now that the loss of the calibrated loss standard has been adjusted to equal substantially the unknown loss of the device under test and that the new amount of loss is presently stored in the calibrated loss standard and measured in the loss standard control as just mentioned, the voltage on lead 661 in FIGS. 40A and 49 is replaced with ground from time out circuit in FIG. 49 due to the completion of the 4 consecutive pulse count at the loss balance. This enables loss control 662 in FIG. 40A to supply a voltage to phase control 663 which is thereby activated to supply timing pulses on lead 682 to phase standard control 108 in FIGS. 5 and 31A and 32–38. These timing pulses stimulate the phase standard control to balance the phase shift of calibrated phase standard 40 in FIGS. 5 and 26 to equal the phase shift of the network under test at the new 1300 c.p.s. testing frequency. The change in phase shift is reflected in the change of the measurement in phase standard control 108 in FIGS. 5, 31A and 32–39.

As the phase of the network under test is balanced at the new 1300 c.p.s. testing frequency, the action of phase control 663 in FIG. 40A is terminated and thereafter it is transferred to the 1-second or 10-second frequency control 664A or 665A in FIG. 40A to provide a voltage on lead 683 or 684 for activating frequency counter 35 in FIGS. 4 and 44. After a 1.1-second or 11-second time delay, the corresponding 1-second or 10-second frequency control is deactivated and display data control 666 in FIGS. 40B and 52 is activated to provide a voltage on lead 685. It is assumed now that identification read out 80D in FIGS. 13 and 52 has been provided with a suitable number such, for example, 000123 given hereinafter in Table C for identifying the data disclosed ultimately therein. The voltage on lead 685 in FIGS. 40B and 52 activates gating 880 to read out simultaneously the amount of loss measured in loss standard control 106, the amount of phase shift measured in phase standard control 108 and the 1300 c.p.s. testing frequency stored in frequency counter 35.

After the 1-second time delay, the display data control is deactivated, and punch control 667 is activated to transfer the numerical values in sequence from the read outs 80D, 80A, 80B and 80C in FIGS. 13 and 52 to a punched tape 48. These comprise the loss and phase measurements at the 1300 c.p.s. testing frequency in Table B below. Upon the completion of the tape punching, a voltage from punch control 667 in FIG. 40B operates a relay in frequency sweep control 668 in the manner of a corresponding relay in FIG. 41 to remove ground from lead 688 in FIGS. 40B and 45. This supplies a voltage on lead 737, to amplifier 71, in FIGS. 3 and 45 and thereby activates the testing oscillator to increase the testing frequency beyond 1300 c.p.s. for the next measurement. Also, at this time, frequency sweep control 668 in FIG. 40B provides a voltage on lead 670 to operate relay 646B in FIGS. 40A and 41 for the next succeeding cycle of measurements in range 1.

In the recycling action for displaying and recording measurements in range 1, it is understood that if and when a coincidence occurs between the programmed ΔL loss increment and the measured change in the loss of the device under test, the voltage on lead L1 connected to ΔL switch 745B in FIG. 46 is applied to lead L1 at gate 805 in FIG. 47 for stopping the testing frequency sweep. Similarly, if a phase increment has been programmed when a coincidence occurs between the programmed Δθ phase increment and the measured change in the phase shift of the device under test, the voltage on lead θ1 at Δθ switch 750B in FIG. 46 is applied to lead θ1 at gate 810 in FIG. 47 for stopping the testing frequency sweep. It is also understood that if and when the ΔL loss unbalance or Δθ phase unbalance equals one increment less than the programmed values of ΔL or Δθ, the voltage at leads 834 and 836 in FIG. 48 operates relay 736 in FIG. 45 which serves to slow down the rate of change of the testing frequency provided by oscillator 20 in FIG. 3.

When the upper frequency limit of range 1 is reached, binary coded decimal thumbwheel switch 700 in FIGS. 15 and 43 is activated in the manner of similar switch 703 to provide an output voltage for setting flip-flop 716 in FIG. 43. In the set state, this flip-flop supplies a voltage for operating relay 717 which moves its swinger 718 to engage its terminal 719 for transferring the operation to range 2. This extinguishes lamp 715 and illuminates lamp 720 in FIGS. 15 and 43. In range 2, as well as in ranges 3–5, the frequency, loss and phase measurements are effected in the manner just described for range 1.

As the measuring system is operating in the automatic mode, and since two cycles of its operation are completed in range 1, the measurements thereof are recorded in Table C below, the system recycles and performs automatically the several functions in the manner discussed above regarding the two cycles of operation for the purpose of achieving measurements of the data points programmed in above Table B and indicated by the remaining entries in Table C. The entries of Table C for the filter network under test are plotted to provide the loss and phase characteristics shown in FIG. 50.

TABLE C

| Identification Number | Loss in db | Degree Phase | Frequency in c.p.s. |
|---|---|---|---|
| 000123 | 77 | 195 | 1,000 |
| 000123 | 70 | 194 | 1,300 |
| 000123 | 64.5 | 193 | 1,600 |
| 000123 | 58 | 192 | 1,900 |
| 000123 | 51 | 191 | 2,200 |
| 000123 | 45.5 | 194 | 2,460 |
| 000123 | 42 | 194 | 2,500 |
| 000123 | 34 | 196 | 2,650 |
| 000123 | 31 | 198 | 2,750 |
| 000123 | 27.5 | 204 | 2,760 |
| 000123 | 25 | 210 | 2,800 |
| 000123 | 21.5 | 213 | 2,820 |
| 000123 | 18 | 222 | 2,860 |
| 000123 | 15 | 228 | 2,890 |
| 000123 | 9 | 255 | 2,900 |
| 000123 | 6 | 297 | 2,960 |
| 000123 | 4.5 | 330 | 2,980 |
| 000123 | 4.5 | 0 | 2,990 |
| 000123 | 4.75 | 33 | 3,000 |
| 000123 | 6.00 | 63 | 3,020 |
| 000123 | 9.00 | 96 | 3,040 |
| 000123 | 12.5 | 117 | 3,060 |
| 000123 | 15.5 | 133 | 3,100 |
| 000123 | 19.5 | 146 | 3,110 |
| 000123 | 23.0 | 150 | 3,190 |
| 000123 | 26 | 156 | 3,210 |
| 000123 | 30 | 159 | 3,260 |
| 000123 | 40 | 165 | 3,500 |
| 000123 | 47.5 | 169 | 3,800 |
| 000123 | 52.5 | 170 | 4,100 |
| 000123 | 56.0 | 170 | 4,400 |
| 000123 | 59.5 | 170 | 4,700 |
| 000123 | 62.5 | 168 | 5,000 |

From Table C and the curves in FIG. 50, ranges 1 and 5 demonstrate that the data points therein are mostly taken at the frequency interval Δf=300 c.p.s. which was programmed in those ranges, and further since a loss increment ΔL=10 db was programmed in ranges 1 and 5, the loss of unknown did not deviate more than 10 db between any two adjacent data points. In ranges 1 and 5 it is also seen that loss is greater than 40 db at frequencies below 2400 c.p.s. and greater than 40 db above 3700 c.p.s. as stated in the above requirements for the filter under test. Ranges 2 and 4 illustrate that the data points therein are programmed at a loss increment ΔL=3 db whereas the requirements for the telephone tone channel filter assumed that the loss should be greater than 7.5 decibels at a 2890 c.p.s. frequency and greater than 16.0 decibels at a frequency of 2875±170 cycles per second. In range 3, phase change is substantially linear relative to frequency, and Δθ phase increment programmed 30 degrees provides seven data points having about 30 degrees spacing between adjacent points.

FIG. 51 is a block diagram of a simplified form of the over-all programming and sweep control system and includes the identification of essential leads connecting the important components forming this system.

*Semiautomatic measuring mode*

This is obtainable in the over-all measuring system shown in FIGS. 4 and 5 by actuating finger knob 303 in FIGS. 13, 16 and 35 to the semiautomatic position S.A. This mode has the advantage that a workman is enabled to initiate any step as desired out of order in the sequence of six steps comprising balance loss BAL LOSS, balance phase BAL PHASE, read frequency READ FREQ T=1 or T=10, display data DISPLAY DATA, print out PRINT OUT, and frequency sweep FREQ SWEEP in FIG. 13. This is achieved by merely manually actuating the appropriate button in FIG. 13. In this mode, the choice of the numerical value of the testing frequency may be manually made by the workman or left to the program 105 as shown in FIGS. 5 and 51. An additional advantage is that one or more of the six steps may be omitted. If, for example, the phase shift of a given unknown electrical device is not of interest, then the step of balancing phase BAL PHASE in FIG. 13 is omitted. A further advantage is that the bandwith filters 110 and 111 in FIG. 5 may be manually selected by the workman with a manual actuation of the appropriate button 493A or 495 in FIG. 13. These buttons operate relay 112 in FIG. 5 as desired. Otherwise the operation of the semiautomatic mode is identical with that described hereinbefore for the automatic mode.

It is to be understood that the above-described embodiment is merely illustrative of the application of the invention. Numerous other embodiments may occur to those skilled in the art without departing from the spirit and scope of the invention.

What is claimed is:

1. In an electrical system for automatically measuring the unknown magnitude of a quantity of an electrical device in one frequency band of a predetermined frequency range, means for providing a testing voltage over a predetermined frequency range, means for dividing said range into a plurality of different subdivision bands including said one band, means for preselecting a parameter representing a numerical value of an increment of said quantity in said one band, means to automatically sweep said one band of the frequency of said testing voltage in an increasing sense from the lowermost frequency of said one band toward the uppermost frequency for transmitting said testing voltage through said device, means for indicating the numerical value of the frequency of said testing voltage transmitted through said device, means connected to the output of said device for continuously measuring the output thereof which is indicative of the unknown magnitudes of a quantity of said device over the swept frequency band, means for comparing said output with a preselected quantity, means for automatically stopping the sweep of the testing voltage frequency on the occurrence of equality between said output and preselected quantity, means for recording the measured numerical magnitude of said device quantity at the numerical value of the lowermost testing frequency and at each stopping of the testing voltage frequency sweep together with the counted numerical value of the testing voltage frequency at the previous numerical value thereof and at each stopping of the testing voltage frequency sweep in said one band, and means for starting the testing voltage frequency sweep after each said stopping of the same.

2. The system according to claim 1 which includes means for preselecting a numerical value of an increment of said testing frequency in said one band, and means for stopping the sweep of the testing voltage frequency on the occurrence of a change in the counted numerical value of the testing voltage frequency relative to the counted numerical value of the lowermost testing voltage frequency and equal to the preselected frequency increment in said one band, said recording means recording the measured numerical magnitude of said device quantity at said last-mentioned stopping of the testing voltage frequency sweep and the counted numerical value of the testing voltage frequency at said last-mentioned stopping of the testing voltage frequency sweep in said one band.

3. In combination, in an electrical system for automatically measuring the unknown magnitudes of a plurality of different quantities of an electrical device over a predetermined frequency band, a source of testing voltage variable in frequency over said range for application to said device, means for dividing said range into a plurality of different subdivision bands, means for preselecting numerical values of a frequency increment and an increment of each of said quantities in said bands, means to sweep the numerical value of the frequency of a testing voltage from the lowermost frequency of the lowest frequency band in an increasing sense through said bands for transmitting the testing voltage through said device, means for indicating the numerical value of the frequency of the testing voltage transmitted through said device, means for measuring the numerical magnitudes of each of said quantities at the output of said device at the numerical value of the lowermost testing voltage frequency and with the frequency sweep of the testing voltage through said bands, means for stopping the testing frequency sweep on the occurrence of each change in the numerical value of the counted testing voltage frequency relative to the counted numerical value at the lowermost testing voltage frequency and equal to the preselected frequency increment in said bands and on the occurrence of each change in the measured numerical magnitude of each quantity relative to the measured magnitude of the corresponding quantity at the lowermost frequency and equal to the preselected numerical increment of the corresponding quantity in said bands, means for starting the testing frequency after each of said stoppings, and means for recording the numerical magnitude of each of said quantities at the numerical value of the lowermost testing frequency and at each stopping of the testing voltage sweep and the numerical value of the lowermost testing frequency and the numerical value of the testing voltage frequency at each of said last-mentioned stoppings of the sweep thereof in said bands.

4. Electrical measuring apparatus for measuring the unknown magnitudes of a plurality of different quantities of an electrical device in different frequency subdivision bands forming a predetermined frequency range, comprising programming means to preselect numerical increments of frequency and of each of said quantities in said bands, a source of testing voltage variable in frequency over a predetermined frequency range, master control means to control the frequency sweep of the testing voltage in an increasing sense from a lowermost frequency in a lowest of said bands through said bands and the application of the testing voltage to said device, means activated by said master means for counting the numerical value of the frequency of the testing voltage applied to said device from the lowermost frequency, means actuated by said control means for measuring the magnitude of each of said quantities at the numerical value of the lowermost testing frequency and with variations of the testing voltage frequency at the output of said device, means stimulated by said master means to stop the testing frequency sweep when the changes of the counted testing frequency relative to the counted lowermost testing frequency equals the programmed frequency increments in said bands and when the changes of the measured numerical magnitude of any one of said quantities relative to the measured numerical magnitude of the corresponding one quantity at the lowermost testing frequency equals the corresponding programmed numerical increments thereof in said bands, means for starting the testing frequency after each of said stops, recording means, and means operated by said master means to record the measured numerical magnitudes of said quantities at the lowermost testing frequency and at numerical variations of the testing frequency and the counted numerical values of the testing voltage frequency at the lowermost value thereof and at each of said stoppings of the testing voltage frequency sweep in said bands.

5. The apparatus according to claim 4 which said programming means includes means to preselect one of a plurality of different numerical increments for each of said quantities in said bands, and said master control means includes means to enable said control means to control the testing voltage frequency sweep at one time rate, said enabling means responsive to a voltage provided by said master control varying said one time rate of the testing voltage frequency sweep to a different time rate when the measured numerical magnitude of the one quantity stimulating said control means to stop the testing voltage frequency sweep equals a preselected numercial increment next preceding the programmed numerical increment of the corresponding quantity which stimulated said control means to stop the testing voltage frequency sweep in said bands.

6. The apparatus according to claim 4 in which said master control means includes a source of testing voltage calibrated in predetermined equal frequency steps, an AFC circuit, and means to provide a voltage to activate said AFC circuit to lock in the counted numerical value of the swept testing frequency with the nearest calibrated predetermined step of said source when the numerical value of the counted testing frequency falls within ± a predetermined number of cycles of the last-mentioned predetermined step thereby obviating error in the numerical value of the testing voltage frequency.

7. In combination, in an electrical system for automatically measuring the unknown magnitudes of loss and phase shift of an electrical device over a predetermined frequency range, a source of testing voltage variable in frequency over a predetermined frequency range, means for dividing said range into a plurality of subdivision bands, means for preselecting numerical increments of a testing frequency, loss and phase shift in said bands, means to sweep the numerical value of the frequency of a testing voltage at a certain time rate in an increasing sense from a lowermost frequency of the lowest of said bands and through said bands for transmission through said device, means for counting the numerical values of the lowermost frequency and the swept frequencies of the testing voltage applied to said device, means for measuring the numerical magnitude of the loss and phase shift represented by the testing voltage at the lowermost and swept testing frequencies at the output of said device, means cooperating with said preselecting means to stop the testing voltage frequency sweep on the occurrence of each change of the counted numerical frequency value relative to the numerical value of the lowermost testing frequency and equal to the preselected numerical frequency increment and on the occurrence of changes in the measured numerical values of said loss and phase shift relative to the measured numerical values of the corresponding loss and phase shift at the lowermost testing frequency and equal to the preselected numerical increments of said loss and phase shift in said bands, means for starting the testing frequency after each of said stops, recording means, and means for recording the numerical values of the measured loss and phase shift at the lowermost testing frequency and at each stopping of the testing voltage frequency sweep and the numerical values of the lowermost testing frequency and the testing frequency at each last-mentioned stopping of the sweep thereof in said bands.

8. The combination according to claim 7 in which said preselecting means includes means for preselecting one of a plurality of different loss numerical increments in said bands, and which also includes means operated to activate said sweep means to change the certain time rate sweep of the testing voltage frequency to a different time rate sweep of the testing voltage frequency when the change of the measured numerical device loss attains the value of the numerical loss increment next preceding the preselected numerical loss increment stopping the testing frequency sweep in said bands thereby minimizing frequency overshoot.

9. The combination according to claim 7 in which said preselecting means includes means for preselecting one of a plurality of different phase shift numerical increments in said bands, and which also include means operated to activate said sweep means to change the certain time rate sweep or the testing voltage frequency to a different time rate sweep of the testing voltage when the change of the measured numerical phase shift attains the value of the numerical phase shift increment next preceding the preselected numerical phase shift increment stopping the testing frequency sweep in said bands thereby minimizing frequency overshoot.

10. The combination according to claim 7 in which said sweep means includes a source of testing voltage calibrated, in predetermined equal frequency steps, an AFC circuit, and means to provide a voltage to activate said AFC circuit to lock in the counted numerical value of the swept testing frequency with the nearest calibrated predetermined step of said source when the numerical value of the counted testing frequency falls within ± a predetermined number of cycles of the last-mentioned predetermined step thereby obviating error in the numerical value of the testing voltage frequency.

11. The combination according to claim 10 in which said preselecting means preselects one of a plurality of multiples of a given numerical frequency increment, said sweep means includes means to count the number of frequency multiples selected by said preselecting means, and said cooperating means provides a voltage to reset said multiple counting means to zero when the change in the counted numerical value of the testing frequency equals the numerical value of the preselected frequency multiple.

12. Apparatus for automatically measuring the unknown values of loss and phase shift of an electrical device at discrete frequencies over a predetermined frequency range, comprising a source of testing voltage variable in frequency over said range for application to said device, means for providing a plurality of different subdivision frequency bands extending over said range, means for preselecting one of a plurality of different numerical values of frequency, loss or phase shift increments available in said bands, means for sweeping the numerical value of a testing voltage frequency in an increasing sense at one time rate through said bands from the previous frequency of the lowest of said bands to transmit the testing voltage through said device, means for counting the numerical value of the frequency of the testing voltage transmitted through said device, means for counting multiples of a lowest one of said frequency increments available to said preselecting means in said bands, means for utilizing the voltage at the output of said device as a measurement of the numerical magnitudes of the loss and phase shift of device at the lowermost and swept numerical values of the testing voltage frequency, means controlled by said frequency counting means and band subdivision means to provide an output voltage indicating a particular subdivision band in which the testing voltage frequency is operating at a given moment, means controlled by said last-mentioned voltage and a voltage representing coincidence between said multiple counting means and said frequency increment preselected by said preselecting means to provide a further output voltage, recording means, means controlled by said further output voltage to stop the testing voltage frequency sweep for recording the numerical values of the measured loss and phase shift and the counted testing voltage frequency at the time at which the testing voltage frequency sweep was stopped, and means for starting the testing frequency after each stop.

13. The apparatus according to claim 12 which includes means responsive to said first-mentioned output voltage and a voltage representing coincidence between a change in the measured numerical value of said device loss at the lowermost testing frequency and said loss increment preselected by said preselecting means to provide another output voltage, and means controlled by said last-mentioned other output voltage to stop the testing voltage frequency sweep for recording the numerical values of the measured loss and phase shift and the counted testing voltage frequency at the time at which the testing voltage frequency was stopped.

14. The apparatus according to claim 12 which includes means responsive to said first-mentioned output voltage and a voltage representing coincidence between a change in the measured numerical value of said device phase shift at the lowermost testing frequency and said phase shift increment preselected by said preselecting means to provide an additional output voltage, and means controlled by said last-mentioned additional output voltage to stop the testing voltage frequency sweep for recording the numerical values of the measured loss and phase shift and the counted testing voltage frequency at the time at which the testing voltage frequency was stopped.

15. The apparatus according to claim 13 in which said preselecting means preselects one of a plurality of different loss increments in said bands, and said responsive means includes means for activating said frequency sweep means to sweep the testing voltage frequency at a time rate different from said one time rate when the change of the measured numerical device loss reaches a numerical loss increment next preceding the preselected numerical loss increment in said bands thereby minimizing frequency overshoot.

16. The apparatus according to claim 14 in which said preselecting means preselects one of a plurality of different phase shift increments in said bands, and said responsive means includes means for activating said frequency sweep means to sweep the testing voltage frequency at a time rate different from said one time rate when the change of the measured numerical phase shift reaches a numerical phase shift increment next preceding the preselected numerical phase shift increment in said bands thereby minimizing frequency overshoot.

17. The apparatus according to claim 12 in which said stopping means includes means for activating said testing voltage sweep means to start the testing voltage frequency sweep after the recording of the numerical values of the measured loss and phase shift and the testing voltage frequency.

18. The apparatus according to claim 12 in which said stopping means includes means to reset said multiple increment counting means to zero upon completion of the recording of the numerical values of the measured loss and phase shift and the testing voltage frequency.

19. Apparatus for automatically measuring the unknown values of loss and phase of an electrical device at discrete frequencies over a predetermined frequency range, comprising a source of testing voltage variable in frequency over said range for application to said device, means for dividing said range into a plurality of subdivision frequency bands each providing an output voltage indicating the corresponding band, means for preselecting one of a plurality of different numerical parameters of each of frequency, loss or phase increments available in said bands, means to activate said source for automatically sweeping the said frequency range in an increasing sense through said bands from the lowermost frequency of the lowest of said bands to transmit the testing voltage through said device, means for indicating the numerical value of said testing frequency, means for continuously measuring the frequency, loss and phase, respectively, at the output of said device, first gating means responsive to output voltages from said frequency counter and said range dividing means for providing a voltage representing a particular band to which said testing frequency is adjusted at a given moment, second gating means responsive to said last-mentioned voltage and a voltage indicating a coincidence between an output voltage of said frequency multiple counting means representing a frequency change relative to said previous frequency and said preselected frequency increment in said particular band, or a voltage indicating a coincidence between a voltage representing a change in the measured numerical value of said loss relative to the numerical value of the measured loss at the previous testing frequency and a voltage representing said preselected loss increment in said particular band, or a voltage indicating a coincidence between a voltage representing a change in the measured numerical value of said device phase shift relative to the numerical value of the measured phase at the previous testing frequency and a voltage representing said preselected phase increment in said particular band for providing an output voltage at each of such coincidences, and means responsive to each of said coincidence output voltages for activating said sweeping means to stop the frequency sweep of said testing voltage source, means for starting the testing voltage frequency sweep after each stopping thereof, measuring means, said next to last mentioned means activated by said measuring means and each of said coincidence output voltages for recording the corresponding numerical values of the testing frequency counted by said counting means and the measured numerical values of said device loss and phase shift at the particular frequencies at which the swept testing frequency was stopped.

No references cited.

RUDOLPH V. ROLINEC, *Primary Examiner.*

WALTER L. CARLSON, *Examiner.*

E. E. KUBASIEWICZ, *Assistant Examiner.*